United States Patent
Chand et al.

(10) Patent No.: US 12,417,596 B2
(45) Date of Patent: Sep. 16, 2025

(54) USER INTERFACES FOR MANAGING LIVE COMMUNICATION SESSIONS

(71) Applicant: Apple Inc., Cupertino, CA (US)

(72) Inventors: Jesse Chand, San Francisco, CA (US); Kristi E. Bauerly, Los Altos, CA (US); Stephen O. Lemay, Palo Alto, CA (US); Jonathan R. Dascola, San Francisco, CA (US); Shih-Sang Chiu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 18/367,418

(22) Filed: Sep. 12, 2023

(65) Prior Publication Data

US 2024/0104859 A1     Mar. 28, 2024

Related U.S. Application Data

(60) Provisional application No. 63/470,882, filed on Jun. 3, 2023, provisional application No. 63/409,583, filed on Sep. 23, 2022.

(51) Int. Cl.
    *G06T 19/00*          (2011.01)
    *G06T 19/20*          (2011.01)
    *H04N 7/15*            (2006.01)

(52) U.S. Cl.
    CPC ............ *G06T 19/006* (2013.01); *G06T 19/20* (2013.01); *H04N 7/152* (2013.01); *H04N 7/157* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 5,146,231 | A | 9/1992 | Ghaem et al. |
| 5,303,286 | A | 4/1994 | Wiedeman |
| 5,446,465 | A | 8/1995 | Diefes et al. |
| 5,583,514 | A | 12/1996 | Fulop |
| 5,587,717 | A | 12/1996 | Jang |

(Continued)

FOREIGN PATENT DOCUMENTS

| | | |
|---|---|---|
| CA | 2792987 A1 | 10/2011 |
| CN | 101042618 A | 9/2007 |

(Continued)

OTHER PUBLICATIONS

Corrected Notice of Allowance received for U.S. Appl. No. 18/230,465, mailed on Nov. 5, 2024, 2 pages.

(Continued)

*Primary Examiner* — Robert J Craddock
(74) *Attorney, Agent, or Firm* — DLA Piper LLP (US)

(57) ABSTRACT

The present disclosure generally relates to managing live communication sessions. A computer system optionally displays an option to invite the respective user to join the ongoing communication session. A computer system optionally one or more options to modify an appearance of an avatar representing the user of the computer system. A computer system optionally transitions a communication session from a spatial communication session to a non-spatial communication session. A computer system optionally displays information about a participant in a communication session.

47 Claims, 40 Drawing Sheets

(56) References Cited

U.S. PATENT DOCUMENTS

| | | |
|---|---|---|
| 5,812,932 A | 9/1998 | Wiedeman et al. |
| 5,863,057 A | 1/1999 | Wessels |
| 5,937,349 A | 8/1999 | Andresen |
| 5,995,041 A | 11/1999 | Bradley et al. |
| 6,006,068 A | 12/1999 | Elkin et al. |
| 6,052,587 A | 4/2000 | Moraes et al. |
| 6,108,538 A | 8/2000 | Blasiak et al. |
| 6,147,644 A | 11/2000 | Castles et al. |
| 6,157,896 A | 12/2000 | Castles et al. |
| 6,169,881 B1 | 1/2001 | Astrom et al. |
| 6,208,858 B1 | 3/2001 | Antonio et al. |
| 6,240,366 B1 | 5/2001 | Nagatsuma et al. |
| 6,263,280 B1 | 7/2001 | Stingone, Jr. |
| 6,272,316 B1 | 8/2001 | Wiedeman et al. |
| 6,278,861 B1 | 8/2001 | Ward et al. |
| 6,317,689 B1 | 11/2001 | Lee |
| 6,397,054 B1 | 5/2002 | Hoirup et al. |
| 6,549,848 B1 | 4/2003 | Green et al. |
| 6,580,452 B1 | 6/2003 | Gangitano |
| 6,690,934 B1 | 2/2004 | Conrad et al. |
| 6,763,226 B1 | 7/2004 | Mczeal, Jr. |
| 6,992,991 B2 | 1/2006 | Duske et al. |
| 7,057,625 B2 | 6/2006 | Kamata et al. |
| 7,184,744 B1 | 2/2007 | Schnabel |
| 7,233,795 B1 | 6/2007 | Ryden |
| 7,311,608 B1 | 12/2007 | Danieli et al. |
| 7,865,205 B1 | 1/2011 | Lundy et al. |
| 8,095,665 B1 | 1/2012 | Bau |
| 8,249,585 B2 | 8/2012 | Tronc et al. |
| 8,254,970 B1 | 8/2012 | Oshinsky et al. |
| 8,521,122 B2 | 8/2013 | Scott et al. |
| 8,584,031 B2 | 11/2013 | Moore et al. |
| 8,594,374 B1 | 11/2013 | Bozarth |
| 8,676,121 B1 | 3/2014 | Monte et al. |
| 8,732,609 B1 | 5/2014 | Bayersdorfer et al. |
| 8,855,012 B1 | 10/2014 | Suri |
| 8,971,946 B2 | 3/2015 | Ahmed et al. |
| 8,983,846 B2 | 3/2015 | Di Profio et al. |
| 8,996,639 B1 | 3/2015 | Faaborg et al. |
| 9,037,164 B2 | 5/2015 | Keerthi |
| 9,235,923 B1 | 1/2016 | Robinson et al. |
| 9,298,257 B2 | 3/2016 | Hwang et al. |
| 9,325,852 B2 | 4/2016 | Forstall et al. |
| 9,349,414 B1 | 5/2016 | Furment et al. |
| 9,369,832 B1 | 6/2016 | Noble et al. |
| 9,408,077 B1 | 8/2016 | David et al. |
| 9,411,506 B1 | 8/2016 | Marra et al. |
| 9,430,186 B2 | 8/2016 | Faaborg et al. |
| 9,489,074 B2 | 11/2016 | Oonishi |
| 9,503,177 B1 | 11/2016 | Shi et al. |
| 9,521,378 B1 | 12/2016 | Palaganas et al. |
| 9,575,720 B2 | 2/2017 | Faaborg et al. |
| 9,947,363 B2 | 4/2018 | Moon et al. |
| 9,965,039 B2 | 5/2018 | Kwon |
| 10,116,893 B1 | 10/2018 | Reis et al. |
| 10,199,051 B2 | 2/2019 | Binder et al. |
| 10,289,265 B2 | 5/2019 | Kulkarni |
| 10,325,417 B1 | 6/2019 | Scapel et al. |
| 10,375,313 B1 | 8/2019 | Van OS et al. |
| 10,376,153 B2 | 8/2019 | Tzvieli et al. |
| 10,419,712 B2 | 9/2019 | Arrasvuori et al. |
| 10,459,504 B2 | 10/2019 | Veloso et al. |
| 10,496,244 B2 | 12/2019 | Reynolds et al. |
| 10,505,726 B1 | 12/2019 | Andon et al. |
| 10,511,707 B2 | 12/2019 | Johnson et al. |
| 10,560,562 B1 | 2/2020 | Tandon |
| 10,623,451 B2 | 4/2020 | Rathod |
| 10,645,561 B1 | 5/2020 | Guo et al. |
| 10,659,405 B1 | 5/2020 | Chang et al. |
| 10,791,536 B1 | 9/2020 | Murphy |
| 10,796,480 B2 | 10/2020 | Chen et al. |
| 10,797,785 B1 | 10/2020 | Rhee |
| 10,802,582 B1 | 10/2020 | Clements |
| 10,853,410 B2 | 12/2020 | Herz |
| 10,959,074 B1 | 3/2021 | Shuman et al. |
| 10,984,569 B2 | 4/2021 | Bondich et al. |
| 11,003,315 B2 | 5/2021 | Sung et al. |
| 11,106,280 B1 | 8/2021 | Bigham et al. |
| 11,144,176 B2 | 10/2021 | Chang et al. |
| 11,217,036 B1 | 1/2022 | Albuz et al. |
| 11,349,559 B1 | 5/2022 | Reuss et al. |
| 11,361,521 B2 | 6/2022 | Lee et al. |
| 11,455,078 B1 | 9/2022 | Goodrich et al. |
| 11,467,713 B2 | 10/2022 | Buzyn et al. |
| 11,907,421 B1 | 2/2024 | Clements |
| 2001/0019330 A1 | 9/2001 | Bickmore et al. |
| 2002/0000931 A1 | 1/2002 | Petronic et al. |
| 2002/0006117 A1 | 1/2002 | Duske et al. |
| 2002/0180797 A1 | 12/2002 | Bachmann |
| 2003/0054814 A1 | 3/2003 | Karabinis et al. |
| 2003/0074647 A1 | 4/2003 | Andrew et al. |
| 2003/0083816 A1 | 5/2003 | Imakado et al. |
| 2003/0206170 A1 | 11/2003 | Bickmore et al. |
| 2004/0166811 A1 | 8/2004 | Moon |
| 2004/0179039 A1 | 9/2004 | Blattner et al. |
| 2004/0192368 A1 | 9/2004 | Edwards et al. |
| 2004/0257275 A1 | 12/2004 | Yee et al. |
| 2005/0125744 A1 | 6/2005 | Hubbard et al. |
| 2005/0143135 A1 | 6/2005 | Brems et al. |
| 2005/0168566 A1 | 8/2005 | Tada et al. |
| 2006/0017612 A1 | 1/2006 | Nagatani |
| 2006/0030334 A1 | 2/2006 | Hashimoto |
| 2006/0035632 A1 | 2/2006 | Sorvari et al. |
| 2006/0055700 A1 | 3/2006 | Niles et al. |
| 2006/0095563 A1 | 5/2006 | Benjamin et al. |
| 2006/0247915 A1 | 11/2006 | Bradford et al. |
| 2006/0258365 A1 | 11/2006 | Cha et al. |
| 2007/0024579 A1 | 2/2007 | Rosenberg |
| 2007/0047697 A1 | 3/2007 | Drewry et al. |
| 2007/0097113 A1 | 5/2007 | Lee et al. |
| 2007/0109186 A1 | 5/2007 | Fujiwara et al. |
| 2007/0123252 A1 | 5/2007 | Tronc et al. |
| 2007/0130606 A1 | 6/2007 | Jeong |
| 2007/0162872 A1 | 7/2007 | Hong et al. |
| 2007/0188380 A1 | 8/2007 | Duong et al. |
| 2007/0216572 A1 | 9/2007 | Schnabel |
| 2008/0030496 A1* | 2/2008 | Lee .............. G06F 3/04842 |
| | | 345/418 |
| 2008/0046839 A1 | 2/2008 | Mehra et al. |
| 2008/0082934 A1 | 4/2008 | Kocienda et al. |
| 2008/0153538 A1 | 6/2008 | Oshaughnessy et al. |
| 2008/0155428 A1 | 6/2008 | Lee |
| 2008/0158232 A1 | 7/2008 | Shuster |
| 2008/0165022 A1 | 7/2008 | Herz et al. |
| 2008/0166011 A1 | 7/2008 | Sever et al. |
| 2008/0168361 A1 | 7/2008 | Forstall et al. |
| 2008/0168379 A1 | 7/2008 | Forstall et al. |
| 2008/0186135 A1 | 8/2008 | Boling et al. |
| 2008/0218641 A1 | 9/2008 | Kjeldsen et al. |
| 2008/0250315 A1 | 10/2008 | Eronen et al. |
| 2008/0303715 A1 | 12/2008 | Wang et al. |
| 2008/0309677 A1 | 12/2008 | Fleury et al. |
| 2008/0313686 A1 | 12/2008 | Matvey |
| 2008/0316227 A1 | 12/2008 | Fleury et al. |
| 2009/0044113 A1 | 2/2009 | Jones et al. |
| 2009/0049905 A1 | 2/2009 | Lawhite et al. |
| 2009/0083382 A1 | 3/2009 | Rosenberg et al. |
| 2009/0100342 A1 | 4/2009 | Jakobson et al. |
| 2009/0135062 A1 | 5/2009 | Hori |
| 2009/0144639 A1 | 6/2009 | Nims et al. |
| 2009/0191854 A1 | 7/2009 | Beason |
| 2009/0191893 A1 | 7/2009 | Smith |
| 2009/0205041 A1 | 8/2009 | Michalske |
| 2009/0231356 A1 | 9/2009 | Barnes et al. |
| 2009/0249247 A1 | 10/2009 | Tseng et al. |
| 2009/0254624 A1 | 10/2009 | Baudin et al. |
| 2009/0262033 A1 | 10/2009 | King et al. |
| 2009/0267828 A1 | 10/2009 | Kobayashi et al. |
| 2009/0300525 A1 | 12/2009 | Jolliff et al. |
| 2009/0325701 A1 | 12/2009 | Andres Del Valle |
| 2010/0026640 A1 | 2/2010 | Kim et al. |
| 2010/0030660 A1 | 2/2010 | Edwards |
| 2010/0062749 A1 | 3/2010 | Yasuda et al. |
| 2010/0083159 A1 | 4/2010 | Mountain et al. |

(56) References Cited

U.S. PATENT DOCUMENTS

| | | |
|---|---|---|
| 2010/0085255 A1 | 4/2010 | Wakabayashi |
| 2010/0097375 A1 | 4/2010 | Tadaishi et al. |
| 2010/0113020 A1 | 5/2010 | Subramanian et al. |
| 2010/0123724 A1 | 5/2010 | Moore et al. |
| 2010/0125811 A1 | 5/2010 | Moore et al. |
| 2010/0156807 A1 | 6/2010 | Stallings et al. |
| 2010/0167672 A1 | 7/2010 | Ahn et al. |
| 2010/0251176 A1 | 9/2010 | Fong et al. |
| 2010/0271312 A1 | 10/2010 | Alameh et al. |
| 2010/0302138 A1 | 12/2010 | Poot et al. |
| 2010/0311385 A1 | 12/2010 | Hurwitz |
| 2011/0004524 A1 | 1/2011 | Paul et al. |
| 2011/0013075 A1 | 1/2011 | Kim et al. |
| 2011/0016425 A1 | 1/2011 | Homburg et al. |
| 2011/0032274 A1 | 2/2011 | Miyata |
| 2011/0057903 A1 | 3/2011 | Yamano et al. |
| 2011/0061017 A1 | 3/2011 | Ullrich et al. |
| 2011/0092158 A1 | 4/2011 | Plamondon |
| 2011/0130113 A1 | 6/2011 | Takuno |
| 2011/0136428 A1 | 6/2011 | Ritter |
| 2011/0157046 A1 | 6/2011 | Lee et al. |
| 2011/0175832 A1 | 7/2011 | Miyazawa et al. |
| 2011/0205182 A1 | 8/2011 | Miyazawa et al. |
| 2011/0230161 A1 | 9/2011 | Newman |
| 2011/0248992 A1 | 10/2011 | Van et al. |
| 2011/0252344 A1 | 10/2011 | Van |
| 2011/0265002 A1 | 10/2011 | Hong et al. |
| 2011/0285656 A1 | 11/2011 | Yaksick et al. |
| 2011/0302518 A1 | 12/2011 | Zhang |
| 2011/0306292 A1 | 12/2011 | Wilson et al. |
| 2012/0011449 A1 | 1/2012 | Sasson et al. |
| 2012/0059787 A1 | 3/2012 | Brown et al. |
| 2012/0068899 A1 | 3/2012 | Ayotte et al. |
| 2012/0075328 A1 | 3/2012 | Goossens |
| 2012/0081356 A1* | 4/2012 | Filippov ............... G06F 3/0412 345/419 |
| 2012/0084692 A1 | 4/2012 | Bae |
| 2012/0102399 A1 | 4/2012 | Nicholson |
| 2012/0105444 A1 | 5/2012 | Tokuda |
| 2012/0105486 A1 | 5/2012 | Lankford et al. |
| 2012/0113008 A1 | 5/2012 | Makinen et al. |
| 2012/0124516 A1 | 5/2012 | Friedman |
| 2012/0135715 A1 | 5/2012 | Kang et al. |
| 2012/0140767 A1 | 6/2012 | Brothers et al. |
| 2012/0158515 A1 | 6/2012 | K |
| 2012/0189273 A1 | 7/2012 | Folgner et al. |
| 2012/0237002 A1 | 9/2012 | Sennett et al. |
| 2012/0239822 A1 | 9/2012 | Poulson et al. |
| 2012/0254318 A1 | 10/2012 | Poniatowskl |
| 2012/0254989 A1 | 10/2012 | Levien et al. |
| 2012/0256967 A1 | 10/2012 | Baldwin et al. |
| 2012/0293686 A1 | 11/2012 | Karn et al. |
| 2012/0295708 A1 | 11/2012 | Hernandez-Abrego et al. |
| 2012/0314047 A1 | 12/2012 | Kasahara et al. |
| 2012/0316876 A1 | 12/2012 | Jang et al. |
| 2013/0010093 A1 | 1/2013 | Redmann et al. |
| 2013/0014019 A1 | 1/2013 | Kim et al. |
| 2013/0015946 A1 | 1/2013 | Lau et al. |
| 2013/0024781 A1 | 1/2013 | Douillet et al. |
| 2013/0024802 A1 | 1/2013 | Zeng et al. |
| 2013/0036380 A1 | 2/2013 | Symons |
| 2013/0038759 A1 | 2/2013 | Jo et al. |
| 2013/0063366 A1 | 3/2013 | Paul |
| 2013/0067391 A1 | 3/2013 | Pittappilly et al. |
| 2013/0109425 A1 | 5/2013 | Kerger et al. |
| 2013/0113956 A1 | 5/2013 | Anderson et al. |
| 2013/0114043 A1 | 5/2013 | Balan et al. |
| 2013/0117383 A1 | 5/2013 | Hymel et al. |
| 2013/0127665 A1 | 5/2013 | Miller et al. |
| 2013/0135146 A1 | 5/2013 | Ransom et al. |
| 2013/0141365 A1 | 6/2013 | Lynn et al. |
| 2013/0157729 A1 | 6/2013 | Tabe |
| 2013/0183924 A1 | 7/2013 | Saigh et al. |
| 2013/0197951 A1 | 8/2013 | Watson et al. |
| 2013/0198210 A1 | 8/2013 | Lee et al. |
| 2013/0205350 A1 | 8/2013 | Ling et al. |
| 2013/0225118 A1 | 8/2013 | Jang et al. |
| 2013/0227596 A1 | 8/2013 | Pettis et al. |
| 2013/0231077 A1 | 9/2013 | Cahill |
| 2013/0263043 A1 | 10/2013 | Sarbin et al. |
| 2013/0271319 A1 | 10/2013 | Trerise |
| 2013/0271320 A1 | 10/2013 | Trerise |
| 2013/0275875 A1 | 10/2013 | Gruber et al. |
| 2013/0286161 A1 | 10/2013 | Lv et al. |
| 2013/0293686 A1 | 11/2013 | Blow et al. |
| 2013/0295872 A1 | 11/2013 | Guday et al. |
| 2013/0295982 A1 | 11/2013 | Lee et al. |
| 2013/0301521 A1 | 11/2013 | Abdi |
| 2013/0307771 A1 | 11/2013 | Parker et al. |
| 2013/0315108 A1 | 11/2013 | Lindner et al. |
| 2013/0342730 A1 | 12/2013 | Lee et al. |
| 2014/0015784 A1 | 1/2014 | Oonishi |
| 2014/0022192 A1 | 1/2014 | Hatanaka |
| 2014/0039894 A1 | 2/2014 | Shostak |
| 2014/0064463 A1 | 3/2014 | Reddy |
| 2014/0078144 A1 | 3/2014 | Berriman et al. |
| 2014/0123005 A1 | 5/2014 | Forstall et al. |
| 2014/0134969 A1 | 5/2014 | Jin et al. |
| 2014/0143682 A1 | 5/2014 | Druck et al. |
| 2014/0143693 A1 | 5/2014 | Goossens et al. |
| 2014/0149878 A1 | 5/2014 | Mischari et al. |
| 2014/0157167 A1 | 6/2014 | Zhu |
| 2014/0164955 A1 | 6/2014 | Thiruvidam et al. |
| 2014/0181219 A1 | 6/2014 | Wang et al. |
| 2014/0195918 A1 | 7/2014 | Friedlander |
| 2014/0195972 A1 | 7/2014 | Lee et al. |
| 2014/0213214 A1 | 7/2014 | Reis |
| 2014/0213236 A1 | 7/2014 | Jimbo et al. |
| 2014/0218371 A1 | 8/2014 | Du et al. |
| 2014/0222436 A1 | 8/2014 | Binder et al. |
| 2014/0237393 A1 | 8/2014 | Van Wie et al. |
| 2014/0267543 A1 | 9/2014 | Kerger et al. |
| 2014/0267618 A1 | 9/2014 | Esteban et al. |
| 2014/0306898 A1 | 10/2014 | Cueto |
| 2014/0350924 A1 | 11/2014 | Zurek et al. |
| 2014/0351720 A1 | 11/2014 | Mn |
| 2014/0354539 A1 | 12/2014 | Skogo et al. |
| 2015/0011220 A1 | 1/2015 | Buckle et al. |
| 2015/0018040 A1 | 1/2015 | He et al. |
| 2015/0036883 A1 | 2/2015 | Deri et al. |
| 2015/0040012 A1 | 2/2015 | Faaborg et al. |
| 2015/0052462 A1 | 2/2015 | Kulkarni |
| 2015/0063428 A1 | 3/2015 | Lever |
| 2015/0077502 A1 | 3/2015 | Jordan et al. |
| 2015/0089398 A1 | 3/2015 | Song et al. |
| 2015/0091896 A1 | 4/2015 | Tarquini et al. |
| 2015/0097687 A1 | 4/2015 | Sloo et al. |
| 2015/0100537 A1 | 4/2015 | Grieves et al. |
| 2015/0109191 A1 | 4/2015 | Johnson et al. |
| 2015/0113435 A1 | 4/2015 | Phillips |
| 2015/0135309 A1 | 5/2015 | Karmarkar et al. |
| 2015/0137972 A1 | 5/2015 | Nepo |
| 2015/0141072 A1 | 5/2015 | Mumick |
| 2015/0149899 A1 | 5/2015 | Bernstein et al. |
| 2015/0153952 A1 | 6/2015 | Grossman et al. |
| 2015/0154001 A1 | 6/2015 | Knox et al. |
| 2015/0169053 A1 | 6/2015 | Bozarth et al. |
| 2015/0189091 A1 | 7/2015 | Forstall et al. |
| 2015/0195179 A1 | 7/2015 | Skare et al. |
| 2015/0213604 A1 | 7/2015 | Li et al. |
| 2015/0248235 A1 | 9/2015 | Offenberg et al. |
| 2015/0257126 A1 | 9/2015 | Herz |
| 2015/0261496 A1 | 9/2015 | Faaborg et al. |
| 2015/0271317 A1 | 9/2015 | Nelson et al. |
| 2015/0281145 A1 | 10/2015 | Ji |
| 2015/0312175 A1 | 10/2015 | Langholz |
| 2015/0338524 A1 | 11/2015 | Ben Moshe et al. |
| 2015/0341759 A1 | 11/2015 | Kerger et al. |
| 2015/0358790 A1 | 12/2015 | Nasserbakht |
| 2015/0366293 A1 | 12/2015 | Clarkson |
| 2015/0370323 A1 | 12/2015 | Cieplinski et al. |
| 2015/0370529 A1 | 12/2015 | Zambetti et al. |
| 2016/0005211 A1 | 1/2016 | Sarkis et al. |
| 2016/0014059 A1 | 1/2016 | Rathod |

(56) References Cited

U.S. PATENT DOCUMENTS

| | | |
|---|---|---|
| 2016/0034133 A1 | 2/2016 | Wilson et al. |
| 2016/0056525 A1 | 2/2016 | Hansryd et al. |
| 2016/0062540 A1 | 3/2016 | Yang et al. |
| 2016/0065669 A1 | 3/2016 | Van Dijkman et al. |
| 2016/0066277 A1 | 3/2016 | Yang et al. |
| 2016/0088455 A1 | 3/2016 | Bozik et al. |
| 2016/0117147 A1 | 4/2016 | Zambetti et al. |
| 2016/0150215 A1 | 5/2016 | Chen et al. |
| 2016/0183098 A1 | 6/2016 | Lim |
| 2016/0191694 A1 | 6/2016 | Kim et al. |
| 2016/0192163 A1 | 6/2016 | Miner et al. |
| 2016/0217601 A1 | 7/2016 | Tsuda et al. |
| 2016/0234664 A1 | 8/2016 | Vendrow et al. |
| 2016/0253745 A1 | 9/2016 | Lee |
| 2016/0277903 A1 | 9/2016 | Poosala et al. |
| 2016/0284123 A1 | 9/2016 | Hare et al. |
| 2016/0302083 A1 | 10/2016 | Durick et al. |
| 2016/0306051 A1 | 10/2016 | Hirabayashi et al. |
| 2016/0306533 A1 | 10/2016 | Agarwal et al. |
| 2016/0320838 A1 | 11/2016 | Teller et al. |
| 2016/0357720 A1 | 12/2016 | Thimbleby |
| 2016/0374047 A1 | 12/2016 | Reis |
| 2017/0004828 A1 | 1/2017 | Lee et al. |
| 2017/0006620 A1 | 1/2017 | Reis |
| 2017/0021260 A1 | 1/2017 | Willett et al. |
| 2017/0026110 A1 | 1/2017 | Richardson et al. |
| 2017/0026509 A1 | 1/2017 | Rand |
| 2017/0045623 A1 | 2/2017 | Zlogar et al. |
| 2017/0068439 A1 | 3/2017 | Mohseni |
| 2017/0069124 A1 | 3/2017 | Tong et al. |
| 2017/0085600 A1 | 3/2017 | Carter et al. |
| 2017/0123571 A1 | 5/2017 | Huang et al. |
| 2017/0124751 A1 | 5/2017 | Ross et al. |
| 2017/0150060 A1 | 5/2017 | Herz |
| 2017/0171636 A1 | 6/2017 | Devlin et al. |
| 2017/0180964 A1 | 6/2017 | Mehta et al. |
| 2017/0195307 A1 | 7/2017 | Jones-McFadden et al. |
| 2017/0223162 A1 | 8/2017 | Wilder et al. |
| 2017/0235361 A1 | 8/2017 | Rigazio et al. |
| 2017/0236298 A1 | 8/2017 | Vetter |
| 2017/0323266 A1 | 11/2017 | Seo |
| 2017/0332035 A1 | 11/2017 | Shah et al. |
| 2017/0332045 A1 | 11/2017 | Metter et al. |
| 2017/0336867 A1 | 11/2017 | Wilairat et al. |
| 2017/0352091 A1 | 12/2017 | Chen et al. |
| 2018/0018514 A1 | 1/2018 | Azam et al. |
| 2018/0024726 A1 | 1/2018 | Hviding |
| 2018/0024846 A1 | 1/2018 | Wu et al. |
| 2018/0035922 A1 | 2/2018 | Kim et al. |
| 2018/0040951 A1 | 2/2018 | Uchiyama |
| 2018/0047200 A1 | 2/2018 | O'Hara et al. |
| 2018/0063249 A1 | 3/2018 | Nguyen |
| 2018/0074693 A1 | 3/2018 | Jones et al. |
| 2018/0081515 A1 | 3/2018 | Block et al. |
| 2018/0088242 A1 | 3/2018 | Eagling |
| 2018/0091732 A1 | 3/2018 | Wilson et al. |
| 2018/0092057 A1 | 3/2018 | Yamashita et al. |
| 2018/0095635 A1 | 4/2018 | Valdivia et al. |
| 2018/0096690 A1 | 4/2018 | Mixter et al. |
| 2018/0176362 A1 | 6/2018 | Cohen |
| 2018/0192264 A1 | 7/2018 | Kwok et al. |
| 2018/0233139 A1 | 8/2018 | Finkelstein et al. |
| 2018/0262834 A1 | 9/2018 | Cho et al. |
| 2018/0268747 A1 | 9/2018 | Braun |
| 2018/0270000 A1 | 9/2018 | Reis et al. |
| 2018/0316416 A1 | 11/2018 | Reis et al. |
| 2018/0316885 A1 | 11/2018 | Reis et al. |
| 2018/0329587 A1 | 11/2018 | Ko et al. |
| 2018/0335930 A1 | 11/2018 | Scapel et al. |
| 2018/0336715 A1 | 11/2018 | Rickwald et al. |
| 2018/0338026 A1 | 11/2018 | Jon et al. |
| 2018/0338035 A1 | 11/2018 | Johnson et al. |
| 2018/0338237 A1 | 11/2018 | Maheswaranathan |
| 2018/0349795 A1 | 12/2018 | Boyle et al. |
| 2018/0365898 A1 | 12/2018 | Costa |
| 2019/0020992 A1 | 1/2019 | Romano |
| 2019/0049592 A1 | 2/2019 | Koontz et al. |
| 2019/0080066 A1 | 3/2019 | Van Os et al. |
| 2019/0080070 A1 | 3/2019 | Van Os et al. |
| 2019/0138092 A1 | 5/2019 | Song |
| 2019/0155382 A1 | 5/2019 | Ikuta et al. |
| 2019/0158735 A1 | 5/2019 | Wilson et al. |
| 2019/0190591 A1 | 6/2019 | Wang et al. |
| 2019/0235247 A1 | 8/2019 | Norden |
| 2019/0266775 A1 | 8/2019 | Lee et al. |
| 2019/0266807 A1 | 8/2019 | Lee et al. |
| 2019/0280788 A1 | 9/2019 | Hardy et al. |
| 2019/0295056 A1 | 9/2019 | Wright |
| 2019/0318283 A1 | 10/2019 | Kelly et al. |
| 2019/0333508 A1 | 10/2019 | Rao et al. |
| 2019/0339847 A1 | 11/2019 | Scapel et al. |
| 2019/0342507 A1 | 11/2019 | Dye et al. |
| 2019/0354265 A1 | 11/2019 | Winnemoeller |
| 2019/0369836 A1 | 12/2019 | Faulkner et al. |
| 2019/0371033 A1 | 12/2019 | Scapel et al. |
| 2019/0371323 A1 | 12/2019 | Kao et al. |
| 2019/0387092 A1 | 12/2019 | Tessier |
| 2020/0025944 A1 | 1/2020 | Mellier et al. |
| 2020/0034025 A1 | 1/2020 | Brady et al. |
| 2020/0042083 A1 | 2/2020 | Min |
| 2020/0053641 A1 | 2/2020 | Lee et al. |
| 2020/0075015 A1 | 3/2020 | Taki et al. |
| 2020/0103963 A1 | 4/2020 | Kelly et al. |
| 2020/0117900 A1 | 4/2020 | Deng et al. |
| 2020/0119984 A1 | 4/2020 | Bouvet et al. |
| 2020/0132644 A1 | 4/2020 | Micalizzi et al. |
| 2020/0187295 A1 | 6/2020 | Li et al. |
| 2020/0196209 A1 | 6/2020 | Cui et al. |
| 2020/0201540 A1 | 6/2020 | Zambetti et al. |
| 2020/0213436 A1 | 7/2020 | Mumick |
| 2020/0225746 A1 | 7/2020 | Bar-Zeev et al. |
| 2020/0234481 A1 | 7/2020 | Scapel et al. |
| 2020/0234508 A1 | 7/2020 | Shaburov et al. |
| 2020/0244673 A1 | 7/2020 | Stockdale et al. |
| 2020/0252780 A1 | 8/2020 | Mcclendon et al. |
| 2020/0264738 A1 | 8/2020 | Lee et al. |
| 2020/0265234 A1 | 8/2020 | Lee et al. |
| 2020/0304444 A1 | 9/2020 | Aneja et al. |
| 2020/0358725 A1 | 11/2020 | Scapel et al. |
| 2020/0367069 A1 | 11/2020 | Struhsaker et al. |
| 2020/0379560 A1 | 12/2020 | Krasadakis |
| 2020/0401686 A1 | 12/2020 | Duchastel |
| 2020/0402304 A1 | 12/2020 | Hwang et al. |
| 2020/0409533 A1 | 12/2020 | Blackstock et al. |
| 2021/0006287 A1 | 1/2021 | Peeters et al. |
| 2021/0011173 A1 | 1/2021 | Rhee |
| 2021/0027790 A1 | 1/2021 | Choi et al. |
| 2021/0048883 A1 | 2/2021 | Kelly et al. |
| 2021/0051444 A1 | 2/2021 | Ryu et al. |
| 2021/0058149 A1 | 2/2021 | Nuttall et al. |
| 2021/0120394 A1 | 4/2021 | Martin et al. |
| 2021/0144539 A1 | 5/2021 | Edge et al. |
| 2021/0168581 A1 | 6/2021 | Van Den Dungen |
| 2021/0175963 A1 | 6/2021 | Chang et al. |
| 2021/0243072 A1 | 8/2021 | Peterson et al. |
| 2021/0255269 A1 | 8/2021 | Lv et al. |
| 2021/0286502 A1 | 9/2021 | Lemay et al. |
| 2021/0311203 A1 | 10/2021 | Reis et al. |
| 2021/0311609 A1 | 10/2021 | Dandoko |
| 2021/0349612 A1 | 11/2021 | Triverio |
| 2021/0405831 A1 | 12/2021 | Mourkogiannis et al. |
| 2022/0066048 A1 | 3/2022 | Diggelen et al. |
| 2022/0091737 A1 | 3/2022 | Bower et al. |
| 2022/0100270 A1 | 3/2022 | Pastrana Vicente et al. |
| 2022/0100812 A1 | 3/2022 | Anvaripour et al. |
| 2022/0116105 A1 | 4/2022 | Robinson et al. |
| 2022/0131822 A1 | 4/2022 | Jon et al. |
| 2022/0206675 A1 | 6/2022 | Hawkes |
| 2022/0207840 A1 | 6/2022 | Cansizoglu et al. |
| 2022/0214743 A1 | 7/2022 | Dascola et al. |
| 2022/0229546 A1 | 7/2022 | Lee et al. |
| 2022/0230379 A1 | 7/2022 | Shriram et al. |
| 2022/0237660 A1 | 7/2022 | Balondona |
| 2022/0253136 A1 | 8/2022 | Holder et al. |

(56) References Cited

U.S. PATENT DOCUMENTS

| | | |
|---|---|---|
| 2022/0256631 A1 | 8/2022 | Jain et al. |
| 2022/0291793 A1 | 9/2022 | Zambetti et al. |
| 2022/0301041 A1 | 9/2022 | Lee et al. |
| 2022/0319075 A1 | 10/2022 | Hu et al. |
| 2022/0359064 A1 | 11/2022 | Pierson et al. |
| 2022/0374137 A1 | 11/2022 | Triverio et al. |
| 2022/0413605 A1 | 12/2022 | Liu et al. |
| 2023/0063173 A1 | 3/2023 | Caro et al. |
| 2023/0065219 A1 | 3/2023 | Caro et al. |
| 2023/0066232 A1 | 3/2023 | Caro et al. |
| 2023/0071037 A1 | 3/2023 | Kim et al. |
| 2023/0081032 A1 | 3/2023 | Ardaud et al. |
| 2023/0185373 A1 | 6/2023 | Kelly et al. |
| 2023/0214107 A1 | 7/2023 | Zambetti et al. |
| 2023/0254152 A1 | 8/2023 | Ratnakaram et al. |
| 2023/0273985 A1 | 8/2023 | Suchan et al. |
| 2023/0305688 A1 | 9/2023 | Triverio et al. |
| 2023/0308538 A1 | 9/2023 | Caro et al. |
| 2023/0328171 A1 | 10/2023 | Caro et al. |
| 2023/0379573 A1 | 11/2023 | Wilson et al. |
| 2023/0384860 A1 | 11/2023 | Dedonato et al. |
| 2024/0028110 A1 | 1/2024 | Aurongzeb et al. |
| 2024/0028177 A1 | 1/2024 | Pastrana Vicente et al. |
| 2024/0036717 A1 | 2/2024 | Triverio |
| 2024/0085707 A1 | 3/2024 | Schowengerdt |
| 2024/0103616 A1 | 3/2024 | Yerkes et al. |
| 2024/0103617 A1 | 3/2024 | Yerkes et al. |
| 2024/0103678 A1 | 3/2024 | Dryer et al. |
| 2024/0118746 A1 | 4/2024 | Yerkes et al. |
| 2024/0257486 A1 | 8/2024 | El Asmar et al. |
| 2024/0259676 A1 | 8/2024 | Wilson et al. |
| 2024/0427417 A1 | 12/2024 | Kelly et al. |

FOREIGN PATENT DOCUMENTS

| | | |
|---|---|---|
| CN | 101098535 A | 1/2008 |
| CN | 101203821 A | 6/2008 |
| CN | 102012738 A | 4/2011 |
| CN | 102163098 A | 8/2011 |
| CN | 102271241 A | 12/2011 |
| CN | 102446059 A | 5/2012 |
| CN | 102622085 A | 8/2012 |
| CN | 102790826 A | 11/2012 |
| CN | 102854979 A | 1/2013 |
| CN | 102905244 A | 1/2013 |
| CN | 103092469 A | 5/2013 |
| CN | 101938287 B | 6/2013 |
| CN | 103516894 A | 1/2014 |
| CN | 103703438 A | 4/2014 |
| CN | 103713843 A | 4/2014 |
| CN | 103744671 A | 4/2014 |
| CN | 103927190 A | 7/2014 |
| CN | 104182741 A | 12/2014 |
| CN | 104246793 A | 12/2014 |
| CN | 104641318 A | 5/2015 |
| CN | 105190700 A | 12/2015 |
| CN | 105283840 A | 1/2016 |
| CN | 105453025 A | 3/2016 |
| CN | 105611275 A | 5/2016 |
| CN | 105786394 A | 7/2016 |
| CN | 105874405 A | 8/2016 |
| CN | 106104677 A | 11/2016 |
| CN | 108574773 A | 9/2018 |
| CN | 108718447 A | 10/2018 |
| CN | 110046020 A | 7/2019 |
| CN | 112634416 A | 4/2021 |
| EP | 0963061 A2 | 12/1999 |
| EP | 1215867 A2 | 6/2002 |
| EP | 1736931 A2 | 12/2006 |
| EP | 1777611 A1 | 4/2007 |
| EP | 2040146 A2 | 3/2009 |
| EP | 2302493 A2 | 3/2011 |
| EP | 2437148 A2 | 4/2012 |
| EP | 2615607 A2 | 7/2013 |
| EP | 2653961 A1 | 10/2013 |
| EP | 2677775 A1 | 12/2013 |
| EP | 2720126 A1 | 4/2014 |
| EP | 2782297 A1 | 9/2014 |
| EP | 2981000 A1 | 2/2016 |
| EP | 3047884 A1 | 7/2016 |
| EP | 3190563 A1 | 7/2017 |
| EP | 3248180 A1 | 11/2017 |
| EP | 2801972 B1 | 1/2018 |
| EP | 3373132 A2 | 9/2018 |
| EP | 3676972 B1 | 2/2022 |
| GB | 2370208 A | 6/2002 |
| JP | 9-9072 A | 1/1997 |
| JP | 9-81309 A | 3/1997 |
| JP | 9-172401 A | 6/1997 |
| JP | 10-191423 A | 7/1998 |
| JP | 10-293860 A | 11/1998 |
| JP | 11-312159 A | 11/1999 |
| JP | 2000-40990 A | 2/2000 |
| JP | 2000-76460 A | 3/2000 |
| JP | 2001-320449 A | 11/2001 |
| JP | 2003-75525 A | 3/2003 |
| JP | 2003-219217 A | 7/2003 |
| JP | 2004-96265 A | 3/2004 |
| JP | 2004-519033 A | 6/2004 |
| JP | 2005-532607 A | 10/2005 |
| JP | 2006-102327 A | 4/2006 |
| JP | 2006520053 A | 8/2006 |
| JP | 2008-97202 A | 4/2008 |
| JP | 2008-257363 A | 10/2008 |
| JP | 2010-211742 A | 9/2010 |
| JP | 2011-209787 A | 10/2011 |
| JP | 2011-209887 A | 10/2011 |
| JP | 2011-530101 A | 12/2011 |
| JP | 2012-18569 A | 1/2012 |
| JP | 2012-123475 A | 6/2012 |
| JP | 2013-97760 A | 5/2013 |
| JP | 2013-239979 A | 11/2013 |
| JP | 2014-230061 A | 12/2014 |
| JP | 2016-15624 A | 1/2016 |
| JP | 2016-508007 A | 3/2016 |
| JP | 2016-76799 A | 5/2016 |
| JP | 2016-136324 A | 7/2016 |
| JP | 2017-527917 A | 9/2017 |
| JP | 6238381 B1 | 11/2017 |
| JP | 2018-513515 A | 5/2018 |
| JP | 2018-532298 A | 11/2018 |
| JP | 2019-505117 A | 2/2019 |
| JP | 2019-155115 A | 9/2019 |
| JP | 2020-504376 A | 2/2020 |
| JP | 2020-149336 A | 9/2020 |
| JP | 2020-187775 A | 11/2020 |
| JP | 6853820 B2 | 3/2021 |
| JP | 2021-533512 A | 12/2021 |
| JP | 2022-03545 A | 1/2022 |
| JP | 2022-8997 A | 1/2022 |
| JP | 2022-23406 A | 2/2022 |
| KR | 10-2004-0009115 A | 1/2004 |
| KR | 10-2004-0046272 A | 6/2004 |
| KR | 10-2008-0050336 A | 6/2008 |
| KR | 10-2010-0086052 A | 7/2010 |
| KR | 10-2011-0028581 A | 3/2011 |
| KR | 10-2014-0033088 A | 3/2014 |
| KR | 10-2014-0049340 A | 4/2014 |
| KR | 10-2014-0073232 A | 6/2014 |
| KR | 10-2015-0067197 A | 6/2015 |
| KR | 10-2015-0068013 A | 6/2015 |
| KR | 10-1540544 B1 | 7/2015 |
| KR | 10-2015-0094197 A | 8/2015 |
| KR | 10-1587115 B1 | 1/2016 |
| KR | 10-2016-0018109 A | 2/2016 |
| KR | 10-2016-0097913 A | 8/2016 |
| KR | 10-2017-0065563 A | 6/2017 |
| KR | 10-2020-0101206 A | 8/2020 |
| KR | 10-2020-0132995 A | 11/2020 |
| WO | 99/66394 A1 | 12/1999 |
| WO | 99/66395 A2 | 12/1999 |
| WO | 03/058589 A2 | 7/2003 |
| WO | 2004/010672 A2 | 1/2004 |
| WO | 2004/079530 A2 | 9/2004 |

(56) References Cited

FOREIGN PATENT DOCUMENTS

| | | |
|---|---|---|
| WO | 2005/057890 A2 | 6/2005 |
| WO | 2006/094308 A2 | 9/2006 |
| WO | 2007/139580 A1 | 12/2007 |
| WO | 2009/073607 A2 | 6/2009 |
| WO | 2009/125481 A1 | 10/2009 |
| WO | 2009/133710 A1 | 11/2009 |
| WO | 2011/127309 A1 | 10/2011 |
| WO | 2011/130849 A8 | 5/2012 |
| WO | 2012/128361 A1 | 9/2012 |
| WO | 2012/170354 A2 | 12/2012 |
| WO | 2013/120851 A1 | 8/2013 |
| WO | 2013/169851 A2 | 11/2013 |
| WO | 2013/169854 A2 | 11/2013 |
| WO | 2013/169870 A1 | 11/2013 |
| WO | 2013/169877 A2 | 11/2013 |
| WO | 2014/024000 A1 | 2/2014 |
| WO | 2014/053063 A1 | 4/2014 |
| WO | 2014/105279 A1 | 7/2014 |
| WO | 2014/124332 A2 | 8/2014 |
| WO | 2014/197339 A1 | 12/2014 |
| WO | 2014/200729 A2 | 12/2014 |
| WO | 2015/017043 A1 | 2/2015 |
| WO | 2015/088141 A1 | 6/2015 |
| WO | 2016/036218 A1 | 3/2016 |
| WO | 2016/036522 A2 | 3/2016 |
| WO | 2016/042926 A1 | 3/2016 |
| WO | 2016/060848 A1 | 4/2016 |
| WO | 2016/116814 A1 | 7/2016 |
| WO | 2016/189390 A2 | 12/2016 |
| WO | 2017/068422 A1 | 4/2017 |
| WO | 2018/109751 A1 | 6/2018 |
| WO | 2018/125563 A1 | 7/2018 |
| WO | 2018/226265 A1 | 12/2018 |
| WO | 2019/118020 A1 | 6/2019 |
| WO | 2019/216999 A1 | 11/2019 |
| WO | 2020/028236 A1 | 2/2020 |
| WO | 2020/226785 A1 | 11/2020 |
| WO | 2021/071532 A1 | 4/2021 |
| WO | 2022/086580 A1 | 4/2022 |
| WO | 2022/147146 A1 | 7/2022 |

OTHER PUBLICATIONS

Notice of Acceptance received for Australian Patent Application No. 2023270278, mailed on Oct. 30, 2024, 3 pages.

Office Action received for Chinese Patent Application No. 202010295272.4, mailed on Oct. 10, 2024, 9 pages (4 pages of English Translation and 5 pages of Official Copy).

Corrected Notice of Allowance received for U.S. Appl. No. 17/899,510, mailed on Dec. 10, 2024, 3 pages.

International Preliminary Report on Patentability received for PCT Patent Application No. PCT/US2023/023273, mailed on Dec. 5, 2024, 13 pages.

Non-Final Office Action received for U.S. Appl. No. 17/898,342, mailed on Dec. 12, 2024, 12 pages.

Office Action received for Australian Patent Application No. 2023219926, mailed on Dec. 3, 2024, 4 pages.

Office Action received for European Patent Application No. 22197430.6, mailed on Dec. 3, 2024, 8 pages.

Office Action received for European Patent Application No. 22198902.3, mailed on Dec. 12, 2024, 8 pages.

Applicant-Initiated Interview Summary received for U.S. Appl. No. 17/899,510, mailed on Jan. 4, 2024, 2 pages.

Applicant-Initiated Interview Summary received for U.S. Appl. No. 17/899,510, mailed on Nov. 22, 2023, 2 pages.

Applicant-Initiated Interview Summary received for U.S. Appl. No. 18/105,191, mailed on Jan. 17, 2024, 2 pages.

Board Decision received for Chinese Patent Application No. 202010295272.4, mailed on Dec. 14, 2023, 2 pages (1 page of English Translation and 1 page of Official Copy).

Corrected Notice of Allowance received for U.S. Appl. No. 17/899,530, mailed on Nov. 8, 2023, 3 pages.

Decision on Appeal received for U.S. Appl. No. 16/259,771, mailed on Feb. 8, 2024, 18 pages.

Decision to Refuse received for European Patent Application No. 17853657.9, mailed on Feb. 2, 2024, 17 pages.

Decision to Refuse received for European Patent Application No. 19212057.4, mailed on Feb. 5, 2024, 18 pages.

Examiner's Answer to Appeal Brief received for U.S. Appl. No. 18/119,789, mailed on Jan. 22, 2024, 45 pages.

Final Office Action received for U.S. Appl. No. 17/899,510, mailed on Nov. 30, 2023, 21 pages.

Final Office Action received for U.S. Appl. No. 18/105,191, mailed on Feb. 20, 2024, 20 pages.

International Preliminary Report on Patentability received for PCT Patent Application No. PCT/US2022/029811, mailed on Nov. 30, 2023, 10 pages.

International Preliminary Report on Patentability received for PCT Patent Application No. PCT/US2022/042069, mailed on Mar. 14, 2024, 15 pages.

International Search Report and Written Opinion received for PCT Patent Application No. PCT/US2023/023273, mailed on Sep. 15, 2023, 19 pages.

International Search Report and Written Opinion received for PCT Patent Application No. PCT/US2023/033372, mailed on Jan. 12, 2024, 21 pages.

International Search Report and Written Opinion received for PCT Patent Application No. PCT/US2023/033376, mailed on Mar. 18, 2024, 21 pages.

International Search Report and Written Opinion received for PCT Patent Application No. PCT/US2023/033540, mailed on Feb. 6, 2024, 25 pages.

Invitation to Pay Additional Fees and Partial International Search Report received for PCT Patent Application No. PCT/US2023/033372, mailed on Nov. 22, 2023, 13 pages.

Invitation to Pay Additional Fees and Partial International Search Report received for PCT Patent Application No. PCT/US2023/033376, mailed on Jan. 24, 2024, 13 pages.

Invitation to Pay Additional Fees and Partial International Search Report received for PCT Patent Application No. PCT/US2023/033540, mailed on Dec. 12, 2023, 17 pages.

Krumm et al., "Multi-camera multi-person tracking for easyliving", Third IEEE International Workshop on Visual Surveillance, Available online at: http://mesh.brown.edu/en193s05-2004/pdfs/KrummEtAl-iwvs00.pdf, Jul. 1, 2000, 8 pages.

Minutes of the Oral Proceedings received for European Patent Application No. 19212057.4, mailed on Jan. 31, 2024, 6 pages.

Non-Final Office Action received for U.S. Appl. No. 17/899,510, mailed on Mar. 27, 2024, 22 pages.

Non-Final Office Action received for U.S. Appl. No. 17/899,510, mailed on Oct. 26, 2023, 18 pages.

Non-Final Office Action received for U.S. Appl. No. 18/105,191, mailed on Oct. 13, 2023, 23 pages.

Notice of Acceptance received for Australian Patent Application No. 2022231779, mailed on Feb. 5, 2024, 3 pages.

Notice of Acceptance received for Australian Patent Application No. 2022235630, mailed on Sep. 28, 2023, 3 pages.

Notice of Allowance received for U.S. Appl. No. 17/899,530, mailed on Oct. 19, 2023, 13 pages.

Office Action received for Australian Patent Application No. 2022231779, mailed on Nov. 6, 2023, 3 pages.

Office Action received for Chinese Patent Application No. 202010295272.4, mailed on Aug. 28, 2023, 8 pages (4 pages of English Translation and 4 pages of Official Copy).

Office Action received for Chinese Patent Application No. 202010295272.4, mailed on Feb. 5, 2024, 14 pages (6 pages of English Translation and 8 pages of Official Copy).

Office Action received for Japanese Patent Application No. 2022-170806, mailed on Nov. 17, 2023, 14 pages (7 pages of English Translation and 7 pages of Official Copy).

Office Action received for Japanese Patent Application No. 2023-001790, mailed on Mar. 4, 2024, 10 pages (5 pages of English Translation and 5 pages of Official Copy).

(56) References Cited

OTHER PUBLICATIONS

Office Action received for Korean Patent Application No. 10-2023-7039673, mailed on Feb. 20, 2024, 11 pages (2 pages of English Translation and 9 pages of Official Copy).
Record of Oral Hearing received for U.S. Appl. No. 16/259,771, mailed on Feb. 4, 2024, 15 pages.
Corrected Notice of Allowance received for U.S. Appl. No. 17/899,510, mailed on Oct. 21, 2024, 16 pages.
Corrected Notice of Allowance received for U.S. Appl. No. 18/230,465, mailed on Oct. 17, 2024, 2 pages.
Corrected Notice of Allowance received for U.S. Appl. No. 18/230,465, mailed on Oct. 24, 2024, 2 pages.
Decision to Grant received for European Patent Application No. 23173355.1, mailed on Oct. 24, 2024, 3 pages.
Extended European Search Report received for European Patent Application No. 24203946.9, mailed on Oct. 24, 2024, 9 pages.
Extended European Search Report received for European Patent Application No. 24204114.3, mailed on Dec. 23, 2024, 10 pages.
Intention to Grant received for European Patent Application No. 22729935.1, mailed on Nov. 22, 2024, 9 pages.
Office Action received for European Patent Application No. 22769872.7, mailed on Nov. 15, 2024, 11 pages.
Office Action received for Korean Patent Application No. 10-2023-7039602, mailed on Nov. 14, 2024, 12 pages (5 pages of English Translation and 7 pages of Official Copy).
Advisory Action received for U.S. Appl. No. 14/833,014, mailed on Jan. 27, 2017, 3 pages.
Advisory Action received for U.S. Appl. No. 16/259,771, mailed on Feb. 26, 2020, 3 pages.
Advisory Action received for U.S. Appl. No. 16/259,771, mailed on Jul. 14, 2020, 6 pages.
Advisory Action received for U.S. Appl. No. 16/806,981, mailed on Jun. 14, 2021, 6 pages.
Advisory Action received for U.S. Appl. No. 17/093,408, mailed on Jun. 5, 2023, 4 pages.
Applicant Initiated Interview Summary received for U.S. Appl. No. 16/259,771, mailed on May 5, 2020, 10 pages.
Applicant Initiated Interview Summary received for U.S. Appl. No. 16/553,622, mailed on Aug. 3, 2020, 3 pages.
Applicant Initiated Interview Summary received for U.S. Appl. No. 16/806,981, mailed on Jan. 28, 2022, 4 pages.
Applicant Initiated Interview Summary received for U.S. Appl. No. 17/079,216, mailed on May 8, 2023, 2 pages.
Applicant Initiated Interview Summary received for U.S. Appl. No. 17/899,510, mailed on Apr. 27, 2023, 2 pages.
Applicant-Initiated Interview Summary received for U.S. Appl. No. 16/259,771, mailed on Apr. 18, 2022, 2 pages.
Applicant-Initiated Interview Summary received for U.S. Appl. No. 17/087,855, mailed on Feb. 28, 2022, 2 pages.
Applicant-Initiated Interview Summary received for U.S. Appl. No. 17/087,855, mailed on Jul. 5, 2022, 2 pages.
Applicant-Initiated Interview Summary received for U.S. Appl. No. 17/087,855, mailed on Nov. 5, 2021, 2 pages.
Applicant-Initiated Interview Summary received for U.S. Appl. No. 17/093,408, mailed on Jan. 5, 2023, 3 pages.
Applicant-Initiated Interview Summary received for U.S. Appl. No. 17/093,408, mailed on Jul. 1, 2022, 3 pages.
Applicant-Initiated Interview Summary received for U.S. Appl. No. 17/093,408, mailed on Mar. 1, 2022, 3 pages.
Applicant-Initiated Interview Summary received for U.S. Appl. No. 17/093,408, mailed on May 10, 2023, 3 pages.
Applicant-Initiated Interview Summary received for U.S. Appl. No. 17/093,408, mailed on May 25, 2023, 2 pages.
Applicant-Initiated Interview Summary received for U.S. Appl. No. 17/746,179, mailed on Nov. 28, 2022, 4 pages.
Applicant-Initiated Interview Summary received for U.S. Appl. No. 17/899,315, mailed on Jan. 24, 2023, 3 pages.
Applicant-Initiated Interview Summary received for U.S. Appl. No. 17/899,510, mailed on Aug. 2, 2023, 2 pages.
Applicant-Initiated Interview Summary received for U.S. Appl. No. 17/899,530, mailed on Aug. 3, 2023, 5 pages.
Applicant-Initiated Interview Summary received for U.S. Appl. No. 17/899,530, mailed on Feb. 3, 2023, 6 pages.
Applicant-Initiated Interview Summary received for U.S. Appl. No. 17/899,530, mailed on Jul. 3, 2023, 6 pages.
Applicant-Initiated Interview Summary received for U.S. Appl. No. 18/119,789, mailed on Jul. 31, 2023, 4 pages.
Applicant-Initiated Interview Summary received for U.S. Appl. No. 18/119,789, mailed on Sep. 27, 2023, 3 pages.
Brief Communication Regarding Oral Proceedings received for European Patent Application No. 20176616.9, mailed on Jun. 9, 2022, 1 page.
Brief Communication Regarding Oral Proceedings received for European Patent Application No. 20176616.9, mailed on May 27, 2022, 1 page.
Certificate of Examination received for Australian Patent Application No. 2019100525, mailed on Aug. 6, 2019, 2 pages.
Corrected Notice of Allowance received for U.S. Appl. No. 15/713,490, mailed on May 1, 2019, 2 pages.
Corrected Notice of Allowance received for U.S. Appl. No. 16/553,622, mailed on Sep. 23, 2020, 5 pages.
Corrected Notice of Allowance received for U.S. Appl. No. 17/079,216, mailed on Aug. 3, 2023, 4 pages.
Corrected Notice of Allowance received for U.S. Appl. No. 17/079,216, mailed on May 19, 2023, 3 pages.
Corrected Notice of Allowance received for U.S. Appl. No. 17/087,855, mailed on Jan. 12, 2023, 6 pages.
Corrected Notice of Allowance received for U.S. Appl. No. 17/087,855, mailed on Jan. 25, 2023, 4 pages.
Corrected Notice of Allowance received for U.S. Appl. No. 17/093,408, mailed on Sep. 13, 2023, 2 pages.
Corrected Notice of Allowance received for U.S. Appl. No. 17/093,408, mailed on Sep. 20, 2023, 3 pages.
Decision on Appeal received for Korean Patent Application No. 10-2021-7002582, mailed on May 13, 2022, 29 pages (2 pages of English Translation and 27 pages of Official Copy).
Decision on Appeal received for U.S. Appl. No. 14/833,014, mailed on Oct. 30, 2019, 10 pages.
Decision on Appeal received for U.S. Appl. No. 16/259,771, mailed on Aug. 19, 2021, 12 pages.
Decision to Grant received for Danish Patent Application No. PA201670320, mailed on Oct. 18, 2018, 2 pages.
Decision to Grant received for Danish Patent Application No. PA201870383, mailed on Jun. 3, 2020, 2 pages.
Decision to Grant received for European Patent Application No. 15759998.6, mailed on Jun. 18, 2020, 2 pages.
Decision to Grant received for European Patent Application No. 19769336.9, mailed on Oct. 7, 2022, 2 pages.
European Search Report received for European Patent Application No. 21179101.7, mailed on Sep. 28, 2021, 5 pages.
Examiner Interview Summary received for U.S. Appl. No. 16/806,981, mailed on Mar. 26, 2021, 2 pages.
Examiner-Initiated Interview Summary received for U.S. Appl. No. 16/806,981, mailed on Jan. 13, 2022, 4 pages.
Examiner-Initiated Interview Summary received for U.S. Appl. No. 16/806,981, mailed on May 24, 2021, 4 pages.
Examiner's Answer to Appeal Brief received for U.S. Appl. No. 14/833,014, mailed on Nov. 2, 2017, 48 pages.
Examiner's Answer to Appeal Brief received for U.S. Appl. No. 16/259,771, mailed on May 26, 2023, 23 pages.
Examiner's Answer to Appeal Brief received for U.S. Appl. No. 16/259,771, mailed on Oct. 23, 2020, 15 pages.
Examiner's Pre-Review Report received for Japanese Patent Application No. 2019-215503, mailed on Aug. 20, 2021, 15 pages (8 pages of English Translation and 7 pages of Official Copy).
Extended European Search Report received for European Patent Application No. 17853657.9, mailed on May 28, 2020, 9 pages.
Extended European Search Report received for European Patent Application No. 19212057.4, mailed on Feb. 27, 2020, 8 pages.
Extended European Search Report received for European Patent Application No. 20176616.9, mailed on Sep. 8, 2020, 7 Pages.

(56) References Cited

OTHER PUBLICATIONS

Extended European Search Report received for European Patent Application No. 22179347.4, mailed on Oct. 13, 2022, 7 pages.
Extended European Search Report received for European Patent Application No. 22197430.6, mailed on Jan. 26, 2023, 8 pages.
Extended European Search Report received for European Patent Application No. 22197456.1, mailed on Feb. 2, 2023, 9 pages.
Extended European Search Report received for European Patent Application No. 22198902.3, mailed on Jan. 20, 2023, 9 pages.
Extended European Search Report received for European Patent Application No. 23173355.1, mailed on Aug. 4, 2023, 8 pages.
Final Office Action received for U.S. Appl. No. 14/833,014, mailed on Oct. 26, 2016, 32 pages.
Final Office Action received for U.S. Appl. No. 15/352,215, mailed on Mar. 7, 2019, 22 pages.
Final Office Action received for U.S. Appl. No. 16/259,771, mailed on Aug. 12, 2022, 25 pages.
Final Office Action received for U.S. Appl. No. 16/259,771, mailed on Nov. 18, 2019, 13 pages.
Final Office Action received for U.S. Appl. No. 16/806,981, mailed on Apr. 14, 2021, 24 pages.
Final Office Action received for U.S. Appl. No. 16/806,981, mailed on Mar. 1, 2022, 33 pages.
Final Office Action received for U.S. Appl. No. 17/087,855, mailed on Mar. 31, 2022, 23 pages.
Final Office Action received for U.S. Appl. No. 17/093,408, mailed on Mar. 2, 2023, 51 pages.
Final Office Action received for U.S. Appl. No. 17/093,408, mailed on May 18, 2022, 41 pages.
Final Office Action received for U.S. Appl. No. 17/899,510, mailed on Jun. 2, 2023, 15 pages.
Final Office Action received for U.S. Appl. No. 17/899,530, mailed on Mar. 8, 2023, 68 pages.
Final Office Action received for U.S. Appl. No. 18/119,789, mailed on Aug. 30, 2023, 29 pages.
Intention to Grant received for Danish Patent Application No. PA201670320, mailed on May 17, 2018, 2 pages.
Intention to Grant received for Danish Patent Application No. PA201870383, mailed on Feb. 11, 2020, 2 pages.
Intention to Grant received for European Patent Application No. 15759998.6, mailed on Apr. 17, 2020, 10 pages.
Intention to Grant received for European Patent Application No. 15759998.6, mailed on Nov. 21, 2019, 12 pages.
Intention to Grant received for European Patent Application No. 19769336.9, mailed on May 31, 2022, 13 pages.
International Preliminary Report on Patentability received for PCT Patent Application No. PCT/US2015/046262, mailed on Mar. 16, 2017, 26 pages.
International Preliminary Report on Patentability received for PCT Patent Application No. PCT/US2017/049795, mailed on Apr. 4, 2019, 16 pages.
International Preliminary Report on Patentability received for PCT Patent Application No. PCT/US2018/033051, mailed on Nov. 28, 2019, 15 pages.
International Preliminary Report on Patentability received for PCT Patent Application No. PCT/US2019/049239, mailed on Apr. 8, 2021, 12 pages.
International Preliminary Report on Patentability received for PCT Patent Application No. PCT/US2021/031096, mailed on Nov. 24, 2022, 11 pages.
International Search Report and Written Opinion received for PCT Application No. PCT/US2017/049795, mailed on Dec. 27, 2017., 26 pages.
International Search Report and Written Opinion Received for PCT Patent Application No. PCT/US2018/033051, mailed on Nov. 22, 2018, 22 pages.
International Search Report and Written Opinion received for PCT Patent Application No. PCT/US2019/049239, mailed on Jan. 22, 2020, 18 pages.
International Search Report and Written Opinion received for PCT Patent Application No. PCT/US2021/031096, mailed on Oct. 13, 2021, 16 pages.
International Search Report and Written Opinion received for PCT Patent Application No. PCT/US2022/029811, mailed on Nov. 7, 2022, 15 pages.
International Search Report and Written Opinion received for PCT Patent Application No. PCT/US2022/042069, mailed on Feb. 14, 2023, 22 pages.
International Search Report and Written Opinion received for PCT Patent Application No. PCT/US2022/043183, mailed on Jan. 23, 2023, 17 pages.
International Search Report and Written Opinion received for PCT Patent Application No. PCT/US2022/044637, mailed on Mar. 15, 2023, 19 pages.
International Search Report and Written Opinion received for PCT Patent Application No. PCT/US2023/14067, mailed on Aug. 4, 2023, 17 pages.
Invitation to Pay Additional Fees and Partial International Search Report received for PCT Patent Application No. PCT/US2018/033051, mailed on Sep. 20, 2018, 14 pages.
Invitation to Pay Additional Fees and Partial International Search Report received for PCT Patent Application No. PCT/US2022/029811, mailed on Sep. 14, 2022, 9 pages.
Invitation to Pay Additional Fees and Partial International Search Report received for PCT Patent Application No. PCT/US2022/042069, mailed on Dec. 22, 2022, 14 pages.
Invitation to Pay Additional Fees and Partial International Search Report received for PCT Patent Application No. PCT/US2022/044637, mailed on Jan. 20, 2023, 12 pages.
Invitation to Pay Additional Fees and Partial International Search Report received for PCT Patent Application No. PCT/US2023/14067, mailed on Jun. 14, 2023, 16 pages.
Invitation to Pay Additional Fees received for PCT Patent Application No. PCT/US2017/049795, mailed on Nov. 3, 2017, 3 pages.
Invitation to Pay Additional Fees received for PCT Patent Application No. PCT/US2019/049239, mailed on Dec. 4, 2019, 10 pages.
Invitation to Pay Additional Fees received for PCT Patent Application No. PCT/US2021/031096, mailed on Aug. 19, 2021, 8 pages.
Invitation to Pay Additional Fees received for PCT Patent Application No. PCT/US2022/043183, mailed on Nov. 30, 2022, 10 pages.
Invitation to Pay Search Fees received for European Patent Application No. 18730555.2, mailed on May 14, 2020, 3 pages.
Non-Final Office Action received for U.S. Appl. No. 15/352,215, mailed on Sep. 20, 2018, 31 pages.
Non-Final Office Action received for U.S. Appl. No. 15/981,828, mailed on Jan. 7, 2020, 8 pages.
Non-Final Office Action received for U.S. Appl. No. 16/259,771, mailed on Jan. 25, 2022, 20 pages.
Non-Final Office Action received for U.S. Appl. No. 16/259,771, mailed on May 8, 2019, 11 pages.
Non-Final Office Action received for U.S. Appl. No. 16/553,622, mailed on May 29, 2020, 11 pages.
Non-Final Office Action received for U.S. Appl. No. 16/806,981, mailed on Nov. 13, 2020, 22 pages.
Non-Final Office Action received for U.S. Appl. No. 16/806,981, mailed on Sep. 1, 2021, 27 pages.
Non-Final Office Action received for U.S. Appl. No. 17/079,216, mailed on Jan. 11, 2023, 15 pages.
Non-Final Office Action received for U.S. Appl. No. 17/087,855, mailed on Dec. 24, 2021, 21 pages.
Non-Final Office Action received for U.S. Appl. No. 17/087,855, mailed on Jul. 12, 2021, 17 pages.
Non-Final Office Action received for U.S. Appl. No. 17/087,855, mailed on Jul. 21, 2022, 23 pages.
Non-Final Office Action received for U.S. Appl. No. 17/093,408, mailed on Dec. 8, 2021, 37 pages.
Non-Final Office Action received for U.S. Appl. No. 17/093,408, mailed on Sep. 14, 2022, 46 pages.
Non-Final Office Action received for U.S. Appl. No. 17/746,179, mailed on Oct. 25, 2022, 18 pages.

(56) References Cited

OTHER PUBLICATIONS

Non-Final Office Action received for U.S. Appl. No. 17/827,004, mailed on Nov. 9, 2022, 27 pages.
Non-Final Office Action received for U.S. Appl. No. 17/899,315, mailed on Dec. 22, 2022, 20 pages.
Non-Final Office Action received for U.S. Appl. No. 17/899,315, mailed on Nov. 4, 2022, 20 pages.
Non-Final Office Action received for U.S. Appl. No. 17/899,510, mailed on Mar. 16, 2023, 16 pages.
Non-Final Office Action received for U.S. Appl. No. 17/899,530, mailed on Jan. 3, 2023, 67 pages.
Non-Final Office Action received for U.S. Appl. No. 17/899,530, mailed on May 25, 2023, 68 pages.
Non-Final Office Action received for U.S. Appl. No. 18/119,789, mailed on Jun. 28, 2023, 31 pages.
Notice of Acceptance received for Australian Patent Application No. 2017330212, mailed on Apr. 28, 2020, 3 pages.
Notice of Acceptance received for Australian Patent Application No. 2018269510, mailed on Apr. 17, 2020, 3 pages.
Notice of Acceptance received for Australian Patent Application No. 2019346842, mailed on Jan. 21, 2021, 3 pages.
Notice of Acceptance received for Australian Patent Application No. 2020210262, mailed on Jan. 20, 2022, 3 pages.
Notice of Acceptance received for Australian Patent Application No. 2020213402, mailed on Sep. 21, 2020, 3 pages.
Notice of Acceptance received for Australian Patent Application No. 2020294208, mailed on Mar. 2, 2022, 3 pages.
Notice of Acceptance received for Australian Patent Application No. 2021202352, mailed on Jun. 6, 2022, 3 pages.
Notice of Acceptance received for Australian Patent Application No. 2022200965, mailed on May 11, 2023, 3 pages.
Notice of Acceptance received for Australian Patent Application No. 2022202360, mailed on Apr. 14, 2023, 3 pages.
Notice of Acceptance received for Australian Patent Application No. 2023204622, mailed on Aug. 10, 2023, 3 pages.
Notice of Allowance received for Chinese Patent Application No. 201510557356.X, mailed on Mar. 5, 2020, 2 pages (1 page of English Translation and 1 pages of Official Copy).
Notice of Allowance received for Chinese Patent Application No. 201780058426.4, mailed on Jun. 30, 2023, 2 pages (1 page of English Translation and 1 page of Official Copy).
Notice of Allowance received for Chinese Patent Application No. 201880036526.1, mailed on Apr. 22, 2021, 2 pages (1 page of English Translation and 1 page of Official Copy).
Notice of Allowance received for Chinese Patent Application No. 201910315328.5, mailed on Aug. 24, 2022, 4 pages (1 page of English Translation and 3 pages of Official Copy).
Notice of Allowance received for Chinese Patent Application No. 201980041865.3, mailed on Aug. 16, 2022, 6 pages (3 pages of English Translation and 3 pages of Official Copy).
Notice of Allowance received for Danish Patent Application No. PA201570563, mailed on May 24, 2016, 2 pages.
Notice of Allowance received for Japanese Patent Application No. 2018-107114, mailed on Mar. 22, 2019, 4 pages (1 page of English Translation and 3 pages of Official Copy.
Notice of Allowance received for Japanese Patent Application No. 2019-215503, mailed on Aug. 26, 2022, 3 pages (1 page of English Translation and 2 pages of Official Copy).
Notice of Allowance received for Japanese Patent Application No. 2019-511767, mailed on Mar. 30, 2020, 4 pages (1 page of English Translation and 3 pages of Official Copy).
Notice of Allowance received for Japanese Patent Application No. 2020-569806, mailed on Jul. 12, 2021, 4 pages (1 page of English Translation and 3 pages of Official Copy).
Notice of Allowance received for Japanese Patent Application No. 2021-092483, mailed on Sep. 30, 2022, 4 pages (1 page of English Translation and 3 pages of Official Copy).
Notice of Allowance received for Japanese Patent Application No. 2021-131310, mailed on Dec. 9, 2022, 4 pages (1 pages of English Translation and 3 pages of Official Copy).

Notice of Allowance received for Korean Patent Application No. 10-2019-7005369, mailed on Oct. 26, 2020, 4 pages (1 page of English Translation and 3 pages of Official Copy).
Notice of Allowance received for Korean Patent Application No. 10-2020-7036748, mailed on Jan. 25, 2021, 3 pages (1 page of English Translation and 2 pages of Official Copy).
Notice of Allowance received for Korean Patent Application No. 10-2021-7010306, mailed on Aug. 14, 2023, 7 pages (2 pages of English Translation and 5 pages of Official Copy).
Notice of Allowance received for Korean Patent Application No. 10-2022-7003364, mailed on Jul. 28, 2023, 7 pages (2 pages of English Translation and 5 pages of Official Copy).
Notice of Allowance received for Netherland Patent Application No. 2019753, mailed on Jul. 6, 2018, 6 pages (2 pages of English Translation and 4 pages of Official copy).
Notice of Allowance received for Taiwanese Patent Application No. 104128684, mailed on Feb. 23, 2017, 3 pages (Official Copy only) (See Communication under 37 CFR § 1.98(a) (3)).
Notice of Allowance received for U.S. Appl. No. 14/833,014, mailed on Nov. 20, 2019, 5 pages.
Notice of Allowance received for U.S. Appl. No. 15/352,215, mailed on Nov. 27, 2019, 20 pages.
Notice of Allowance received for U.S. Appl. No. 15/713,490, mailed on Mar. 20, 2019, 15 pages.
Notice of Allowance received for U.S. Appl. No. 15/981,828, mailed on Jul. 13, 2020, 8 pages.
Notice of Allowance received for U.S. Appl. No. 16/553,622, mailed on Sep. 11, 2020, 8 pages.
Notice of Allowance received for U.S. Appl. No. 17/079,216, mailed on Apr. 27, 2023, 6 pages.
Notice of Allowance received for U.S. Appl. No. 17/079,216, mailed on May 5, 2023, 3 pages.
Notice of Allowance received for U.S. Appl. No. 17/087,855, mailed on Nov. 25, 2022, 8 pages.
Notice of Allowance received for U.S. Appl. No. 17/093,408, mailed on Aug. 30, 2023, 59 pages.
Notice of Allowance received for U.S. Appl. No. 17/746,179, mailed on Mar. 6, 2023, 8 pages.
Notice of Allowance received for U.S. Appl. No. 17/899,315, mailed on Feb. 24, 2023, 9 pages.
Office Action received for Australian Patent Application No. 2017330212, mailed on Feb. 21, 2020, 2 pages.
Office Action received for Australian Patent Application No. 2018269510, mailed on Feb. 21, 2020, 3 pages.
Office Action received for Australian Patent Application No. 2020210262, mailed on Jul. 28, 2021, 6 pages.
Office Action received for Australian Patent Application No. 2020294208, mailed on Dec. 17, 2021, 2 pages.
Office Action received for Australian Patent Application No. 2021202352, mailed on Mar. 15, 2022, 3 pages.
Office Action received for Australian Patent Application No. 2022200965, mailed on Feb. 14, 2023, 4 pages.
Office Action received for Australian Patent Application No. 2022202360, mailed on Feb. 17, 2023, 4 pages.
Office Action received for Australian Patent Application No. 2022231779, mailed on Aug. 7, 2023, 5 pages.
Office Action received for Australian Patent Application No. 2022235630, mailed on Jul. 21, 2023, 6 pages.
Office Action received for Australian Patent Application No. 2022235630, mailed on May 17, 2023, 3 pages.
Office Action received for Chinese Patent Application No. 201510557356.X, mailed on Aug. 15, 2019, 12 pages (7 pages of English Translation and 5 pages of Official Copy).
Office Action received for Chinese Patent Application No. 201510557356.X, mailed on Dec. 29, 2017, 11 pages (5 pages of English Translation and 6 pages of Official Copy).
Office Action received for Chinese Patent Application No. 201510557356.X, mailed on Nov. 23, 2018, 12 pages (5 pages of English Translation and 7 pages of Official Copy).
Office Action received for Chinese Patent Application No. 201520679198.0, mailed on Jun. 24, 2016, 5 pages (3 pages of English Translation and 2 pages of Official Copy).

(56) References Cited

OTHER PUBLICATIONS

Office Action received for Chinese Patent Application No. 201621208900.6, mailed on Apr. 26, 2017, 2 pages (Official Copy only) (See Communication under 37 CFR § 1.98(a)(3)).
Office Action received for Chinese Patent Application No. 201780058426.4, mailed on Dec. 2, 2022, 11 pages (5 pages of English Translation and 6 pages of Official Copy).
Office Action received for Chinese Patent Application No. 201810411708.4, mailed on Feb. 24, 2022, 10 pages (5 pages of English Translation and 5 pages of Official Copy).
Office Action received for Chinese Patent Application No. 201810411708.4, mailed on Feb. 26, 2021, 16 pages (8 pages of English Translation and 8 pages of Official Copy).
Office Action received for Chinese Patent Application No. 201810411708.4, mailed on Nov. 12, 2021, 12 pages (6 pages of English Translation and 6 pages of Official Copy).
Office Action received for Chinese Patent Application No. 201880036526.1, mailed on Aug. 21, 2020, 8 pages (3 pages of English Translation and 5 pages of Official Copy).
Office Action received for Chinese Patent Application No. 201910315328.5, mailed on Nov. 30, 2021, 21 pages (10 pages of English Translation and 11 pages of Official Copy).
Office Action received for Chinese Patent Application No. 201911199054.4, mailed on Jan. 20, 2021, 19 pages (11 pages of English Translation and 8 pages of Official Copy).
Office Action received for Chinese Patent Application No. 201911199054.4, mailed on Jul. 3, 2020, 15 pages (9 pages of English Translation and 6 pages of Official Copy).
Office Action received for Chinese Patent Application No. 201911199054.4, mailed on Jun. 10, 2021, 13 pages (7 pages of English Translation and 6 pages of Official Copy).
Office Action received for Chinese Patent Application No. 201980041865.3, mailed on Apr. 13, 2022, 12 pages (6 pages of English Translation and 6 pages of Official Copy).
Office Action received for Chinese Patent Application No. 201980041865.3, mailed on May 24, 2021, 14 pages (8 pages of English Translation and 6 pages of Official Copy).
Office Action received for Chinese Patent Application No. 202010295272.4, mailed on Feb. 27, 2023, 15 pages (6 pages of English Translation and 9 pages of Official Copy).
Office Action received for Danish Patent Application No. PA201670319, mailed on Aug. 2, 2016, 6 pages.
Office Action received for Danish Patent Application No. PA201670319, mailed on Jun. 21, 2017, 6 pages.
Office Action received for Danish Patent Application No. PA201670319, mailed on Nov. 24, 2016, 7 pages.
Office Action received for Danish Patent Application No. PA201670320, mailed on Aug. 4, 2016, 9 pages.
Office Action received for Danish Patent Application No. PA201670320, mailed on Dec. 5, 2016, 4 pages.
Office Action received for Danish Patent Application No. PA201670320, mailed on Jan. 18, 2018, 2 pages.
Office Action received for Danish Patent Application No. PA201670320, mailed on Jul. 3, 2017, 4 pages.
Office Action received for Danish Patent Application No. PA201770395, mailed on Apr. 11, 2019, 10 pages.
Office Action received for Danish Patent Application No. PA201770395, mailed on May 25, 2018, 10 pages.
Office Action received for Danish Patent Application No. PA201870383, mailed on Aug. 26, 2019, 3 pages.
Office Action received for Danish Patent Application No. PA202070167, mailed on Jul. 2, 2021, 5 pages.
Office Action received for European Patent Application No. 15759998.6, mailed on Dec. 19, 2018, 6 pages.
Office Action received for European Patent Application No. 15759998.6, mailed on Jul. 16, 2018, 6 pages.
Office Action received for European Patent Application No. 15759998.6, mailed on May 29, 2019, 6 pages.
Office Action received for European Patent Application No. 17853657.9, mailed on Apr. 1, 2021, 6 pages.
Office Action received for European Patent Application No. 18730555.2, mailed on Feb. 25, 2021, 9 pages.
Office Action received for European Patent Application No. 18730555.2, mailed on Sep. 7, 2020, 11 pages.
Office Action received for European Patent Application No. 19212057.4, mailed on Mar. 9, 2021, 6 pages.
Office Action received for European Patent Application No. 19769336.9, mailed on Nov. 4, 2021, 6 pages.
Office Action received for European Patent Application No. 20176616.9, mailed on Jun. 10, 2021, 4 pages.
Office Action received for European Patent Application No. 21179101.7, mailed on Jul. 7, 2023, 8 pages.
Office Action received for European Patent Application No. 21179101.7, mailed on Oct. 8, 2021, 10 pages.
Office Action received for Japanese Patent Application No. 2017-510631, mailed on Mar. 2, 2018, 12 pages (7 pages of English Translation and 5 pages of Official Copy).
Office Action received for Japanese Patent Application No. 2018-107114, mailed on Oct. 9, 2018, 4 pages (2 pages of English Translation and 2 pages of Official copy).
Office Action received for Japanese Patent Application No. 2019-215503, mailed on Feb. 5, 2021, 12 pages (6 pages of English Translation and 6 pages of Official Copy).
Office Action received for Japanese Patent Application No. 2019-215503, mailed on Jul. 3, 2020, 12 pages (6 pages of English Translation and 6 pages of Official Copy).
Office Action received for Japanese Patent Application No. 2021-092483, mailed on Apr. 1, 2022, 8 pages (4 pages of English Translation and 4 pages of Official Copy).
Office Action received for Japanese Patent Application No. 2021-131310, mailed on Sep. 2, 2022, 9 pages (5 pages of English Translation and 4 pages of Official Copy).
Office Action received for Korean Patent Application No. 10-2019-7005369, mailed on Mar. 13, 2020, 12 pages (5 pages of English Translation and 7 pages of Official Copy).
Office Action received for Korean Patent Application No. 10-2021-7002582, mailed on Apr. 16, 2021, 13 pages (6 pages of English Translation and 7 pages of Official Copy).
Office Action received for Korean Patent Application No. 10-2021-7002582, mailed on Oct. 29, 2021, 6 pages (3 pages of English Translation and 3 pages of Official Copy).
Office Action received for Korean Patent Application No. 10-2021-7010306, mailed on Feb. 15, 2023, 10 pages (5 pages of English Translation and 5 pages of Official Copy).
Office Action received for Korean Patent Application No. 10-2022-7003364, mailed on Apr. 22, 2022, 14 pages (6 pages of English Translation and 8 pages of Official Copy).
Office Action received for Korean Patent Application No. 10-2022-7003364, mailed on Dec. 26, 2022, 8 pages (3 pages of English Translation and 5 pages of Official Copy).
Office Action received for Netherland Patent Application No. 2019753, mailed on Apr. 12, 2018, 8 pages (3 page of English Translation and 5 pages of Official Copy).
Office Action received for Taiwanese Patent Application No. 104128684, mailed on Nov. 8, 2016, 24 pages (9 pages of English Translation and 15 pages of Official Copy).
Qualcomm Toq-smartwatch-User Manual, Available Online At: URL: https://toq.qualcomm.com/sites/default/files/qualcomm_toq_user_manual.pdf [retrieved on Jun. 25, 2015], Nov. 27, 2013, pp. 1-38.
Record of Oral Hearing received for U.S. Appl. No. 16/259,771, mailed on Aug. 4, 2021, 15 pages.
Search Report and Opinion received for Danish Patent Application No. PA201770395, mailed on Sep. 5, 2017, 14 pages.
Search Report and Opinion received for Danish Patent Application No. PA201870383, mailed on Sep. 7, 2018, 8 pages.
Search Report and Opinion received for Danish Patent Application No. PA202070167, mailed on Nov. 25, 2020, 9 pages.
Search Report and Opinion received for Netherlands Patent Application No. 2015364, issued on Jul. 4, 2017, 12 pages (5 pages of English Translation of Search Opinion and 7 pages of official copy).
Summons to Attend Oral Proceedings received for European Patent Application No. 17853657.9, mailed on May 2, 2023, 8 pages.

(56) References Cited

OTHER PUBLICATIONS

Summons to Attend Oral Proceedings received for European Patent Application No. 19212057.4, mailed on Apr. 19, 2023, 9 pages.
Summons to Attend Oral Proceedings received for European Patent Application No. 20176616.9, mailed on Dec. 17, 2021, 7 pages.
Supplemental Notice of Allowance received for U.S. Appl. No. 14/833,014, mailed on Mar. 12, 2020, 2 pages.
Supplemental Notice of Allowance received for U.S. Appl. No. 15/713,490, mailed on May 30, 2019, 2 pages.
Supplemental Notice of Allowance received for U.S. Appl. No. 17/746,179, mailed on Apr. 3, 2023, 2 pages.
Non Final Office Action received for U.S. Appl. No. 14/833,014, mailed on Mar. 21, 2016, 26 pages.
Office Action Recieved for Australian Patent Application No. 2015101183, issued on Nov. 6, 2015, 4 pages.
Office Action received for Chinese Patent Application No. 2015206791980, mailed on Mar. 7, 2016, 6 pages (4 pages of English Translation and 2 pages of Official Copy).
Office Action Received for Chinese Patent Application No. 2015206791980, mailed on Nov. 18, 2015, 4 pages (2 pages English Translation and 2 pages Official copy).
Applivgames, "Super Mario Run" Stickers for iMessage: Free Delivery Started!, Available online at: <https://games.app-liv.jp/archives/178627>, Sep. 13, 2016, 3 pages (Official Copy Only) (See Communication under 37 CFR § 1.98(a) (3)).
Clark Mitchell, "Qualcomm's going toe-to-toe with Apple's satellite messaging feature", Available online at: https://www.theverge.com/2023/1/5/23538207/qualcomm-satellite-messaging-snapdragon-android, Jan. 6, 2023, 18 pages.
Contents Pocket, "Line Stamp Information", Available online at: <https://web.archive.org/web/20150404080541/http://contents-pocket.net/linestamp.html>, Apr. 2015, 2 pages (Official Copy Only) (See Communication under 37 CFR § 1.98(a) (3)).
Exultationpictures, "Align Satellite Dish on Astra 19.2 with the App Satellite Finder (Pro) and DUR Line SF4000", Online available at: https://www.youtube.com/watch?v=n5EEZ6rcYcQ, Mar. 29, 2021, 2 pages.
Fono et al., "Eye Windows: Evaluation of Eye-Controlled Zooming Windows for Focus Selection", CHI 2005, Conference Proceedings, Conference On Human Factors In Computing Systems, Apr. 2-7, 2005, pp. 151-160.
Horowitz Paul, "Always Show Scroll Bars in Mac OS X", OS X Daily, available online at: URL: http:jjosxdaily.com/2011/08/03/show-scroll-bars-mac-os-x-lion/, Aug. 3, 2011, 7 pages.
Krotov Ilya, "Bellus3D app experience", Available online at: https://www.youtube.com/watch?v=aSu688IY26c&t=45s, Aug. 17, 2021, 2 pages.
Motorola Solutions, "Wave 7000 Push-to-Talk for Mobile Devices", XP055709564, Retrieved from the Internet: URL: https://learning.motorolasolutions.com/es/node/2426/download, Jul. 2016, pp. 1-54.
Intention To Grant received for Danish Patent Application No. PA201570563, mailed on Mar. 17, 2016, 7 pages.
International Search Report and Written Opinion received for PCT Patent Application No. PCT/US2015/046262, mailed on Mar. 15, 2016, 34 pages.
Invitation to Pay Additional Fees received for PCT Patent Application No. PCT/US2015/046262, mailed on Nov. 23, 2015, 7 pages.
Peters Jay, "The iPhone 13's rumored satellite link sounds like it's just for emergencies", The Verge, Available online at: https://apple.news/A-xX1QS6IT2m818PPKtL52Q, Aug. 30, 2021, 2 pages.
Pocketnow,"AT&T Enhanced Push To Talk: A Guided Tour | Pocketnow", Retrieved from https://www.youtube.com/watch?v=aagcgg07EEc, Dec. 25, 2012, 1 page.
ProPTT2 Wearable App with Apple Watch, Retrieved from the Internet: <https://www.youtube.com/watch?v=iqOT30irl4A>, Mar. 29, 2017, 3 pages.
Singh Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.

Team on the Run, "Push-To-Talk Feature for Android", Retrieved from the Internet: <https://www.youtube.com/watch?v=_dlrC7q92KQ>, Oct. 14, 2016, 3 pages.
Theunlockr, "Galaxy Watch Complete Walkthrough: The Best Watch They've Made So Far", Available online at: https://www.youtube.com/watch?v=xiECIfe1SN4, Sep. 11, 2018, 27 pages.
Wikipedia, "Emoji", Online Available at: https://web.archive.org/web/20140829025736/https://en.wikipedia.org/wiki/Emoji, 2014, 13 pages.
ZY News, "Generate Cartoon Face within Three Seconds, You are the New-generation Expression Emperor", Online available at: <http://inews.ifeng.com/48551936/news.shtml>, Apr. 22, 2016, 3 pages (Official Copy Only) (See Communication under 37 CFR § 1.98(a) (3)).
Applicant-Initiated Interview Summary received for U.S. Appl. No. 17/899,510, mailed on Jun. 5, 2024, 2 pages.
Applicant-Initiated Interview Summary received for U.S. Appl. No. 18/105,191, mailed on Apr. 30, 2024, 2 pages.
Applicant-Initiated Interview Summary received for U.S. Appl. No. 18/204,908, mailed on Jul. 2, 2024, 4 pages.
Board Opinion received for Chinese Patent Application No. 201911199054.4, mailed on May 10, 2024, 24 pages (13 pages of English Translation and 11 pages of Official Copy).
Corrected Notice of Allowance received for U.S. Appl. No. 18/105,191, mailed on Aug. 6, 2024, 5 pages.
Decision to Grant received for European Patent Application No. 22197456.1, mailed on Aug. 29, 2024, 3 pages.
Decision to Grant received for Japanese Patent Application No. 2023-572180. mailed on Apr. 22, 2024. 3 pages (1 page of English Translation and 2 pages of Official Copy).
Intention to Grant received for European Patent Application No. 22197456.1, mailed on Apr. 16, 2024, 9 pages.
Intention to Grant received for European Patent Application No. 23173355.1, mailed on Jun. 28, 2024, 9 pages.
International Preliminary Report on Patentability received for PCT Patent Application No. PCT/US2022/043183, mailed on Mar. 28, 2024, 12 pages.
International Preliminary Report on Patentability received for PCT Patent Application No. PCT/US2022/044637, mailed on Apr. 4, 2024, 12 pages.
International Preliminary Report on Patentability received for PCT Patent Application No. PCT/US2023/014067. mailed on Sep. 12, 2024, 12 pages.
International Search Report and Written Opinion received for PCT Patent Application No. PCT/US2024/012658, mailed on Jun. 21, 2024, 22 pages.
Invitation to Pay Additional Fees and Partial International Search Report received for PCT Patent Application No. PCT/US2024/012658, mailed on Apr. 30, 2024, 13 pages.
Invitation to Pay Search Fees received for European Patent Application No. 21727979.3, mailed on Jul. 10, 2024, 4 pages.
Non-Final Office Action received for U.S. Appl. No. 18/204,908, mailed on Jun. 5, 2024, 16 pages.
Non-Final Office Action received for U.S. Appl. No. 18/230,465, mailed on Aug. 15, 2024, 37 pages.
Notice of Allowance received for Chinese Patent Application No. 202110666978.1, mailed on Jun. 28, 2024, 5 pages (1 page of English Translation and 4 pages of Official Copy).
Notice of Allowance received for Japanese Patent Application No. 2022-170806, mailed on Aug. 9, 2024, 4 pages (1 page of English Translation and 3 pages of Official Copy).
Notice of Allowance received for Japanese Patent Application No. 2022-557929, mailed on Aug. 5, 2024, 5 pages (1 page of English Translation and 4 pages of Official Copy).
Notice of Allowance received for Japanese Patent Application No. 2023-001790, mailed on Jul. 5, 2024, 4 pages (1 page of English Translation and 3 pages of Official Copy).
Notice of Allowance received for Korean Patent Application No. 10-2023-7039673, mailed on Aug. 21, 2024, 4 pages (1 page of English Translation and 3 pages of Official Copy).
Notice of Allowance received for U.S. Appl. No. 17/899,510, mailed on Sep. 11, 2024, 20 pages.

(56) References Cited

OTHER PUBLICATIONS

Notice of Allowance received for U.S. Appl. No. 18/105,191, mailed on May 22, 2024, 8 pages.
Notice of Allowance received for U.S. Appl. No. 18/204,908, mailed on Jul. 24, 2024, 6 pages.
Notice of Allowance received for U.S. Appl. No. 18/230,465, mailed on Sep. 16, 2024, 5 pages.
Office Action received for Australian Patent Application No. 2023219926, mailed on Aug. 24, 2024, 5 pages.
Office Action received for Australian Patent Application No. 2023270278, mailed on Sep. 17, 2024, 3 pages.
Office Action received for Chinese Patent Application No. 202010295272.4, mailed on Jun. 11, 2024, 12 pages (5 pages of English Translation and 7 pages of Official Copy).
Office Action received for Chinese Patent Application No. 202280036173.1, mailed on Jul. 21, 2024, 12 pages (6 pages of English Translation and 6 pages of Official Copy).
Office Action received for Chinese Patent Application No. 202280036173.1, mailed on May 10, 2024, 16 pages (8 pages of English Translation and 8 pages of Official Copy).
Office Action received for European Patent Application No. 22729935.1. mailed on May 10. 2024, 7 pages.
Office Action received for Japanese Patent Application No. 2022-170806, mailed on May 13, 2024, 4 pages (2 pages of English Translation and 2 pages of Official Copy).
Office Action received for Japanese Patent Application No. 2022-557929, mailed on Mar. 29, 2024, 8 pages (4 pages of English Translation and 4 pages of Official Copy).
Office Action received for Japanese Patent Application No. 2023-001269, mailed on Mar. 22, 2024, 14 pages (7 pages of English Translation and 7 pages of Official Copy).
Office Action received for Japanese Patent Application No. 2023-001270, mailed on Mar. 22, 2024, 10 pages (5 pages of English Translation and 5 pages of Official Copy).
Office Action received for Korean Patent Application No. 10-2023-7037034, mailed on Jul. 22, 2024, 23 pages (11 pages of English Translation and 12 pages of Official Copy).
Supplemental Notice of Allowance received for U.S. Appl. No. 18/204,908, mailed on Aug. 13, 2024, 2 pages.
Board Decision received for Chinese Patent Application No. 201911199054.4, mailed on Sep. 25, 2024, 24 pages (1 page of English Translation and 23 pages of Official Copy).
Corrected Notice of Allowance received for U.S. Appl. No. 17/899,510, mailed on Oct. 1, 2024, 3 pages.
Corrected Notice of Allowance received for U.S. Appl. No. 18/230,465, mailed on Oct. 9, 2024, 2 pages.
Notice of Allowance received for Japanese Patent Application No. 2023-001270, mailed on Sep. 30, 2024, 4 pages (1 page of English Translation and 3 pages of Official Copy).
Office Action received for European Patent Application No. 21727979.3, mailed on Sep. 26, 2024, 11 pages.
Office Action received for Japanese Patent Application No. 2023-001269, mailed on Sep. 20, 2024, 9 pages (4 pages of English Translation and 5 pages of Official Copy).
Supplemental Notice of Allowance received for U.S. Appl. No. 18/204,908, mailed on Oct. 9, 2024, 2 pages.
Supplemental Notice of Allowance received for U.S. Appl. No. 18/204,908, mailed on Sep. 26, 2024, 2 pages.
Corrected Notice of Allowance received for U.S. Appl. No. 18/378,470, mailed on May 29, 2025, 2 pages.
Kxowls, "Face Unlock Not Working", Online available at: https://youtube.com/shorts/EF8WgD . . . 9Oiw?si=i-4X8OAGPLHgMfvz, Nov. 2, 2020, 2 pages.
Non-Final Office Action received for U.S. Appl. No. 18/167,767, mailed on Jun. 4, 2025, 32 pages.
Office Action received for Korean Patent Application No. 10-2023-7039602, mailed on May 28, 2025, 9 pages (4 pages of English Translation and 5 pages of Official Copy).
Applicant-Initiated Interview Summary received for U.S. Appl. No. 18/374,562, mailed on Jul. 22, 2025, 2 pages.
Final Office Action received for U.S. Appl. No. 17/941,400, mailed on Jul. 17, 2025, 8 pages.
Intention to Grant received for European Patent Application No. 22197430.6, mailed on Jul. 22, 2025, 12 pages.
Intention to Grant received for European Patent Application No. 22785843.8, mailed on Jul. 10, 2025, 8 pages.
Non-Final Office Action received for U.S. Appl. No. 18/371,403, mailed on Jul. 21, 2025, 23 pages.
Non-Final Office Action received for U.S. Appl. No. 18/371,406, mailed on Jul. 15, 2025, 15 pages.
Notice of Allowance received for U.S. Appl. No. 17/898,342, mailed on Jul. 29, 2025, 9 pages.
Office Action received for European Patent Application No. 22198902.3, mailed on Jul. 9, 2025, 7 pages.
Office Action received for Japanese Patent Application No. 2024-083562, mailed on Jun. 26, 2025, 5 pages (3 pages of English Translation and 2 pages of Official Copy).
Corrected Notice of Allowance received for U.S. Appl. No. 17/898,342, mailed on Aug. 8, 2025, 3 pages.
Non-Final Office Action received for U.S. Appl. No. 18/201,411, mailed on Aug. 11, 2025, 18 pages.
Office Action received for Australian Patent Application No. 2022352756, mailed on Aug. 8, 2025, 4 pages.
Applicant-Initiated Interview Summary received for U.S. Appl. No. 18/131,833, mailed on Jun. 27, 2025, 2 pages.
Extended European Search Report received for European Patent Application No. 25160012.8, mailed on Jun. 10, 2025, 8 pages.
Extended European Search Report received for European Patent Application No. 25169286.9, mailed on Jun. 26, 2025, 12 pages.
Non-Final Office Action received for U.S. Appl. No. 18/829,038, mailed on Jun. 23, 2025, 12 pages.
Notice of Allowance received for Japanese Patent Application No. 2025-048996, mailed on Jun. 23, 2025, 5 pages (1 page of English Translation and 4 pages of Official Copy).
Notice of Allowance received for Korean Patent Application No. 10-2023-7037034, mailed on May 28, 2025, 7 pages (2 pages of English Translation and 5 pages of Official Copy).
Office Action received for Australian Patent Application No. 2024203238, mailed on Jun. 25, 2025, 5 pages.
Office Action received for Japanese Patent Application No. 2024-550636, mailed on Jun. 20, 2025, 10 pages (5 pages of English Translation and 5 pages of Official Copy).

* cited by examiner

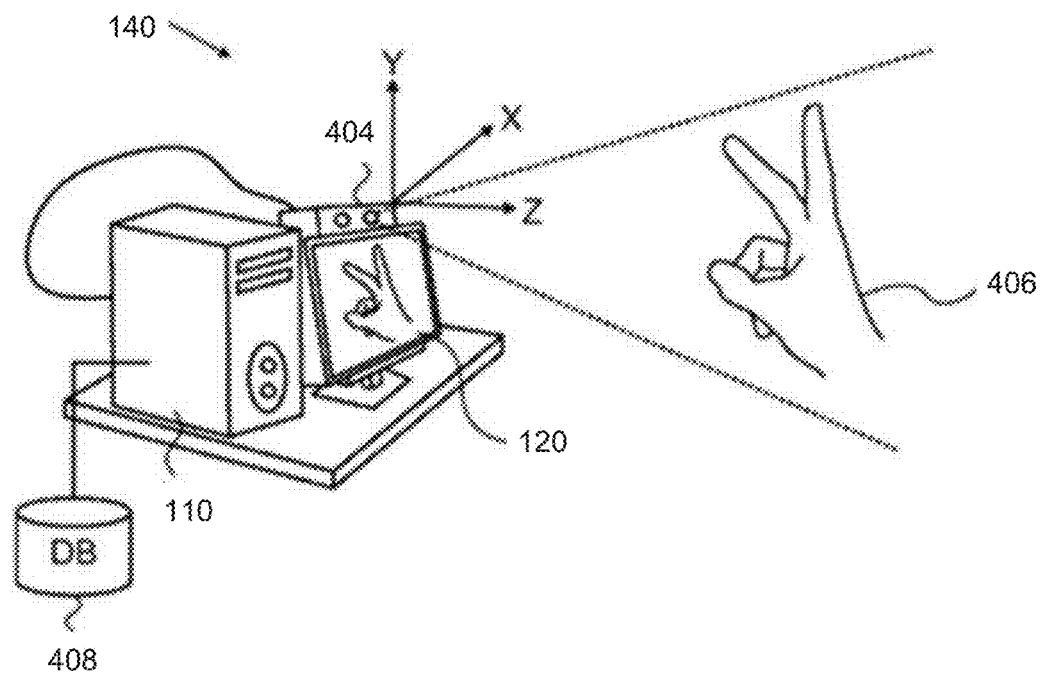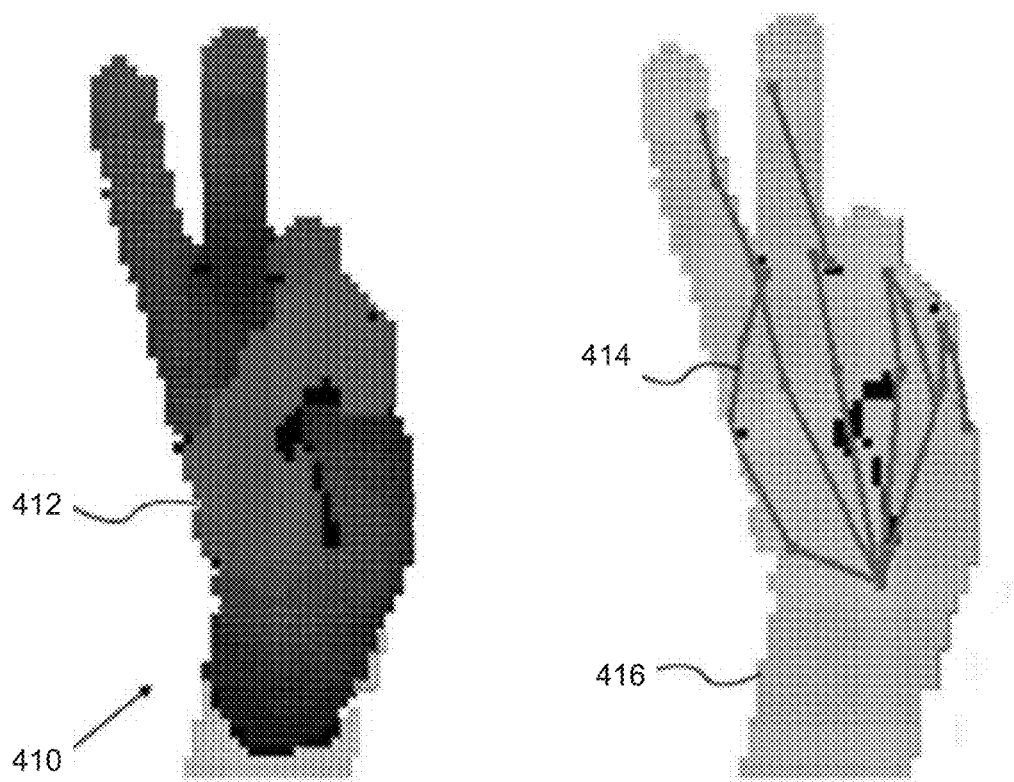
*FIG. 4*

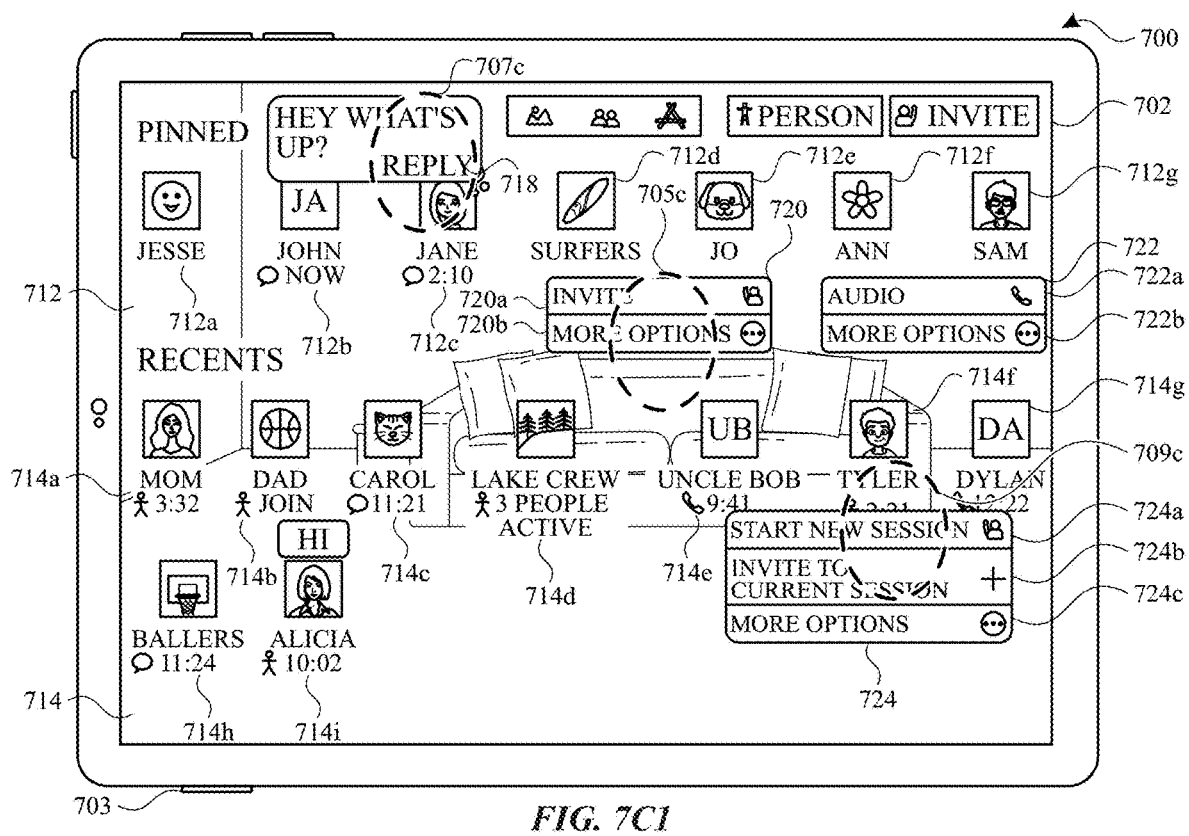
*FIG. 7C1*

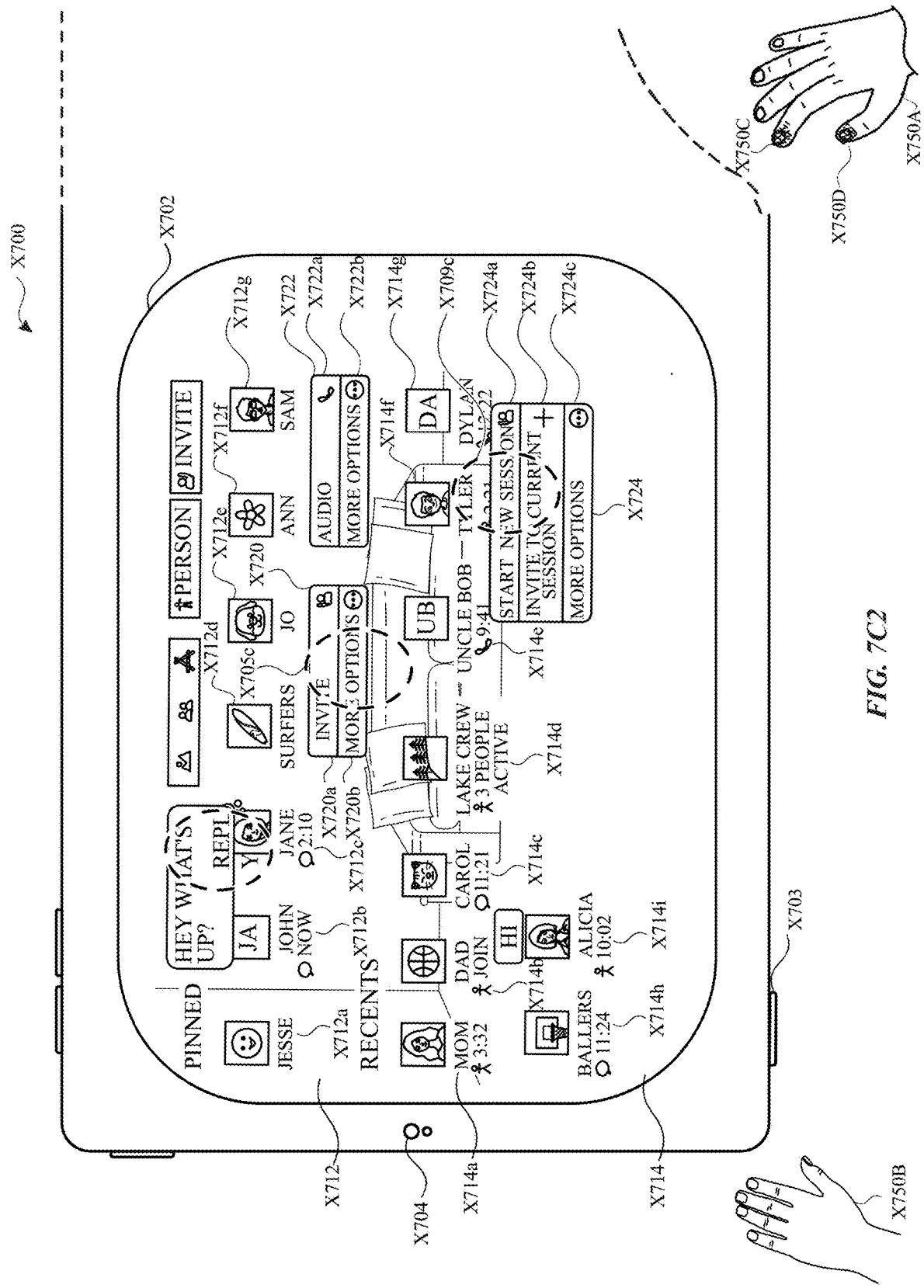
FIG. 7C2

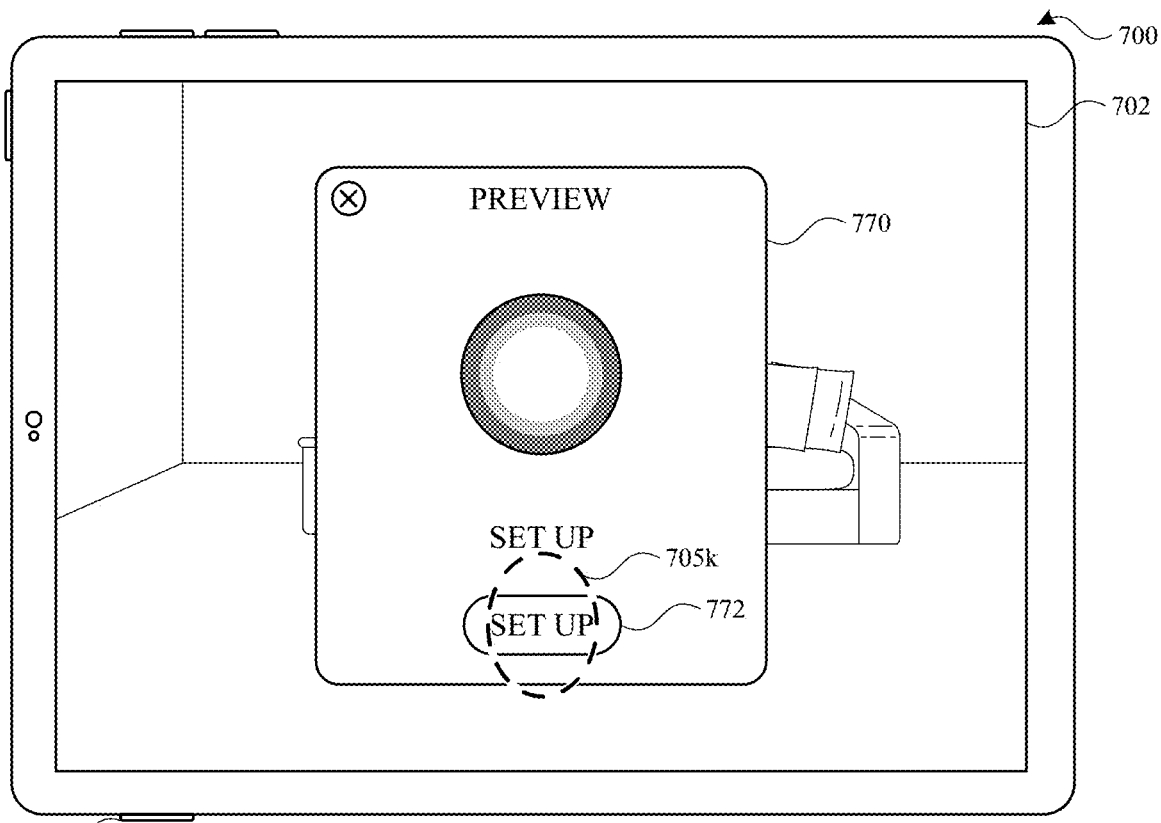
FIG. 7K
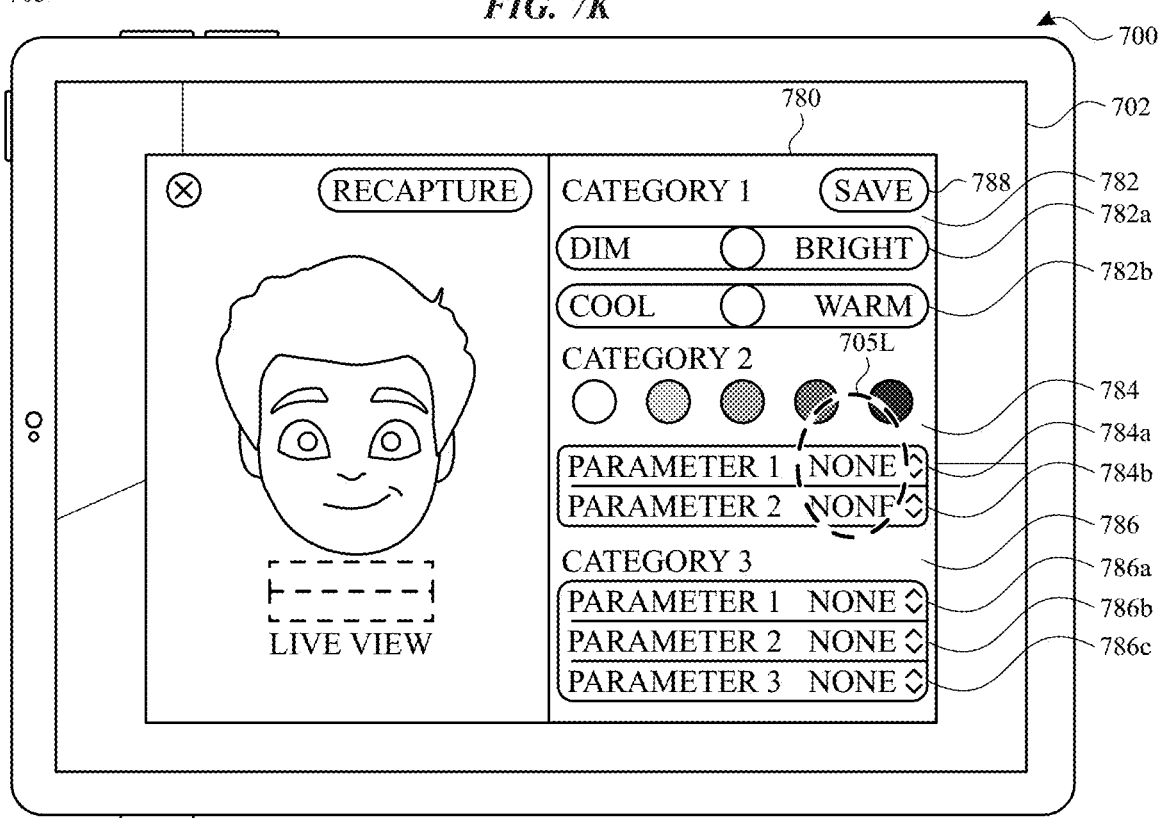
FIG. 7L1

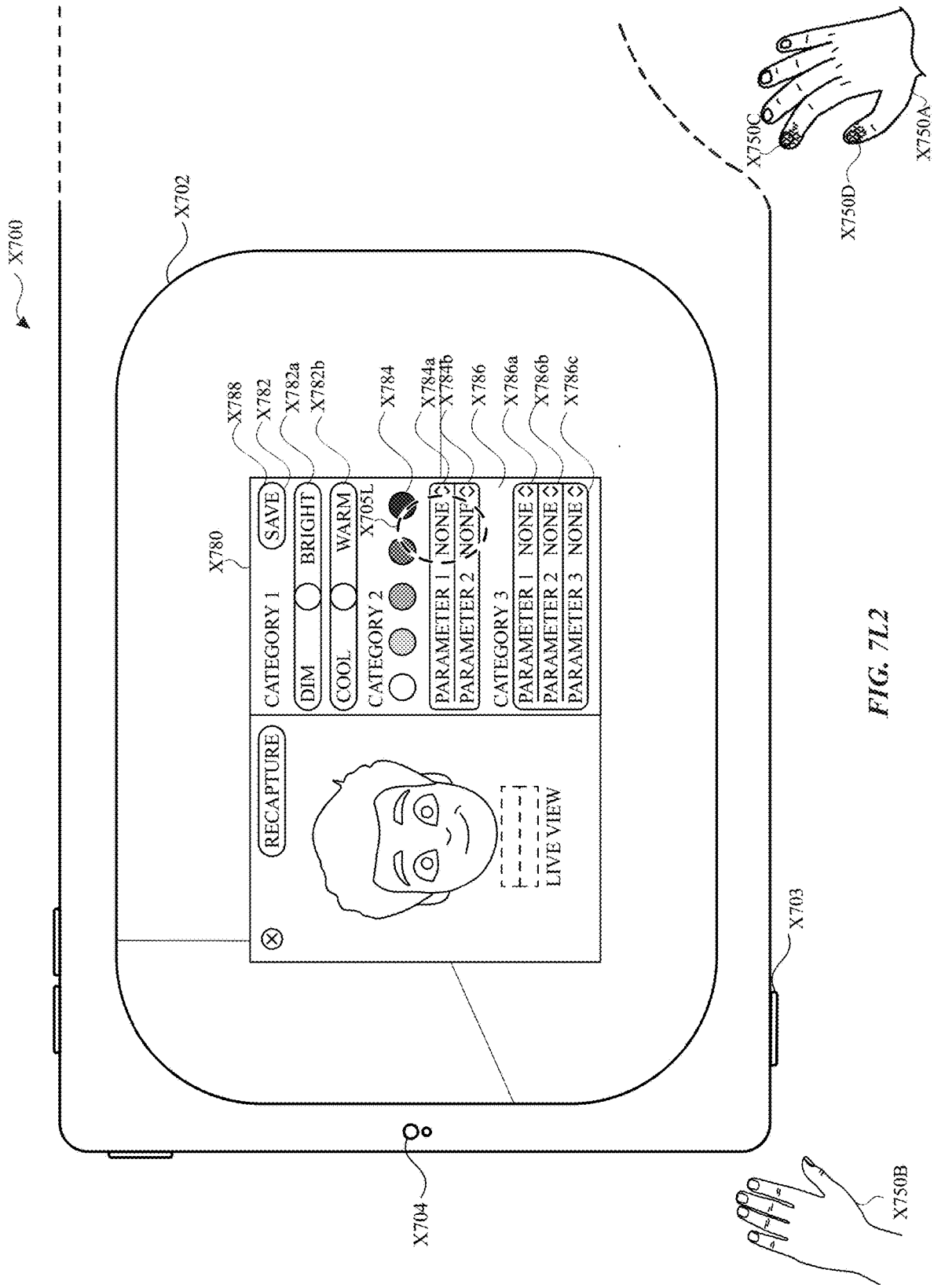
FIG. 7L2

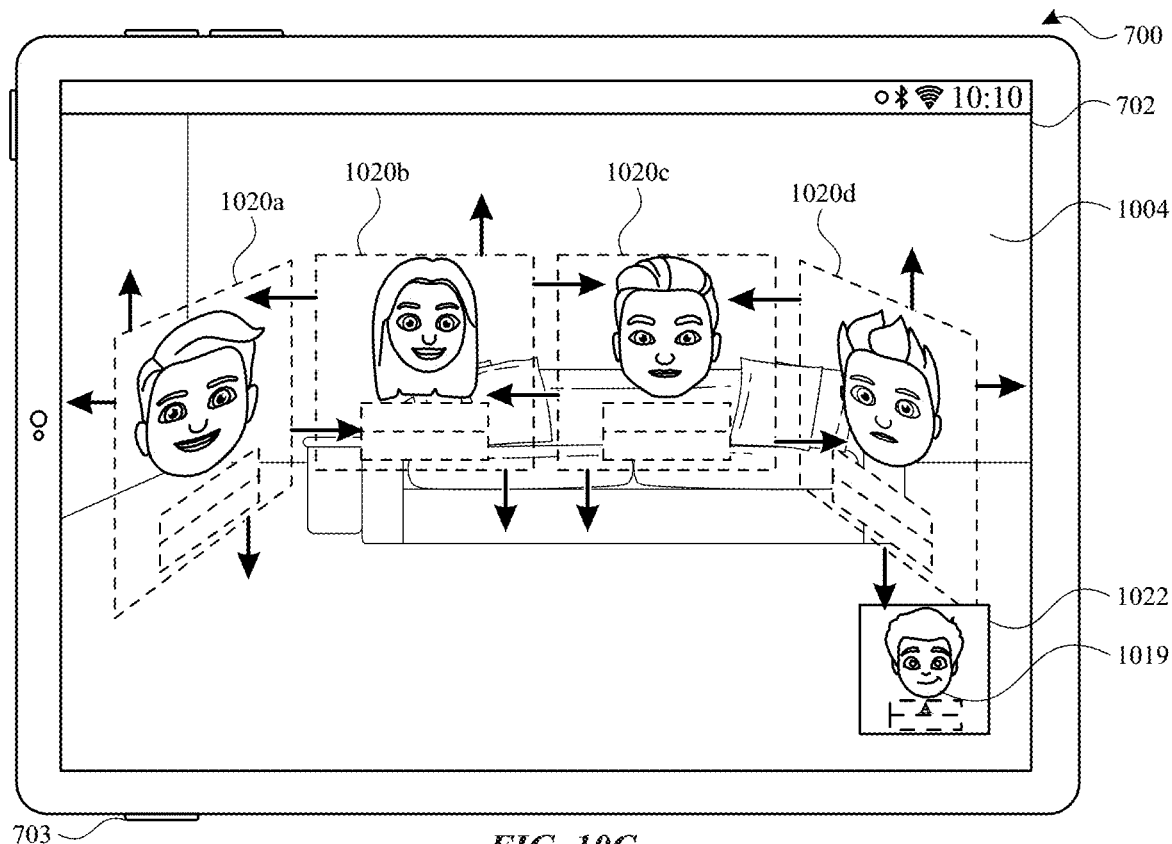
FIG. 10C
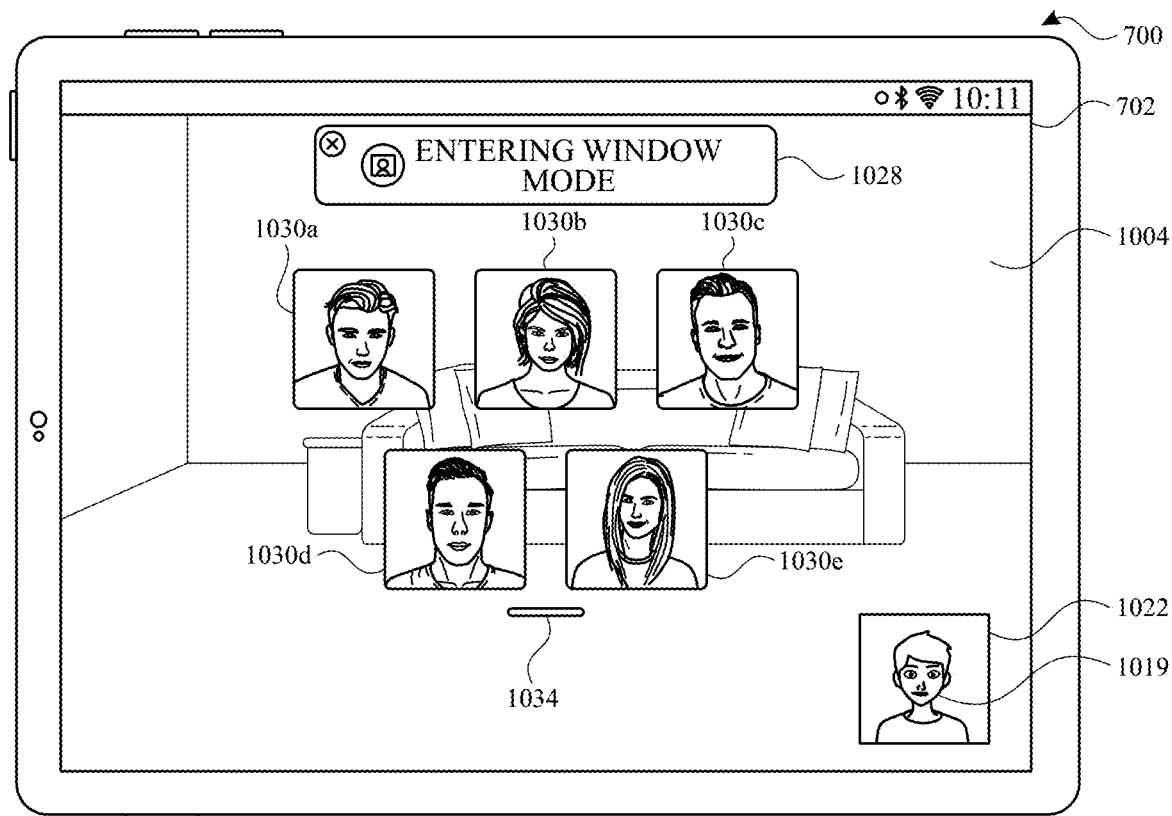
FIG. 10D1

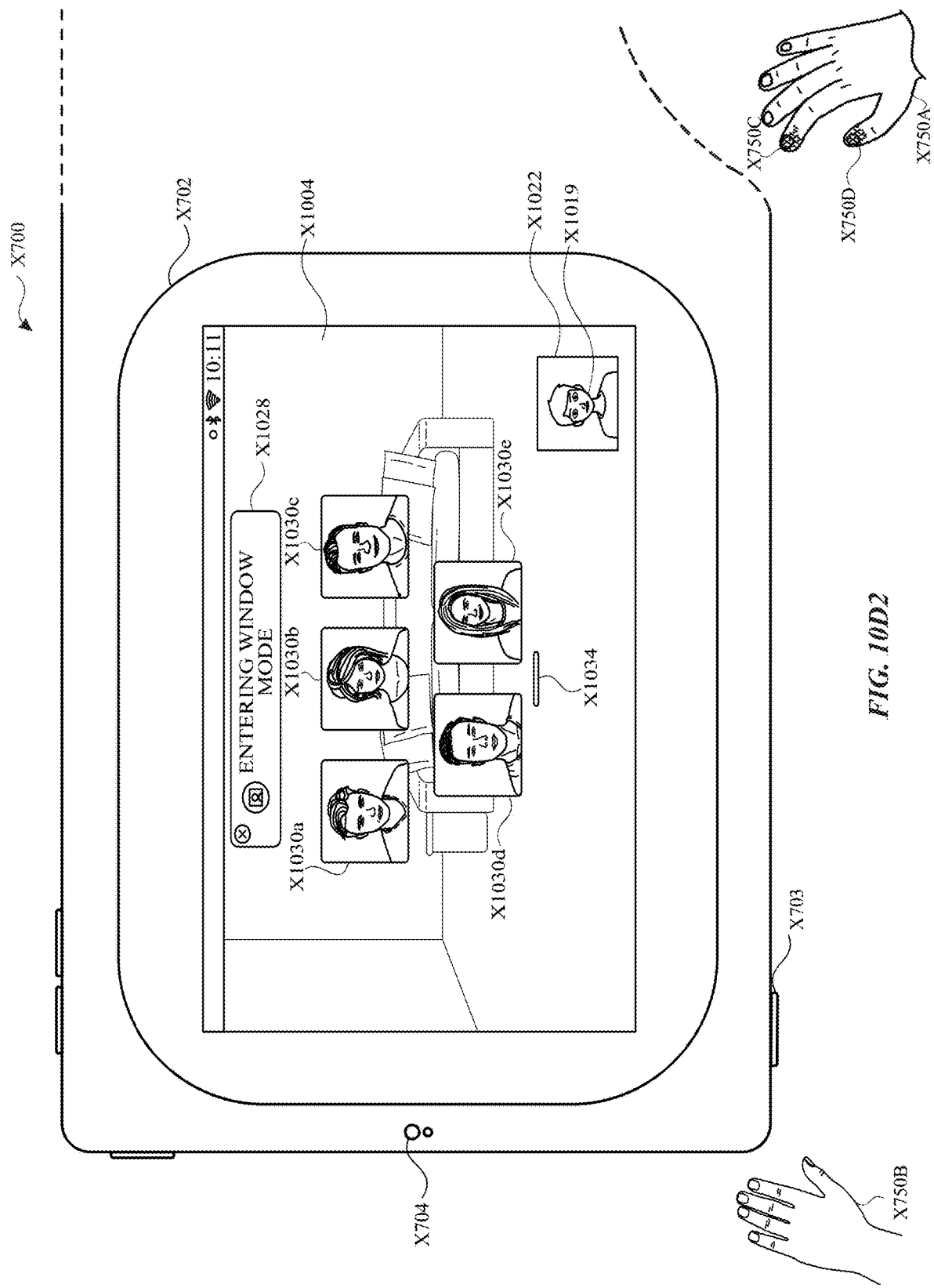
FIG. 10D2

1100

1102
While participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying:

1104
Tthe representations of the plurality of participants spaced apart from each other and a user of the computer system by at least a threshold amount in a first non-vertical direction in the 3D environment.

1106
The representations of the plurality of participants spaced apart from each other and the user by at least the threshold amount in a second non-vertical direction that is different from the first non-vertical direction.

1108
While displaying the representations of the plurality of participants distributed in the 3D environment, detecting an event.

1110
In response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement:

1112
The representations of the plurality of participants are spaced apart from each other by less than the threshold amount in the first non-vertical direction in the 3D environment.

1114
A representation of a first participant in the grouped arrangement has a different position than a representation of the first participant in the spatially distributed arrangement.

1116
A representation of a second participant in the grouped arrangement has a different position than a representation of the second participant in the spatially distributed arrangement.

*FIG. 11*

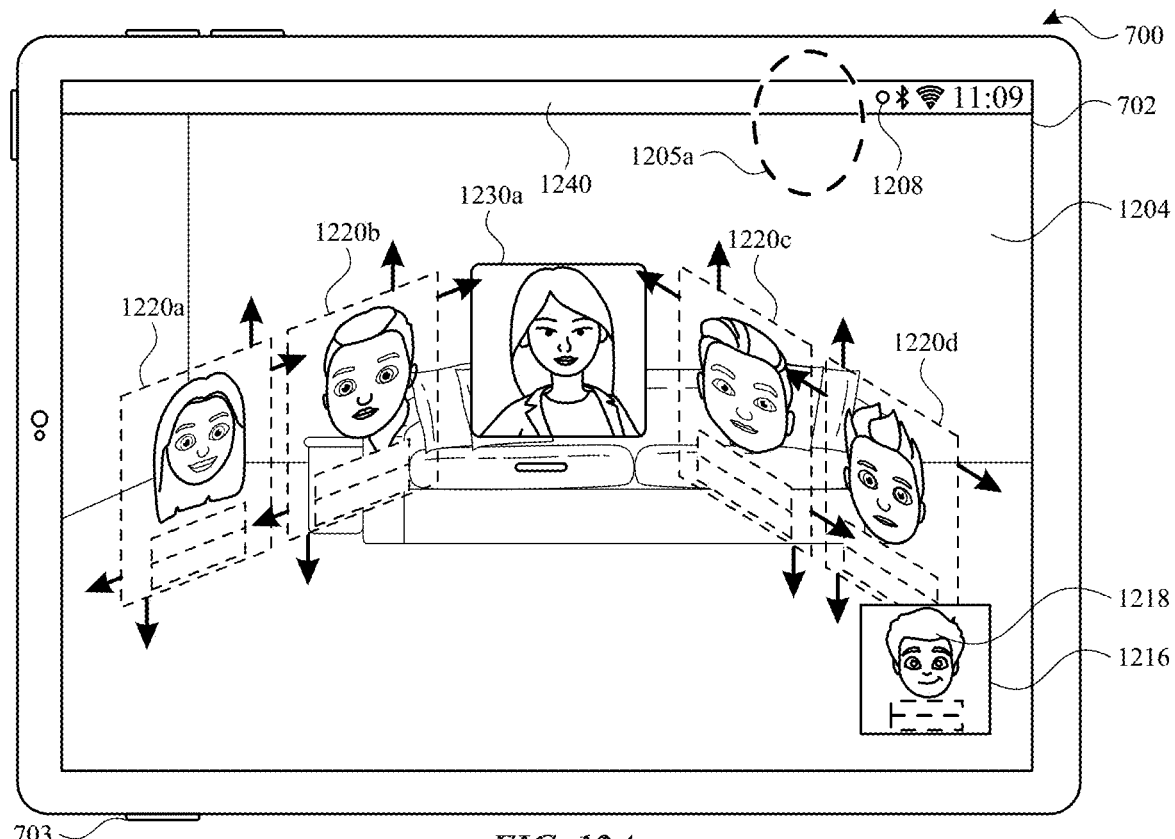
FIG. 12A
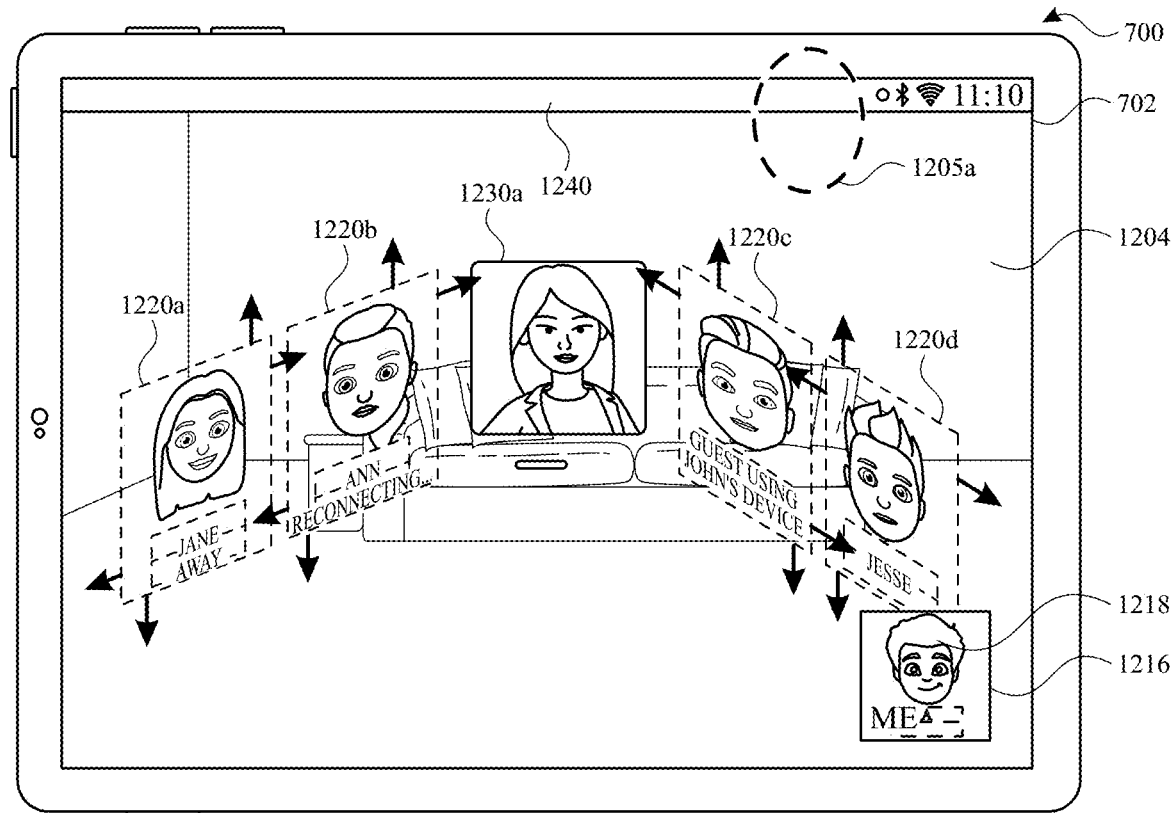
FIG. 12B1

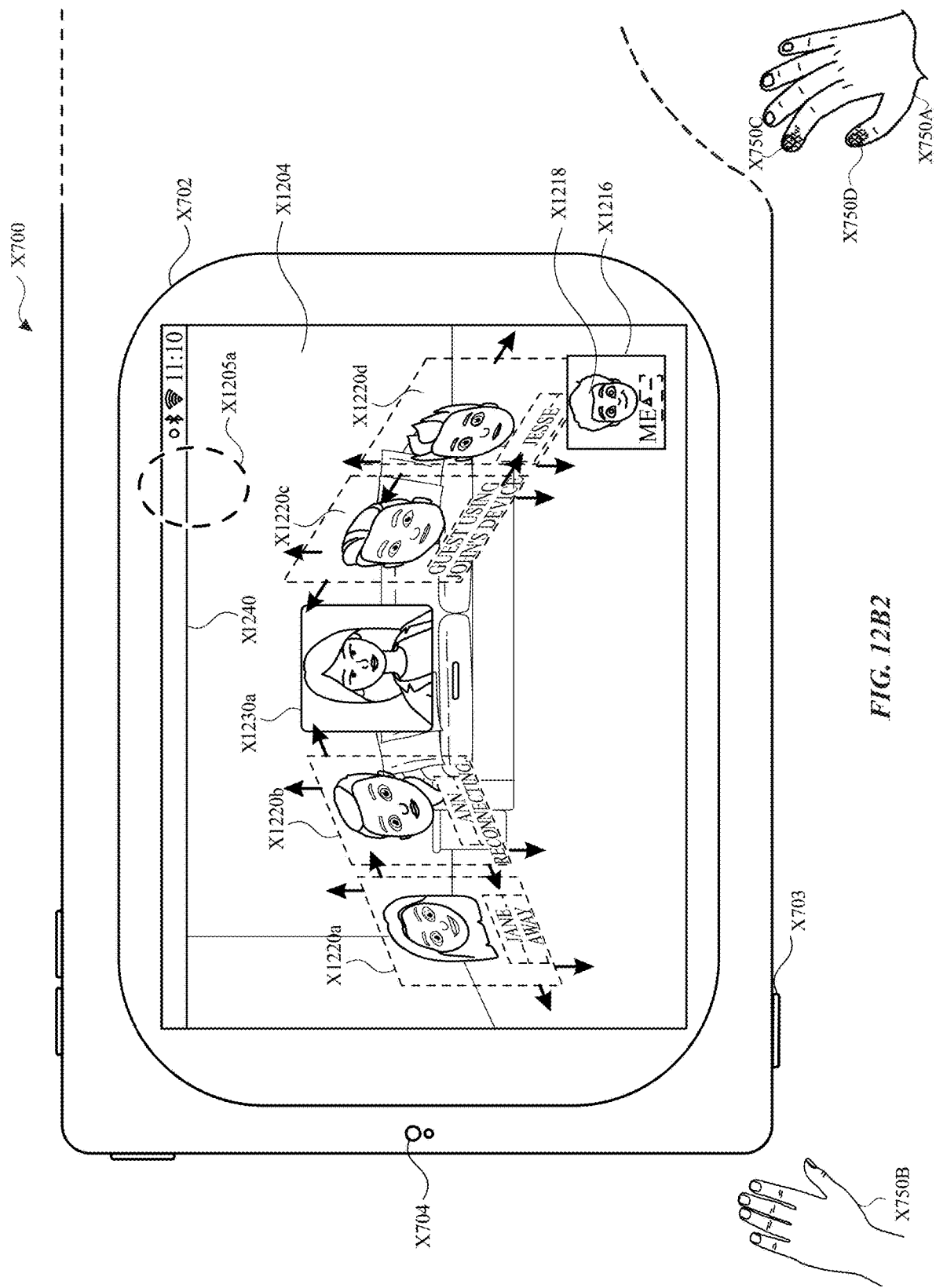
FIG. 12B2

1300 ⤵

```
1302
while in a communication session with one or more participants in the communication
session, detecting, via the one or more sensors, gaze input of a user of the computer system.
```

↓

```
1304
In response to detecting the gaze input:

1306
    In accordance with a determination that the gaze input meets a set of one or more
    gaze criteria, displaying, via the display generation component, information about
    a first participant in the communication session.

1308
    In accordance with a determination that the gaze input does not meet the set of one
    or more gaze criteria, forgoing display of the information about the first participant
    in the communication session.
```

FIG. 13

USER INTERFACES FOR MANAGING LIVE COMMUNICATION SESSIONS

CROSS-REFERENCE TO RELATED APPLICATIONS

This application claims priority to U.S. Provisional Patent Application 63/470,882, entitled "USER INTERFACES FOR MANAGING LIVE COMMUNICATION SESSIONS," filed Jun. 3, 2023 and U.S. Provisional Patent Application 63/409,583, entitled "USER INTERFACES FOR MANAGING LIVE COMMUNICATION SESSIONS," filed Sep. 23, 2022, the contents of which are hereby incorporated by reference in their entirety.

TECHNICAL FIELD

The present disclosure relates generally to computer systems that are in communication with a display generation component and, optionally, one or more sensors that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for managing live communication sessions, such as those including at least some virtual elements (e.g., applications, augmented reality environments, mixed reality environments, and virtual reality environments) are cumbersome, inefficient, and limited. For example, systems that provide insufficient controls for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for managing live communication sessions that are more efficient and intuitive for a user. Such methods and interfaces optionally complement or replace conventional methods for managing live communication sessions. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for managing live communication sessions. Such methods and interfaces may complement or replace conventional methods for managing live communication sessions. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

Example methods are described herein. An example method includes, at a computer system that is in communication with a display generation component and one or more sensors: displaying, via the display generation component, representations of a plurality of users; receiving, via the one or more sensors, selection of a representation of a respective user of the plurality of users; and in response to receiving selection of the representation of the respective user: in accordance with a determination that there is an ongoing communication session, displaying, via the display generation component, an option to invite the respective user to join the ongoing communication session; and in accordance with a determination that there is no ongoing communication session, forgoing display of the option to invite the respective user to join the ongoing communication session.

An example method includes, at a computer system that is in communication with a display generation component and one or more sensors: displaying, via the display generation component, a communication user interface for communicating with other users in a real-time communication session, wherein during the real-time communication session a user of the computer system is represented by an avatar that moves, during the real-time communication session, in accordance with movement, detected by the one or more sensors, of the user of the computer system; while displaying the communication user interface, displaying, via the display generation component, a selectable user interface object; detecting, via the one or more sensors, one or more inputs that include a selection input directed to the selectable user interface object; and in response to detecting the one or more inputs that include the selection input directed to the selectable user interface object, concurrently displaying, via the display generation component, an avatar editing user interface that includes: the avatar representing the user of the computer system; and one or more options to modify an appearance of the avatar representing the user of the computer system.

An example method includes, at a computer system that is in communication with a display generation component: while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying: the representations of the plurality of participants spaced apart from each other and a user of the computer system by at least a threshold amount in a first non-vertical direction in the 3D environment; and the representations of the plurality of participants spaced apart from each other and the user by at least the threshold amount in a second non-vertical direction that is different from the first non-vertical direction; while displaying the representations of the plurality of participants distributed in the 3D environment, detecting an event; and in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement: the representations of the plurality of participants are spaced apart from each other by less than the threshold amount in the first non-vertical direction in the 3D environment; a representation of a first participant in the grouped arrangement has a different position than a representation of the first participant in the spatially distributed arrangement; and a representation of a second participant in the grouped arrangement has a different position than a representation of the second participant in the spatially distributed arrangement.

An example method includes, at a computer system that is in communication with a display generation component and one or more sensors: while in a communication session with one or more participants in the communication session, detecting, via the one or more sensors, gaze input of a user of the computer system; and in response to detecting the gaze input: in accordance with a determination that the gaze input meets a set of one or more gaze criteria, displaying, via the display generation component, information about a first participant in the communication session; and in accordance with a determination that the gaze input does not meet the set of one or more gaze criteria, forgoing display of the information about the first participant in the communication session.

Example non-transitory computer-readable storage media are described herein. An example non-transitory computer-readable storage medium stores one or more programs configured to be executed by one or more processors of a computer system that is in communication with a display generation component and one or more sensors and includes instructions for: displaying, via the display generation component, representations of a plurality of users; receiving, via the one or more sensors, selection of a representation of a respective user of the plurality of users; and in response to receiving selection of the representation of the respective user: in accordance with a determination that there is an ongoing communication session, displaying, via the display generation component, an option to invite the respective user to join the ongoing communication session; and in accordance with a determination that there is no ongoing communication session, forgoing display of the option to invite the respective user to join the ongoing communication session.

An example non-transitory computer-readable storage medium stores one or more programs configured to be executed by one or more processors of a computer system that is in communication with a display generation component and one or more sensors and includes instructions for: displaying, via the display generation component, a communication user interface for communicating with other users in a real-time communication session, wherein during the real-time communication session a user of the computer system is represented by an avatar that moves, during the real-time communication session, in accordance with movement, detected by the one or more sensors, of the user of the computer system; while displaying the communication user interface, displaying, via the display generation component, a selectable user interface object; detecting, via the one or more sensors, one or more inputs that include a selection input directed to the selectable user interface object; and in response to detecting the one or more inputs that include the selection input directed to the selectable user interface object, concurrently displaying, via the display generation component, an avatar editing user interface that includes: the avatar representing the user of the computer system; and one or more options to modify an appearance of the avatar representing the user of the computer system.

An example non-transitory computer-readable storage medium stores one or more programs configured to be executed by one or more processors of a computer system that is in communication with a display generation component and includes instructions for: while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying: the representations of the plurality of participants spaced apart from each other and a user of the computer system by at least a threshold amount in a first non-vertical direction in the 3D environment; and the representations of the plurality of participants spaced apart from each other and the user by at least the threshold amount in a second non-vertical direction that is different from the first non-vertical direction; while displaying the representations of the plurality of participants distributed in the 3D environment, detecting an event; and in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement: the representations of the plurality of participants are spaced apart from each other by less than the threshold amount in the first non-vertical direction in the 3D environment; a representation of a first participant in the grouped arrangement has a different position than a representation of the first participant in the spatially distributed arrangement; and a representation of a second participant in the grouped arrangement has a different position than a representation of the second participant in the spatially distributed arrangement.

An example non-transitory computer-readable storage medium stores one or more programs configured to be executed by one or more processors of a computer system that is in communication with a display generation component and one or more sensors and includes instructions for: while in a communication session with one or more participants in the communication session, detecting, via the one or more sensors, gaze input of a user of the computer system; and in response to detecting the gaze input: in accordance with a determination that the gaze input meets a set of one or more gaze criteria, displaying, via the display generation component, information about a first participant in the communication session; and in accordance with a determination that the gaze input does not meet the set of one or more gaze criteria, forgoing display of the information about the first participant in the communication session.

Example transitory computer-readable storage media are described herein. An example transitory computer-readable storage medium stores one or more programs configured to be executed by one or more processors of a computer system that is in communication with a display generation component and one or more sensors and includes instructions for: displaying, via the display generation component, representations of a plurality of users; receiving, via the one or more sensors, selection of a representation of a respective user of the plurality of users; and in response to receiving selection of the representation of the respective user: in accordance with a determination that there is an ongoing communication session, displaying, via the display generation component, an option to invite the respective user to join the ongoing communication session; and in accordance with a determination that there is no ongoing communication session, forgoing display of the option to invite the respective user to join the ongoing communication session.

An example transitory computer-readable storage medium stores one or more programs configured to be executed by one or more processors of a computer system that is in communication with a display generation component and one or more sensors and includes instructions for: displaying, via the display generation component, a communication user interface for communicating with other users in a real-time communication session, wherein during the real-time communication session a user of the computer system is represented by an avatar that moves, during the real-time communication session, in accordance with movement, detected by the one or more sensors, of the user of the computer system; while displaying the communication user interface, displaying, via the display generation component, a selectable user interface object; detecting, via the one or more sensors, one or more inputs that include a selection input directed to the selectable user interface object; and in response to detecting the one or more inputs that include the selection input directed to the selectable user interface object, concurrently displaying, via the display generation component, an avatar editing user interface that includes: the avatar representing the user of the computer system; and one or more options to modify an appearance of the avatar representing the user of the computer system.

An example transitory computer-readable storage medium stores one or more programs configured to be executed by one or more processors of a computer system that is in communication with a display generation component and includes instructions for: while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying: the representations of the plurality of participants spaced apart from each other and a user of the computer system by at least a threshold amount in a first non-vertical direction in the 3D environment; and the representations of the plurality of participants spaced apart from each other and the user by at least the threshold amount in a second non-vertical direction that is different from the first non-vertical direction; while displaying the representations of the plurality of participants distributed in the 3D environment, detecting an event; and in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement: the representations of the plurality of participants are spaced apart from each other by less than the threshold amount in the first non-vertical direction in the 3D environment; a representation of a first participant in the grouped arrangement has a different position than a representation of the first participant in the spatially distributed arrangement; and a representation of a second participant in the grouped arrangement has a different position than a representation of the second participant in the spatially distributed arrangement.

An example transitory computer-readable storage medium stores one or more programs configured to be executed by one or more processors of a computer system that is in communication with a display generation component and one or more sensors and includes instructions for: while in a communication session with one or more participants in the communication session, detecting, via the one or more sensors, gaze input of a user of the computer system; and in response to detecting the gaze input: in accordance with a determination that the gaze input meets a set of one or more gaze criteria, displaying, via the display generation component, information about a first participant in the communication session; and in accordance with a determination that the gaze input does not meet the set of one or more gaze criteria, forgoing display of the information about the first participant in the communication session.

Example computer systems are described herein. An example computer system is configured to communicate with a display generation component and one or more sensors and includes: one or more processors; and memory storing one or more programs configured to be executed by the one or more processors, the one or more programs including instructions for: displaying, via the display generation component, representations of a plurality of users; receiving, via the one or more sensors, selection of a representation of a respective user of the plurality of users; and in response to receiving selection of the representation of the respective user: in accordance with a determination that there is an ongoing communication session, displaying, via the display generation component, an option to invite the respective user to join the ongoing communication session; and in accordance with a determination that there is no ongoing communication session, forgoing display of the option to invite the respective user to join the ongoing communication session.

An example computer system is configured to communicate with a display generation component and one or more sensors and includes: one or more processors; and memory storing one or more programs configured to be executed by the one or more processors, the one or more programs including instructions for: displaying, via the display generation component, a communication user interface for communicating with other users in a real-time communication session, wherein during the real-time communication session a user of the computer system is represented by an avatar that moves, during the real-time communication session, in accordance with movement, detected by the one or more sensors, of the user of the computer system; while displaying the communication user interface, displaying, via the display generation component, a selectable user interface object; detecting, via the one or more sensors, one or more inputs that include a selection input directed to the selectable user interface object; and in response to detecting the one or more inputs that include the selection input directed to the selectable user interface object, concurrently displaying, via the display generation component, an avatar editing user interface that includes: the avatar representing the user of the computer system; and one or more options to modify an appearance of the avatar representing the user of the computer system.

An example computer system is configured to communicate with a display generation component and includes: one or more processors; and memory storing one or more programs configured to be executed by the one or more processors, the one or more programs including instructions for: while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying: the representations of the plurality of participants spaced apart from each other and a user of the computer system by at least a threshold amount in a first non-vertical direction in the 3D environment; and the representations of the plurality of participants spaced apart from each other and the user by at least the threshold amount in a second non-vertical direction that is different from the first non-vertical direction; while displaying the representations of the plurality of participants distributed in the 3D environment, detecting an event; and in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement: the representations of the plurality of participants are spaced apart from each other by less than the threshold amount in the first non-vertical direction in the 3D environment; a representation of a first participant in the grouped arrangement has a different position than a representation of the first participant in the spatially distributed arrangement; and a representation of a second participant in the grouped arrangement has a different position than a representation of the second participant in the spatially distributed arrangement.

An example computer system is configured to communicate with a display generation component and one or more sensors and includes: one or more processors; and memory storing one or more programs configured to be executed by the one or more processors, the one or more programs including instructions for: while in a communication session with one or more participants in the communication session, detecting, via the one or more sensors, gaze input of a user of the computer system; and in response to detecting the gaze input: in accordance with a determination that the gaze input meets a set of one or more gaze criteria, displaying, via the display generation component, information about a first participant in the communication session; and in accordance with a determination that the gaze input does not meet the set of one or more gaze criteria, forgoing display of the information about the first participant in the communication session.

An example computer system is configured to communicate with a display generation component and one or more sensors and includes means for displaying, via the display generation component, representations of a plurality of users; means for receiving, via the one or more sensors, selection of a representation of a respective user of the plurality of users; and means for, in response to receiving selection of the representation of the respective user: in accordance with a determination that there is an ongoing communication session, displaying, via the display generation component, an option to invite the respective user to join the ongoing communication session; and in accordance with a determination that there is no ongoing communication session, forgoing display of the option to invite the respective user to join the ongoing communication session.

An example computer system is configured to communicate with a display generation component and one or more sensors and includes means for displaying, via the display generation component, a communication user interface for communicating with other users in a real-time communication session, wherein during the real-time communication session a user of the computer system is represented by an avatar that moves, during the real-time communication session, in accordance with movement, detected by the one or more sensors, of the user of the computer system; means for, while displaying the communication user interface, displaying, via the display generation component, a selectable user interface object; means for detecting, via the one or more sensors, one or more inputs that include a selection input directed to the selectable user interface object; and means for, in response to detecting the one or more inputs that include the selection input directed to the selectable user interface object, concurrently displaying, via the display generation component, an avatar editing user interface that includes: the avatar representing the user of the computer system; and one or more options to modify an appearance of the avatar representing the user of the computer system.

An example computer system is configured to communicate with a display generation component and includes means for, while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying: the representations of the plurality of participants spaced apart from each other and a user of the computer system by at least a threshold amount in a first non-vertical direction in the 3D environment; and the representations of the plurality of participants spaced apart from each other and the user by at least the threshold amount in a second non-vertical direction that is different from the first non-vertical direction; means for, while displaying the representations of the plurality of participants distributed in the 3D environment, detecting an event; and means for, in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement: the representations of the plurality of participants are spaced apart from each other by less than the threshold amount in the first non-vertical direction in the 3D environment; a representation of a first participant in the grouped arrangement has a different position than a representation of the first participant in the spatially distributed arrangement; and a representation of a second participant in the grouped arrangement has a different position than a representation of the second participant in the spatially distributed arrangement.

An example computer system is configured to communicate with a display generation component and one or more sensors and includes means for, while in a communication session with one or more participants in the communication session, detecting, via the one or more sensors, gaze input of a user of the computer system; and means for, in response to detecting the gaze input: in accordance with a determination that the gaze input meets a set of one or more gaze criteria, displaying, via the display generation component, information about a first participant in the communication session; and in accordance with a determination that the gaze input does not meet the set of one or more gaze criteria, forgoing display of the information about the first participant in the communication session.

Example computer program products are described herein. An example computer program product includes one or more programs configured to be executed by one or more processors of a computer system that is in communication with a display generation component and one or more sensors, the one or more programs including instructions for: displaying, via the display generation component, representations of a plurality of users; receiving, via the one or more sensors, selection of a representation of a respective user of the plurality of users; and in response to receiving selection of the representation of the respective user: in accordance with a determination that there is an ongoing communication session, displaying, via the display generation component, an option to invite the respective user to join the ongoing communication session; and in accordance with a determination that there is no ongoing communication session, forgoing display of the option to invite the respective user to join the ongoing communication session.

An example computer program product includes one or more programs configured to be executed by one or more processors of a computer system that is in communication with a display generation component and one or more sensors, the one or more programs including instructions for: displaying, via the display generation component, a communication user interface for communicating with other users in a real-time communication session, wherein during the real-time communication session a user of the computer system is represented by an avatar that moves, during the real-time communication session, in accordance with movement, detected by the one or more sensors, of the user of the computer system; while displaying the communication user interface, displaying, via the display generation component, a selectable user interface object; detecting, via the one or more sensors, one or more inputs that include a selection input directed to the selectable user interface object; and in response to detecting the one or more inputs that include the selection input directed to the selectable user interface object, concurrently displaying, via the display generation component, an avatar editing user interface that includes: the avatar representing the user of the computer system; and one or more options to modify an appearance of the avatar representing the user of the computer system.

An example computer program product includes one or more programs configured to be executed by one or more processors of a computer system that is in communication with a display generation component, the one or more programs including instructions for: while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying: the representations of the plurality of participants spaced apart from each other and a user of the computer system by at least a threshold amount in a first non-vertical direction in the 3D environment; and the representations of the plurality of participants spaced apart from each other and the user by at least the threshold amount in a second non-vertical direction that is different from the first non-vertical direction; while displaying the representations of the plurality of participants distributed in the 3D environment, detecting an event; and in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement: the representations of the plurality of participants are spaced apart from each other by less than the threshold amount in the first non-vertical direction in the 3D environment; a representation of a first participant in the grouped arrangement has a different position than a representation of the first participant in the spatially distributed arrangement; and a representation of a second participant in the grouped arrangement has a different position than a representation of the second participant in the spatially distributed arrangement.

An example computer program product includes one or more programs configured to be executed by one or more processors of a computer system that is in communication with a display generation component and one or more sensors, the one or more programs including instructions for: while in a communication session with one or more participants in the communication session, detecting, via the one or more sensors, gaze input of a user of the computer system; and in response to detecting the gaze input: in accordance with a determination that the gaze input meets a set of one or more gaze criteria, displaying, via the display generation component, information about a first participant in the communication session; and in accordance with a determination that the gaze input does not meet the set of one or more gaze criteria, forgoing display of the information about the first participant in the communication session.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 10A-10E illustrate example techniques for providing representations in live communication sessions, in accordance with some embodiments.

FIG. 11 is a flow diagram of methods of providing representations in live communication sessions, in accordance with various embodiments.

FIGS. 12A-12F illustrate example techniques for providing information in live communication sessions, in accordance with some embodiments.

FIG. 13 is a flow diagram of methods of providing information in live communication sessions, in accordance with various embodiments.

DESCRIPTION OF EMBODIMENTS

Figure 1A:
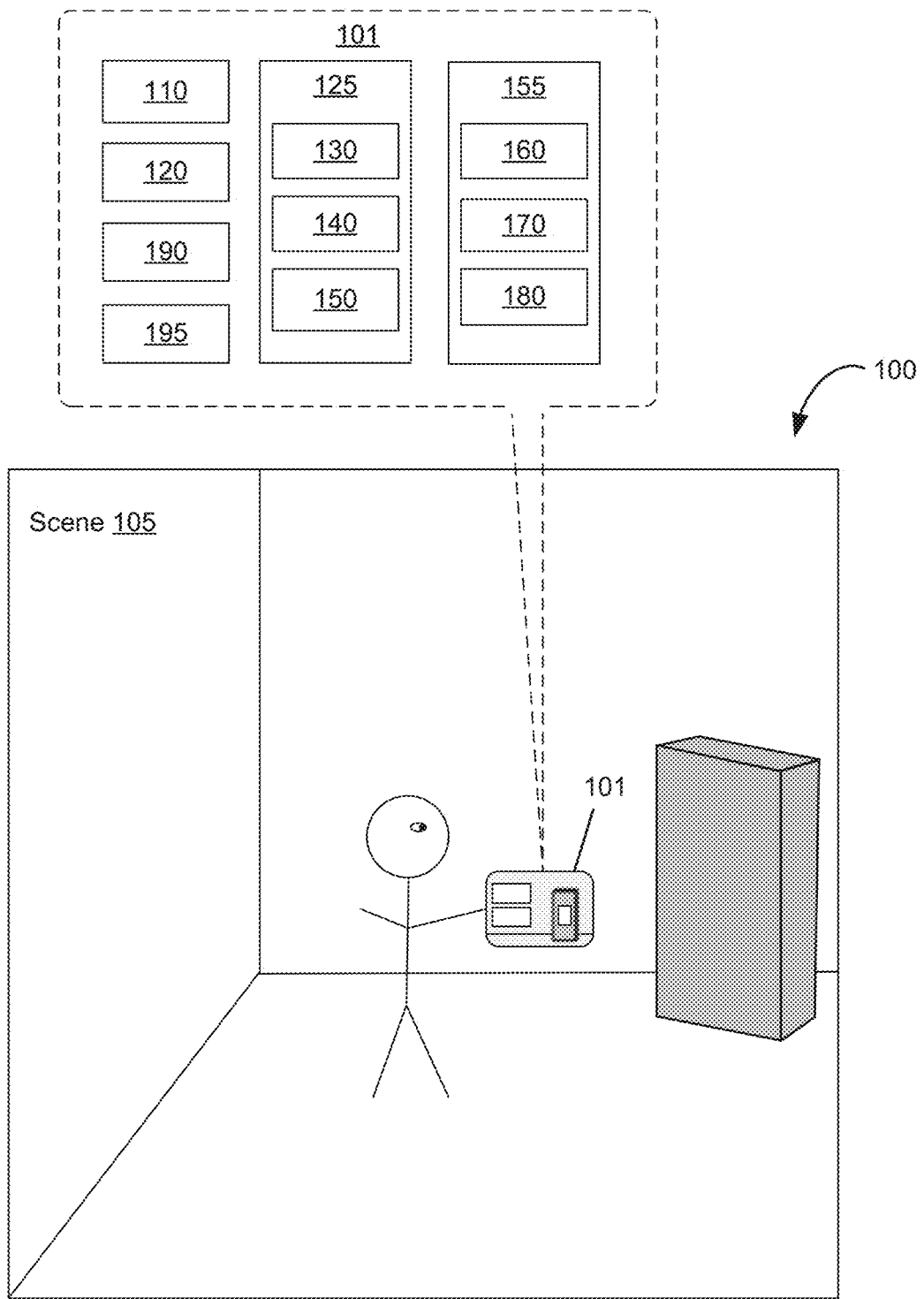
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system allows for live communication between users. The computer system displays representations of a plurality of users and receives selection of a representation of a respective user of the plurality of users. In response to receiving selection of the representation of the respective user, in accordance with a determination that there is an ongoing communication session, the computer system displays an option to invite the respective user to join the ongoing communication session, and in accordance with a determination that there is no ongoing communication session, the computer system forgoes display of the option to invite the respective user to join the ongoing communication session.

In some embodiments, a computer system provides options for a user to change an appearance of the user's avatar. The computer system displays a communication user interface for communicating with other users in a real-time communication session. During the real-time communication session, the user is represented by an avatar that moves during the real-time communication session in accordance with movement of the user of the computer system. While displaying the communication user interface, the computer system concurrently displays a selectable user interface object. While concurrently displaying the communication user interface and selectable user interface object, the computer system detects one or more inputs that include a selection input directed to the selectable user interface object. In response to detecting the one or more inputs that include the selection input directed to the selectable user interface object, the computer system concurrently displays an avatar editing user interface that includes the avatar representing the user of the computer system and one or more options to modify an appearance of the avatar representing the user of the computer system.

In some embodiments, a computer system switches between spatial and non-spatial communication sessions. While participating in a communication session that is a spatial communication session that includes the computer system displays representations of a plurality of participants in the communication session in a spatially distributed arrangement in a 3D environment. Displaying the plurality of participants in the spatially distributed arrangement includes displaying the representations of the plurality of participants spaced apart from each other and the user by at least a threshold amount in a first non-vertical direction in the 3D environment and the representations of the plurality of participants spaced apart from each other and the user by at least the threshold amount in a second non-vertical direction that is different from the first non-vertical direction. While displaying the representations of the plurality of participants distributed in the 3D environment, the computer system detects an event, and in response to detecting the event, the computer system transitions the communication session from the spatial communication session to a non-spatial communication session. Transitioning to the non-spatial communication session includes displaying representations of at least a subset of the plurality of participants of the communication session in a grouped arrangement. In the grouped arrangement, the representations of the plurality of participants are spaced apart from each other by less than the threshold amount in the first non-vertical direction in the 3D environment, a representation of a first participant in the grouped arrangement has a different position than a representation of the first participant in the spatially distributed arrangement, and a representation of a second participant in the grouped arrangement has a different position than a representation of the second participant in the spatially distributed arrangement.

In some embodiments, a computer system provides information during a live communication session based on a user's gaze. While in a communication session with one or more participants in the communication session, the computer system detects gaze input of a user of the computer system. In response to detecting the gaze input, in accordance with a determination that the gaze input meets a set of one or more gaze criteria, the computer system displays information about a first participant in the communication session, and in accordance with a determination that the gaze input does not meet the set of one or more gaze criteria, the computer system forgoes display of the information about the first participant in the communication session.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

Figure 7A:
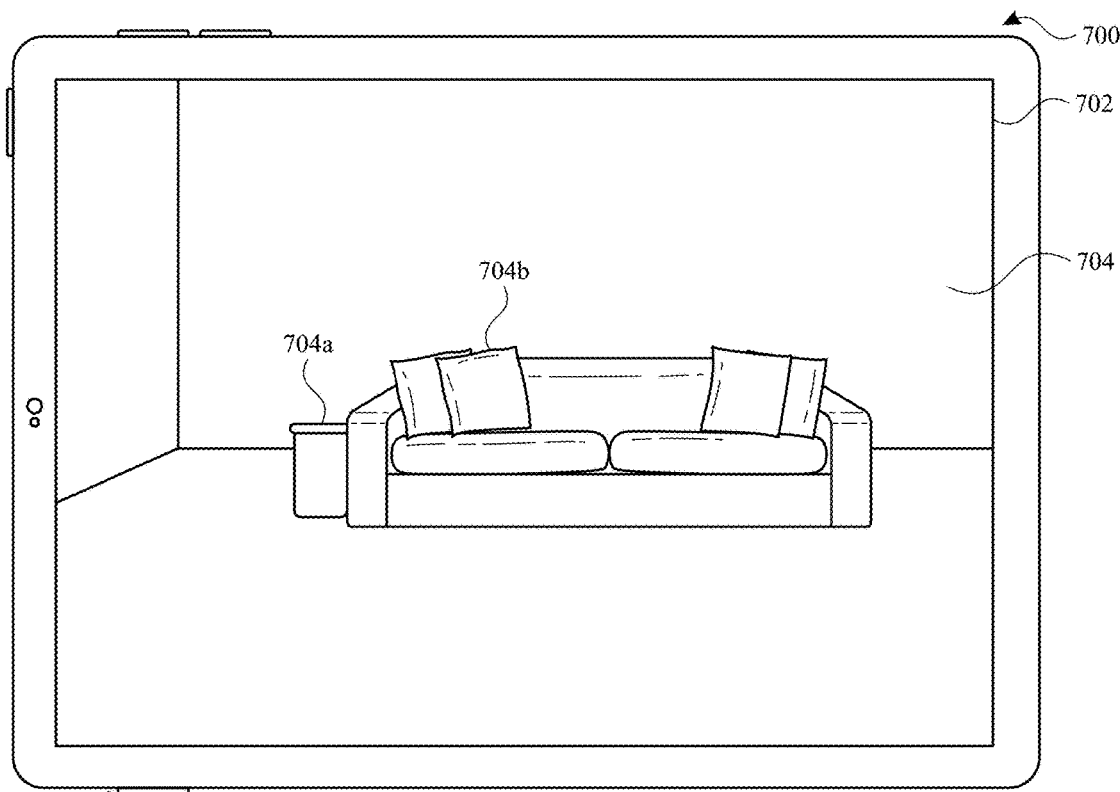
FIGS. 7A-7Q illustrate example techniques for managing live communication sessions, in accordance with some embodiments.
Figure 7Q:
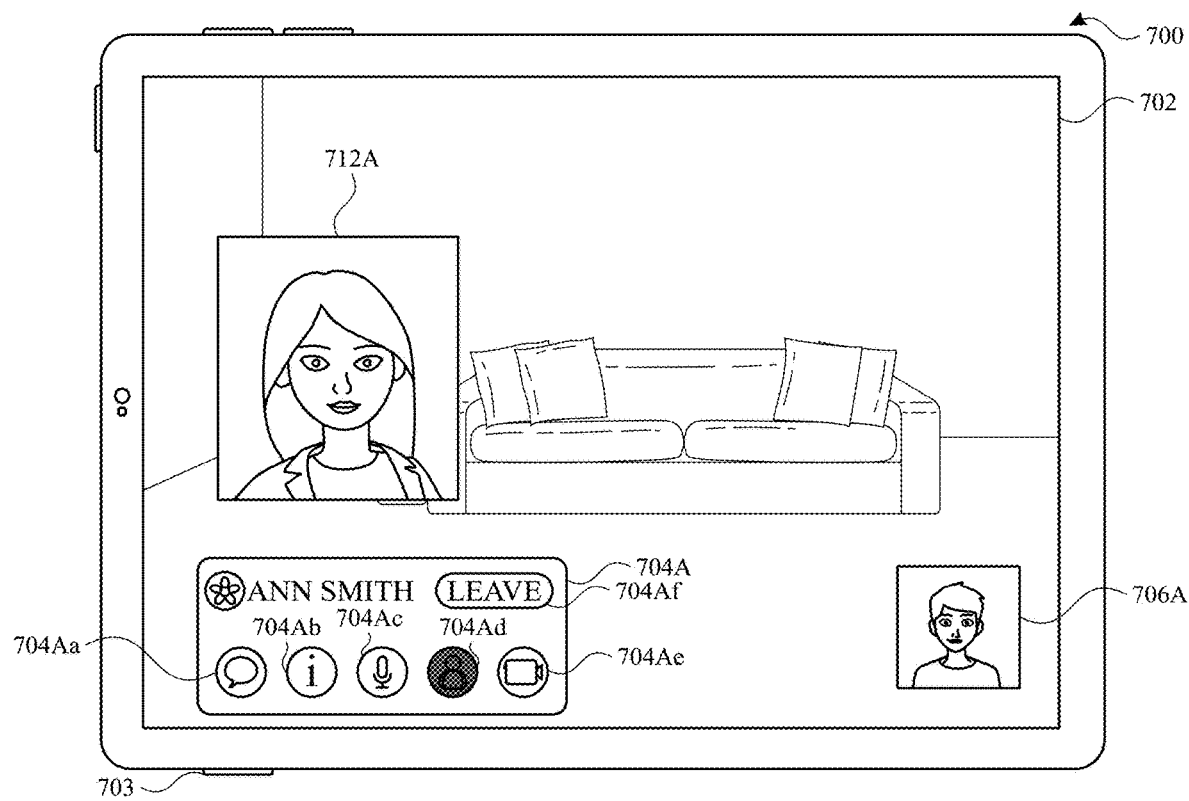
Figure 8:
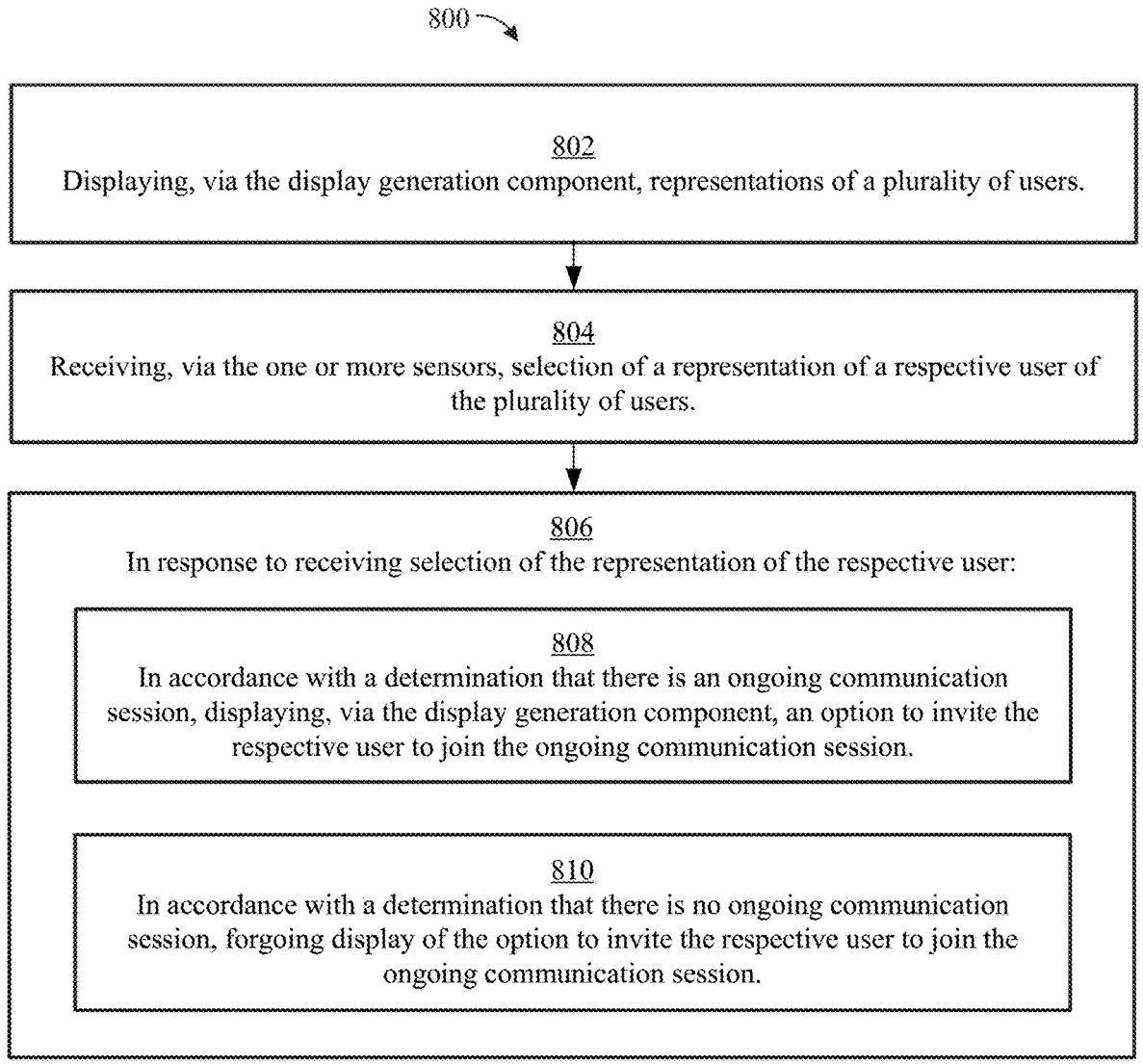
FIG. 8 is a flow diagram of methods of managing live communication sessions, in accordance with various embodiments.
Figure 9:
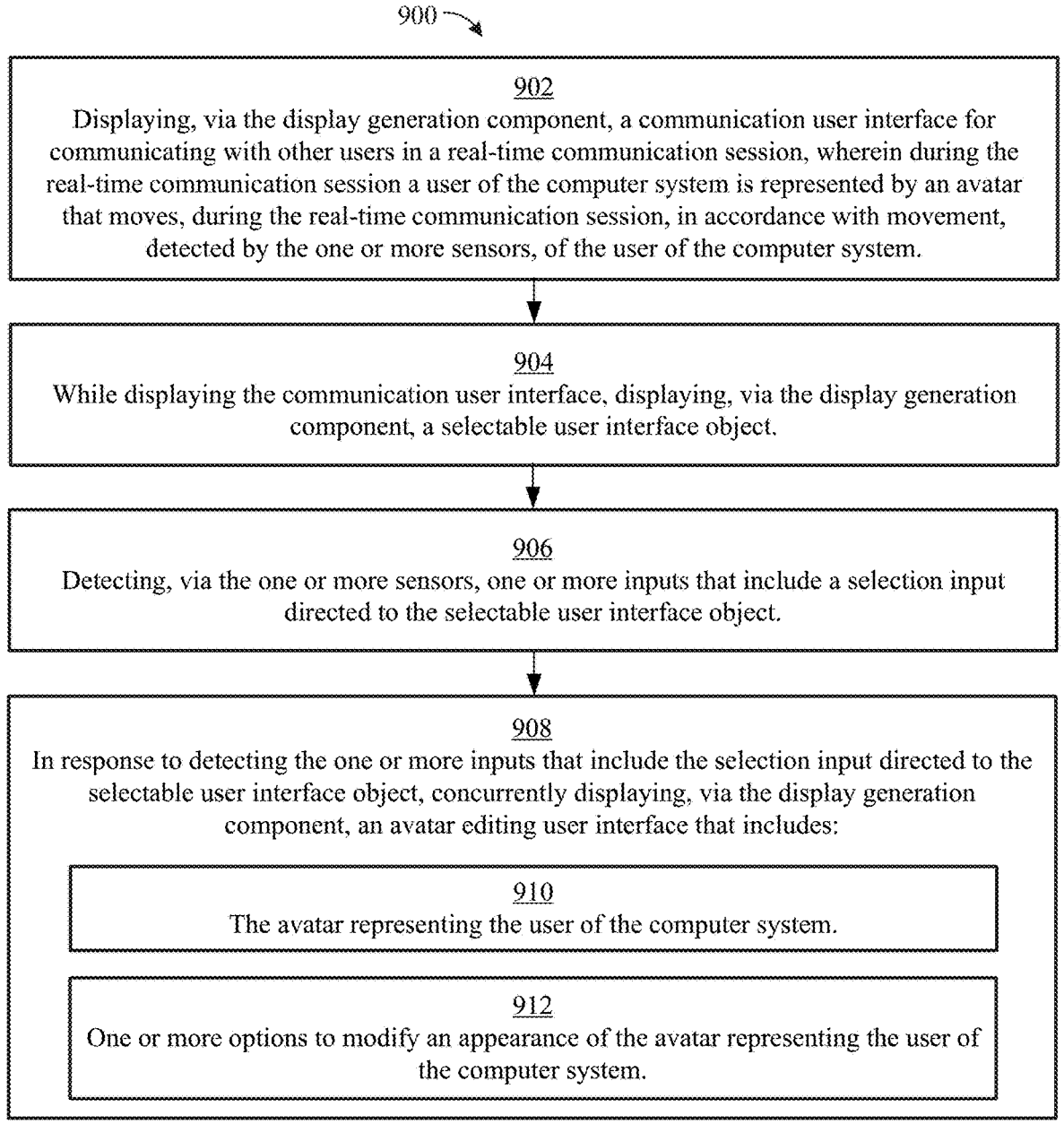
FIG. 9 is a flow diagram of methods of providing avatars in live communication sessions, in accordance with various embodiments.

FIGS. 1A-6 provide a description of example computer systems for providing XR experiences to users. FIGS. 7A-7Q illustrate example techniques for managing live communication sessions, in accordance with some embodiments. FIG. 8 is a flow diagram of methods of managing live communication sessions, in accordance with various embodiments. FIG. 9 is a flow diagram of methods of providing avatars in live communication sessions, in accordance with various embodiments. The user interfaces in FIGS. 7A-7Q are used to illustrate the processes in FIG. 8 and FIG. 9. FIGS. 10A-10E illustrate example techniques for providing representations in live communication sessions, in accordance with some embodiments. FIG. 11 is a flow diagram of methods of providing representations in live communication sessions, in accordance with various embodiments. The user interfaces in FIGS. 10A-10E are used to illustrate the processes in FIG. 11. FIGS. 12A-12F illustrate example techniques for providing information in live communication sessions, in accordance with some embodiments. FIG. 13 is a flow diagram of methods of providing information in live communication sessions, in accordance with various embodiments. The user interfaces in FIGS. 10A-10E are used to illustrate the processes in FIG. 11.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
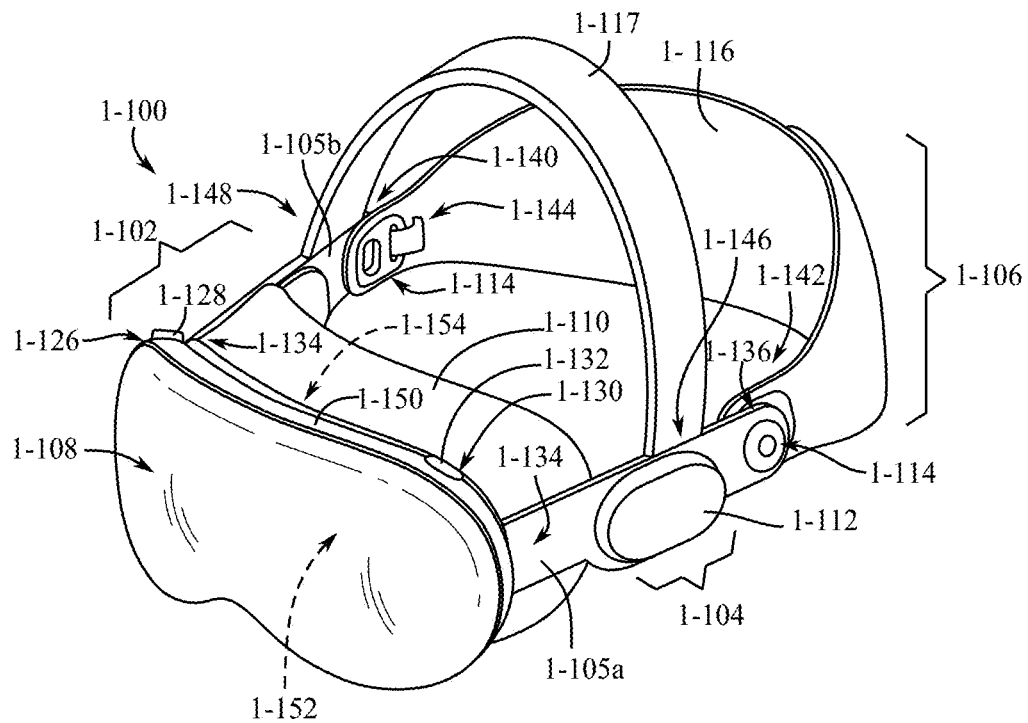
FIGS. 1B-1P are examples of a computer system for providing XR experiences in the operating environment of FIG. 1A.
Figure 1C:
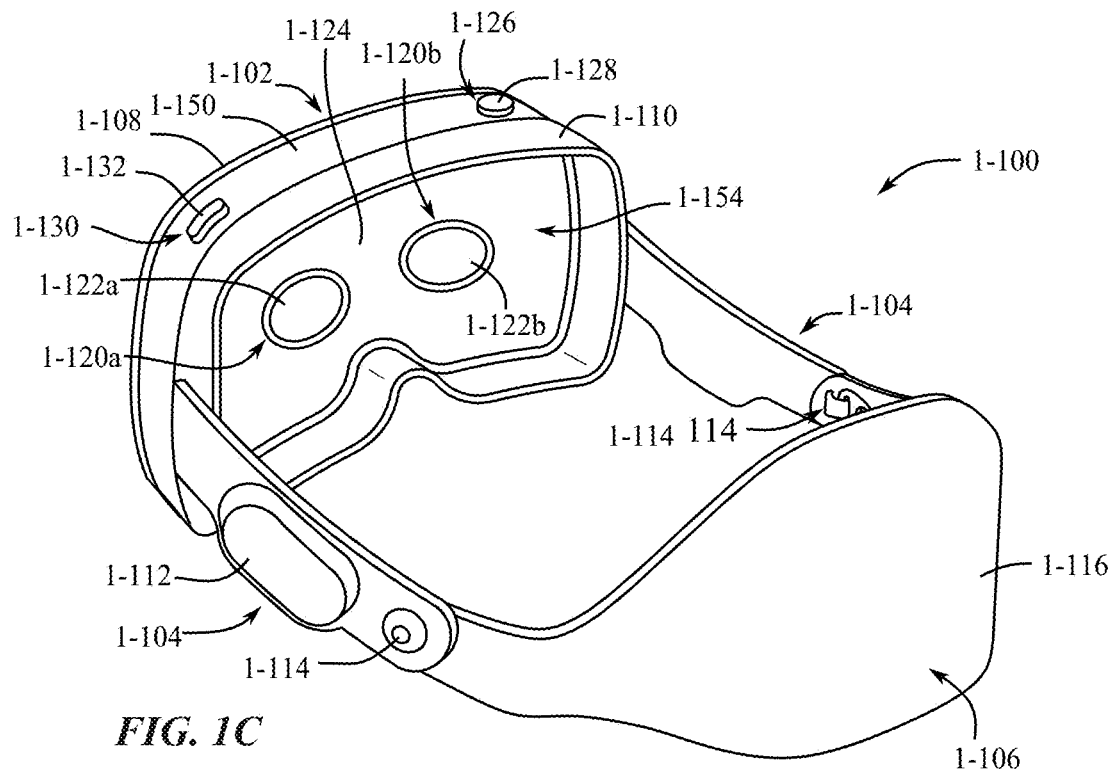
Figure 1D:
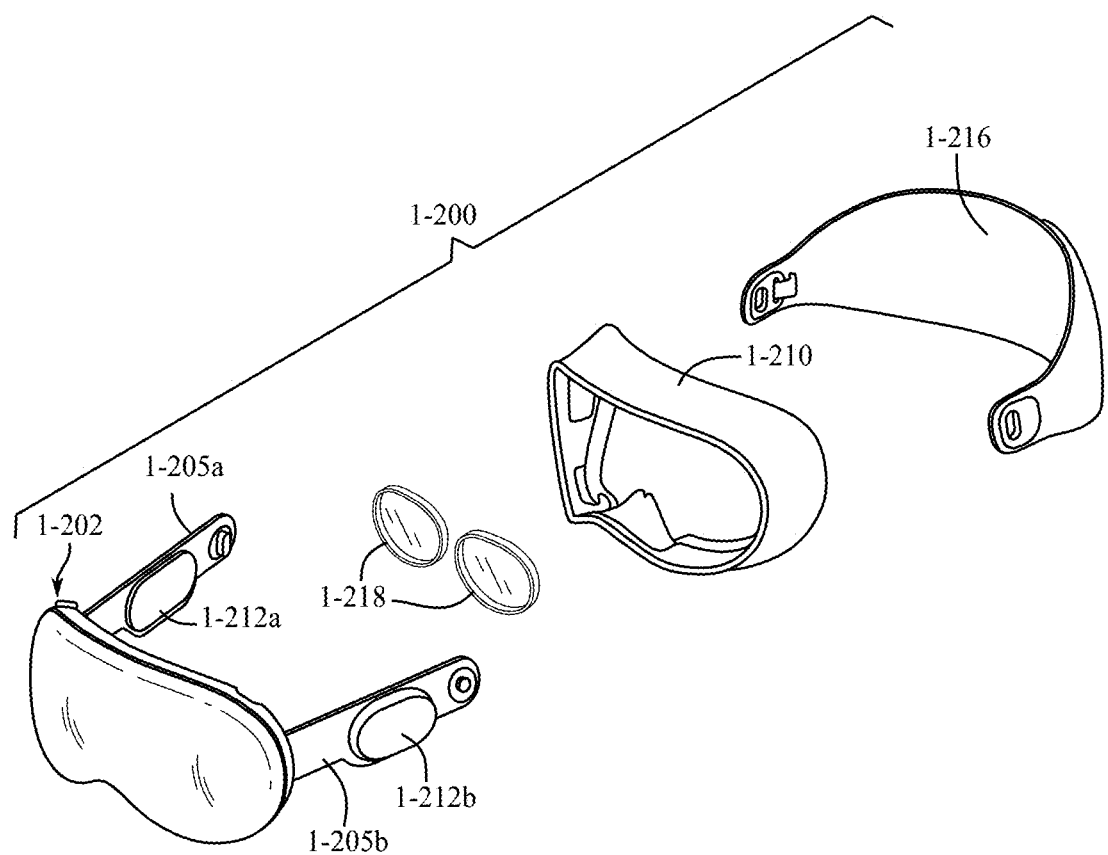
Figure 1E:
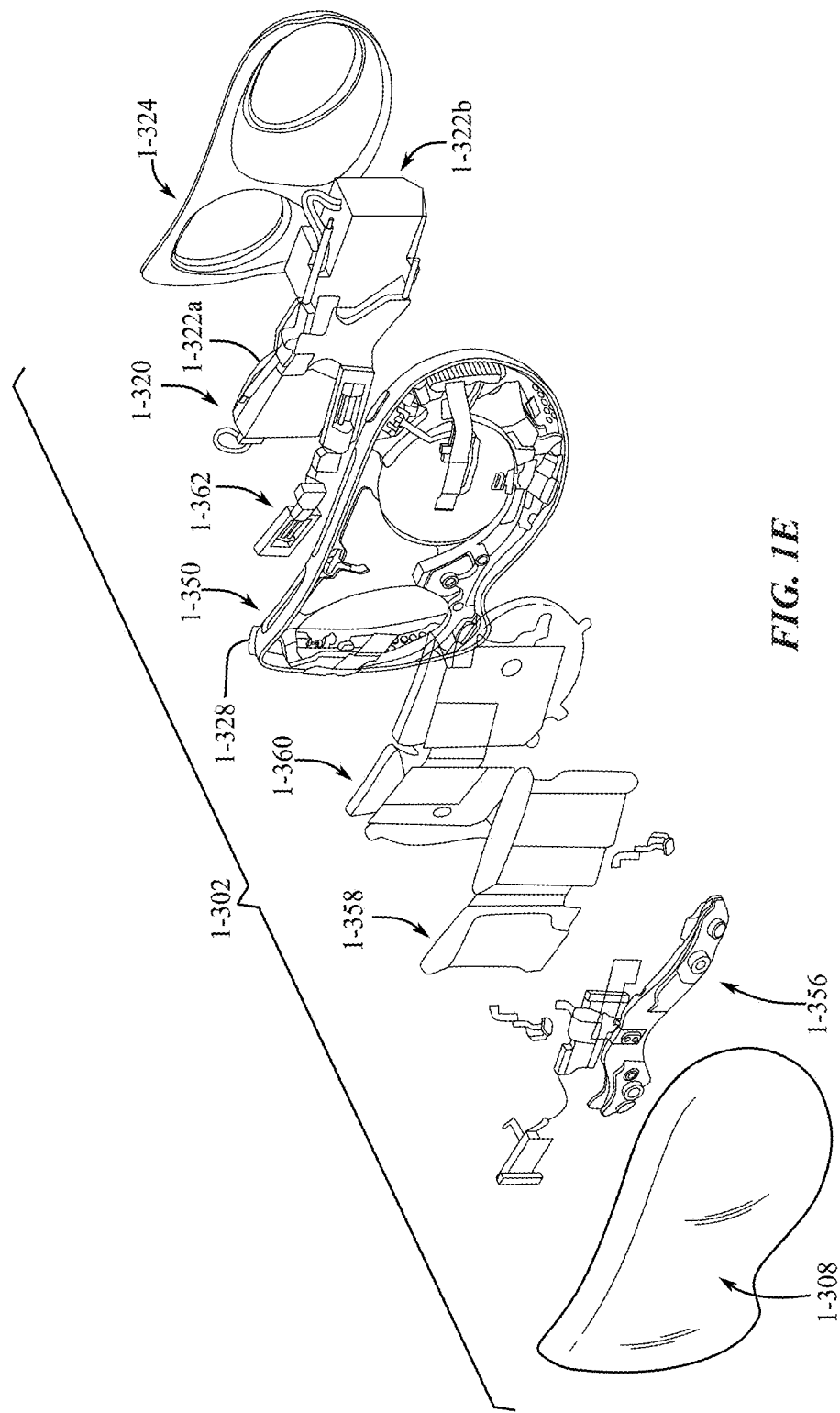
Figure 1F:
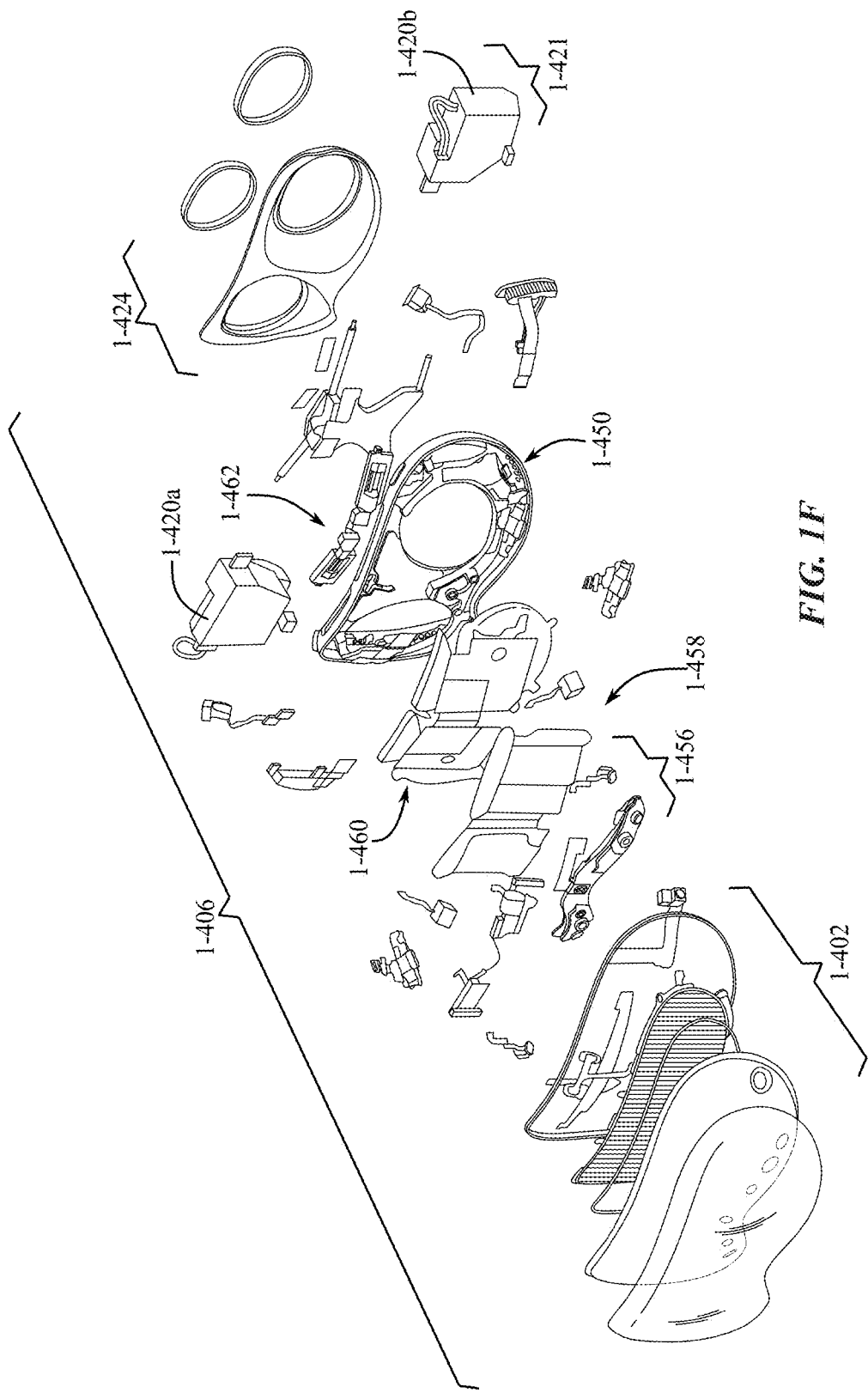
Figure 1G:
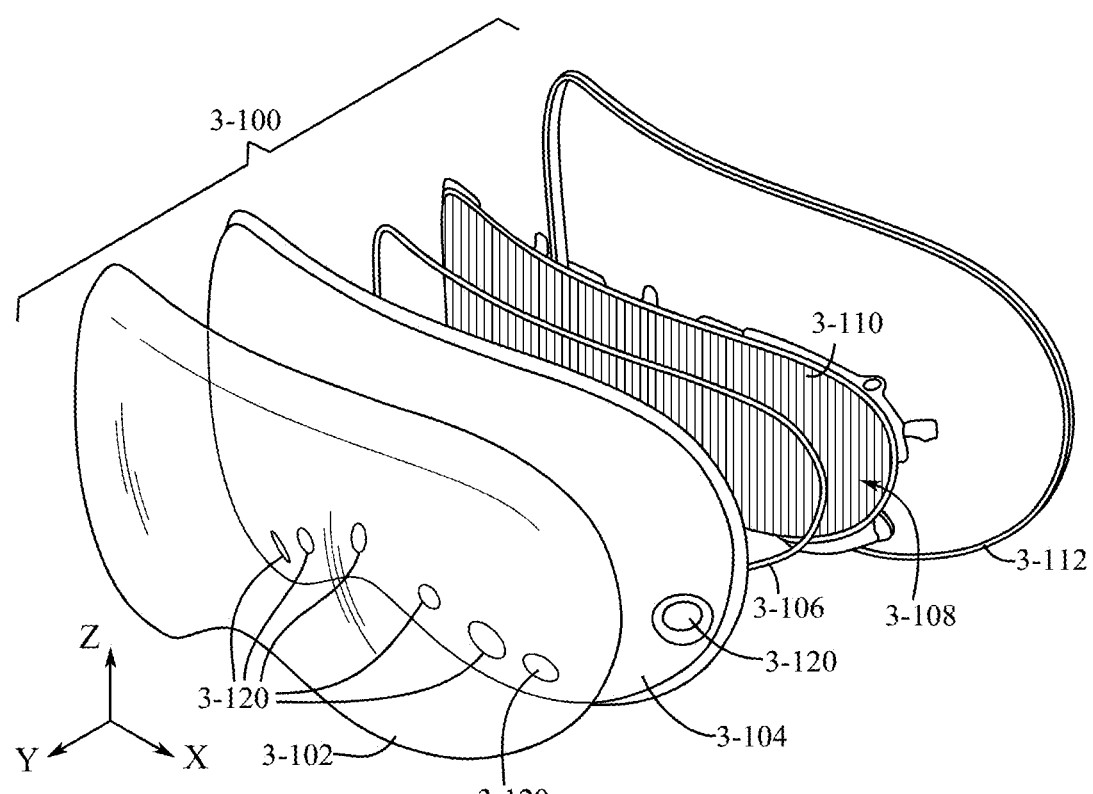
Figure 1H:
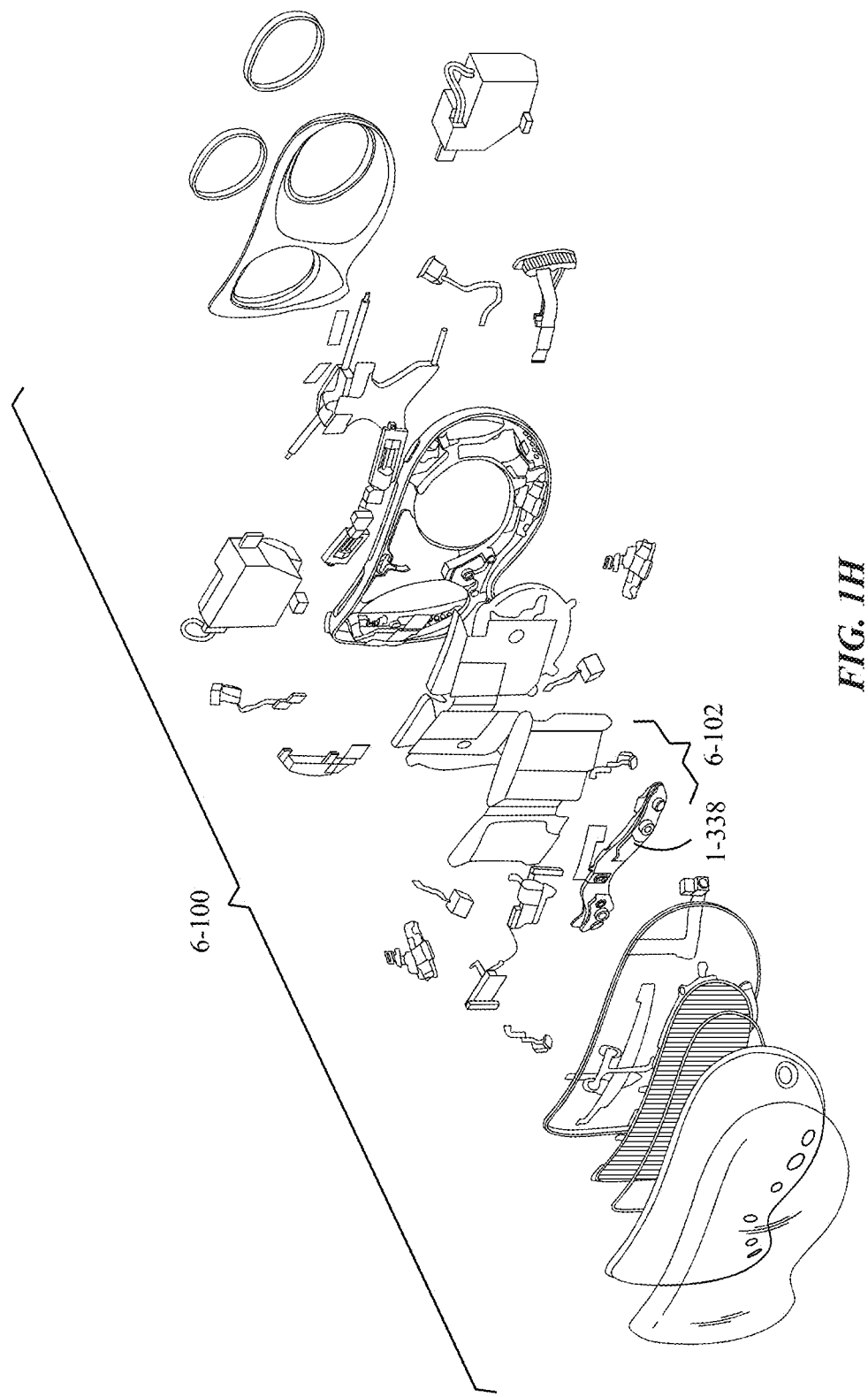
Figure 1I:
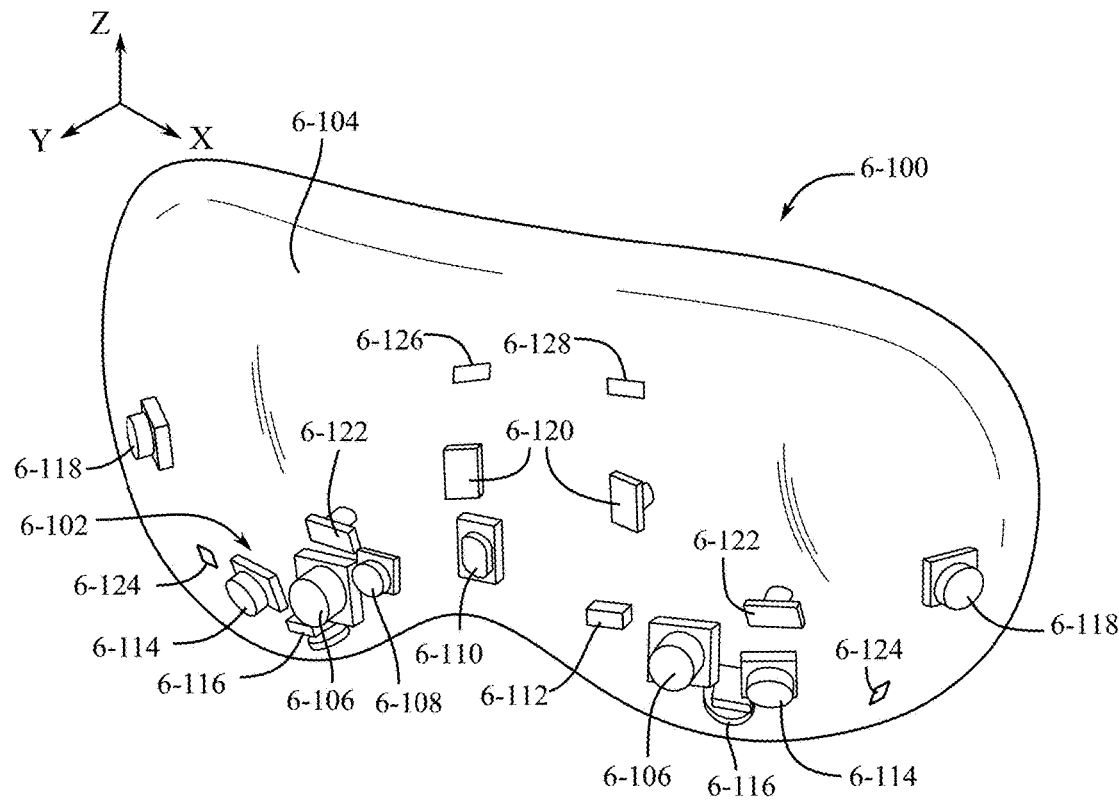
Figure 1J:
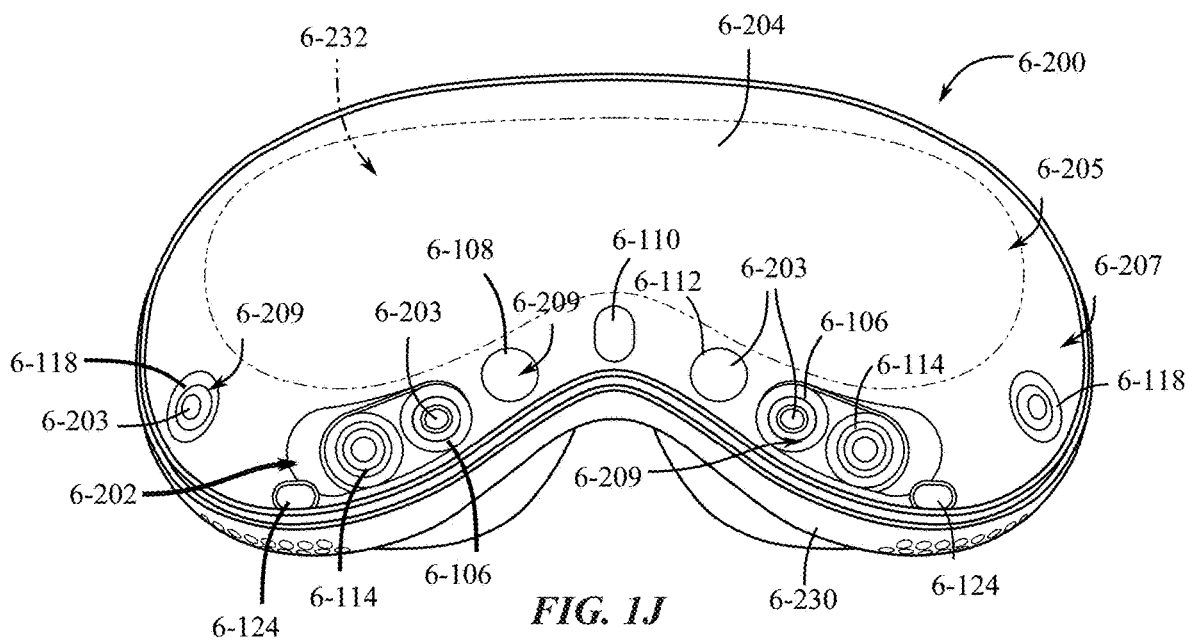
Figure 1K:
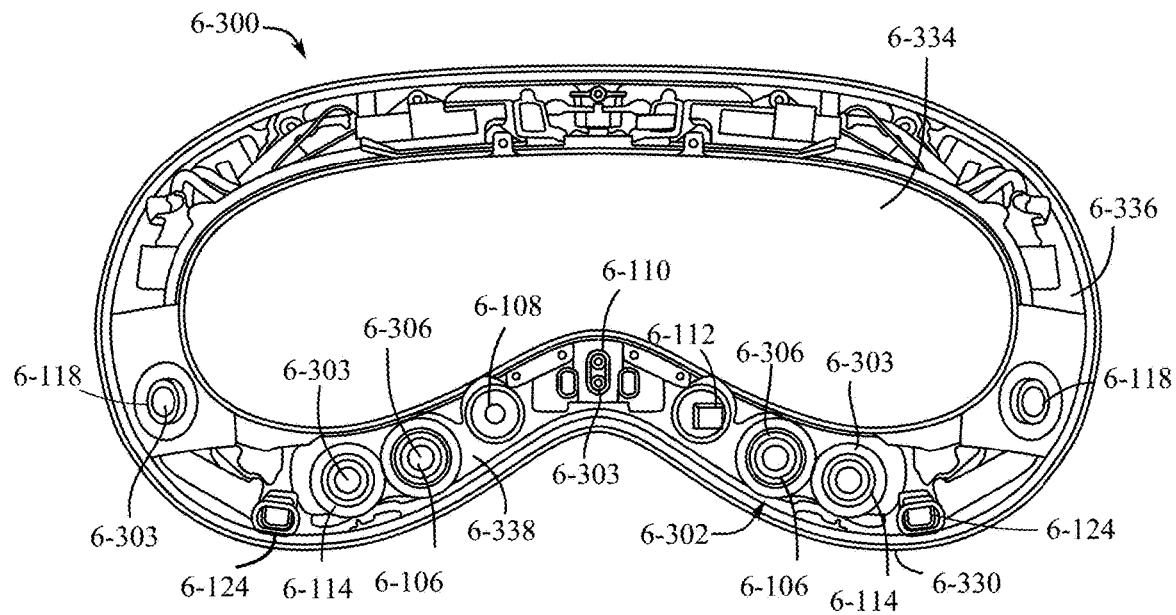
Figure 1L:
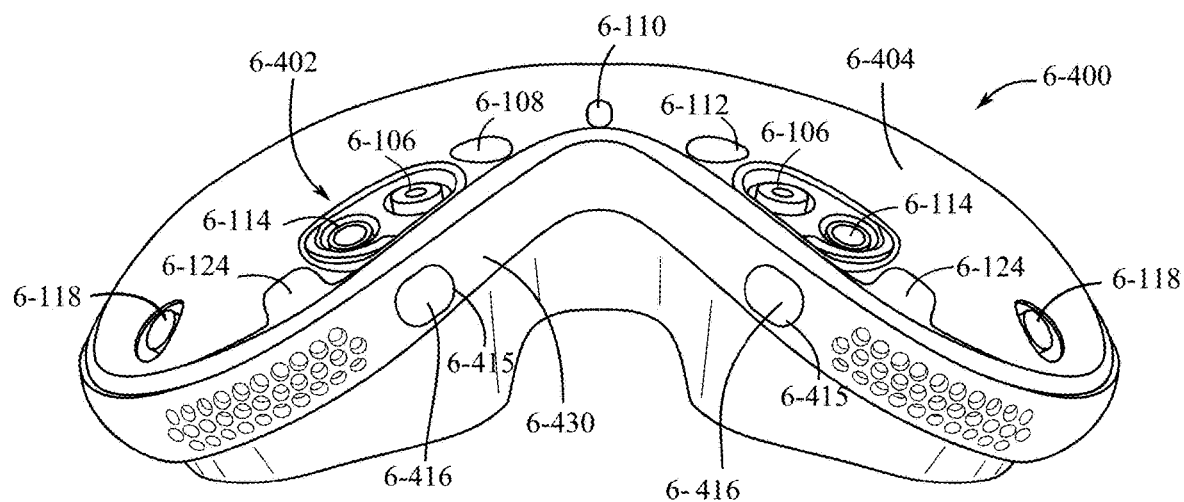
Figure 1M:
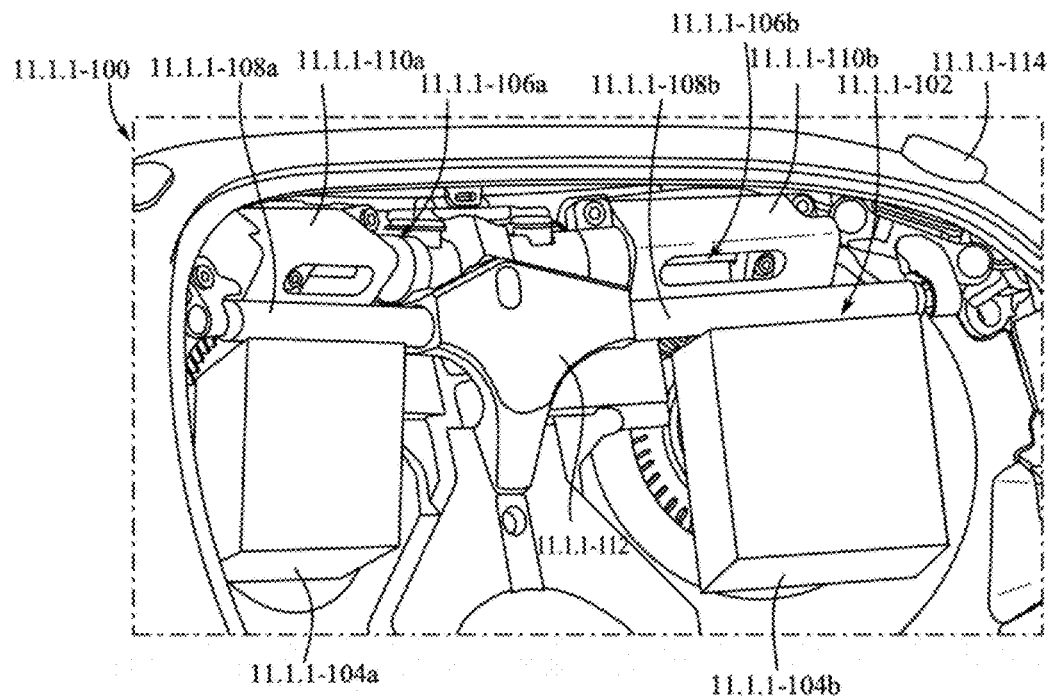
Figure 1N:
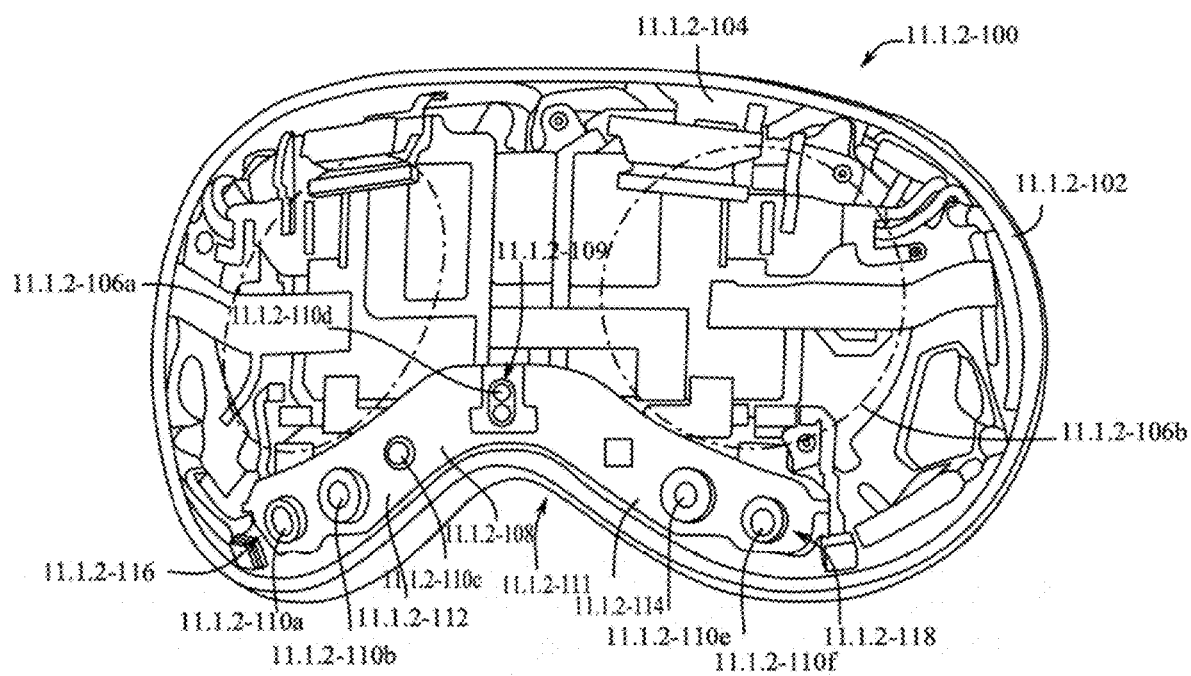
Figure 1O:
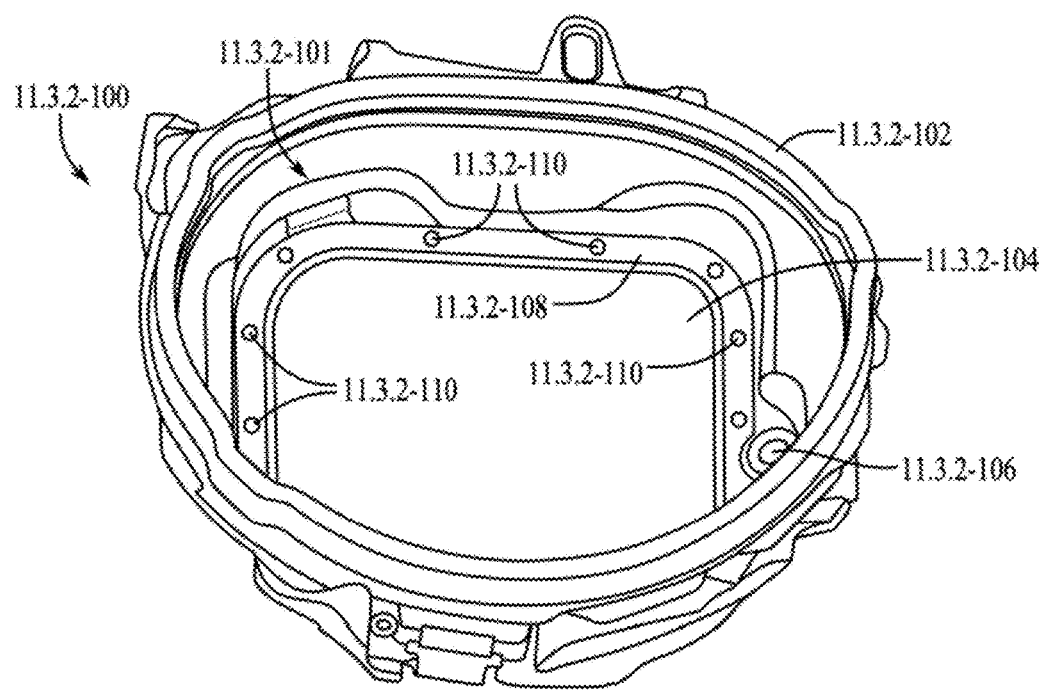
Figure 1P:
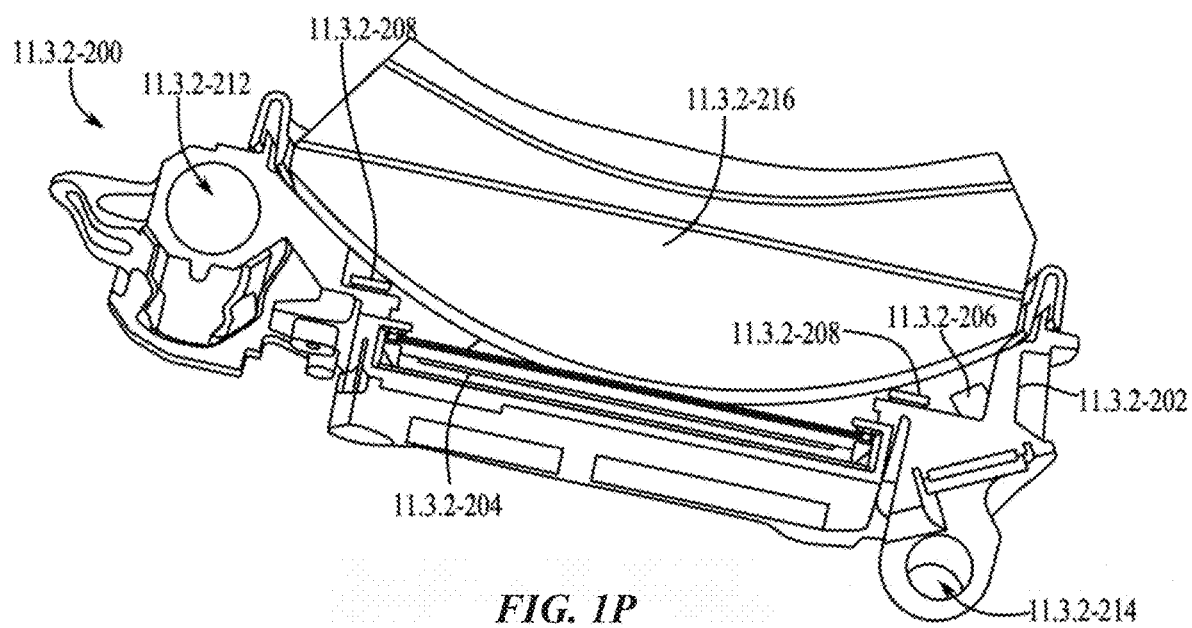

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," "backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HMD device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HMD 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HMD devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
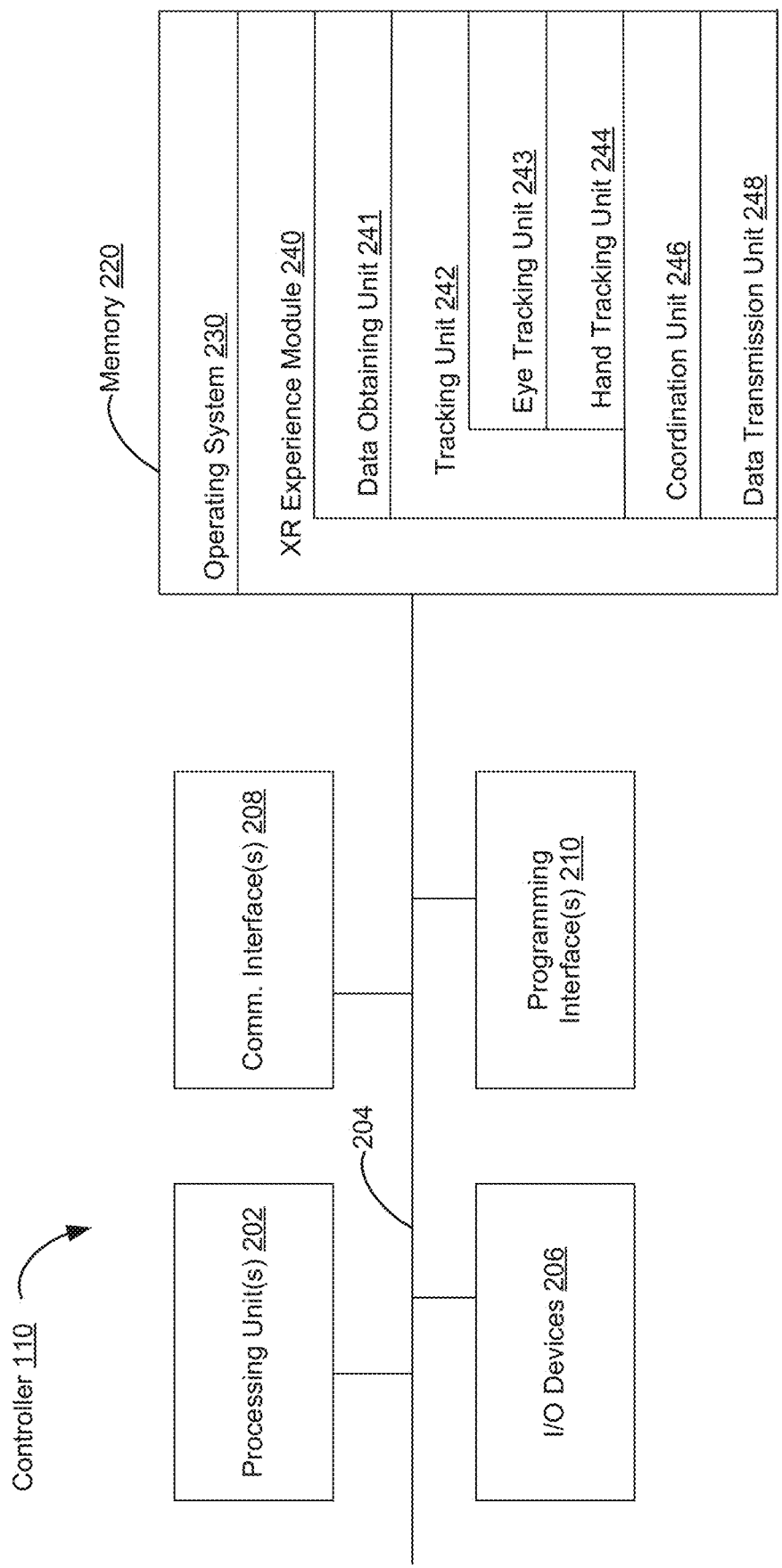
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
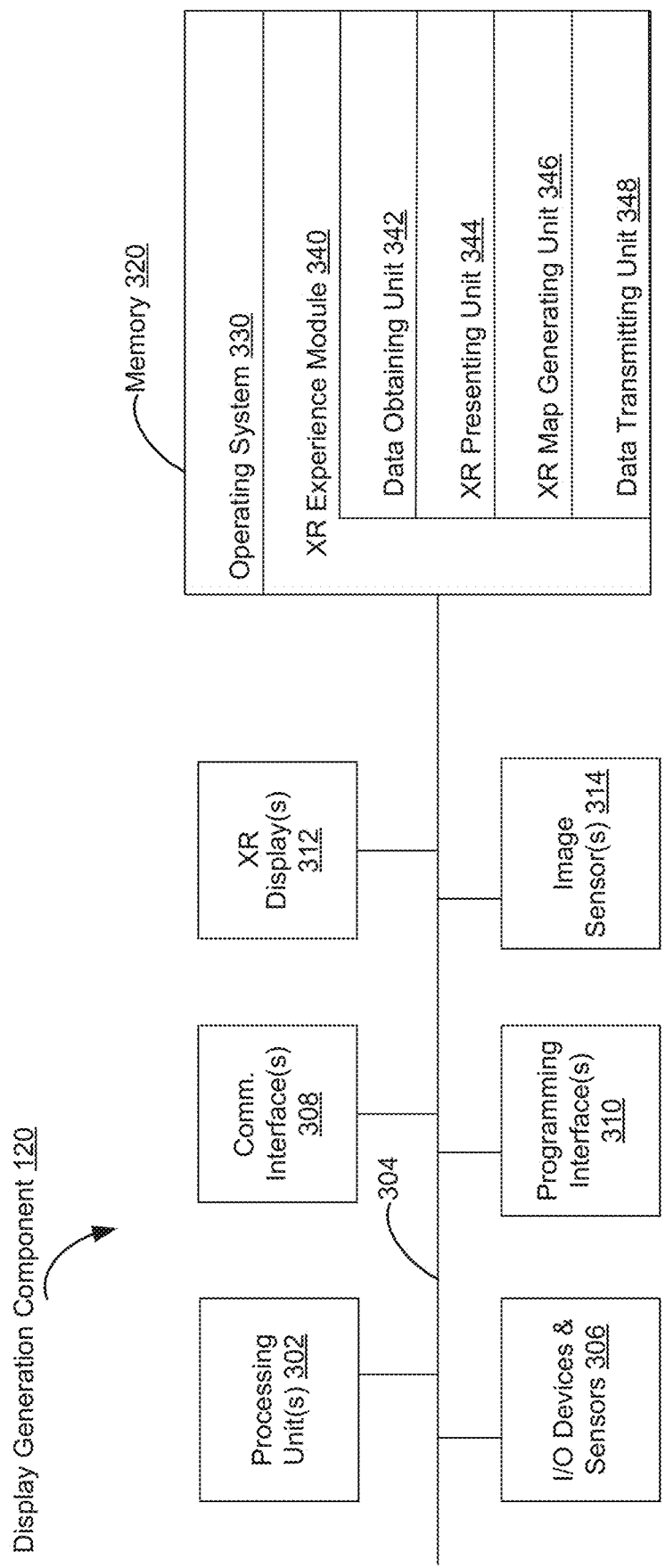
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complementary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand) In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
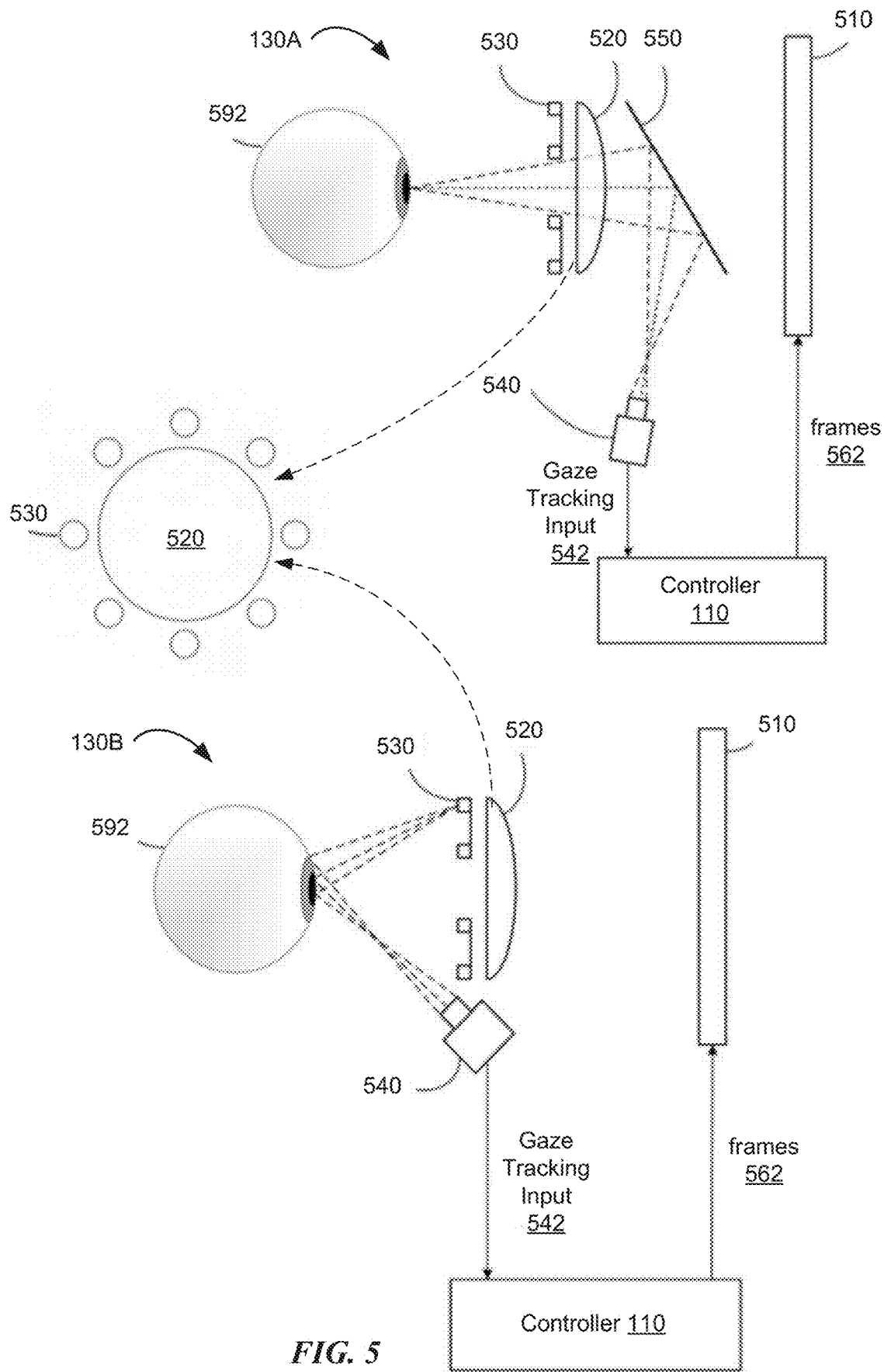
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
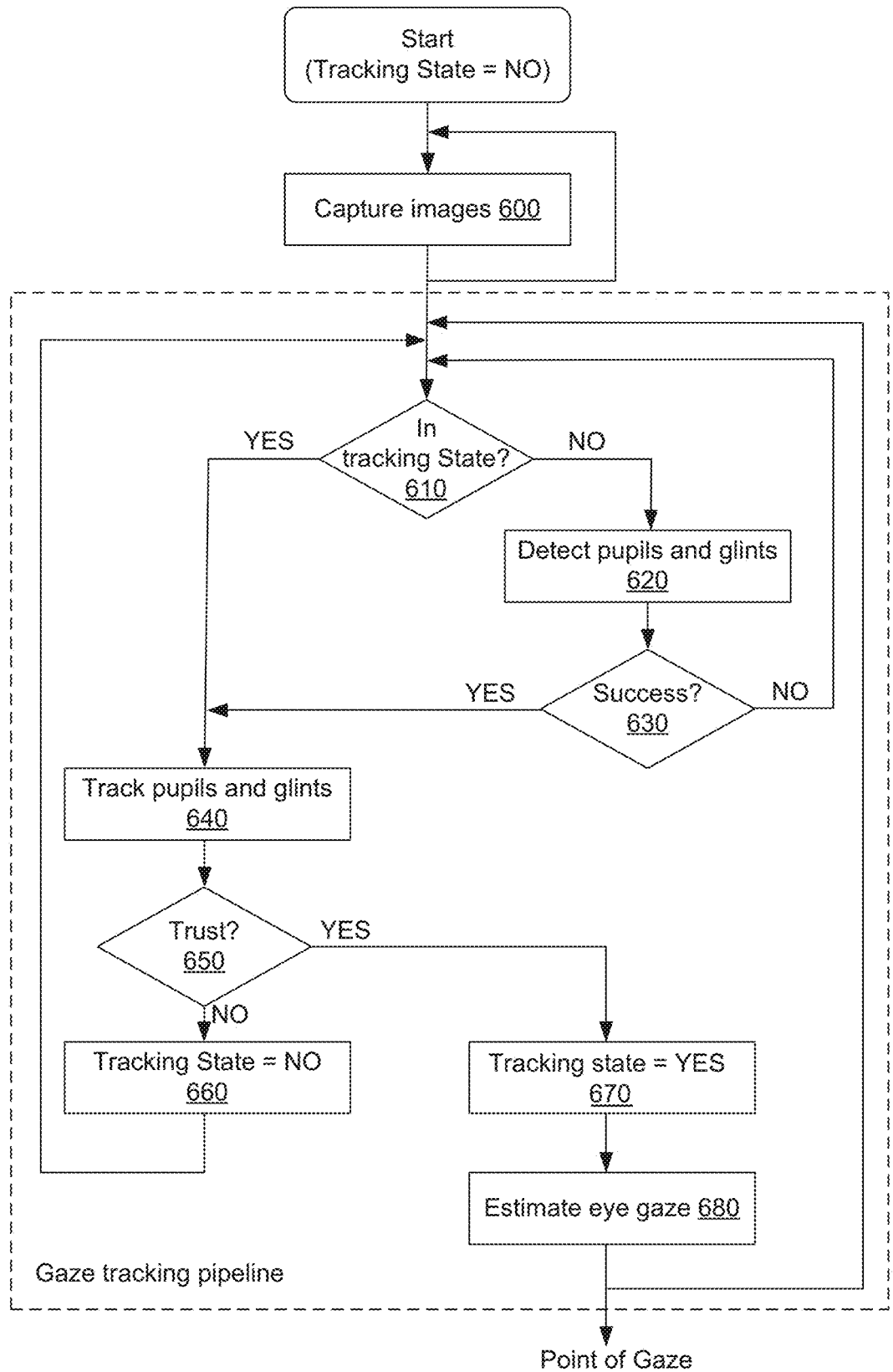
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one or more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and (optionally) one or more sensors.

Examples described herein illustrate the manner in which a user of a computer system (e.g., device 700) may initiate and/or modify a live communication session in which the user communicates with one or more users of other respective computer systems. In some embodiments, a live communication session is an audio communication session (e.g., voice call or phone call). In some embodiments, a live communication session is a video communication session (e.g., video telephony and/or video conferencing). In some embodiments, a live communication session is an XR communication session, such as a spatial communication session or a non-spatial communication session. During a spatial communication session, one or more users are represented in the XR environment by three-dimensional (3D) representations (e.g., avatars) corresponding to the user(s), respectively. In some embodiments, a 3D representation has spatial agency such that the 3D representation can move within the XR environment relative to other elements and/or users in the XR environment. During a non-spatial communication session, one or more users are represented in the XR environment by two-dimensional (2D) representations corresponding to the user(s), respectively. In some embodiments, a 2D representation includes a video feed of a user and optionally, has a fixed position (e.g., location) within the XR environment.

FIGS. 7A-7Q illustrate examples of managing live communication sessions. FIG. 8 is a flow diagram of an exemplary method 800 for managing live communication sessions. FIG. 9 is a flow diagram of an exemplary method 900 for providing avatars in live communication sessions. The user interfaces in FIGS. 7A-7Q are used to illustrate the processes described below, including the processes in FIG. 8 and/or FIG. 9.

While FIGS. 7A-7Q illustrate a device 700 as a handheld device having a display 702 (e.g., a tablet, a smart phone, or a laptop), in some embodiments, device 700 is a head-mounted device (HMD). The HMD is configured to be worn on a head of a user of device 700 and includes display 702 on and/or in an interior portion of the HMD. Display 702 is visible to the user when device 700 is worn on the head of the user. For instance, in some embodiments, the HMD at least partially covers eyes of the user when worn on the head of the user, such that display 702 is positioned over and/or in front of the eyes of the user. In such embodiments, display 702 is configured to display an XR environment during a live communication session in which the user of the HMD is participating.

Figure 7B:
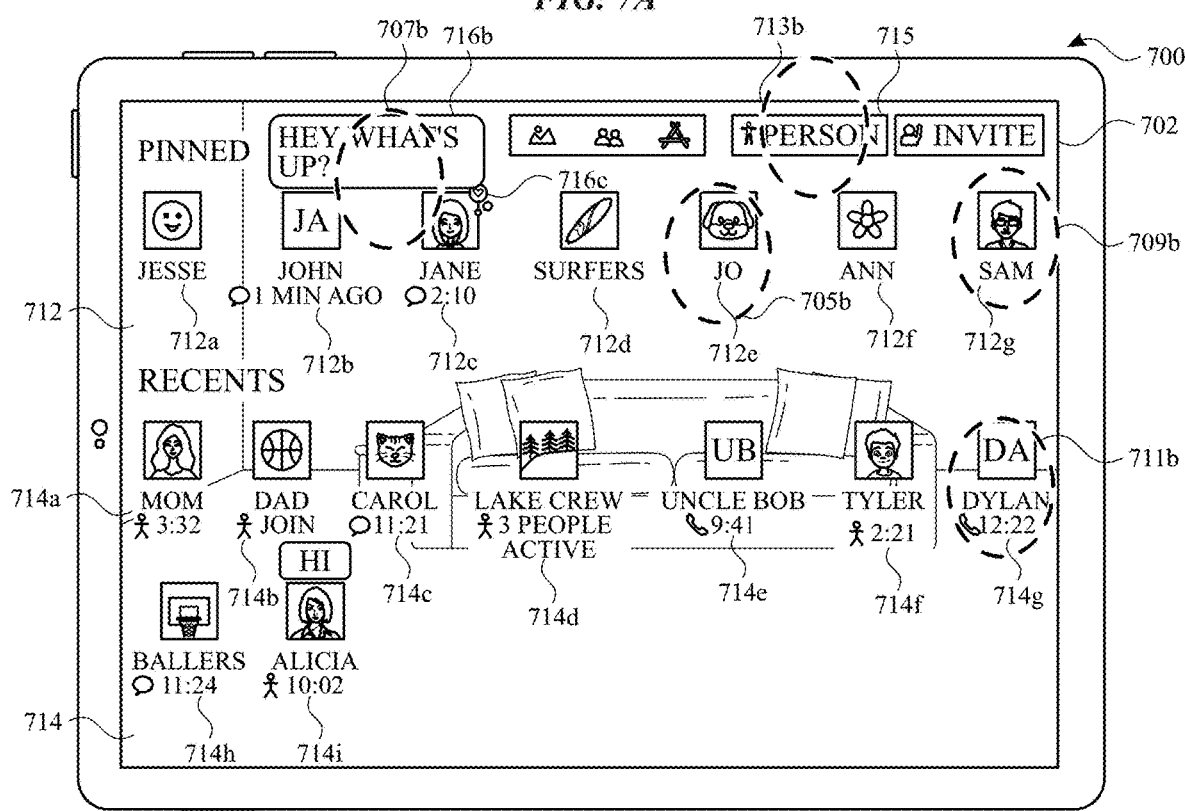

In FIG. 7A, device 700 displays, on display 702, XR environment 704 including elements (e.g., virtual elements and/or physical elements), such as table 704a and couch 704b. While displaying XR environment 704, device 700 receives a request to display a communication interface. In some embodiments, the request to display a communication interface is a press of button 703 of device 700. As shown in FIG. 7B, in response to receiving the request, device 700 displays communication interface 710. In some embodiments, communication interface 710 is displayed within XR environment 704.

Generally, communication interface 710 can be used to initiate and/or modify a live communication session (e.g., audio communication session, video communication session, or XR communication session). Communication interface 710 includes pinned contacts 712 (e.g., pinned contacts 712a-712g) and recent contacts 714 (e.g., recent contacts 714a-714i). In some embodiments, pinned contacts 712 are a set of contacts selected (e.g., contacts favorited or pinned) by the user of device 700 to be included in communication interface 710. In some embodiments, recent contacts 714 are contacts with which the user of device 700 has recently communicated (e.g., via text, phone, and/or live communication session) using device 700, and optionally, one or more other devices associated with the user of device 700. In some embodiments, recent contacts 714 are arranged (e.g., ordered or ranked) based on recency of communications between recent contacts 714 and the user of device 700.

In some embodiments, one or more pinned contacts 712 and/or recent contacts 714 correspond to a defined group of contacts. As an example, pinned contact 712d corresponds to a group of contacts "Surfers". As another example, recent contact 714d corresponds to a group of contacts "Lake Crew".

In some embodiments, pinned contacts 712 and/or recent contacts 714 indicate the most recent communications between the user of device 700 and various contacts. As an example, pinned contact 712b ("John") indicates that the contact last sent a text message 1 minute ago. Optionally, communication interface 710 includes preview 716b indicating the content of the text message sent by pinned user 712b. As another example, pinned user 712c indicates that the contact last sent a text reaction (e.g., a "heart" reaction) at a time of 2:10. As yet another example, recent contact 714a ("Mom") indicates that the user of device 700 most recently communicated with contact 714a in an XR communication session (e.g., a spatial live communication session or a non-spatial live communication session) at a time of 3:32. As yet another example, recent contact 714e ("Uncle Bob") indicates that the user of device 700 most recently communicated with contact 714e in an audio communication session (e.g., phone call) at a time of 9:41.

In some embodiments, pinned contacts 712 and/or recent contacts 714 indicate pending invitations to live communication sessions. As an example, recent contact 714b ("Dad") indicates that the user of device 700 can join a live communication session with recent contact 714b. As yet another example, recent contact 714d ("Lake Crew") indicates that three members of the group are currently in an ongoing live communication session that the user of device 700 has been invited to join.

In some embodiments, contacts 712 and 714 of communication interface 710 can be used to manage contacts. By way of example, while displaying communication interface 710, device 700 detects selection of contact 712e ("Jo"). In some embodiments, the selection of contact 712e is a tap gesture 705b on contact 712e. In some embodiments, the selection of contact 712e is an air gesture, for instance, indicating a selection of contact 712e. As shown in FIG. 7C1 and/or FIG. 7C2, in response to detecting selection of contact 712e, device 700 displays contact menu 720 associated with contact 712e.

Figure 7D:
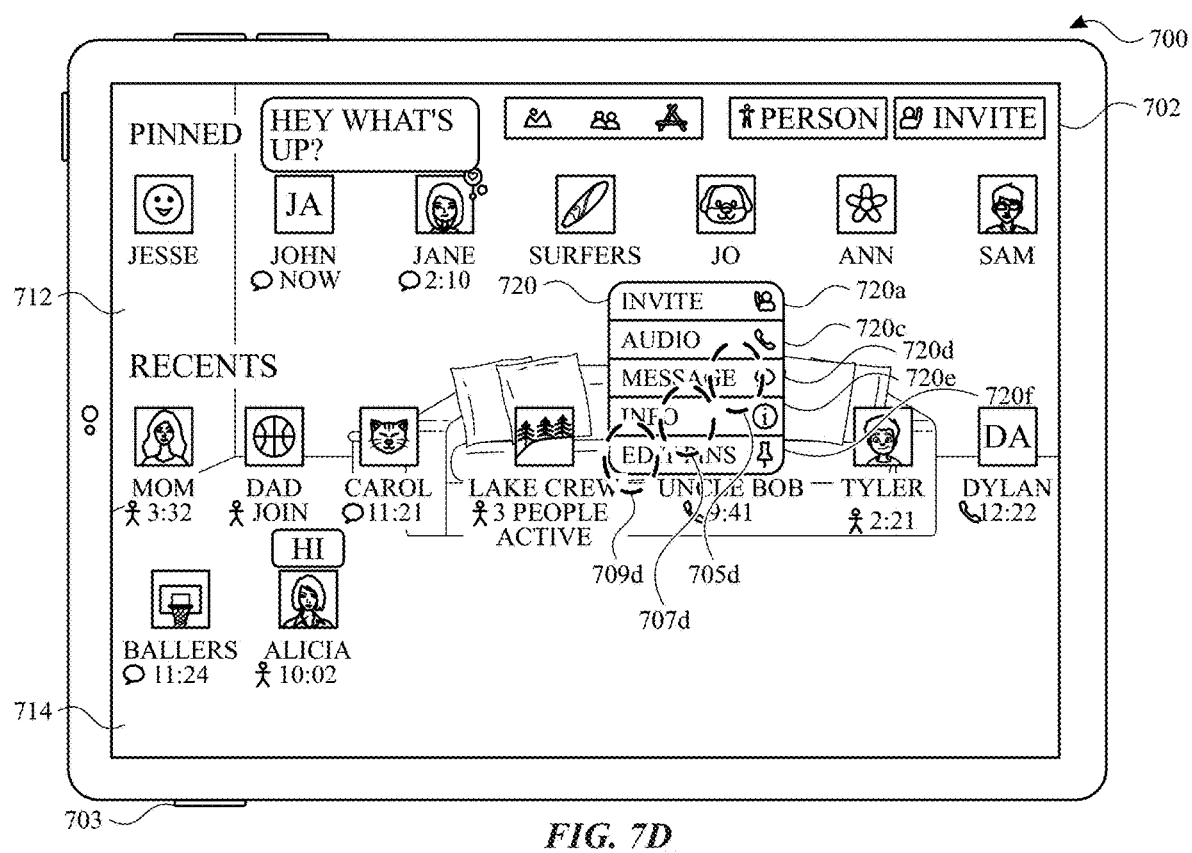

Contact menu 720 includes invite option 720a and expand option 720b. Invite option 720a, when selected, causes device 700 to invite contact 712e to an XR communication session. Expand option 720b, when selected, causes device 700 to display one or more additional options for managing contact 712e. For example, while displaying contact menu 720, device 700 detects selection of expand option 720b. In some embodiments, the selection of expand option 720b is a tap gesture 705c on expand option 720b. In some embodiments, the selection of expand option 720b is an air gesture, for instance, indicating a selection of expand option 720b. As shown in FIG. 7D, in response to detecting selection of expand option 720b, device 700 expands contact menu 720 to display (e.g., replace display of expand option 720b with) one or more additional options (e.g., options 720c-720f).

Figure 7E:
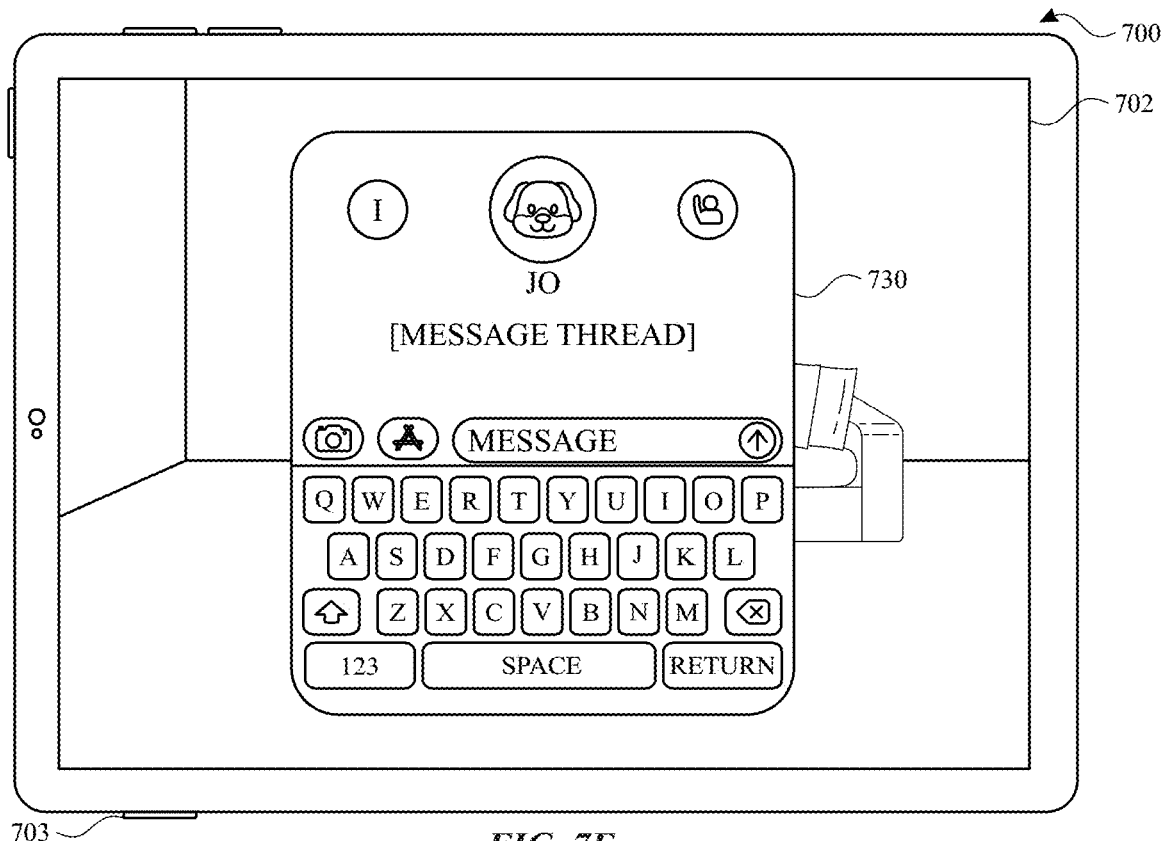

In some embodiments, when expanded, contact menu 720 includes audio option 720c, message option 720d, info option 720e, and edit option 720f. Audio option 720c, when selected, causes device 700 to initiate an audio communication session (e.g., that does not have a live video component) with contact 712e. In some embodiments, device 700 is not capable of communicating over a cellular network and/or is configured to use an external device for audio calls. Accordingly, in some examples, device 700 initiates an audio communication session using a nearby device (e.g., mobile phone and/or a tablet) (e.g., that is capable of communicating over a cellular network). Edit option 720f, when selected, allows a user of device 700 to remove contact 712e from pinned contacts 712 (or add contact 712e to pinned contacts in embodiments in which contact 712e is not already a pinned contact). Message option 720d, when selected, allows for a user to send a message to contact 712e. For example, while displaying contact menu 720, device 700 detects selection of message option 720d. In some embodiments, the selection of message option 720d is a tap gesture 705d on message option 720d. In some embodiments, the selection of message option 720d is an air gesture, for instance, indicating a selection of message option 720d. As shown in FIG. 7E, in response to detecting selection of message option 720d, device 700 displays (e.g., replaces display of communications interface 710 with) message interface 730. Thereafter, message interface 730 can be used to send messages to contact 712e.

Figure 7F:
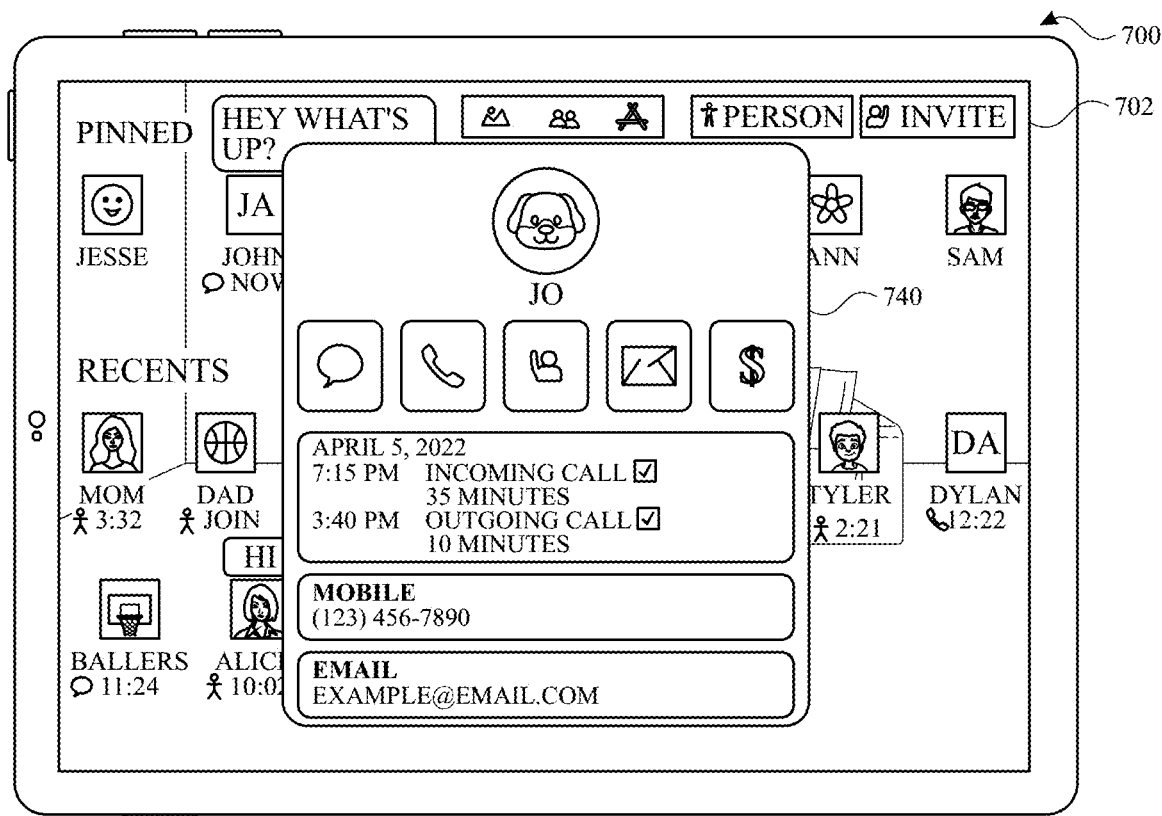

With reference once again to FIG. 7D, info option 720e, when selected, causes device 700 to display information corresponding to contact 712e (e.g., without displaying additional information corresponding to other contacts). For example, while displaying contact menu 720, device 700 detects selection of info option 720e. In some embodiments, the selection of info option 720e is a tap gesture 707d on info option 720e. In some embodiments, the selection of info option 720e is an air gesture, for instance, indicating a selection of info option 720e. As shown in FIG. 7F, in response to detecting selection of info option 720e, device 700 displays info interface 740. Info interface 740 includes various details corresponding to contact 712e, including but not limited to name and contact information.

In some embodiments, a device of a contact is not capable of participating in an XR communication session with device 700. Accordingly, in some embodiments, one or more options of a contact menu may be omitted, de-emphasized (e.g., grayed out or darkened), and/or replaced to accurately reflect capabilities of a device of a contact. For example, with reference once again to FIG. 7B, while displaying communications interface 710, device 700 detects selection of contact 712g ("Sam"). In some embodiments, the selection of contact 712g is a tap gesture 709b on contact 712g. In some embodiments, the selection of contact 712g is an air gesture, for instance, indicating a selection of contact 712g. As shown in FIG. 7C1, in response to detecting selection of contact 712g, device 700 displays contact menu 722 associated with contact 712g.

Because, in some embodiments, a device of contact 712g is not capable of communicating in an XR communication session with device 700, menu 722 does not include an invite option (e.g., invite option 720a) and instead includes audio option 722a. Audio option 722a, when selected, causes device 700 to initiate an audio communication session with contact 712g. Menu 722 further includes expand option 722b, which when selected, causes device 700 to display one or more additional options for contact 712g.

In some embodiments, a contact menu associated with a contact includes one or more additional options based on a state of device 700. As an example, in some embodiments, in instances in which device 700 is participating in a live communication session (e.g., XR communication session or an audio communication session), a contact menu includes an option to invite a contact to the live communication session. For example, with reference to FIG. 7B, while participating in an XR communication session and while displaying communication interface 710, device 700 detects selection of contact 714g ("Dylan"). In some embodiments, the selection of contact 714g is a tap gesture 711b on contact 714g. In some embodiments, the selection of contact 714g is an air gesture, for instance, indicating a selection of contact 714f. As shown in FIG. 7C1, in response to detecting selection of contact 714g, device 700 displays contact menu 724 associated with contact 714g.

Contact menu 724 includes invite option 724a, invite option 724b, and expand option 724c. Invite option 724a, when selected (e.g., tap gesture 709c), causes device 700 to invite contact 714g to a new live communication session. Invite option 724b, when selected, causes device 700 to invite contact 714g to the live communication session in which device 700 is currently participating. Expand option 720c, when selected, causes device 700 to display one or more additional options for contact 714g.

Figure 7G:
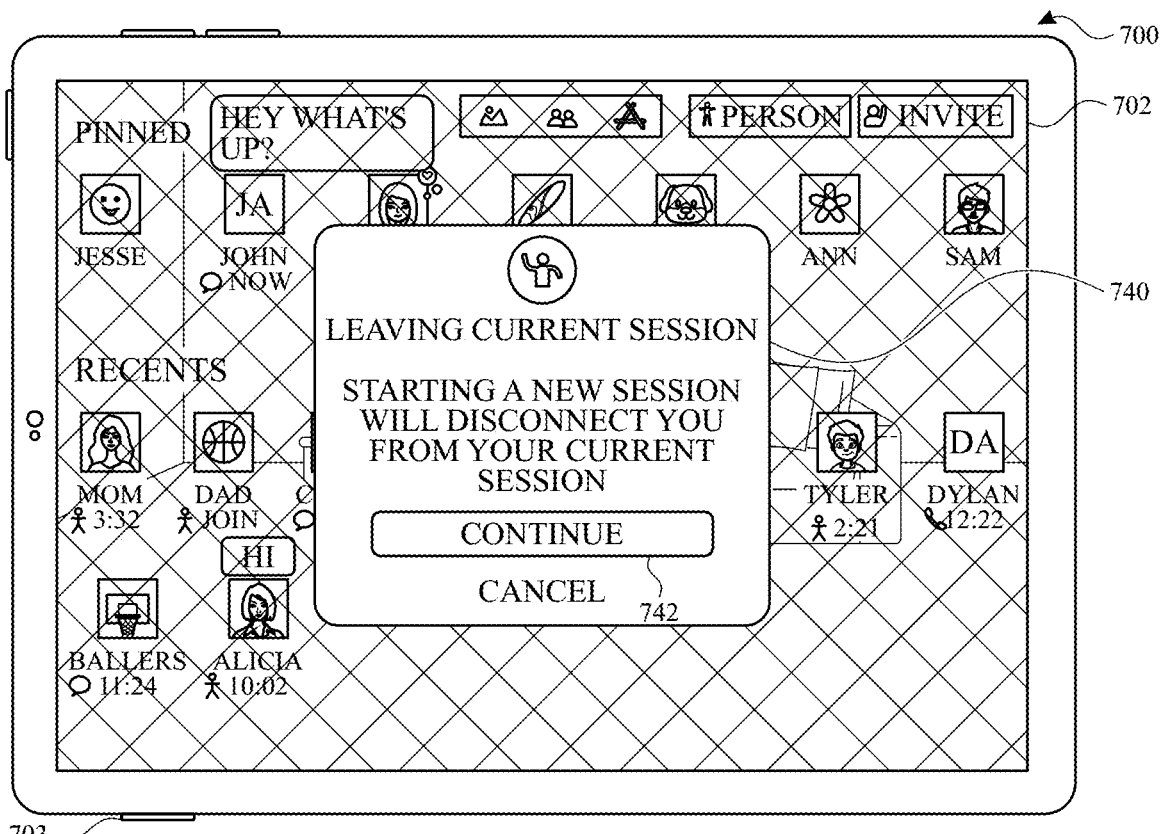

In some embodiments, inviting a contact to a new live communication session (e.g., in response to selection of option 724a) will cause device 700 to disconnect from and/or terminate the live communication session in which device 700 is currently participating. In some embodiments, prior to terminating an existing live communication session in this manner, device 700 confirms that a user wishes to disconnect from the current live communication session prior to initiating a new live communication session. For example, as shown in FIG. 7G, in response to selection of invite option 724a, device 700 displays confirmation interface 740 including confirm affordance 742. In response to selection of confirm affordance 742, device 700 terminates the current live communication session and invites contact 714f to a new live communication session.

In some embodiments, a user optionally sends messages to contacts using communication interface 710. For example, with reference to FIG. 7B, while displaying communication interface 710, device 700 detects selection of preview 716b associated with pinned contact 712b. In some embodiments, the selection of preview 716b is a tap gesture 707b on preview 716b. In some embodiments, the selection of preview 716b is an air gesture, for instance, indicating a selection of preview 716b. As shown in FIG. 7C1, in response to detecting selection of preview 716b, device 700 expands preview 716b to display reply option 718.

Figure 7H:
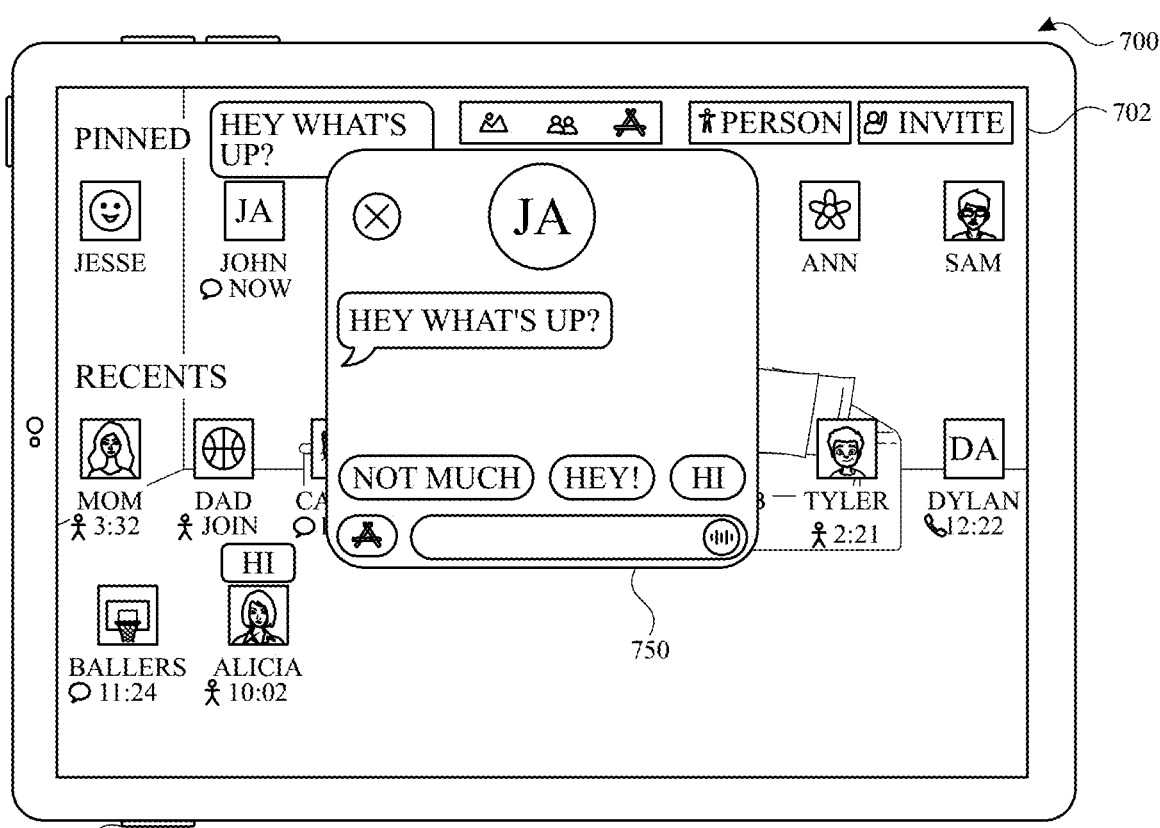

Reply option 718, when selected, causes device 700 to display a reply interface for sending a message to contact 712b. For example, while displaying reply option 718 in preview 716b, device 700 detects selection of reply option 718. In some embodiments, the selection of reply option 718 is a tap gesture 707c on reply option 718. In some embodiments, the selection of reply option 718 is an air gesture, for instance, indicating a selection of reply option 718. As shown in FIG. 7H, in response to detecting selection of reply option 718, device 700 displays reply interface 750, which can be used to send messages to contact 712b.

In some embodiments, the techniques and user interface(s) described in FIG. 7C1 are provided by one or more of the devices described in FIGS. 1A-1P. FIG. 7C2 illustrates an embodiment in which communication interface X710 (e.g., as described in FIGS. 7B and 7C1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

As shown in FIG. 7C2, in response to detecting selection of contact X712e, HMD X700 displays contact menu X720 associated with contact X712e. In some embodiments, HMD X700 detects selection of contact X712e based on an air gesture performed by a user of HMD X700. In some embodiments, HMD X700 detects hands X750a and/or X750b of the user of HMD X700 and determines whether motion of hands X750a and/or X750b perform a predetermined air gesture corresponding to selection of contact X712e. In some embodiments, the predetermined air gesture selecting contact X712e includes a pinch gesture. In some embodiments, the pinch gesture includes detecting movement of finger X750c and thumb X750d toward one another. In some embodiments, HMD X700 detects selection of contact X712e based on a gaze and air gesture input performed by the user of HMD X700. In some embodiments, the gaze and air gesture input includes detecting that the user of HMD X700 is looking at contact X712e (e.g., for more than a predetermined amount of time) and hands X750a and/or X750b of the user of HMD X700 perform a pinch gesture.

Contact menu X720 includes invite option X720a and expand option X720b. Invite option X720a, when selected (e.g., via an air gesture, such as a pinch gesture and/or via a gaze and pinch gesture), causes HMD X700 to invite contact X712e to an XR communication session. Expand option X720b, when selected, causes HMD X700 to display one or more additional options for managing contact X712e. For example, while displaying contact menu X720, HMD X700 detects selection of expand option X720b. In some embodiments, the selection of expand option X720b is an air gesture (e.g., a pinch gesture and/or a gaze and pinch gesture), for instance, indicating a selection of expand option X720b. In response to detecting selection of expand option X720b, HMD X700 expands contact menu X720 to display (e.g., replace display of expand option X720b with) one or more additional options (e.g., options 720c-720f, as illustrated in FIG. 7D).

In some embodiments, when expanded, contact menu X720 includes an audio option (e.g., 720c), a message option (e.g., 720d), an info option (e.g., 720e), and an edit option (e.g., 720f), e.g., as described with respect to FIG. 7D. The audio option, when selected, causes HMD X700 to initiate an audio communication session (e.g., that does not have a live video component) with contact X712e. In some embodiments, HMD X700 is not capable of communicating over a cellular network and/or is configured to use an external device for audio calls. Accordingly, in some examples, HMD X700 initiates an audio communication session using a nearby device (e.g., mobile phone and/or a tablet) (e.g., that is capable of communicating over a cellular network). The edit option, when selected, allows a user of HMD X700 to remove contact X712e from pinned contacts X712 (or add contact X712e to pinned contacts in embodiments in which contact X712e is not already a pinned contact), e.g., as described with respect to FIG. 7D. The message option, when selected, allows for a user to send a message to contact X712e, e.g., as described with respect to FIG. 7D. For example, while displaying expanded contact menu X720, HMD X700 detects selection of the message option (e.g., 720d). In some embodiments, the selection of the message option is an air gesture (e.g., a pinch gesture and/or a gaze and pinch gesture), for instance, indicating a selection of the message option. In some embodiments, as shown in FIG. 7E, in response to detecting selection of the message option (e.g., 720d), HMD X700 displays (e.g., replaces display of communications interface X710 with) a message interface (e.g., 730). Thereafter, the message interface can be used to send messages to contact X712e.

In some embodiments, a contact menu associated with a contact includes one or more additional options based on a state of HMD X700. As an example, in some embodiments, in instances in which HMD X700 is participating in a live communication session (e.g., XR communication session or an audio communication session), a contact menu includes an option to invite a contact to the live communication session. For example, while participating in an XR communication session and while displaying communication interface X710, HMD X700 detects selection of contact X714g ("Dylan"). In some embodiments, the selection of contact X714g is an air gesture (e.g., a pinch gesture and/or a gaze and pinch gesture), for instance, indicating a selection of contact X714f. As shown in FIG. 7C2, in response to detecting selection of contact X714g, HMD X700 displays contact menu X724 associated with contact X714g.

Contact menu X724 includes invite option X724a, invite option X724b, and expand option X724c. Invite option X724a, when selected (e.g., via an air gesture, such as a pinch gesture and/or a gaze and pinch gesture), causes HMD X700 to invite contact X714g to a new live communication session. Invite option X724b, when selected (e.g., via an air gesture, such as a pinch gesture and/or a gaze and pinch gesture), causes HMD X700 to invite contact X714g to the live communication session in which HMD X700 is currently participating. Expand option X720c, when selected, causes HMD X700 to display one or more additional options for contact X714g.

In some embodiments, inviting a contact to a new live communication session (e.g., in response to selection of option X724a) will cause HMD X700 to disconnect from and/or terminate the live communication session in which HMD X700 is currently participating. In some embodiments, prior to terminating an existing live communication session in this manner, HMD X700 confirms that a user wishes to disconnect from the current live communication session prior to initiating a new live communication session. For example, as shown in FIG. 7G, in response to selection of invite option X724a, HMD X700 can display confirmation interface 740 including confirm affordance 742. In response to selection (e.g., via an air gesture, such as a pinch gesture and/or a gaze and pinch gesture) of confirm affordance 742, HMD X700 terminates the current live communication session and invites contact X714f to a new live communication session.

In some embodiments, a user optionally sends messages to contacts using communication interface X710. For example, while displaying communication interface X710, HMD X700 detects selection of preview 716b (e.g., as shown in FIG. 7B) associated with pinned contact X712b. In some embodiments, the selection of preview 716b is an air gesture (e.g., a pinch gesture and/or a gaze and pinch gesture), for instance, indicating a selection of preview 716b. As shown in FIG. 7C2, in response to detecting selection of preview 716b, HMD X700 expands preview 716b to display reply option X718.

Reply option X718, when selected, causes HMD X700 to display a reply interface for sending a message to contact X712b. For example, while displaying reply option X718 in preview 716b, HMD X700 detects selection of reply option X718. In some embodiments, the selection of reply option X718 is an air gesture (e.g., a pinch gesture and/or a gaze and pinch gesture), for instance, indicating a selection of reply option X718. As shown in FIG. 7H, in response to detecting selection of reply option X718, HMD X700 can display reply interface 750, which can be used to send messages to contact X712b.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7I:
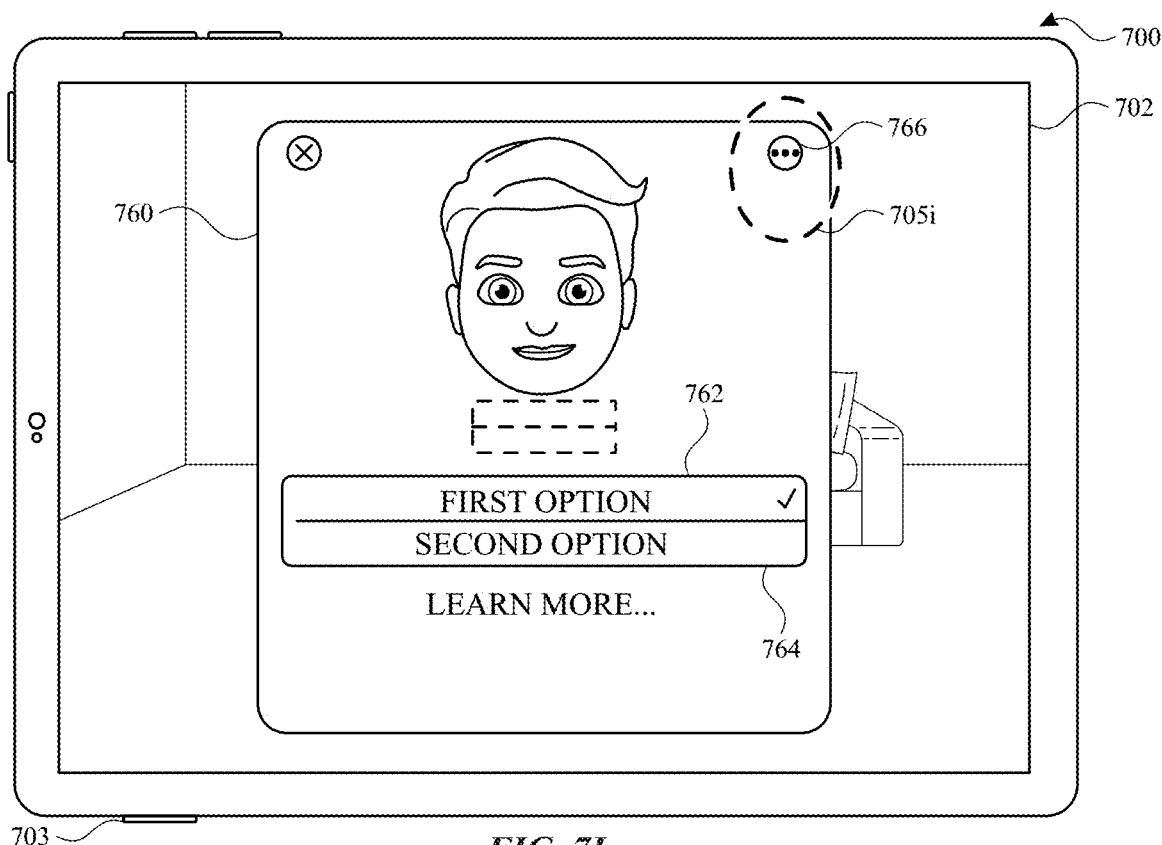

In some embodiments, communication interface 710 is used to generate an avatar. In some embodiments, the avatar serves as a representation (e.g., 3D representation) of the user of device 700 in XR communication sessions. For example, with reference to FIG. 7B, while displaying communication interface 710, device 700 detects selection of avatar option 715. In some embodiments, the selection of avatar option 715 is a tap gesture 713b on avatar option 715. In some embodiments, the selection of avatar option 715 is an air gesture, for instance, indicating a selection of avatar option 715. As shown in FIG. 7I, in response to detecting selection of avatar option 715, device 700 displays avatar interface 760.

At FIG. 7I, avatar interface 760 first option 762 (e.g., that is more realistic than a second option) and second option 764 (e.g., that is less realistic than the first option). First option 762, when enabled, causes an avatar of a user of device 700 to reflect an appearance of the user. For example, in some embodiments, when first option 762 is enabled, an avatar includes one or more visual characteristics that correspond to one or more physical characteristics of the user. Second option 764, when enabled, causes an avatar of a user of device 700 to indicate motion of a user (e.g., during live communication sessions) without reflecting an appearance of the user. For example, in some embodiments, when second option 764 is enabled, an avatar having a default appearance is used. In some embodiments, when first option 762 is enabled (as compared to second option 764), the avatar of the user of device 700 is represented by a first representation style and the avatar is displayed with a first level of detail (e.g., a first level of detail with respective to the appearance of the user and/or one or more portions of the user) and indicates a position and movement of a first user portion of the user relative to a position and movement of a second user portion of the user in a first manner. In some embodiments, when second option 764 is enabled (as compared to first option 762), the avatar of the user of device 700 is represented by a second representation style that is different from the first representation style and the avatar is displayed with a second level of detail (e.g., a second level of detail with respective to the appearance of the user and/or one or more portions of the user) that is lower than (e.g., less than and/or mimics the appearance of the user with less detail and/or a lower amount of detail) the first level of detail and indicates the position and movement of the first user portion of the user relative to the position and movement of the second user portion of the user in a second manner that is different from the first manner.

Figure 7J:
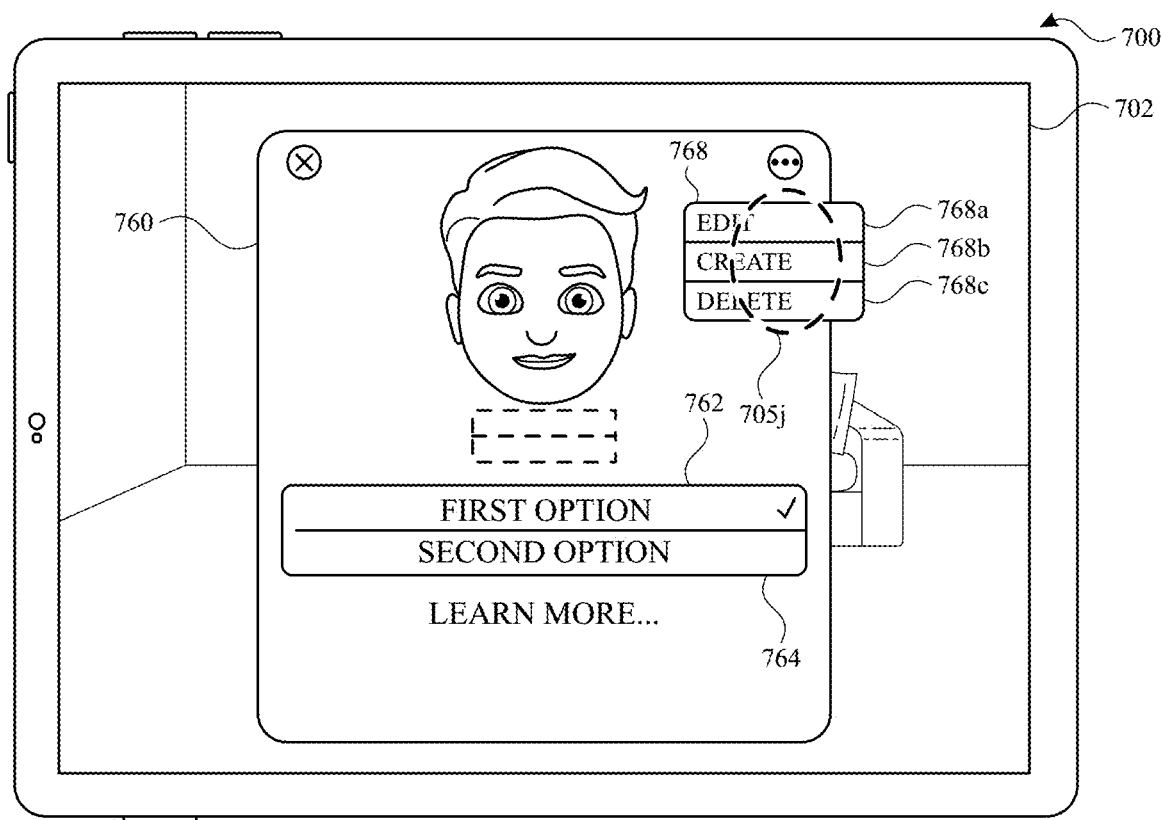

Avatar interface 760 further includes menu option 766, which when selected, causes device 700 to display an avatar menu, as shown in FIG. 7I. For example, at FIG. 7I, while displaying avatar interface 760, device 700 detects selection of menu option 766. In some embodiments, the selection of menu option 766 is a tap gesture 705i on menu option 766. In some embodiments, the selection of menu option 766 is an air gesture, for instance, indicating a selection of menu option 766. As shown in FIG. 7J, in response to detecting selection of menu option 766, device 700 displays avatar menu 768.

At FIG. 7J, avatar menu 768 includes edit option 768a, create option 768b, and/or delete option 768c. In some embodiments, if an avatar has not yet been created for a user of device 700, avatar menu 768 includes create option 768b and does not include edit option 768a and delete option 768c. In some embodiments, if an avatar has been created for a user of device 700, avatar menu 768 includes edit option 768a and delete option 768c and does not include create option 768b.

At FIG. 7J, while displaying avatar menu 768, device 700 detects selection of create option 768b. In some embodiments, the selection of create option 768b is a tap gesture 705j on create option 768b. In some embodiments, the selection of create option 768b is an air gesture, for instance, indicating a selection of create option 768b. As shown in FIG. 7K, in response to detecting selection of create option 768b, device 700 displays setup interface 770.

At FIG. 7K, setup interface 770 includes setup option 772, which when selected, causes device 700 to display an avatar editing interface. For example, while displaying setup interface 770, device 700 detects selection of setup affordance 772. In some embodiments, the selection of setup affordance 772 is a tap gesture 705k on setup affordance 772. In some embodiments, the selection of setup affordance 772 is an air gesture, for instance, indicating a selection of setup affordance 772. As shown in FIG. 7L1, in response to detecting selection of setup affordance 772, device 700 displays avatar editing interface 780.

At FIG. 7L-1, avatar editing interface 780 includes live view 781 of an avatar of a user of device 700. In some embodiments, device 700 displays live view 781, which is updated in real-time, of avatar editing interface 780 according to movement and/or mannerisms of the user of device 700, as detected by device 700. Avatar editing interface 780 further includes various settings and/or parameters by which visual characteristics of the avatar are adjusted. As an example, avatar editing interface 780 includes settings 782, which include a brightness setting 782a and a warmth setting 782b. Brightness setting 782a and warmth setting 782b are used to adjust simulated lighting and temperature of skin of an avatar, respectively. As another example, avatar editing interface 780 includes a color palette 783 including a set of one or more colors and/or shades from which a color of the skin of the avatar is selected.

Figures 7M, 7N:
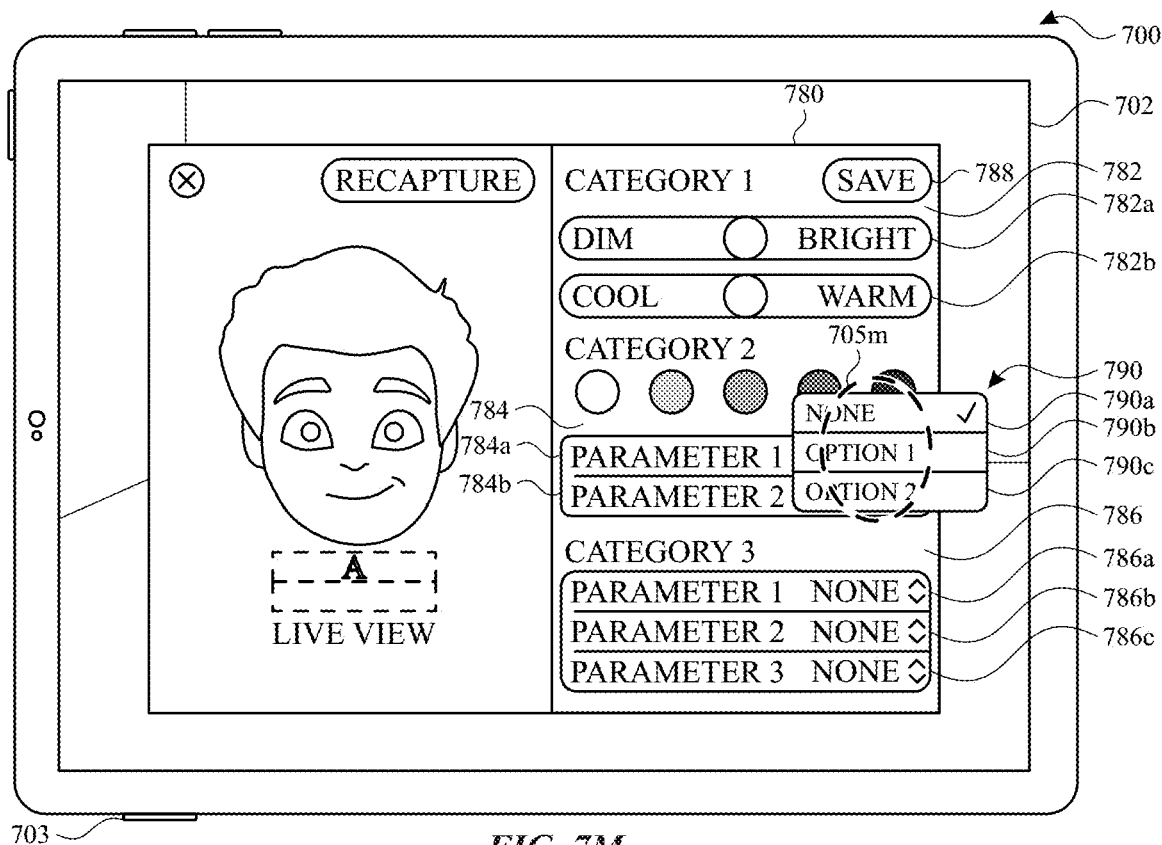

In some embodiments, as illustrated in FIG. 7L1, avatar editing interface 780 includes a set of parameters 784, such as shirt parameter 784a and headwear parameter 784b. In some embodiments, selecting a parameter allows for visual characteristics of one or more aspects of the avatar to be selected. With reference to FIG. 7M, for instance, selection of shirt parameter 784a (e.g., a tap input 705l or an air gesture corresponding to a location of parameter 784a) causes device 700 to display parameter menu 790 from which a user can select from any number of options for shirt parameter 784a (e.g., options 790a-790c). With reference to FIG. 7N, once an option has been selected (e.g., a tap input 705m or an air gesture corresponding to a location of option 790b), a user can select from styles 792 (e.g., 792a-792f) of the selected option, and visual characteristics of the avatar are updated accordingly. Similarly, in some embodiments, selection of headwear parameter 784b causes device 700 to display headwear options for headwear parameter 784b, and selection of an option causes device 700 to display types for the selected option.

While description is made herein with respect to parameters 784a and 784b corresponding to shirts and headwear, respectively, it will be appreciated that, in some embodiments, parameters of avatar editing interface 780 optionally corresponds to other/additional visual aspects of an avatar. By way of example, in some embodiments, parameters 784 are used to select one or more aspects of eyewear of an avatar (e.g., parameter 784a corresponds to eyeglasses and parameter 784b corresponds to eyepatches). In an example in which device 700 receives a user selection of parameter 784a corresponding to eyeglasses, device 700 displays options for various designs of eyeglasses (e.g., frameless, thin frames, thick frames, etc.). Once device 600 receives a user selection of a design, device 700 displays various styles of the selected design as types 792 for selection by the user. In an example in which device 700 receives a user selection of eyepatches, device 700 displays options for various designs of eyepatches (e.g., left eye patch or right eye patch). Once device 600 receives a user selection of a design, device 700 displays various styles of the selected design as types 792 for selection by the user.

In some embodiments, avatar editing interface 780 includes a set of parameters 786. As shown, in some embodiments, parameters 786 are used to select one or more aspects of hair. By way of example, parameter 786a corresponds to hair style, parameter 786b corresponds to hair color, and parameter 786c corresponds to hair highlights. In other embodiments, parameters 786 are used to select one or more aspects of accessibility features. By way of example, in some embodiments, parameter 786a corresponds to hand prosthetics, parameter 786b corresponds to hearing aids, and parameter 786c corresponds to wheelchairs.

In some embodiments, the techniques and user interface (s) described in FIG. 7L1 are provided by one or more of the devices described in FIGS. 1A-1P. FIG. 7L2 illustrates an embodiment in which avatar editing interface X780 (e.g., as described in FIGS. 7L1-7N) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7L2, avatar editing interface X780 includes live view X781 of an avatar of a user of HMD X700. In some embodiments, HMD X700 displays live view X781, which is updated in real-time, of avatar editing interface 780 according to movement and/or mannerisms of the user of HMD X700, as detected by HMD X700. Avatar editing interface X780 further includes various settings and/or parameters by which visual characteristics of the avatar are adjusted. As an example, avatar editing interface X780 includes settings X782, which include a brightness setting X782a and a warmth setting X782b. Brightness setting X782a and warmth setting X782b are used to adjust simulated lighting and temperature of skin of an avatar, respectively. As another example, avatar editing interface X780 includes a color palette X783 including a set of one or more colors and/or shades from which a color of the skin of the avatar is selected.

In some embodiments, as illustrated in FIG. 7L2, avatar editing interface X780 includes a set of parameters X784, such as shirt parameter X784a and headwear parameter X784b. In some embodiments, selecting a parameter allows for visual characteristics of one or more aspects of the avatar to be selected. For instance, selection of shirt parameter X784a (e.g., a gaze and pinch gesture, where gaze is represented by gaze indicator X705L, corresponding to a location of parameter X784a) causes HMD X700 to display parameter menu 790 from which a user can select from any number of options for shirt parameter X784*a* (e.g., options 790*a*-790*c*), as shown in FIG. 7M.

In some embodiments, HMD X700 detects selection of shirt parameter X784*a* based on an air gesture performed by a user of HMD X700. In some embodiments, HMD X700 detects hands X750*a* and/or X750*b* of the user of HMD X700 and determines whether motion of hands X750*a* and/or X750*b* perform a predetermined air gesture corresponding to selection of shirt parameter X784*a*. In some embodiments, the predetermined air gesture selecting shirt parameter X784*a* includes a pinch gesture. In some embodiments, the pinch gesture includes detecting movement of finger X750*c* and thumb X750*d* toward one another. In some embodiments, HMD X700 detects selection of shirt parameter X784*a* based on a gaze and air gesture input performed by the user of HMD X700. In some embodiments, the gaze and air gesture input includes detecting that the user of HMD X700 is looking at shirt parameter X784*a* (e.g., for more than a predetermined amount of time) and hands X750*a* and/or X750*b* of the user of HMD X700 perform a pinch gesture.

With reference to FIG. 7N, once an option has been selected (e.g., a tap input 705*m* or an air gesture corresponding to a location of option 790*b*), a user can select from styles 792 (e.g., 792*a*-792*f*) of the selected option, and visual characteristics of the avatar are updated accordingly. Similarly, in some embodiments, selection of headwear parameter 784*b* causes device 700 to display headwear options for headwear parameter 784*b*, and selection of an option causes device 700 to display types for the selected option.

While description is made herein with respect to parameters X784*a* and X784*b* corresponding to shirts and headwear, respectively, it will be appreciated that, in some embodiments, parameters of avatar editing interface X780 optionally corresponds to other/additional visual aspects of an avatar. By way of example, in some embodiments, parameters X784 are used to select one or more aspects of eyewear of an avatar (e.g., parameter X784*a* corresponds to eyeglasses and parameter X784*b* corresponds to eyepatches). In an example in which HMD X700 receives a user selection of parameter X784*a* corresponding to eyeglasses, HMD X700 displays options for various designs of eyeglasses (e.g., frameless, thin frames, thick frames, etc.). Once HMD X700 receives a user selection of a design, HMD X700 displays various styles of the selected design as types 792 for selection by the user. In an example in which HMD X700 receives a user selection of eyepatches, HMD X700 displays options for various designs of eyepatches (e.g., left eye patch or right eye patch). Once HMD X700 receives a user selection of a design, HMD X700 displays various styles of the selected design as types 792 for selection by the user.

In some embodiments, avatar editing interface X780 includes a set of parameters X786. As shown, in some embodiments, parameters X786 are used to select one or more aspects of hair. By way of example, parameter X786*a* corresponds to hair style, parameter X786*b* corresponds to hair color, and parameter X786*c* corresponds to hair highlights. In other embodiments, parameters X786 are used to select one or more aspects of accessibility features. By way of example, in some embodiments, parameter X786*a* corresponds to hand prosthetics, parameter X786*b* corresponds to hearing aids, and parameter X786*c* corresponds to wheelchairs.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7O:
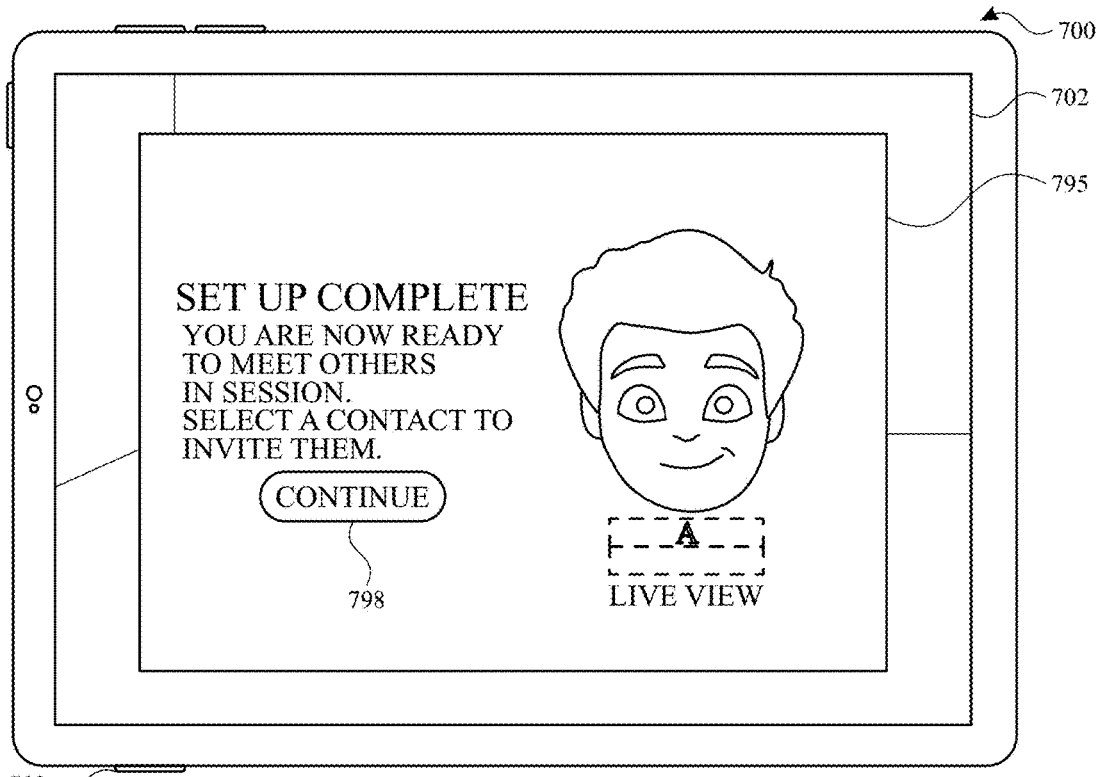

With reference to FIG. 7N, while displaying the avatar editing interface 780, device 700 detects selection of save option 788. In some embodiments, the selection of save option 788 is a tap gesture 705*n* on save option 788. In some embodiments, the selection of save option 788 is an air gesture, for instance, indicating a selection of save option 788. In response to detecting selection of save option 788, device 700 stores (e.g., locally stores and/or remotely stores) the selected configuration of the avatar for the user of device 700 for subsequent use in XR communication sessions. As shown in FIG. 7O, further in response to detecting selection of setup affordance 772, device 700 displays completion interface 795 indicating that the user has successfully created and/or updated the avatar of the user.

Figure 7P:
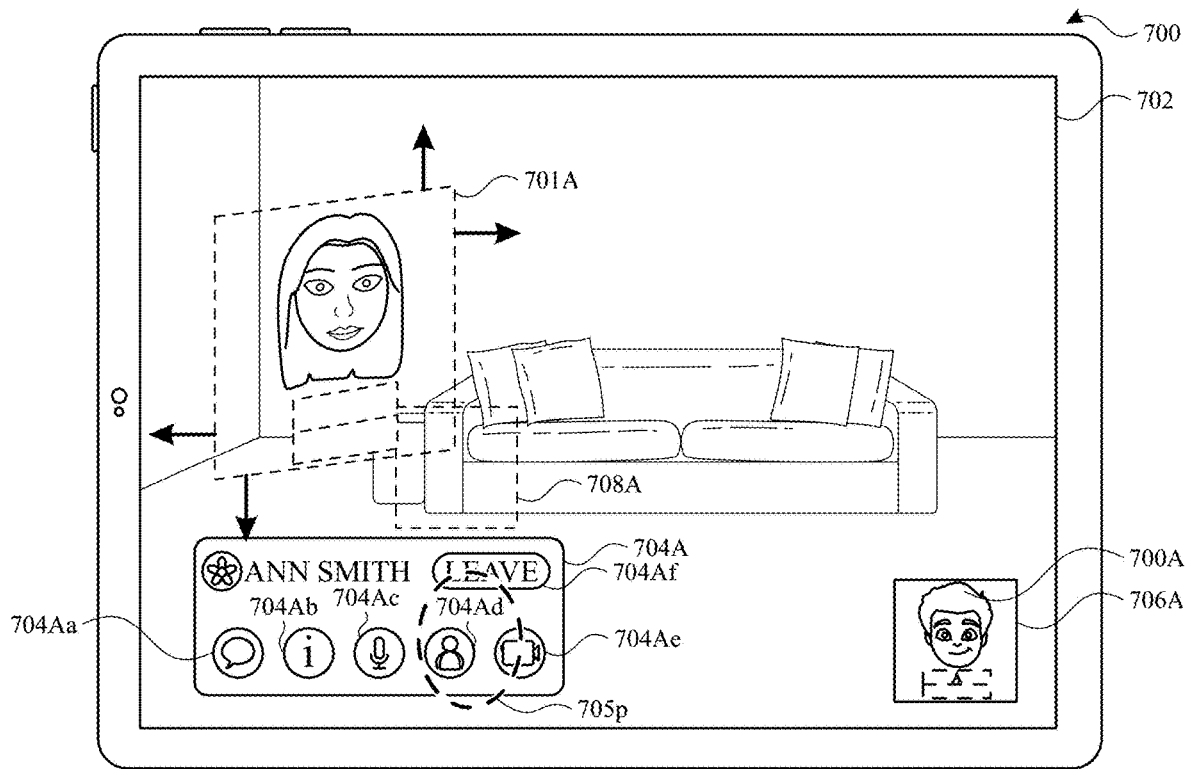

In FIG. 7P, a user of device 700 is participating in an XR communication session with a contact 712*f* ("Ann", FIG. 7B) within XR environment 704. In some embodiments, the XR communication session is a spatial communication session. Accordingly, in some embodiments, contact 712*f* and/or the user of device 700 are represented in XR environment 704 by 3D representations (e.g., avatars). For example, as shown in FIG. 7P, the user of device 700 is represented by representation 700A (as shown in self preview 706A) and contact 712*f* is represented by representation 701A.

In some embodiments, the view of XR environment 704 for the user of device 700 is provided from the perspective of representation 700A within XR environment 704. Because this can preclude the user from otherwise viewing representation 700A, device 700 displays self preview 706A including a live view of representation 700A in XR environment 704. While self preview 706A is shown as being located in a lower, righthand corner of display 702, it will be appreciated that self preview 706A is optionally displayed at any location on display 702. By way of example, in some embodiments, self preview 706A is located adjacent to a representation of a contact in the XR communication session. In some embodiments, self-preview 706A is located, for instance, at a position 708A proximate to representation 701A.

In some embodiments, participants represented by 3D representations in an XR environment have spatial agency. Accordingly, during the XR communication session, 3D representations optionally move within XR environment 704 such that 3D representations move relative to elements (e.g., table 704a and couch 704b) and/or other participants in XR environment 704. In some embodiments, 3D representations move according to movement of corresponding devices. By way of example, 3D representation 700A can move within XR environment 704 in response to movement of device 700. In some embodiments, 3D representations move in a manner that corresponds to the movement of devices. If, for instance, device 700 first moves in a first direction (e.g., left) and thereafter moves in a second direction (e.g., right), 3D representation 700A will move in the first and second directions within XR environment 704 in an analogous manner.

In some embodiments, while participating in an XR communication session, device 700 displays a set of controls 704A for managing one or more aspects of the XR communication session, as shown in FIG. 7P. The set of controls 704A includes a message option 704Aa, an info option 704Ab, a microphone option 704Ac, an avatar option 704Ad, a camera option 704Ae, and a terminate option 704Af. Message option 704Aa, when selected, causes device 700 to display a message interface for sending messages to contact 712f. Info option 704Ab, when selected, causes device 700 to display an info interface corresponding to contact 712f. Microphone option 704Ac, when selected, toggles a state of (e.g., enables or disables) a microphone of device 700. In some embodiments, disabling a microphone of device 700 precludes device 700 from providing audio during an XR communication session. Camera option 704Ae, when selected, toggles a state of (e.g., enables or disables) a camera of device 700. In some embodiments, disabling a camera of device 700 precludes device 700 from providing video (e.g., a video feed of a user of device 700 and/or movement of the representation of the user of device 700) during an XR communication session. Terminate option 704Af, when selected, causes device 700 to disconnect from the XR communication session.

Avatar option 704Ad, when selected, toggles (e.g., enables or disables) the use of 3D representations in XR environment 704. For example, while displaying XR environment 704, device 700 detects selection of avatar option 704Ad. In some embodiments, the selection of avatar option 704Ad is a tap gesture 705p on avatar option 704Ad. In some embodiments, the selection of avatar option 704Ad is an air gesture, for instance, indicating a selection of avatar option 704Ad. As shown in FIG. 7Q, in response to selection of avatar option 704Ad, device 700 disables the use of 3D representations in XR environment 704.

In some embodiments, when toggling the use of 3D representations in XR environment 704, device 700 transitions an XR communication session between spatial communication sessions and non-spatial communication sessions. Disabling the use of 3D representations causes device 700 to transition the XR communication session from a spatial communication session to a non-spatial communication session. Enabling the use of 3D representations causes device 700 to transition the XR communication session from a non-spatial communication session to a spatial communication session.

In some embodiments, in a non-spatial communication session, participants in the XR communication session are represented by 2D representations. By way of example, as shown in FIG. 7Q, the user of device 700 is represented by 2D representation 710A (as shown in self preview 706A) and contact 712f is represented by 2D representation 712A.

In some embodiments, 2D representations include a video feed (e.g., live video feed) of users. In some embodiments, if a video feed of a user is not available (e.g., a camera of a device is disabled), the 2D representation of the user instead includes an image (e.g., thumbnail) associated with the user, a monogram corresponding to the user, and/or another 2D representation. In some embodiments, users represented by 2D representations in an XR environment do not have spatial agency and are, optionally, positioned at one or more predetermined locations in XR environment 704. In some embodiments, device 600 is configured to move a 2D representation of a remote participant in the XR environment based on user input received at device 700 (e.g., input to drag the representation from a first location to a second location). In some embodiments, device 600 is not configured to move a 3D representation of a remote participant in the XR environment based on user input received at device 700.

Additional descriptions regarding FIGS. 7A-7Q are provided below in reference to method 800 and method 900, each of which is described with respect to FIGS. 7A-7Q.

FIG. 8 is a flow diagram of an exemplary method 800 for managing live communication sessions, in accordance with some embodiments. In some embodiments, method 800 is performed at a computer system (e.g., computer system 101 in FIG. 1A, computer system 700, and/or HMD X700) (e.g., a smartphone, tablet, and/or head-mounted device) that is in communication with a display generation component (e.g., display generation component 120 in FIGS. 1A, 3, and 4, display 702, and/or display X702) (e.g., a visual output device, a 3D display, a display having at least a portion that is transparent or translucent on which images can be projected (e.g., a see-through display), a projector, a heads-up display, and/or a display controller) and one or more sensors (e.g., a touch-sensitive surface, a gyroscope, an accelerometer, a motion sensor, a movement sensor, a microphone, an infrared sensor, a camera sensor, a depth camera, a visible light camera, an eye-tracking sensor, a gaze-tracking sensor, a physiological sensor, and/or an image sensor). In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

The computer system (e.g., 700 and/or X700) displays (802), via the display generation component, representations (e.g., 712a-712g and 714a-714i) (e.g., static avatars, animated avatars, images, and/or monograms) of a plurality of users (e.g., users that are not operating the computer system (remote users) and/or users other than the user of the computer system).

The computer system (e.g., 700 and/or X700) receives (804), via the one or more sensors, selection (e.g., 705b and/or 711b) (e.g., via a touch input on a touch-sensitive surface and/or via an air gesture) of a representation (e.g.,

712e, X712e, 714g, and/or X714g) (e.g., a static avatar, an animated avatar, an image, and/or a monogram) of a respective user of the plurality of users.

In response to (806) receiving selection of the representation (e.g., 712e, X712e, 714g, and/or X714g) of the respective user and in accordance with a determination that there is an ongoing (e.g., active and/or currently established) communication session (e.g., a video communication session, an audio communication session, an extended reality communication session, a spatial communication session, and/or a non-spatial communication session), the computer system (e.g., 700 and/or X700) displays (808), via the display generation component (e.g., 702 and/or X702), an option (e.g., 724b at FIG. 7C-1 and/or X724b at FIG. 7C-2) to invite the respective user to join the ongoing communication session.

In response to (806) receiving selection of the representation (e.g., 712e, X712e, 714g, and/or X714g) of the respective user and in accordance with a determination that there is no ongoing communication session, the computer system (e.g., 700 and/or X700) forgoes display (810) of the option to invite the respective user to join the ongoing communication session (e.g., as in menu 720 at FIG. 7C1 and/or menu X720 at FIG. 7C2). Conditionally displaying an option to invite the respective user to join the ongoing communication session enables the user of the computer system to invite the respective user with needing to navigate to a different user interface, thereby reducing the number of inputs needed to perform the invite operation.

In some embodiments, in response to receiving selection of the representation (e.g., 712e, X712e, 714g, and/or X714g) of the respective user (e.g., independent of the determination whether there is an ongoing communication session), the computer system (e.g., 700 and/or X700) displays, via the display generation component (e.g., 702 and/or X702), an option (e.g., 720a and/or 724a at FIG. 7C1 and/or X720a and/or X724a at FIG. 7C2) to initiate a new spatial communication session with the respective user, and an option for additional features (e.g., 720b and/or 724c at FIG. 7C1 and/or X720b and/or X724c at FIG. 7C2) (e.g., without displaying options for transmitting a textual message to the respective user and/or displaying additional information about the respective user). In some embodiments, while displaying the option (e.g., 720a and/or 724a at FIG. 7C1 and/or X720a and/or X724a at FIG. 7C2) for additional features, the computer system (e.g., 700 and/or X700) receives selection (e.g., 705c and/or 709d) of the option (e.g., 720a and/or 724a at FIG. 7C1 and/or x720a and/or x724a at FIG. 7C2) for additional features. In some embodiments, in response to receiving selection of the option for additional features, the computer system (e.g., 700 and/or X700) displays (e.g., by replacing display of the option to invite the respective user to join the ongoing communication session), via the display generation component (e.g., 702 and/or X702), one or more options (e.g., 720c-720f at FIG. 7D) associated with the respective user (e.g., one or more options for communicating with the respective user such as by transmitting a textual message to the respective user and/or displaying additional information about the respective user). In some embodiments, a spatial communication session is a communication session with at least some (e.g., less than all, a plurality of, and/or all) representations of users participating in the communication session distributed in a 3D environment. Displaying the option to initiate a new spatial communication session with the respective user and an option to access additional features enables the user of the computer system to quickly access the option to initiate the new spatial communication session without cluttering the user interface, while still providing access to additional (and potentially less often used) features, thereby improving the man-machine interface.

In some embodiments, in response to receiving selection of the representation of the respective user (e.g., independent of the determination whether there is an ongoing communication session), the computer system (e.g., 700 and/or X700) displays, via the display generation component (e.g., 702 and/or X702), an option (e.g., 720b at FIG. 7C1 and/or X720b at FIG. 7C2) for additional features (e.g., without displaying options for transmitting a textual message to the respective user and/or displaying additional information about the respective user). In some embodiments, while displaying the option (e.g., 720b at FIG. 7C1 and/or X720b at FIG. 7C2) for additional features, the computer system (e.g., 700 and/or X700) receives, via the one or more sensors, selection (e.g., 705c) (e.g., via a touch input on a touch-sensitive surface and/or via an air gesture) of the option (e.g., 720b at FIG. 7C1 and/or X720b at FIG. 7C2) for additional features. In some embodiments, in response to receiving selection of the option (e.g., 720b at FIG. 7C1 and/or X720b at FIG. 7C2) for additional features, the computer system (e.g., 700 and/or X700) displays (e.g., by replacing display of the option to invite the respective user to join the ongoing communication session), via the display generation component (e.g., 702 and/or X702), an option (e.g., 720c at FIG. 7D) to initiate an audio communication session with the respective user (e.g., that does not include a live visual representation of the participants and/or that does not include a video component) (e.g., as part of the one or more options associated with the respective user). In some embodiments, the computer system receives, via the one or more sensors, selection (e.g., via a touch input on a touch-sensitive surface and/or via an air gesture) of the option (e.g., 720c at FIG. 7D) to initiate an audio communication session with the respective user. In some embodiments, in response to receiving selection of the option (e.g., 720c at FIG. 7D) to initiate an audio communication session with the respective user, the computer system (e.g., 700 and/or X700) initiates an audio communication session (e.g., that does not include a live visual representation of the participants and/or that does not include a video component) with the respective user (e.g., and not with other users). Displaying an option to initiate an audio communication session enables the user of the computer system to start a communication session that does not include a live visual representation of the user without the need to initiate a video communication session and separately disabling the video portion, thereby reducing the number of inputs required to initiate the audio communication session.

In some embodiments, the computer system initiates an audio communication session includes initiating an audio call (e.g., a voice call and/or a telephone call) using an external electronic device (e.g., a smart phone and/or a cellular phone) that is within a predetermined range (e.g., distance and/or wireless range) of the computer system (e.g., 700 and/or X700). In some embodiments, the option to initiate an audio communication session is displayed for respective users that do not have an account (or do not have an active account) with a particular online service (e.g., the user of the computer system has an account with the particular online service used for video and/or extended reality communications, but the respective user does not). Initiating the audio communication session via an audio call using an external electronic device enables the computer system to use the resources (e.g., cellular connection of and/or CPU processing of) the external computer system, thereby improving the functionality of the computer system while reducing the workload of the computer system.

In some embodiments, in response to receiving selection (e.g., 705c and/or 711b) of the representation (e.g., 712e, X712e, 714g, and/or X714g) of the respective user (e.g., independent of the determination whether there is an ongoing communication session), the computer system (e.g., 700 and/or X700) displays, via the display generation component (e.g., 702 and/or X702), an option (e.g., 720b, X720b, 724c, and/or X724C) for additional features (e.g., without displaying options for initiating a process to send a message to the respective user and/or displaying additional information about the respective user). In some embodiments, while displaying the option (e.g., 720b, X720b, 724c, and/or X724c) for additional features, the computer system (e.g., 700 and/or X700) receives, via the one or more sensors, selection (e.g., 705c) (e.g., via a touch input on a touch-sensitive surface and/or via an air gesture) of the option (e.g., 720b and/or X720b) for additional features. In some embodiments, in response to receiving selection (e.g., 705c) of the option (e.g., 720b and/or X720b) for additional features, the computer system (e.g., 700 and/or X700) displays (e.g., by replacing display of the option to invite the respective user to join the ongoing communication session), via the display generation component (e.g., 702 and/or X702), an option (e.g., 720d) to initiate a process to send a message (e.g., that does not include live transmission of audio and/or video) to the respective user (e.g., as part of the one or more options associated with the respective user). In some embodiments, the computer system receives, via the one or more sensors, selection (e.g., 705d) (e.g., via a touch input on a touch-sensitive surface and/or via an air gesture) of the option (e.g., 720d) to initiate a process to send a message to the respective user. In some embodiments, in response to receiving selection (e.g., 705d) of the option (e.g., 720d) to initiate a process to send a message to the respective user, the computer system (e.g., 700 and/or X700) initiates a process to send a message (e.g., 730 at FIG. 7E and/or 750 at FIG. 7H) (e.g., that does not include a live visual representation of the participants and/or that does not include a video component) to the respective user (e.g., without sending the message to other users). In some embodiments, initiating a process to send the message to the respective user includes displaying a user interface that includes a conversation between the user of the computer system and the respective user, displaying a keyboard, and/or displaying a text entry field for entering the message. Providing an option, via the additional features selection, to initiate a process to send a message to the respective user enables to the user of the computer system to quickly initiate the process without needing to specify the recipient, thereby reducing the number of inputs required to send the message.

In some embodiments, in response to receiving selection (e.g., 705c and/or 711b) of the representation (e.g., 712e, X712e 714g, and/or X714g) of the respective user (e.g., independent of the determination whether there is an ongoing communication session), the computer system (e.g., 700 and/or X700) displays, via the display generation component (e.g., 702 and/or X702), an option (e.g., 720b, X720b, 724c, and/or X724c) for additional features (e.g., without displaying options for initiating a process to send a message to the respective user and/or displaying additional information about the respective user). In some embodiments, while displaying the option (e.g., 720b, X720b, 724c, and/or X724C) for additional features, the computer system receives, via the one or more sensors, selection (e.g., via a touch input on a touch-sensitive surface and/or via an air gesture) of the option (e.g., 720b, X720b, 724c, and/or X724c) for additional features. In some embodiments, in response to receiving selection of the option (e.g., 720b, X720b, 724c, and/or X724c) for additional features, the computer system displays (e.g., by replacing display of the option to invite the respective user to join the ongoing communication session), via the display generation component, an option (e.g., 720e) to display additional information about the respective user (e.g., without displaying additional information about other users) (e.g., as part of the one or more options associated with the respective user). In some embodiments, the computer system receives, via the one or more sensors, selection (e.g., 707d) (e.g., via a touch input on a touch-sensitive surface and/or via an air gesture) of the option (e.g., 720e) to display additional information about the respective user. In some embodiments, in response to receiving selection (e.g., 707d) of the option (e.g., 720e) to display additional information about the respective user, the computer system (e.g., 700 And/or X700) displays, via the display generation component (e.g., 702 and/or X702), additional information (e.g., 740 at FIG. 7F) (e.g., prior communication history with the respective user, a phone number of the respective user, and/or an email address of the respective user) (e.g., that was not displayed when the option for additional features was selected and/or was not displayed when the option for additional information was selected) about the respective user (e.g., without displaying additional information about other users). Providing the user with additional information about the respective user provides the user of the computer system with feedback about the respective user and/or devices of the respective user, thereby providing improved visual feedback.

In some embodiments, in response to receiving selection (e.g., 705c and/or 711b) of the representation (e.g., 712e, X712e, 714g, and/or X714g) of the respective user (e.g., independent of the determination whether there is an ongoing communication session), the computer system (e.g., 700 and/or X700) displays, via the display generation component (e.g., 702 and/or X702), an option (e.g., 720b, X720b, 724c, and/or X724c) for additional features (e.g., without displaying options for initiating a process to send a message to the respective user and/or displaying additional information about the respective user). In some embodiments, while displaying the option (e.g., 720b, X720b, 724c, and/or X724c) for additional features, the computer system (e.g., 700 and/or X700) receives, via the one or more sensors, selection (e.g., 705c) (e.g., via a touch input on a touch-sensitive surface and/or via an air gesture) of the option for additional features. In some embodiments, in response to receiving selection (e.g., 705c) of the option (e.g., 720b and/or X720b) for additional features, the computer system displays (e.g., by replacing display of the option to invite the respective user to join the ongoing communication session), via the display generation component, an option (e.g., 720f) to remove the respective user (e.g., without removing other users) from favorites (e.g., a list or group of favorite users) (e.g., as part of the one or more options associated with the respective user). In some embodiments, removing the respective user from favorites includes ceasing to display the representation of the respective user as part of the representations (e.g., static avatars, animated avatars, images, and/or monograms) of the plurality of users (e.g., which are optionally displayed as part of a home user interface). In some embodiments, the computer system receives, via the one or more sensors, selection (e.g., via a touch input on a touch-sensitive surface and/or via an air gesture) of the option (e.g., 720f) to remove the respective user from favorites (e.g., 712). In some embodiments, in response to receiving selection of the option (e.g., 720f) to remove the respective user from favorites (e.g., 712), the computer system (e.g., 700 and/or X700) initiates a process to remove the respective user from favorites (e.g., requesting confirmation to remove the respective user from favorites and/or removing the respective user from favorites). Initiating a process to remove the respective user from favorites enables the user to limit the users that are accessible via the favorites and/or the home user interface, thereby reducing visual cluttering and enabling other users to be added to favorites, thereby providing improved visual feedback.

In some embodiments, in response to receiving selection (e.g., 711b) of the representation (e.g., 714g and/or X714g) of the respective user and in accordance with a determination that there is an ongoing (e.g., active and/or currently established) communication session (e.g., a video communication session, an audio communication session, an extended reality communication session, a spatial communication session, and/or a non-spatial communication session), the computer system (e.g., 700 and/or X700) displays, via the display generation component (e.g., 702 and/or X702) and concurrently with the option (e.g., 724b and/or X724b) to invite the respective user to join the ongoing communication session, an option (e.g., 724a and/or X724a) to initiate a process to start a new communication session with the respective user. In some embodiments, the computer system (e.g., 700 and/or X700) receives, via the one or more sensors, selection (e.g., 709c) (e.g., via a touch input on a touch-sensitive surface and/or via an air gesture) of the option (e.g., 724a and/or X724a) to initiate a process to start a new communication session with the respective user. In some embodiments, in response to receiving selection (e.g., 709c) of the option (e.g., 724a and/or X724a) to initiate the process to start a new communication session with the respective user, the computer system (e.g., 700 and/or X700) initiates a process to end the ongoing communication session (e.g., 740 at FIG. 7G) and start the new communication session with the respective user. In some embodiments, in response to receiving selection of the option to initiate the process to start the new communication session with the respective user, the computer system automatically (e.g., without requiring and/or receiving additional input from the user and/or without request user confirmation) ends the ongoing communication session and starts the new communication session with the respective user. Providing an option to start a new communication session with the respective user enables the computer system to both end the ongoing communication session and start the new communication session without requiring separate user inputs directed to ending the ongoing communication session and starting the new communication session, thereby reducing the number of inputs required to perform the operations.

In some embodiments, during the process (e.g., 740 at FIG. 7G) to start the new communication session with the respective user, the computer system (e.g., 700 and/or X700) prompts (e.g., 742) (e.g., via audio using a speaker and/or via display using the display generation component) to confirm ending the ongoing communication session. In some embodiments, the computer system (e.g., 700 and/or X700) receives (e.g., while displaying a prompt to confirm ending the ongoing communication session), via the one or more sensors, confirmation to end the ongoing communication session. In some embodiments, in response to receiving confirmation to end the ongoing communication session, the computer system ends the ongoing communication session (and, optionally, starting the new communication session with the respective user). Requesting confirmation from the user of the computer system to end the ongoing communication session enables the computer system to avoid the user unintentionally ending the ongoing communication session, thereby improving the man-machine interface.

In some embodiments, the representations (e.g., static avatars, animated avatars, images, and/or monograms) of the plurality of users are displayed as part of a home user interface (e.g., as shown in FIGS. 7B-7D) (e.g., that optionally includes representations of contacts recently communicated with) and displaying the option (e.g., 724b and/or X724b) to invite the respective user to join the ongoing communication session and/or displaying the one or more options associated with the respective user (e.g., 720a-720b, X720a-X720b, 724a-724c, and/or X724a-X724c) includes obscuring (e.g., partially blocking display of, blurring, and/or otherwise partially obscuring) the home user interface. In some embodiments, the home user interface includes a plurality of user interface objects for displaying respective applications (e.g., a first user interface object that, when activated, causes display of a user interface of a first application and a second user interface object that, when activated, causes display of a user interface of a second application that is different from the first application). In some embodiments, in response to detecting a respective user input (e.g., detecting a press of a physical button and/or detecting a respective gesture, such as an air gesture), the computer system displays the home user interface (e.g., without regard to what the computer system is displaying when the respective user input is received). In some embodiments, subsequent to the computer system exiting (e.g., waking) from a low power mode and/or receiving user inputs that unlock the computer system, the computer system automatically displays the home user interface. Continuing to display the home user interface (while obscured) provides the user with context about the content the user is accessing, including information (e.g., name and/or contact information) about the respective user.

In some embodiments, the one or more options associated with the respective user includes an option (e.g., 720d) to initiate a process to send a message (e.g., that does not include live transmission of audio and/or video) to the respective user (e.g., as part of the one or more options associated with the respective user). In some embodiments, the computer system (e.g., 700 and/or X700) receives, via the one or more sensors, selection (e.g., 705d) of the option (e.g., 720d) to initiate a process to send a message to the respective user. In some embodiments, in response to receiving (e.g., 705d) of the option (e.g., 720d) to initiate a process to send a message to the respective user (and, optionally, in accordance with a determination that a message from the respective user was not being displayed when selection of the representation of the respective user was received), the computer system (e.g., 700 and/or X700) displays, via the display generation component (e.g., 702 and/or X702), a messaging user interface (e.g., 730 at FIG. 7E) (for messaging with the respective user) with a first appearance (e.g., a messaging user interface of a first size and/or a messaging user interface that includes a displayed keyboard) without displaying the home user interface. Displaying the messaging user interface with the first appearance and without displaying the home user interface provides the user with feedback that the messaging user interface is in a first state, thereby providing the user with improved visual feedback.

In some embodiments, the one or more options associated with the respective user includes an option (e.g., 718 and/or X718) to initiate a process to send a message (e.g., that does not include live transmission of audio and/or video) to the respective user (e.g., as part of the one or more options associated with the respective user). In some embodiments, the computer system (e.g., 700 and/or X700) receives, via the one or more sensors, selection (e.g., 707*c*) of the option (e.g., 718 and/or X718) to initiate a process to send a message to the respective user. In some embodiments, in response to receiving selection (e.g., 707*c*) of the option (e.g., 718 and/or X718) to initiate a process to send a message to the respective user (and, optionally in accordance with a determination that a message from the respective user was being displayed when selection of the representation of the respective user was received), the computer system (e.g., 700 and/or X700) concurrently displays, via the display generation component, a messaging user interface (e.g., 750) (for messaging with the respective user) with a second appearance (e.g., a messaging user interface of a second size that is smaller than the first size and/or a messaging user interface that does not include a displayed keyboard) (e.g., that is different from the first appearance) and at least a portion of the home user interface (e.g., as shown in FIG. 7H) (e.g., displaying an obscured home user interface). Displaying the messaging user interface with the second appearance and with a portion of the home user interface provides the user with feedback that the messaging user interface is in a second state, thereby providing the user with improved visual feedback.

In some embodiments, the home user interface is not user-moveable and wherein the messaging user interface (e.g., 750) (e.g., with the first appearance and/or with the second appearance) is user-moveable. Enabling the user to move the messaging user interface without enabling the user to move the home user interface provides the user with feedback about which elements are part of the home user interface and which elements are not, thereby providing the user with improved visual feedback.

In some embodiments, displaying, via the display generation component (e.g., 702 and/or X702), representations (e.g., 712*a*-712*g* and 714*a*-714*i*) of the plurality of users includes displaying, via the display generation component (e.g., 702 and/or X702), a first group (e.g., 712) of a first plurality of representations of a first plurality of users, wherein the first plurality (e.g., 712*a*-712*g*) of users is selected to be included as part of the representations of the plurality of users independent of recency of communication between a user of the computer system and the first plurality of users (e.g., included to be displayed based on being manually selected as part of favorite contacts and/or based on frequency of communication). In some embodiments, displaying, via the display generation component, representations (e.g., 712*a*-712*g* and 714*a*-714*i*) of the plurality of users includes displaying, via the display generation component (e.g., 702 and/or X702), a second group (e.g., 714) of a second plurality of representations of a second plurality of users, wherein the second plurality (e.g., 714*a*-714*i*) of users is selected to be included as part of the plurality of users based on recency of communication between the user of the computer system and the second plurality of users (e.g., included to be displayed based on being the most recent users communicated with). In some embodiments, an order of the second plurality of representations of the second plurality of users is based on recency of communication between the user of the computer system and the second plurality of users. In some embodiments, displaying, via the display generation component, representations of the plurality of users includes: displaying, via the display generation component, a first group of a first plurality of representations of a first plurality of users, wherein the first plurality of users is selected to be included as part of the representations of the plurality of users independent of recency of communication between a user of the computer system and the first plurality of users and a second group of a second plurality of representations of a second plurality of users, wherein: in accordance with a determination that recent communications by the user of the computer system includes communications with a first set of one or more users without including communications with a second set of one or more users, the second plurality of users includes the first set of one or more users without including the second set of one or more users, and in accordance with a determination that recent communications by the user of the computer system includes communications with the second set of one or more users without including communications with the first set of one or more users, the second plurality of users includes the second set of one or more users without including the first set of one or more users. Grouping the first plurality of users together and the second plurality of users together enables the computer system to provide the user with feedback about which users were selected independent of recency of communication and which users were included based on recency of communication, thereby providing improved visual feedback.

In some embodiments, the recency of communication between a user of the computer system (e.g., 700 and/or X700) and the second plurality of users is based on a plurality of modes of communication (e.g., textual messaging, phone calls, and/or a communication session (e.g., a video communication session, an audio communication session, an extended reality communication session, a spatial communication session, and/or a non-spatial communication session)). Grouping the second plurality of users together based on recency of communication using a plurality of modes of communication enables the computer system to group recent contacts regardless of how the communication occurred, thereby providing improved visual feedback.

In some embodiments, the computer system (e.g., 700 and/or X700) displays, via the display generation component (e.g., 702 and/or X702) and concurrently with the option (e.g., 724*b* and/or X724*b*) to invite the respective user to join the ongoing communication session and/or the one or more options associated with the respective user (e.g., 724*a*, X724*a*, 724*c*, and/or X724*c*), an indication (e.g., 714*f* and/or X714*f*) of recent communication activity between a user of the computer system and the respective user (e.g., information about a recent call or communication, information about an active call or communication, and/or information about recent messages). Displaying an indication of recent communication activity along with the one or more options enables the user to see what recent communication method was used and quickly select a communication method for another communication session, thereby reducing the number of inputs required to initiate the appropriate type of communication session.

In some embodiments, the one or more options (e.g., 720*c*-720*f*) associated with the respective user includes an option (e.g., 724*a* and/or X724*a*) to initiate a spatial communication session (e.g., a communication session with at least some (e.g., less than all, a plurality of, and/or all) representations of users participating in the communication session distributed in a 3D environment) with the respective user. In some embodiments, the computer system receives, via the one or more sensors, selection (e.g., 709*c*) (e.g., via a touch input on a touch-sensitive surface and/or via an air gesture) of the option (e.g., 724*a* and/or X724*a*) to initiate a spatial communication session with the respective user. In some embodiments, in response to receiving selection (e.g., 709*c*) of the option (e.g., 724*a* and/or X724*a*) to initiate a spatial communication session with the respective user, the computer system (e.g., 700 and/or X700) initiates a spatial communication session with the respective user (e.g., such as in FIG. 7P). Providing an option to initiate a spatial communication session with the respective user enables the computer system to start the communication session without requiring separate user inputs directed to selecting the user with which to participate in the communication session, thereby reducing the number of inputs required to perform the operations.

In some embodiments, the computer system (e.g., 700 and/or X700) displays, via the display generation component (e.g., 702 and/or X702) and concurrently with the representations (e.g., 712*a*-712*g* and 714*a*-714*i*) of the plurality of users, an option (e.g., 715) to preview and/or edit an avatar of a user of the computer system. In some embodiments, the computer system (e.g., 700 and/or X700) receives, via the one or more sensors, selection (e.g., 713*b*) (e.g., via a touch input on a touch-sensitive surface and/or via an air gesture) of the option (e.g., 715) to preview and/or edit the avatar of the user of the computer system. In some embodiments, in response to receiving selection (e.g., 713*b*) of the option (e.g., 715) to preview and/or edit the avatar of the user of the computer system, the computer system (e.g., 700 and/or X700) displays, via the display generation component (e.g., 702 and/or X702), a user interface (e.g., 760) for previewing (e.g., via an avatar self-view that moves in conjunction with movement of the user) and/or editing the avatar of the user of the computer system. Displaying a user interface to preview and/or edit the avatar of the user of the computer provides the user with visual feedback about the visual characteristics of the avatar and the editing that can be done, thereby providing improved visual feedback.

In some embodiments, the computer system (e.g., 700 and/or X700) displays, via the display generation component (e.g., 702 and/or X702) and concurrently with the representations (e.g., 712*a*-712*g* and 714*a*-714*i*) of the plurality of users, a first indication (e.g., 9:41 at 714*e* at FIG. 7B) (e.g., display adjacent to the representation of the first user or displayed overlapping the representation of the first user) of a most recent communication (e.g., a text message, an established call, and/or a missed call) between a user of the computer system and a first user of the plurality of users and a second indication (e.g., 2:21 at 714*f* at FIG. 7B) (e.g., display adjacent to the representation of the second user or displayed overlapping the representation of the second user) of a most recent communication (e.g., a text message, an established call, and/or a missed call) between the user of the computer system (e.g., 700 and/or X700) and a second user, different from the first user, of the plurality of users. Displaying an indication of a most recent communication between the user of the computer system and other respective users provides the user with visual feedback about the recent communications, thereby providing improved visual feedback.

In some embodiments, a first representation, corresponding to a first user, of the representations of the plurality of users includes a recent message (e.g., 716*b*) (e.g., a portion of a recent message, a received textual message, and/or received image) from the first user. In some embodiments, a second representation, corresponding to a second user, of the representations of the plurality of users includes a recent message (e.g., received textual message and/or received image) from the second user. Displaying a recent message from the first user provides the user of the computer system feedback about the recent message, thereby providing enhanced visual feedback.

In some embodiments, the computer system receives, via the one or more sensors, selection (e.g., 707*b*) (e.g., via a touch input on a touch-sensitive surface and/or via an air gesture) of the recent message (e.g., 716*b*) from the first user; and in response to receiving selection (e.g., 707*b*) of the recent message (e.g., 716*b*) from the first user, displays, via the display generation component (e.g., 702 and/or X702), an option (e.g., 718 at FIG. 7C1 and/or X718 at FIG. 7C2) to reply to the recent message. In some embodiments, in response to receiving selection of the recent message from the first user, the display of the recent message expands to display additional content from the recent message from the first user. Displaying an option to reply to the recent message in response to receiving selection of the recent message enables the user of the computer system to quickly reply to the message without having to first open a separate application, thereby reducing the number of inputs required to reply to the message.

In some embodiments, the computer system receives, via the one or more sensors, selection (e.g., 707*c*) (e.g., via a touch input on a touch-sensitive surface and/or via an air gesture) of the option (e.g., 718 and/or X718) to reply to the recent message from the first user. In some embodiments, in response to receiving selection (e.g., 707*c*) of the option (e.g., 718 and/or X718) to reply to the recent message from the first user, the computer system (e.g., 700 and/or X700) displays, via the display generation component (e.g., 702 and/or X702), a user interface (e.g., 750) (e.g., a messages user interface, a keyboard for entering a message, a text entry field for entering a message) for replying to the recent message from the first user. Displaying an option to reply to the recent message in response to receiving selection of the recent message enables the user of the computer system to quickly reply to the message without having to first open a separate application, thereby reducing the number of inputs required to reply to the message.

In some embodiments, the representations (e.g., 712*a*-712*g* and 714*a*-714*i*) (e.g., static avatars, animated avatars, images, and/or monograms) of the plurality of users are displayed as part of a home user interface (e.g., as shown in FIGS. 7B-7D) (e.g., that optionally includes representations of contacts recently communicated with). In some embodiments, the home user interface (including the representations of the plurality of users) is displayed in response to detecting activation of a hardware button (e.g., 703) (e.g., a depressible button, a capacitive button, and/or a button that is not displayed by the display generation component). Displaying the home user interface in response to detecting activation of the hardware button enables the user to quickly access the home user interface (e.g., regardless of the content displayed via the display generation competent), thereby reducing the number of inputs required to access the home user interface.

Figure 10A:
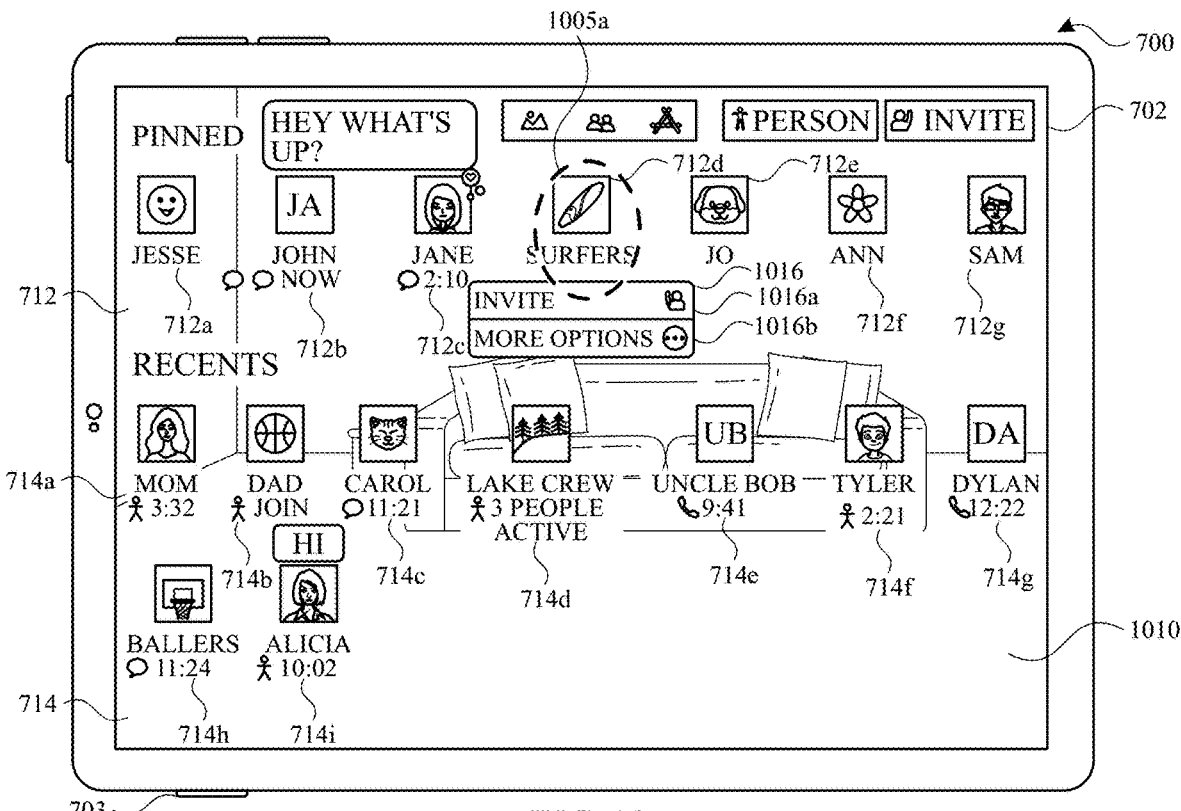

In some embodiments, aspects/operations of methods 800, 900, 1100, and/or 1300 may be interchanged, substituted, and/or added between these methods. For example, the home screen of FIG. 7B is the same home screen of FIG. 10A. For another example, the real-time communication session of FIG. 10C is the same as the real-time communication session of FIG. 12A. For brevity, these details are not repeated here.

FIG. 9 is a flow diagram of an exemplary method 900 for providing avatars in live communication sessions, in some embodiments. In some embodiments, method 900 is performed at a computer system (e.g., computer system 101 in FIG. 1A, computer system 700, and/or HMD X700) (e.g., a smartphone, tablet, and/or head-mounted device) that is in communication with a display generation component (e.g., display generation component 120 in FIGS. 1A, 3, and 4, display 702, and/or display X702) (e.g., a visual output device, a 3D display, a display having at least a portion that is transparent or translucent on which images can be projected (e.g., a see-through display), a projector, a heads-up display, and/or a display controller) and one or more sensors (e.g., a touch-sensitive surface, a gyroscope, an accelerometer, a motion sensor, a movement sensor, a microphone, an infrared sensor, a camera sensor, a depth camera, a visible light camera, an eye-tracking sensor, a gaze-tracking sensor, a physiological sensor, and/or an image sensor). In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

The computer system (e.g., 700 and/or X700) displays (902), via the display generation component (e.g., 702 and/or X702), a communication user interface for communicating with other users in a real-time communication session, wherein during the real-time communication session a user of the computer system is represented by an avatar that moves, during the real-time communication session, in accordance with (e.g., in conjunction with and/or based on) movement, detected by the one or more sensors, of the user of the computer system (e.g., one or more cameras of the computer system detect the movements, such as head, eye, mouth, arm, and/or hand movements, of the user and the avatar moves in accordance with the detected movement).

While displaying the communication user interface (e.g., 760 and/or 770), the computer system displays (904), via the display generation component, a selectable user interface object (e.g., 762, 764, 768, and/or 772).

The computer system (e.g., while concurrently displaying the communication user interface and selectable user interface object, or while not concurrently displaying the communication user interface and selectable user interface object) detects (906), via the one or more sensors, one or more inputs that include a selection input directed to the selectable user interface object (e.g., 762, 764, 768, and/or 772). In some embodiments, at least one of the one or more inputs is detected while concurrently displaying the communication user interface and selectable user interface object (e.g., the selection input directed to the selectable user interface object and/or a different input of the one or more inputs).

In response to detecting the one or more inputs that include the selection input directed to the selectable user interface object (e.g., 762, 764, 768, and/or 772), the computer system (e.g., 700 and/or X700) concurrently displays (908), via the display generation component, an avatar editing user interface (910) (e.g., 760, 780, and/or X780) that includes the avatar (e.g., show on left side of 780 and/or X780) representing the user of the computer system (e.g., 700 and/or X700) and one or more options (912) (e.g., 782, X782, 784, X784, 786, X786, and/or 790) to modify an appearance of the avatar (e.g., show on left side of 780 and/or X780) representing the user of the computer system (e.g., 700 and/or X700). Displaying an avatar editing user interface, including the avatar and options to modify the appearance of the avatar, in response to the one or more inputs provides the user with visual feedback about the state of the computer system, and in particular the appearance of the avatar and the options available to modify the appearance of the avatar, thereby providing improved visual feedback.

In some embodiments, the real-time communication session is an extended reality communication session that is conducted in an extended reality environment. In some embodiments, the communication user interface (e.g., as shown in FIGS. 7P and/or 7Q) is displayed in the extended reality environment. In some embodiments, the avatar editing user interface (e.g., 760, 780, and/or X780) is displayed in the extended reality environment. In some embodiments, the user can traverse the extended reality environment to view the communication user interface and/or the avatar editing user interface from different viewpoints from within the extended reality environment. Displaying the communication user interface and the avatar editing user interface in the extended reality environment provides the user with feedback about the communication session and the avatar being used, thereby providing improved visual feedback.

In some embodiments, subsequent to displaying the selectable user interface object (e.g., 762, 764, 768, and/or 772) (and/or the avatar editing user interface), the computer system (e.g., 700 and/or X700) participates in a communication session using the avatar (e.g., 700A) representing the user of the computer system (e.g., 700 and/or X700). In some embodiments, the selectable user interface object and/or the avatar editing user interface are displayed prior to the user entering a communication session, thereby providing the user an opportunity to modify the appearance of the avatar representing the user of the computer system. Displaying the selectable user interface objection prior to the user participating in the communication session using the avatar provides the user with an opportunity to edit the avatar before participating in the communication session, thereby reducing the need to navigate user interfaces to modify the avatar, and thus reducing the number of inputs required. In some embodiments, the computer system receives users input (e.g., via voice input, touch input, gestures, air gestures, gaze, and/or button activation) requesting to initiate a communication session. In some embodiments, in response to receiving user input requesting to initiate the communication session, the computer system displays the selectable user interface object and/or the avatar editing user interface object. In some embodiments, after (or without) receiving user input modifying the appearance of the avatar representing the user of the computer system, the computer system receives user input (e.g., via voice input, touch input, gestures, air gestures, gaze, and/or button activation) to proceed with initiating the communication session and, in response to receiving the user input to proceed with initiating the communication session, initiates the communication session.

In some embodiments, the computer system (e.g., 700 and/or X700) displays, via the display generation component (e.g., 702 and/or X702) and concurrently with the selectable user interface object (e.g., 762, 764, 768, and/or 772), an option to initiate a communication session (e.g., a video communication session, an audio communication session, an extended reality communication session, a spatial communication session, and/or a non-spatial communication session). In some embodiments, the computer system (e.g., 700 and/or X700) detects, via the one or more sensors, a selection input directed to the option to initiate a communication session. In some embodiments, in response to detecting the selection input directed to the option to initiate a communication session, the computer system initiates a communication session. Displaying the option to initiate the communication session concurrently with the selectable user interface object enables the user to alternatively participate in a communication session or modify the visual characteristics of the avatar, thereby reducing the number of inputs required.

In some embodiments, the selectable user interface object is displayed during an ongoing communication session (e.g., at FIG. 7P) (e.g., a video communication session, an audio communication session, an extended reality communication session, a spatial communication session, and/or a non-spatial communication session). Displaying the selectable user interface object during the ongoing communication session enables the user to participate in the communication session and have the option to modify the visual characteristics of the avatar, thereby reducing the number of inputs required.

In some embodiments, the computer system detects, via the one or more sensors, input (e.g., touch input, gestures, air gestures, gaze, and/or button activation) directed to the one or more options (e.g., 782, X782, 784, X784, 786, X786, and/or 790) to modify the appearance of the avatar (e.g., as shown in FIG. 7M) representing the user of the computer system (e.g., 700 and/or X700). In some embodiments, in response to detecting input directed to the one or more options (e.g., 782, X782, 784, X784, 786, X786, and/or 790) to modify the appearance of the avatar representing the user of the computer system (e.g., 700 and/or X700), the computer system (e.g., 700 and/or X700) modifies the appearance of the avatar (e.g., as in FIGS. 7L1-7N), wherein modifying the appearance of the avatar includes editing the avatar. Modifying the appearance of the avatar by editing the avatar provides the user with visual feedback about the modifications made to the avatar, thereby providing the user with improved visual feedback.

In some embodiments, a first option (e.g., 792) (e.g., accessories and/or lighting) of the avatar (e.g., as shown in FIG. 7M) representing the user of the computer system is editable via the avatar editing user interface and a second option (e.g., hair color, skin color, and/or eye color) of the avatar representing the user of the computer system is not editable via the avatar editing user interface. In some embodiments, the second option of the avatar is editable via a different user interface. Limiting the options of the avatar that are editable using the avatar editing user interface reduces the complexity of the avatar editing user interface, thereby improving the man-machine interface.

In some embodiments, editing the avatar representing the user of the computer system (e.g., 700 and/or X700) includes adding eyewear (e.g., glasses with different sizes, shapes, and/or frame type) to the avatar representing the user of the computer system (e.g., 700 and/or X700). Adding eyewear to the avatar enables the use to modify the avatar to more closely resemble the visual appearance of the user, thereby making the avatar a more accurate representation of the user and providing improved visual feedback.

In some embodiments, the one or more options (e.g., 782, X782, 784, X784, 786, X786, and/or 790) to modify the appearance of the avatar (e.g., as shown in FIG. 7M) representing the user of the computer system (e.g., 700 and/or X700) includes an option for a first eyewear template and an option for a second eyewear template that is different from the first eyewear template. In some embodiments, the first eyewear template is a first shape and the second eyewear template is a second shape, thereby enabling the user to select different types of glasses for the avatar (and then, optionally, selecting a color for the glasses). Providing eyewear templates enables the user to select a style of eyewear and to modify the avatar to more closely resemble the visual appearance of the user, thereby making the avatar a more accurate representation of the user and providing improved visual feedback.

In some embodiments, editing the avatar (e.g., as shown in FIG. 7M) representing the user of the computer system (e.g., 700 and/or X700) includes adding one or more accessibility options (e.g., eye patch, prosthetic, hearing aid, and/or wheelchair) to the avatar representing the user of the computer system. Providing accessibility options for modifying the avatar enables the user to modify the avatar to more closely resemble the visual appearance of the user, thereby making the avatar a more accurate representation of the user and providing improved visual feedback.

In some embodiments, adding one or more accessibility options to the avatar (e.g., as shown in FIG. 7M) representing the user of the computer system (e.g., 700 and/or X700) includes adding an accessibility option (e.g., an eye patch and/or a prosthetic eye) to a first (e.g., left) eye of the avatar without adding an accessibility option to the second (e.g., right) eye of the avatar. Enabling the user to add an accessibility option to a first or second eye of the avatar enables the user to modify the avatar to more closely resemble the visual appearance of the user, thereby making the avatar a more accurate representation of the user and providing improved visual feedback.

In some embodiments, the one or more options include one or more options to change simulated lighting (e.g., 782 at FIG. 7M). In some embodiments, the computer system (e.g., 700 and/or X700) detects, via the one or more sensors, input directed to the one or more options to change simulated lighting (e.g., 782 at FIG. 7M). In some embodiments, in response to detecting input directed to the one or more options to change simulated lighting, the computer system modifies the appearance of the avatar representing the user of the computer system, wherein modifying the appearance of the avatar includes changing simulated lighting (e.g., simulated lighting in an extended reality environment). Enabling the user to change the simulated lighting that lights the avatar enables the user to modify the avatar to more closely resemble the visual appearance of the user, thereby making the avatar a more accurate representation of the user and providing improved visual feedback.

In some embodiments, changing simulated lighting includes changing exposure settings (e.g., 782*a* and/or X782*a*). In some embodiments, changing exposure settings directly changes the appearance of the avatar and/or changes the processing of the image data used to generate the avatar (e.g., increasing the exposure of image data and generating the avatar based on the modified image data). In some embodiments, changing exposure settings helps to correct errors in capturing skin tone due to challenging lighting in an environment in which image data (e.g., of the user of the computer system) was captured to enroll the avatar. Enabling the user to change the expose settings for the simulated lighting enables the user to modify the avatar to more closely resemble the visual appearance of the user, thereby making the avatar a more accurate representation of the user and providing improved visual feedback.

In some embodiments, changing simulated lighting includes changing color temperature settings (e.g., 782*b* and/or X782*b*). In some embodiments, changing color temperature settings directly changes the appearance of the avatar and/or changes the processing of the image data used to generate the avatar (e.g., changing the color temperature of the image data and generating the avatar based on the modified image data). In some embodiments, changing color temperature settings helps to correct errors in capturing skin tone due to challenging lighting in an environment in which image data (e.g., of the user of the computer system) was captured to enroll the avatar. Enabling the user to change color temperature settings for the simulated lighting enables the user to modify the avatar to more closely resemble the visual appearance of the user, thereby making the avatar a more accurate representation of the user and providing improved visual feedback.

In some embodiments, the one or more options include one or more options (e.g., 762 and/or 764) to change a fidelity of the avatar representing the user of the computer system (e.g., 700 and/or X700). In some embodiments, the computer system (e.g., 700 and/or X700) detects, via the one or more sensors, input directed to the one or more options (e.g., 762 and/or 764) to change the fidelity of the avatar representing the user of the computer system. In some embodiments, in response to detecting input directed to the one or more options to change the fidelity of the avatar representing the user of the computer system, the computer system (e.g., 700 and/or X700) modifies the fidelity of the avatar (e.g., changing how life-like the avatar appears and/or changing the number of features of the avatar). Changing the fidelity of the avatar enables the user of the computer system to change how closely the avatar reflects the visual appearance of the user, thereby allowing the user to quickly modify the avatar to look less like the user without needing to manually change distinct visual characteristics of the avatar, thereby reducing the number of inputs required.

In some embodiments, the avatar representing the user of the computer system (e.g., 700 and/or X700) is a simulated three-dimensional avatar. In some embodiments, the computer system (e.g., 700 and/or X700) displays, via the display generation component (e.g., 702 and/or X702) and during the real-time communication session while the user is represented by the avatar that moves in accordance with (e.g., in conjunction with and/or based on) movement of the user of the computer system (e.g., 700 and/or X700), an option (e.g., 704Ad at FIG. 7P) to cease use (e.g., cease display of at the computer system and/or cease display of at participant devices) of the avatar in the real-time communication session. In some embodiments, the computer system detects, via the one or more sensors, selection (e.g., 705*p*) (e.g., via a touch input on a touch-sensitive surface and/or via an air gesture) of the option (e.g., 704Ad at FIG. 7P) to cease use of the avatar in the real-time communication session. In some embodiments, in response to detecting selection (e.g., 705*p*) of the option (e.g., 704Ad at FIG. 7P) to cease use of the avatar in the real-time communication session, the computer system ceases use of the avatar in the real-time communication session (e.g., switching to using a static image, a two-dimensional avatar, and/or a monogram). Providing an option to cease using the avatar in the real-time communication session enables the user to quickly stop other participants from seeing the avatar without the need to navigate numerous user interfaces, thereby reducing the number of inputs needed.

In some embodiments, the avatar editing user interface (e.g., 760, 780, and/or X780) includes one or more avatar management options (e.g., 768). Providing one or more avatar management options as part of the avatar editing user interface enables the user to quickly manage avatars without the need to navigate numerous user interfaces, thereby reducing the number of inputs needed.

In some embodiments, the one or more avatar management options (e.g., 768) includes an option (e.g., 768*b*) to create a new avatar representing the user of the computer system. In some embodiments, the computer system detects, via the one or more sensors, selection (e.g., 705*j*) of the option (e.g., 768*b*) to create a new avatar representing the user of the computer system (e.g., 700 and/or X700). In some embodiments, in response to detecting selection (e.g., 705*j*) of the option (e.g., 768*b*) to create a new avatar representing the user of the computer system (e.g., 700 and/or X700), the computer system (e.g., 700 and/or X700) initiates a process (e.g., displays setup interface 770) to create a new avatar representing the user of the computer system. In some embodiments, initiating the process to create a new avatar representing the user of the computer system includes using the computer system to capture information about one or more physical characteristics of the user of the computer system (e.g., data (e.g., image data, sensor data, and/or depth data) that represents a size, shape, position, pose, color, depth, and/or other characteristics of one or more body parts and/or features of body parts of the user) using a first sensor (e.g., via the one or more cameras) that is optionally positioned on a same side of the computer system as a first display generation component of the one or more display generation components and prompting (e.g., a visual prompt displayed by the first display generation component, an audio prompt output via a speaker of the computer system, and/or a haptic prompt) the user of the computer system to move a position of a head of the user relative to the computer system. In some embodiments, the computer system outputs feedback (e.g., a non-visual indication, one or more audio indications, and/or one or more haptic indications) confirming that a threshold (e.g., sufficient) amount of information about the one or more physical characteristics (e.g., facial features, facial expressions, and/or body features) of the user has been captured. In some embodiments, after capturing (e.g., during the enrollment process) information about the one or more physical characteristics (e.g., data (e.g., image data, sensor data, and/or depth data) that represents a size, shape, position, pose, color, depth, and/or other characteristics of one or more body parts and/or features of body parts of the user) of the user of the computer system, the computer system displays a representation of the user generated based on information captured about the one or more physical characteristics of the user. Providing an option to create a new avatar as part of the avatar editing user interface enables the user to quickly manage avatars without the need to navigate numerous user interfaces, thereby reducing the number of inputs needed.

In some embodiments, the one or more avatar management options (e.g., 768) includes an option (e.g., 768*c*) to delete an avatar representing the user of the computer system (e.g., 700 and/or X700). In some embodiments, the computer system detects, via the one or more sensors, selection of the option (e.g., 768*c*) to delete an avatar representing the user of the computer system. In some embodiments, in response to detecting selection of the option (e.g., 768*c*) to delete an avatar representing the user of the computer system (e.g., 700 and/or X700), the computer system (e.g., 700 and/or X700) initiates a process to delete (e.g., deleting and/or requesting confirmation to delete) an avatar representing the user of the computer system. Providing an option to delete an avatar as part of the avatar editing user interface enables the user to quickly manage avatars without the need to navigate numerous user interfaces, thereby reducing the number of inputs needed.

In some embodiments, a simulated three-dimensional avatar representing the user of the computer system (e.g., 700 and/or X700) is not available (e.g., has been deleted or was not created). In some embodiments, the computer system (e.g., 700 and/or X700) uses, during the real-time communication session while a simulated three-dimensional avatar representing the user of the computer system (e.g., 700 and/or X700) is not available, a representation of the user of the computer system (e.g., 700 and/or X700) that moves in accordance with (e.g., in conjunction with and/or based on) movement of the user of the computer system (e.g., 700 and/or X700) without reflecting an appearance of the user of the computer system (e.g., 700 and/or X700) (e.g., the representation does not have a visual appearance that corresponds to the appearance of the user of the computer system). In some embodiments, the representation of the user of the computer system that moves in accordance with (e.g., in conjunction with and/or based on) movement of the user of the computer system without reflecting the appearance of the user of the computer system (e.g., without including user-specific features of the user of the computer system, such as facial features, skin color, eye color, and/or hair color) is displayed, via the displayed generation component, thereby enabling the user to see what the avatar looks like. Providing a representation of the user of the computer system that moves in accordance with movement of the user of the computer system without reflecting the appearance of the user of the computer system enables participants of the communication session to view the user's movements when a more realistic avatar is not available, thereby providing improved visual feedback.

In some embodiments, in accordance with a determination that the avatar representing the user of the computer system (e.g., 700 and/or X700) is a simulated three-dimensional avatar, the computer system (e.g., 700 and/or X700) enables participation, by the user of the computer system (e.g., 700 and/or X700), in spatial communication sessions (e.g., as shown in FIG. 7P) (e.g., by displaying and/or enabling controls for initiating and/or joining a spatial communication session). In some embodiments, in accordance with a determination that the avatar representing the user of the computer system is not a simulated three-dimensional avatar (e.g., is a two-dimensional avatar, is an image, and/or is a monogram), the computer system forgoes enabling participation, by the user of the computer system (e.g., 700 and/or X700), in spatial communication sessions (e.g., by forgoing to display, ceasing to display, forgoing enabling, and/or ceasing enabling controls for initiating and/or joining a spatial communication session). In some embodiments, a spatial communication session is a communication session with at least some (e.g., less than all, a plurality of, and/or all) representations of users participating in the communication session distributed in a 3D environment. Enabling the user to participant in a spatial communication session when the avatar representing the user is a simulated three-dimensional avatar and forgoing enabling participation, by the user of the computer system, in spatial communication sessions when the avatar representing the user of the computer system is not a simulated three-dimensional avatar provides the user with feedback about the avatar currently representing the user, thereby providing improved feedback.

In some embodiments, while a simulated three-dimensional avatar representing the user of the computer system (e.g., 700 and/or X700) is not available (e.g., has been deleted or was not created) and in response to at least a portion of the detected one or more inputs, the computer system (e.g., 700 and/or X700) displays, via the display generation component, an option (e.g., 772) to create an avatar representing the user of the computer system. In some embodiments, in response to detecting selection (e.g., 705k) of the option (e.g., 772) to create an avatar representing the user of the computer system, the computer system (e.g., 700 and/or X700) initiates a process (e.g., including display of 780 and/or X780) to create an avatar representing the user of the computer system. In some embodiments, in accordance with a determination that a (e.g., simulated three-dimensional or two-dimensional) avatar representing the user of the computer system is not available, the computer system displays the option to create an avatar representing the user of the computer system, and in accordance with a determination that an avatar representing the user of the computer system is available, the computer system forgoes display of the option to create an avatar representing the user of the computer system. Automatically displaying an option to create an avatar representing the user of the computer system when a simulated three-dimensional avatar representing the user of the computer system is not available enables the computer system to provide the user with feedback about the status of the avatar and provide quick access to create the avatar, thereby providing improved visual feedback and reducing the number of inputs required to create the avatar.

In some embodiments, while a simulated three-dimensional avatar representing the user of the computer system is not available (e.g., has been deleted or was not created) and in response to at least a portion of the detected one or more inputs, the computer system (e.g., 700 and/or X700) displays, via the display generation component, an option to use a default avatar to represent the user of the computer system (e.g., 700 and/or X700). In some embodiments, in response to detecting selection of the option to use the default avatar to represent the user of the computer system (e.g., 700 and/or X700), the computer system (e.g., 700 and/or X700) uses the default avatar to represent the user of the computer system (e.g., 700 and/or X700). Providing an option to use a default avatar when a simulated three-dimensional avatar is not available for the user enables the computer system to provide the user feedback about the availability of avatars and to enable the user to quickly use a default avatar, thereby providing improved feedback and reducing the number of inputs required to use a default avatar.

In some embodiments, the default avatar moves in accordance with (e.g., in conjunction with and/or based on) movement of the user of the computer system (e.g., 700 and/or X700) without reflecting an appearance of the user of the computer system (e.g., 700 and/or X700) (e.g., the representation does not have a visual appearance that corresponds to the appearance of the user of the computer system). Providing a default avatar that moves in accordance with movement of the user of the computer system without reflecting the appearance of the user of the computer system enables participants of the communication session to view the user's movements, thereby providing improved visual feedback.

In some embodiments, the default avatar represents users of the computer system (e.g., 700 and/or X700) when the computer system (e.g., 700 and/or X700) is in a guest mode (e.g., a mode in which an un-registered user is using the computer system, a mode in which an unrecognized user is using the computer system, a mode in which a user that has not logged into an account is using the computer system, and/or a mode in which a first set of features (e.g., a set of content and/or functions) are made accessible to and/or are unlocked for the guest user (without making a second set of feature accessible to the guest user) without successful user authentication of the guest user (e.g., based on a set of criteria being met that optionally includes a first criterion that is satisfied if a most recent user of the computer system other than the current user (e.g., the most recent user that used the computer system prior to the user) is an authorized user and/or a second criterion that is satisfied if the computer system has been in the locked state (e.g., has been continuously and/or uninterruptedly in the locked state) for less than a threshold duration of time since the last time the computer system was in an unlocked state)). Using a default avatar when a guest is using the computer system enables the computer system to provide visual feedback about who is using the computer system, thereby providing enhanced visual feedback.

In some embodiments, aspects/operations of methods 800, 900, 1100, and/or 1300 may be interchanged, substituted, and/or added between these methods. For example, the home screen of FIG. 7B is the same home screen of FIG. 10A. For another example, the real-time communication session of FIG. 10C is the same as the real-time communication session of FIG. 12A. For brevity, these details are not repeated here.

FIGS. 10A-10E illustrate examples of providing representations in live communication sessions. FIG. 11 is a flow diagram of an exemplary method 1100 for providing representations in live communication sessions. The user interfaces in FIGS. 10A-10E are used to illustrate the processes described below, including the processes in FIG. 11.

FIGS. 10A-10E illustrate a device 700 having a display 702 (e.g., a tablet, a smart phone, or a laptop). While device 700 is illustrated as a handheld device, in some embodiments, device 700 is a head-mounted device (HMD). The HMD is configured to be worn on a head of a user of device 700 and includes display 702 on and/or in an interior portion of the HMD. Display 702 is visible to the user when device 700 is worn on the head of the user. For instance, in some embodiments, the HMD at least partially covers eyes of the user when worn on the head of the user, such that display 702 is positioned over and/or in front of the eyes of the user. In such embodiments, display 702 is configured to display an XR environment during a live communication session in which the user of the HMD is participating.

In FIG. 10A, device 700 displays, on display 702, a communication interface 1010 within an XR environment 1004. XR environment 1004 includes elements (e.g., virtual elements and/or physical elements), such as table 1004a and couch 1004b. Communication interface 1010 includes pinned contacts 1012 (e.g., pinned contacts 1012a-1012g) and recent contacts 1014 (e.g., recent contacts 1014a-1014i), such as described above with respect to FIGS. 7B-7D.

While displaying communication interface 1010, device 700 detects selection of contact 1012d, corresponding to a group of contacts named "Surfers". In some embodiments, the selection of contact 1012d is a tap gesture 1005a on contact 1012d. In some embodiments, the selection of contact 1012d is an air gesture, for instance, indicating a selection of contact 1012d. As shown in FIG. 10A, in response to detecting selection of contact 1012d, device 700 displays contact menu 1016 including invite option 1016a and expand option 1016b.

Figure 10B:
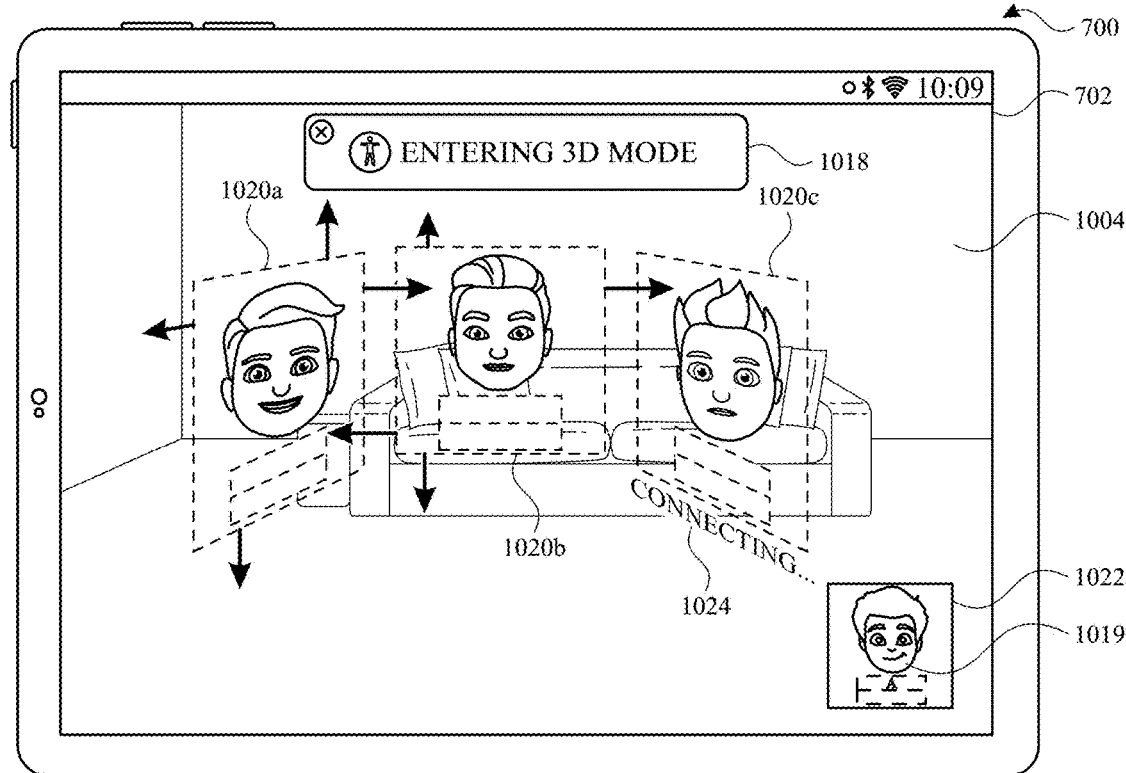

While displaying communication interface 1010, device 700 detects selection of invite option 1016a. In some embodiments, the selection of invite option 1014a is a tap gesture 1007a on invite option 1016a. In some embodiments, the selection of invite option 1016a is an air gesture, for instance, indicating a selection of invite option 1016a. As shown in FIG. 10B, in response to selection of invite option 1014a, device 700 initiates a XR communication session with members of the group of contacts "Surfers".

In FIG. 10B, device 700 displays XR environment 1004 for the initiated XR communication session. Optionally, device 700 displays notification 1018, indicating that the XR communication session is a spatial communication session.

As shown in FIG. 10B, XR environment 1004 includes 3D representations 1020a and 1020b corresponding to users of the group "Surfers" that have accepted the invite from device 700 and have joined the live communication session. In some embodiments, because the XR communication session is a spatial communication session, remote users corresponding to 3D representations 1020a and 1020b have spatial agency.

At FIG. 10B, XR environment 1004 further includes representation 1020c corresponding to a third user of "Surfers". Because the user is in the process of joining the XR communication session, as indicated by status 1024, the user corresponding to representation 1020c does not have spatial agency. In some embodiments, in a spatial communication session, representations of users joining a session are 3D representations (e.g., an avatar associated with the user or a default avatar), and in other embodiments, representations of users joining a session are 2D representations.

In some embodiments, device 700 displays self preview 1022 including a live view of representation 1019 in XR environment 1004, as shown in FIG. 10B. While self preview 1019 is shown in FIG. 10B as being located in a lower, righthand corner of display 702, it will be appreciated that self preview 1019 may be displayed at any location on display 702.

In FIG. 10C, device 700 displays XR environment 1004 after the third user and a fourth user of "Surfers" has joined the XR communication session. In some embodiments, when users join an XR communication session, one or more representations are initially arranged according to a template. For example, with reference to FIGS. 10B-10C, in response to the fourth member of "Surfers" joining the XR communication session, positions of representations 1020a-1020c are, optionally, adjusted, to provide adequate spacing for representation 1020d in XR environment 1004.

In some embodiments, when a number of 3D representations in an XR environment exceeds a threshold amount (e.g., 3, 4, 5, or 10), device 700 transitions the XR communication session from a spatial communication session to a non-spatial communication session. In FIG. 10D1, for example, a fifth user of "Surfers" has joined the XR communication session, exceeding a threshold number (e.g., five) of 3D representations permitted in the XR communication session. In response, as shown in FIG. 10D1, device 700 transitions the XR communication session to a non-spatial communication session and displays notification 1028, indicating that the XR communication session is currently a non-spatial communication session.

In some embodiments, because device 700 transitions the XR live communication to a non-spatial communication session, 3D representations 1020*a*-1020*d* are transitioned to 2D representations 1030*a*-1030*d*, respectively, and the fifth user is represented by 2D representation 1030*e*. In some embodiments, 2D representations are arranged in XR environment 1004 according to one or more templates. For example, as shown in FIG. 10D1, 2D representations 1030*a*-1030*e* are centered and/or arranged such that the distance between the representations is substantially equal. In some embodiments, representations are spaced such that the distance between representations satisfies a threshold distance in one or more non-vertical directions and/or a vertical direction.

In some embodiments, a user can move one or more 2D representations within XR environment 1004. By way of example, representations 1030*a*-103*e* can simultaneously be moved by moving grabber 1034.

In some embodiments, the techniques and user interface (s) described in FIG. 10D1 are provided by one or more of the devices described in FIGS. 1A-1P. FIG. 10D2 illustrates an embodiment in which a non-spatial communication session (e.g., as described in FIGS. 10B-10D1) is displayed in XR environment X1004 on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

As set forth above with reference to FIG. 10D1, in some embodiments, when a number of 3D representations in an XR environment exceeds a threshold amount (e.g., 3, 4, 5, or 10), HMD X700 transitions the XR communication session from a spatial communication session to a non-spatial communication session. In FIG. 10D2, for example, a fifth user of "Surfers" has joined the XR communication session, exceeding a threshold number (e.g., five) of 3D representations permitted in the XR communication session. In response, as shown in FIG. 10D-2, HMD X700 transitions the XR communication session to a non-spatial communication session and displays notification X1028, indicating that the XR communication session is currently a non-spatial communication session.

In some embodiments, because HMD X700 transitions the XR live communication to a non-spatial communication session, 3D representations 1020*a*-1020*d* (e.g., as shown in FIG. 10C) are transitioned to 2D representations X1030*a*-X1030*d*, respectively, and the fifth user is represented by 2D representation X1030*e*. In some embodiments, 2D representations are arranged in XR environment X1004 according to one or more templates. For example, as shown in FIG. 10D2, 2D representations X1030*a*-X1030*e* are centered and/or arranged such that the distance between the representations is substantially equal. In some embodiments, representations are spaced such that the distance between representations satisfies a threshold distance in one or more non-vertical directions and/or a vertical direction.

In some embodiments, a user can move one or more 2D representations within XR environment X1004. By way of example, representations X1030*a*-X1030*e* can simultaneously be moved by moving grabber X1034.

In some embodiments, HMD X700 detects selection of grabber X1034 based on an air gesture performed by a user of HMD X700. In some embodiments, HMD X700 detects hands X750*a* and/or X750*b* of the user of HMD X700 and determines whether motion of hands X750*a* and/or X750*b* perform a predetermined air gesture corresponding to selection of grabber X1034. In some embodiments, the predetermined air gesture selecting grabber X1034 includes a pinch gesture. In some embodiments, the pinch gesture includes detecting movement of finger X750*c* and thumb X750*d* toward one another. In some embodiments, HMD X700 detects selection of grabber X1034 based on a gaze and air gesture input performed by the user of HMD X700. In some embodiments, the gaze and air gesture input includes detecting that the user of HMD X700 is looking at grabber X1034 (e.g., for more than a predetermined amount of time) and hands X750*a* and/or X750*b* of the user of HMD X700 perform a pinch gesture.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 10E:
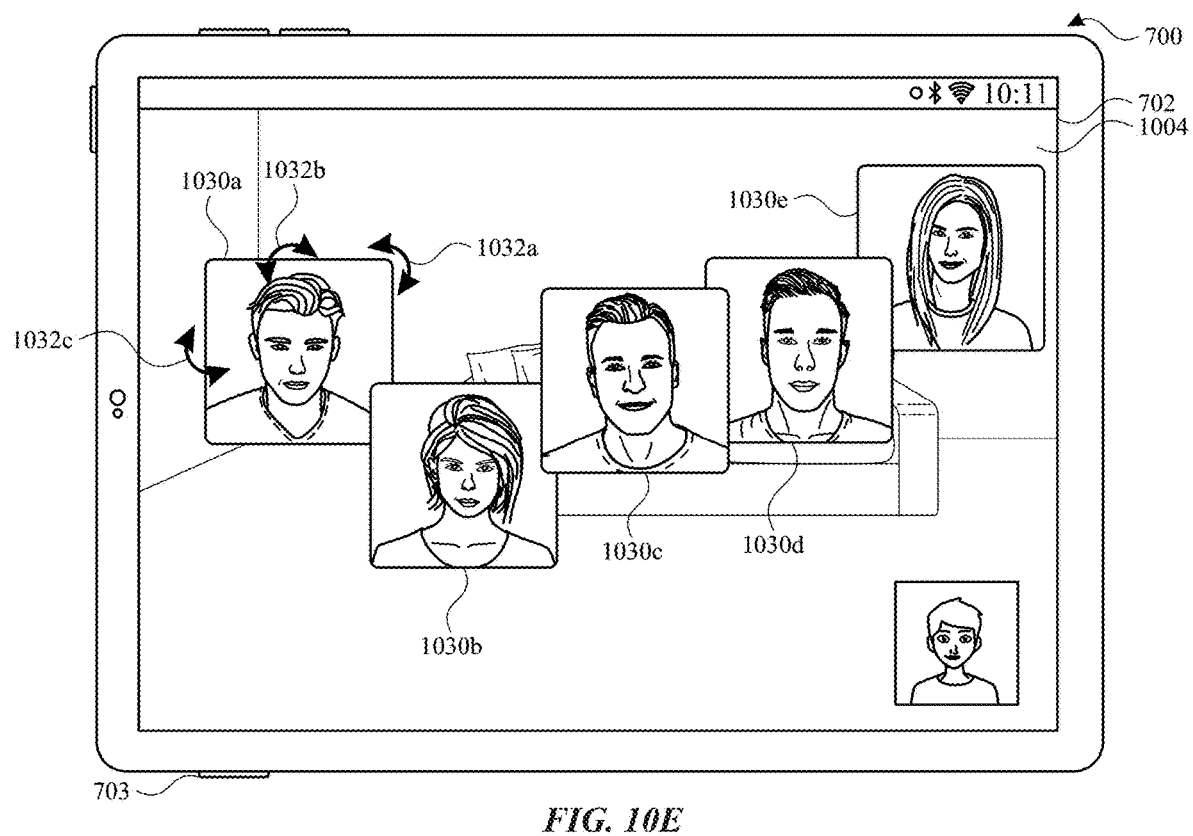

FIG. 10E illustrates another exemplary arrangement for 2D representations in a non-spatial communication session. As shown in FIG. 10E, representations 1030*a*-1030*e* are partially overlapped in an ordered stack. In some embodiments, the order of the ordered stack is static. In some embodiments, the order is dynamic, and the representations are ordered according to which user most recently communicated in the XR communication session.

In some embodiments, 2D representations 1030*a*-1030*e* can rotate along one or more axes during the XR communication session. By way of example, 2D representations 1030*a*-1030*e* can rotate along any one or more of X-, Y-, and Z-axes. In some embodiments, rotation of 2D representations 1030*a*-1030*e* is based on movement of users corresponding to the 2D representations 1030*a*-1030*e*. As an example, if a user corresponding to representation 1030*a* tilts their head to a side, representation 1030*a* rotates in an analogous manner along a z-axis, as indicated by rotational indicator 1032*a*. As another example, if the user corresponding to representation 1030*a* leans forward, representation 1030*a* rotates in an analogous manner along an x-axis, as indicated by rotational indicator 1032*b*. As yet another example, if the user corresponding to representation 1030*a* turns their head to a side (e.g., looks left or right), representation 1030*a* can rotate in an analogous manner along a y-axis, as indicated by rotational indicator 1032*c*.

Description is made herein with respect to device 700 transitioning an XR communication session from a spatial communication session to a non-spatial communication session when a threshold number of 3D representations are exceeded in the spatial communication. It will be appreciated that in some embodiments device 700 transitions an XR communication session from a non-spatial communication session to spatial communication session as well. For example, with reference to FIG. 10D1, if one or more users disconnects from the XR communication session such that the number of 3D representations no longer exceeds the threshold number, device 700 can, optionally, transition the XR communication session from a non-spatial communication session to a spatial communication session.

In some embodiments, spatial communication sessions include both 3D and 2D representations. Accordingly, with reference once again to FIG. 10D1, if one or more users were to disable use of their 3D representation (e.g., using an avatar option, such as avatar option 704Ad of FIG. 7P or another option) such that the number of 3D representations would no longer exceed the threshold number, device 700 can, optionally, transition the XR communication session from a non-spatial communication session to a spatial communication session. Thereafter, those users that disabled use of 3D representations would be represented by 2D representations and other users by 3D representations.

Additional descriptions regarding FIGS. 10A-10E are provided below in reference to method 1100 described with respect to FIGS. 10A-10E.

FIG. 11 is a flow diagram of an exemplary method 1100 for providing representations in live communication sessions, in some embodiments. In some embodiments, method 1100 is performed at a computer system (e.g., computer system 101 in FIG. 1A, computer system 700, and/or HMD X700) (e.g., a smartphone, tablet, and/or head-mounted device) that is in communication with a display generation component (e.g., display generation component 120 in FIGS. 1A, 3, and 4, display 702, and/or display X702) (e.g., a visual output device, a 3D display, a display having at least a portion that is transparent or translucent on which images can be projected (e.g., a see-through display), a projector, a heads-up display, and/or a display controller). In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

While participating (1102) in a communication session that is a spatial communication session (e.g., at FIGS. 10B and 10C) (e.g., a communication session with at least some (e.g., less than all, a plurality of, and/or all) representations of users participating in the communication session distributed in a 3D environment) that includes displaying, via the display generation component, representations (e.g., 1020*a*-1020*d*) (e.g., other than a representation of the user of the computer system that is participating in the communication session or including a representation of the user of the computer system that is participating in the communication session) of a plurality of (e.g., less than all, a plurality of, and/or all) participants in the communication session in a spatially distributed arrangement in a 3D environment.

Displaying the plurality of participants in the spatially distributed arrangement includes displaying the representations (e.g., 1020*a*-1020*d*) of the plurality of participants spaced apart from each other and a user (e.g., 1022) of the computer system by at least a threshold amount in a first non-vertical direction (1104) in the 3D environment (e.g., a 3D virtual reality environment or a 3D mixed reality environment).

Displaying the plurality of participants in the spatially distributed arrangement includes displaying the representations (e.g., 1020*a*-1020*d*) of the plurality of participants spaced apart from each other and the user (e.g., 1022) by at least the threshold amount in a second non-vertical direction (1106) that is different from the first non-vertical direction.

While displaying the representations (e.g., 1020*a*-1020*d*) of the plurality of participants distributed in the 3D environment, the computer system (e.g., 700 and/or X700) detects (1108) an event. In some embodiments, spatial communication sessions are displayed such that the representations of some of the users appear to be located at different positions (including, for example, different depths) within the 3D environment.

In response to detecting the event, the computer system transitions (1110) the communication session from the spatial communication session to a non-spatial communication session (e.g., as shown in FIGS. 10D1, 10D2, and/or 10E) (e.g., a communication session where representations of users participating in the communication session are not distributed in 3D space (are distributed in 1D space (on a line) or in 2D space (on a single plane)) that includes displaying, via the display generation component, representations (e.g., 1030*a*-1030*e* and/or X1030*a*-X1030*e*) of at least a subset (e.g., less than all, all, and/or all remaining) of the plurality of participants of the communication session in a grouped arrangement.

In the grouped arrangement: the representations (e.g., 1030*a*-1030*e* and/or X1030*a*-X1030*e*) of the plurality of participants are spaced apart from each other by less than the threshold amount in the first non-vertical direction (1112) in the 3D environment (e.g., as in FIGS. 10D1, 10D2, and 10E), a representation (1114) of a first participant in the grouped arrangement has a different position than a representation of the first participant in the spatially distributed arrangement, and a (1116) representation of a second participant in the grouped arrangement has a different position than a representation of the second participant in the spatially distributed arrangement. In some embodiments, transitioning the communication session from the spatial communication session to the non-spatial communication session includes reducing the number of axes in which the representations of the users participating in the communication session are located (e.g., reducing the representations from being distributed in 3D space to being distributed in 2D space). Switching from a spatial communication session to a non-spatial communication session when the event is detected provides the user with visual feedback that the event has been detected, thereby providing the user with improved visual feedback.

In some embodiments, in the non-spatial communication session (e.g., as shown in FIGS. 10D1, 10D2, and/or 10E) a representation of a first participant of the plurality of participants is in a first window region (e.g., 1030*a* and/or X1030*a*) and a representation of a second participant of the plurality of participants is in a second window region (e.g., 1030*b* and/or X1030*b*) that is different from the first window region. In some embodiments, in the spatial communication session a representation of the first participant of the plurality of participants is not in a window region and a representation of the second participant of the plurality of participants is not in a window region (e.g., as in FIGS. 10B and 10C). In some embodiments, in the non-spatial communication session, each representation is in a separate window and in the spatial communication session, representations are not in separate windows. Displaying representations in window regions in non-spatial communication sessions and displaying representations without window regions in spatial communication sessions provides the user with feedback about the type of communication session, thereby providing improved visual feedback.

In some embodiments, the representation of the first participant is a simulated three-dimensional representation (e.g., a 3D avatar) and the representation of the second participant is a two-dimensional representation (e.g., a 2D avatar). In some embodiments, the representations of the participants are a mix of 2D and 3D representations/avatars. Displaying participants as both three-dimensional representations and two-dimensional representations provides the user of the computer system with feedback about the type of representation being used by the participants, thereby providing improved visual feedback.

In some embodiments, the plurality of participants are two-dimensional representations (e.g., as in FIGS. 10D1 and/or 10D2). In some embodiments, all representations of users participating in the communication session are 2D representations. Displaying participants as two-dimensional representations provides the user of the computer system with visual feedback about the representation being used by the participants, thereby providing improved visual feedback.

In some embodiments, the plurality of participants are three-dimensional representations (e.g., as in FIG. 10C). In some embodiments, all representations of users participating in the communication session are 3D representations. Displaying participants as three-dimensional representations provides the user of the computer system with visual feedback about the representation being used by the participants, thereby providing improved visual feedback.

In some embodiments, the event is a request (e.g., initiated by a user of the computer system or not initiated by the user of the computer system) received during the communication session to transition a representation of the user of the computer system (e.g., 700 and/or X700) from a 3D representation to a 2D representation. Automatically switching from the spatial communication session to the non-spatial communication session when the user switches to a 2D representation provides the user with feedback that the user has changed their representation, thereby providing improved visual feedback.

In some embodiments, the request is based on an input (e.g., via voice input, touch input, gestures, air gestures, gaze, and/or button activation) in a communication session control region. Switching from the spatial communication session to the non-spatial communication session when the user provides input at a communication session control region provides the user with feedback that the input has been received, thereby providing improved visual feedback.

In some embodiments, the communication session control region (e.g., such as a control region for FIG. 10B) includes an option to transition the representation of the user of the computer system from the 3D representation to the 2D representation and one or more options corresponding to other communication session controls (e.g., mute the communication session, send a textual message as part of the communication session, display information about the communication session, and/or leave the communication session). Providing additional controls concurrently with the option to representation of the user of the computer system from the 3D representation to the 2D representation enables the user to control more aspects of the communication session, thereby improving the man-machine interface.

In some embodiments, the event is a request (e.g., initiated by a user of the computer system or not initiated by the user of the computer system) received during the communication session (e.g., as in FIGS. 10D1 and/or 10D2) to transition the communication session from the spatial communication session to the non-spatial communication session (e.g., while maintaining the representation of the user of the computer system as a 3D representation or while changing the representation of the user from a 3D representation to a 2D representation). Switching from the spatial communication session to the non-spatial communication session based on a user request enables the user to control the type of communication session, thereby improving the man-machine interface.

In some embodiments, the event is an additional participant joining the communication session (e.g., as in FIGS. 10D1 and/or 10D2) (e.g., where the event is triggered when the additional participant joining causes the number of participants to exceed the threshold number of participants who can participate in a spatial communication session or where the event is triggered independent of the number of participants). In some embodiments, while in a spatial communication session, an additional user requests to join the communication session and, in response, in accordance with a determination that the additional user joining would exceed the threshold number of participants, the communication session changes to a non-spatial communication session; and in accordance with a determination that the additional user joining would not exceed the threshold number of participants, the communication session does not change to a non-spatial communication session (stays a spatial communication session). Switching from the spatial communication session to the non-spatial communication session based on an additional participant joining reducing the computing resources required and conserves battery power.

In some embodiments, the additional participant joining the communication session (e.g., as in FIGS. 10D1 and/or 10D2) causes the number of participants represented by simulated three-dimensional representations to exceed a threshold number of participants (e.g., independent of the number of participants represented by two-dimensional representations). In some embodiments, when the number of spatial participants exceeds the threshold number, the communication session changes to a non-spatial communication session. Including only 3D representations (and not 2D representations) as part of the threshold improves computer resource management because the 3D representations are more computing intensive as compared to the non-3D representations.

In some embodiments, while the communication session is a non-spatial communication session (e.g., as in FIGS. 10D1 and/or 10D2), shifting the position of a respective window region (e.g., 1030a-1030e and/or X1030a-X1030e) corresponding to a respective participant based on the respecting participant moving. In some embodiments, as participants move during a non-spatial communication session, the window displaying the representation of the participant shifts based on the detected movement. Shifting respective window regions as respective participants move provides the user with visual feedback about the movement of the participant, thereby providing improved visual feedback.

In some embodiments, the respective window region (e.g., 1030a-1030e and/or X1030a-X1030e) moves forward and/or backward in a virtual environment based on a head position of respective participant. Shifting respective window regions as respective participants move provides the user with visual feedback about the movement of the participant, thereby providing improved visual feedback.

In some embodiments, the respective window region (e.g., 1030a-1030e and/or X1030a-X1030e) tilts (e.g., clockwise and/or counterclockwise) based on a head position of respective participant. Shifting respective window regions as respective participants move provides the user with visual feedback about the movement of the participant, thereby providing improved visual feedback.

In some embodiments, a first window (e.g., 1030a-1030e and/or X1030a-X1030e) region shifts (e.g., moves forward, backward, and/or tilts) in a first direction based on movement of a participant displayed in the first window and a second window (e.g., 1030a-1030e and/or X1030a-X1030e) shifts (e.g., moves forward, backward, and/or tilts) in a second direction, different from the first direction, based on movement of a participant displayed in the second window. In some embodiments, movements of various participants cause movements of the respective window regions of the various participants. Shifting respective window regions as respective participants move provides the user with visual feedback about the movement of the particular participants, thereby providing improved visual feedback.

In some embodiments, while participating in the communication session that is a non-spatial communication session (e.g., as in FIGS. 10D1 and/or 10D2), the computer system (e.g., 700 and/or X700) detects a second event. In some embodiments, in response to detecting the second event, the computer system (e.g., 700 and/or X700) transitions the communication session from the non-spatial communication session to the spatial communication session (e.g., from FIG. 10D-1 and/or 10D-2 back to FIG. 10C). Switching from the non-spatial communication session to the spatial communication session when the second event is detected provides the user with visual feedback that the second event has been detected, thereby providing the user with improved visual feedback.

In some embodiments, the second event is a participant leaving the communication session (e.g., where the event is triggered when the participant leaves because the number of participants falls below the threshold number of participants who can participate in a spatial communication session). In some embodiments, while in a non-spatial communication session, a user leaves the communication session and, in response, in accordance with a determination that the participants after the user leaving would exceed the threshold number of participants, the communication session stays a non-spatial communication session; and in accordance with a determination that the participants after the user leaving would not exceed the threshold number of participants, the communication session changes to a spatial communication session. Switching from the non-spatial communication session to the spatial communication session based on a participant leaving provides the user with visual feedback that the participant has left. In addition, the participant leaving reduces the computational resources required for the communication session, thereby allowing more computational resources to be used to make the communication session a spatial communication session.

In some embodiments, the second event is a request (e.g., initiated by a user of the computer system or not initiated by the user of the computer system) received during the communication session to transition a representation of the user of the computer system (e.g., 700 and/or X700) from a 2D representation to a 3D representation. In some embodiments, the request is based on via voice input, touch input, gestures, air gestures, gaze, and/or button activation. Automatically switching from the non-spatial communication session to the spatial communication session when the user switches to a 3D representation provides the user with feedback that the user has changed their representation, thereby providing improved visual feedback.

In some embodiments, the second event is a request (e.g., initiated by a user of the computer system or not initiated by the user of the computer system) received during the communication session to transition the communication session from a non-spatial communication session to a spatial communication session (e.g., from FIGS. 20D1 and/or 10D2 back to FIG. 10C). In some embodiments, the request is based via voice input, touch input, gestures, air gestures, gaze, and/or button activation. Switching from the spatial communication session to the non-spatial communication session when the user provides input (e.g., at the communication session control region) requesting the change provides the user with feedback that the input has been received, thereby providing improved visual feedback.

In some embodiments, while in a spatial communication session, the computer system (e.g., 700 and/or X700) displays, via the display generation component (e.g., 702 and/or X702), a self-view (e.g., 1019) of a representation (e.g., a 3D representation or a 2D representation) of the user of the computer system (e.g., 700 and/or X700) in a self-view window region (e.g., 1022). Displaying a self-view of the representation of the user provides the user with visual feedback about what the representation of the user looks like, thereby providing the user with improved visual feedback.

In some embodiments, the self-view window region (e.g., 1022) overlaps a window region that includes a representation of another participant of an ongoing communication session (e.g., in accordance with the communication session being between the user of the computer system and the other participant and no other participants). In some embodiments, the self-view window region is the same size as the window region that includes the representation of the other participant. Overlapping the self-view window region with a window region of a representation of another participant provides the user with feedback about which window region is a self-view window region and which window region is a representation of another participant, thereby providing improved visual feedback.

In some embodiments, the self-view window region (e.g., 1022) is smaller than a window region (e.g., 1020a-1020c) that includes a representation of another participant (e.g., in accordance with the communication session being between the user of the computer system and a plurality of other participants). In some embodiments, the self-view window region is smaller than window regions of one or more (or all) other participants of the communication session. Providing the self-view window region in a size that is different from a window region of a representation of another participant provides the user with feedback about which window region is a self-view window region and which window region is a representation of another participant, thereby providing improved visual feedback.

In some embodiments, during a spatial communication session (e.g., at FIGS. 10B and 10C), a first participant of the communication session is enabled to move a respective representation of the first participant and a second participant of the communication session is enabled to move a respective representation of the second participant (e.g., the participants can move their own representation relative to representations of other participants, and/or move in an extended reality environment). In some embodiments, during a spatial communication session, the user of the computer system cannot move respective representations of the participants.

In some embodiments, during a non-spatial communication session (e.g., at FIGS. 10D1 and/or 10D2), a user of the computer system is enabled to move respective window regions that include respective representations of the plurality of participants of the communication session (e.g., relative to window regions that include representations of other participants). In some embodiments, during a non-spatial communication session, participants of the communication session are not enabled to move their own respective representations (e.g., the participants do not have spatial agency, cannot move their own representation relative to representations of other participants, and/or cannot move in an extended reality environment). Enabling users to move about in an extended reality environment during a spatial communication session provides the user with feedback about the type of communication session, thereby providing improved feedback.

In some embodiments, the computer system (e.g., 700 and/or X700) detects (e.g., during a non-spatial communication session), via the one or more sensors, user input (e.g., via 1034 of FIG. 10D1 and/or X1034 of FIG. 10D2) to reposition a respective window region that includes a respective representation of a participant. In some embodiments, in response to detecting the user input to reposition the respective window region that includes the respective representation of the participant, the computer system repositions a plurality of (e.g., all of or less than all of) window regions of the plurality of participants. In some embodiments, during a non-spatial communication session, multiple (e.g., some or all) windows of (e.g., some or all) participants move together. Moving multiple window regions together enables all representations to remain grouped together and more easily viewable without the need for the user to move each window region independently, thereby reducing the number of inputs required.

In some embodiments, the respective representations of the participants are placed (e.g., in 2D space or in 3D space) in an initial placement (e.g., at the start of a spatial communication session or at the start of a non-spatial communication session) based on predetermined placement rules (e.g., at FIG. 10B and/or at FIGS. 10D1 and 10D2). In some embodiments, the initial placement is a first placement that is conducive to conversation, wherein in the first placement representations of participants are distributed across from each other, such as in a circular or semi-circular arrangement facing toward each other. In some embodiments, the initial placement is a second placement that is conducive to viewing shared content, wherein in the second placement representations of participants are distributed facing the same direction or location, such as in a linear or arc shaped arrangement facing toward the shared content. Automatically initially placing respective representations of users based on predetermined placement rules reduces the need for the user to provide input to place the users, thereby reducing the number of inputs required.

In some embodiments, the computer system (e.g., 700 and/or X700) displays, via the display generation component (e.g., 702 and/or X702), a representation (e.g., 1020c) of an invited user that is not currently a participant in the communication session (e.g., a placeholder). In some embodiments, accordance with a determination that the communication session is a non-spatial communication session (and/or that the representation of the invited user that is not currently a participant in the communication session is a non-spatial representation), the computer system enables a user of the computer system to reposition the representation of the invited user that is not currently a participant. In some embodiments, in accordance with a determination that the communication session is a spatial communication session (and/or that the representation of the invited user that is not currently a participant in the communication session is a spatial representation), the computer system forgoes enabling the user of the computer system to reposition the representation of the invited user that is not currently a participant. In some embodiments, while displaying the representation of the invited user that is not currently a participant in the communication session, receiving a request (e.g., via voice input, touch input, gestures, air gestures, gaze, and/or button activation) from the user of the computer system to reposition the representation of the invited user that is not currently a participant. In response to receiving the request from the user of the computer system to reposition the representation of the invited user that is not currently a participant: in accordance with a determination that the communication session is a non-spatial communication session (and/or that the representation of the invited user that is not currently a participant in the communication session is a non-spatial representation), repositioning the representation of the invited user that is not currently a participant, and in accordance with a determination that the communication session is a spatial communication session (and/or that the representation of the invited user that is not currently a participant in the communication session is a spatial representation), forgoing repositioning the representation of the invited user that is not currently a participant. Enabling a user of the computer system to move the representation of the invited user based on the type of communication session and/or the type of representation provides the user with feedback about the type of communication session and/or the type of representation, thereby providing improved visual feedback.

In some embodiments, in response to changing between a spatial communication (e.g., at FIG. 10C) and a non-spatial communication session (e.g., at FIGS. 10D1 and/or 10D2), the computer system (e.g., 700 and/or X700) displays, via the display generation component (e.g., 702 and/or X702), an indication (e.g., 1028, X1028, and/or 1018) that a mode of the communication session has changed. In some embodiments, the computer system indicates that the mode is changing to the spatial or non-spatial communication session. Displaying a notification when changing the communication session between spatial and non-spatial modes provides the user with visual feedback about the change, thereby providing improved visual feedback.

In some embodiments, aspects/operations of methods 800, 900, 1100, and/or 1300 may be interchanged, substituted, and/or added between these methods. For example, the home screen of FIG. 7B is the same home screen of FIG. 10A. For another example, the real-time communication session of FIG. 10C is the same as the real-time communication session of FIG. 12A. For brevity, these details are not repeated here.

FIGS. 12A-12F illustrate examples of providing information in live communication sessions. FIG. 13 is a flow diagram of an exemplary method 1300 for providing information in live communication sessions. The user interfaces in FIGS. 12A-12F are used to illustrate the processes described below, including the processes in FIG. 13.

FIGS. 12A-12F illustrate a device 700 having a display 702 (e.g., a tablet, a smart phone, or a laptop). While device 700 is illustrated as a handheld device, in some embodiments, device 700 is a head-mounted device (HMD). The HMD is configured to be worn on a head of a user of device 700 and includes display 702 on and/or in an interior portion of the HMD. Display 702 is visible to the user when device 700 is worn on the head of the user. For instance, in some embodiments, the HMD at least partially covers eyes of the user when worn on the head of the user, such that display 702 is positioned over and/or in front of the eyes of the user. In such embodiments, display 702 is configured to display an XR environment during a live communication session in which the user of the HMD is participating.

In FIG. 12A, device 700 is participating in an XR communication session with users represented by 3D representations 1220a-1220d and 2D representation 1230a in XR environment 1204. In some embodiments, because a threshold number of 3D representations (e.g., five) has not been exceeded, the XR communication session is a spatial communication session and users corresponding to 3D representations 1220a-1220d have spatial agency.

In some embodiments, device 700 displays self preview 1216 including a live view of representation 1218 in XR environment 1204. While self preview 1216 is shown as being located in a lower, righthand corner of display 702, it will be appreciated that self preview 1216 is optionally displayed at any location on display 702.

In some embodiments, while participating in an XR communication session, device 700 displays status indicator 1208, as shown in FIG. 12A. In some embodiments, status indicator 1208 indicates a state of the XR communication session. For example, status indicator 1208 indicates when a pending invitation remains for the XR communication session such that the user of device 700 is aware that one or more additional users could join the XR communication session. In some embodiments, status indicator 1208 is displayed with a first visual characteristic (e.g., is displayed using a particular color such as yellow or green) to indicate that one or more pending invitations remain. In some embodiments, status indicator 1208 indicates when device 700 is transmitting audio to participants of the XR communication session (e.g., using a microphone of device 700). In some embodiments, status indicator 1208 is displayed with a second visual characteristic (e.g., is displayed using a particular color such as orange or purple) to indicate an invitation for the XR communication session is currently pending.

While displaying XR environment 1204 during the XR communication session, device 700 detects selection of control bar 1240. In some embodiments, the selection of control bar is a press (e.g., tap gesture or tap and hold gesture) on control bar 1240. In some embodiments, the selection of control bar 1240 is detected based on a gaze 1205a of the user of device 700, as shown in FIG. 12A. Gaze indicators 1205a and 1205c, which indicate where the gaze of the user is directed, is illustrated for ease of understanding, and is not visually displayed as part of the user interfaces of device 700. In embodiments where device 700 is an HMD, device 700 is enabled to perform operations based on a gaze of the user. If for, example, device 700 determines that the user's gaze meets a first set of gaze criteria, control bar 1240 is selected (e.g., independent of other gestures, such as hand gestures, performed by the user). In some embodiments, the first set of gaze criteria is met when the user of device 700 looks at control bar 1240 (or a particular portion thereof) for a predetermined amount of time. As shown in FIG. 12B1, in response to selection of control bar 1240, device 700 displays information about one or more users in the XR communication session. In some embodiments, information displayed in this manner is displayed for a predetermined amount of time (e.g., 5 seconds or 10 seconds) and then ceases to be displayed.

In some embodiments, information displayed by device 700 includes names of one or more users in the XR communication session. As an example, device 700 displays information indicating that representation 1220a corresponds to a user "Jane", representation 1220b corresponds to a user "Ann", representation 1220d corresponds to a user "Jesse", and representation 1230a corresponds to a user "Calvin".

In some embodiments, information displayed by device 700 includes statuses of one or more users in the XR communication session. As an example, device 700 displays information indicating that the user corresponding to representation 1220a ("Jane") is currently away. In embodiments in which a device is an HMD, an away status can, optionally, indicate that a user is not wearing the device. As another example, device 700 displays information indicating that a device of user corresponding to representation 1220b ("Ann") is reconnecting to the XR communication session. As yet another example, device 700 displays information indicating that a user corresponding to representation 1220c is using a device associated with another user ("John"). In some embodiments, a 3D representation corresponding to a guest user differs from the 3D representation of the user associated with a user (e.g., owner) of the device.

While description is made herein with respect to displaying information in response to selection of control bar 1240, in some embodiments, selection of a representation (e.g., via a tap input or gaze) causes device 700 to display information for the user corresponding to the representation.

Figure 12C:
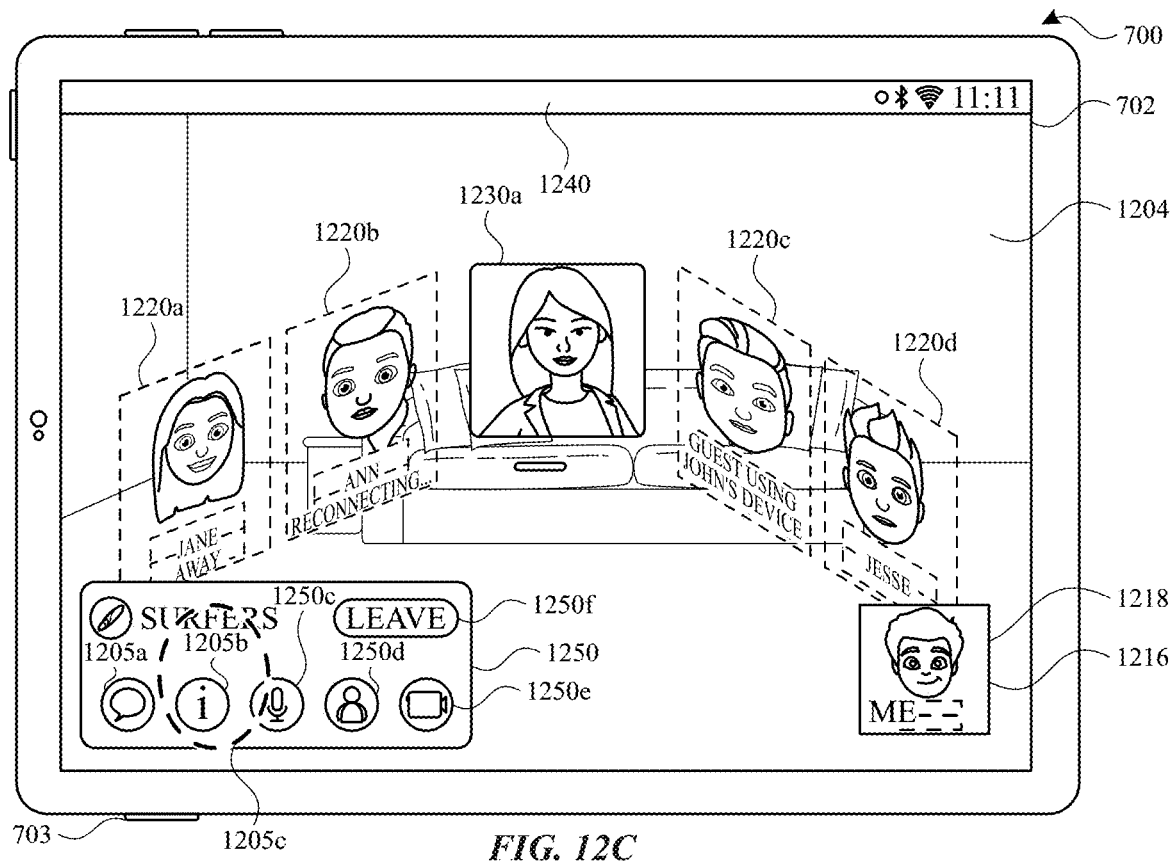

While displaying XR environment 1204 during the XR communication session, device 700 determines whether the detected selection of control bar 1240 persists for a threshold amount of time. In embodiments in which the selection of control bar 1240 is a press (e.g., tap gesture or tap and hold gesture) on control bar 1240, device 700 determines whether the press persists for the threshold amount of time. In embodiments in which the selection of control bar 1240 is based on gaze 1205a, device 700 determines whether the user's gaze 1205a meets a second set of gaze criteria. In some embodiments, the second set of gaze criteria is met when the user of device 700 continues to look at control bar 1240 (or a particular portion thereof) for a threshold amount of time. As shown in FIG. 12C, in response to device 700 determining that selection of control bar 1240 persists for the threshold amount of time, device 700 displays set of controls 1250. In some embodiments, one or more options 1250a-1250f of the set of controls correspond to options 704Aa-740Af of the set of controls 704A (FIG. 7P), respectively. Thus, when device 700 detects the user's gaze directed at control bar 1240 for a first amount of time, information about one or more participants is displayed, as illustrated in FIG. 12B1, and when device 700 detects the user's gaze is directed at control bar 1240 for a second amount of time (longer than the first amount of time), set of controls 1250 is displayed, as illustrated in FIG. 12C.

In some embodiments, the techniques and user interface(s) described in FIG. 12B1 are provided by one or more of the devices described in FIGS. 1A-1P. FIG. 12B2 illustrates an embodiment in which information about one or more users in an XR communication session (e.g., as described in FIG. 12B1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

While displaying XR environment X1204 during the XR communication session, HMD X700 detects selection of control bar X1240. In some embodiments, the selection of control bar is detected based on a gaze X1205a of the user of HMD X700. Gaze indicator X1205a, which indicate where the gaze of the user is directed, is illustrated for ease of understanding, and is not visually displayed as part of the user interfaces of HMD X700. In embodiments, HMD X700 is enabled to perform operations based on a gaze of the user. If for, example, HMD X700 determines that the user's gaze meets a first set of gaze criteria, control bar X1240 is selected (e.g., independent of other gestures, such as hand gestures, performed by the user). In some embodiments, the first set of gaze criteria is met when the user of HMD X700 looks at control bar X1240 (or a particular portion thereof) for a predetermined amount of time. As shown in FIG. 12B2, in response to selection of control bar X1240, HMD X700 displays information about one or more users in the XR communication session. In some embodiments, information displayed in this manner is displayed for a predetermined amount of time (e.g., 5 seconds or 10 seconds) and then ceases to be displayed.

In some embodiments, information displayed by HMD X700 includes names of one or more users in the XR communication session. As an example, HMD X700 displays information indicating that representation X1220a corresponds to a user "Jane", representation X1220b corresponds to a user "Ann", representation X1220d corresponds to a user "Jesse", and representation X1230a corresponds to a user "Calvin".

In some embodiments, information displayed by HMD X700 includes statuses of one or more users in the XR communication session. As an example, HMD X700 displays information indicating that the user corresponding to representation X1220a ("Jane") is currently away. In embodiments, an away status can, optionally, indicate that a user is not wearing an HMD. As another example, HMD X700 displays information indicating that a device of user corresponding to representation X1220b ("Ann") is reconnecting to the XR communication session. As yet another example, HMD X700 displays information indicating that a user corresponding to representation X1220c is using a device associated with another user ("John"). In some embodiments, a 3D representation corresponding to a guest user differs from the 3D representation of the user associated with a user (e.g., owner) of the device.

While description is made herein with respect to displaying information in response to selection of control bar X1240, in some embodiments, selection of a representation (e.g., via a tap input or gaze) causes HMD X700 to display information for the user corresponding to the representation.

While displaying XR environment X1204 during the XR communication session, HMD X700 determines whether the detected selection of control bar X1240 persists for a threshold amount of time. In some embodiments, HMD X700 determines whether the user's gaze, as indicated by gaze indicator X1205a, meets a second set of gaze criteria. In some embodiments, the second set of gaze criteria is met when the user of HMD X700 continues to look at control bar X1240 (or a particular portion thereof) for a threshold amount of time. In some embodiments, in response to HMD X700 determining that selection of control bar X1240 persists for the threshold amount of time, HMD X700 displays set of controls 1250, as shown in FIG. 12C. In some embodiments, one or more options 1250a-1250f of the set of controls correspond to options 704Aa-740Af of the set of controls 704A (FIG. 7P), respectively. Thus, when HMD X700 detects the user's gaze directed at control bar X1240 for a first amount of time, information about one or more participants is displayed, as illustrated in FIG. 12B2, and when HMD X700 detects the user's gaze is directed at control bar X1240 for a second amount of time (longer than the first amount of time), set of controls 1250 can be displayed, as illustrated in FIG. 12C.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 12D:
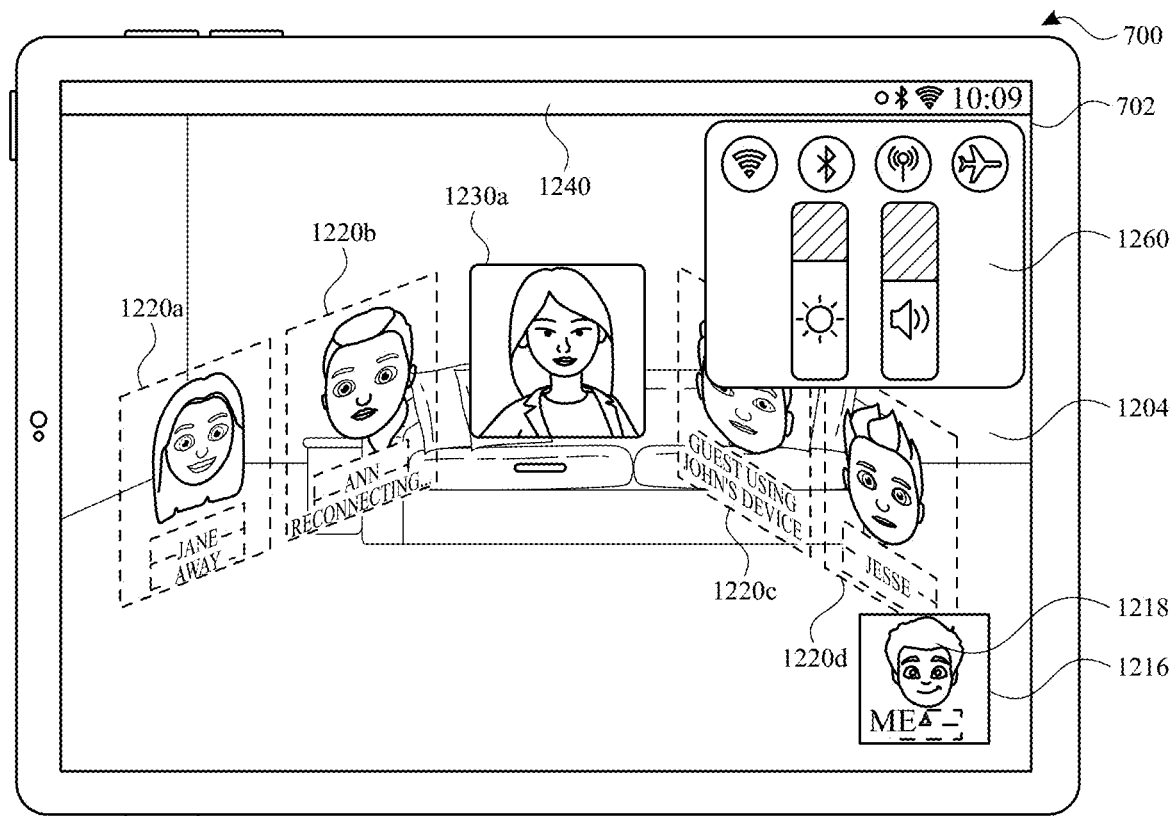

While displaying set of controls 1250, device 700 detects selection of the set of controls 1250. In some embodiments, the selection of control bar is a tap gesture on controls 1250. In some embodiments, the selection of the set of controls 1250 is detected based on a gaze 1205c of the user of device 700. If, for example, device 700 detects the user of device 700 looking at set of controls 1250 (or a particular portion thereof) for a threshold amount of time, set of controls 1250 is selected. As shown in FIG. 12D, in response to the selection of set of controls 1250, device 700 displays a set of system controls 1260 for managing various aspects of device 700 including but not limited to networking, volume, and display brightness, as illustrated in FIG. 12D.

Figure 12E:
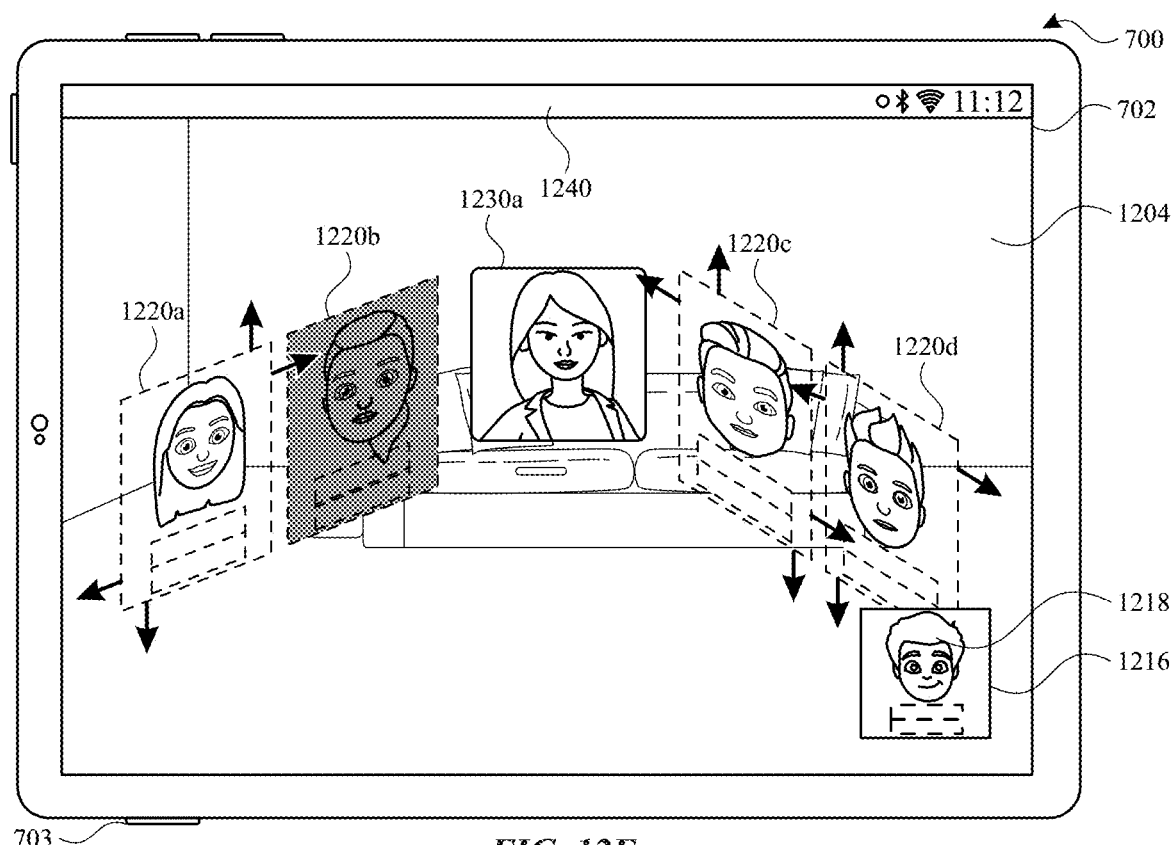

In some embodiments, device 700 indicates which users, if any, are experiencing connection disruptions during an XR communication session. In FIG. 12E, for example, a visual characteristic of representation 1220b is modified (e.g., "greyed out" or otherwise darkened) indicating that the device of the user ("Ann") corresponding to representation 1220b has poor and/or intermittent connectivity with one or more other devices participating in the XR communication session. In some embodiments, representations of users experiencing connection disruptions have limited or no spatial agency until such disruptions have been resolved.

Figure 12F:
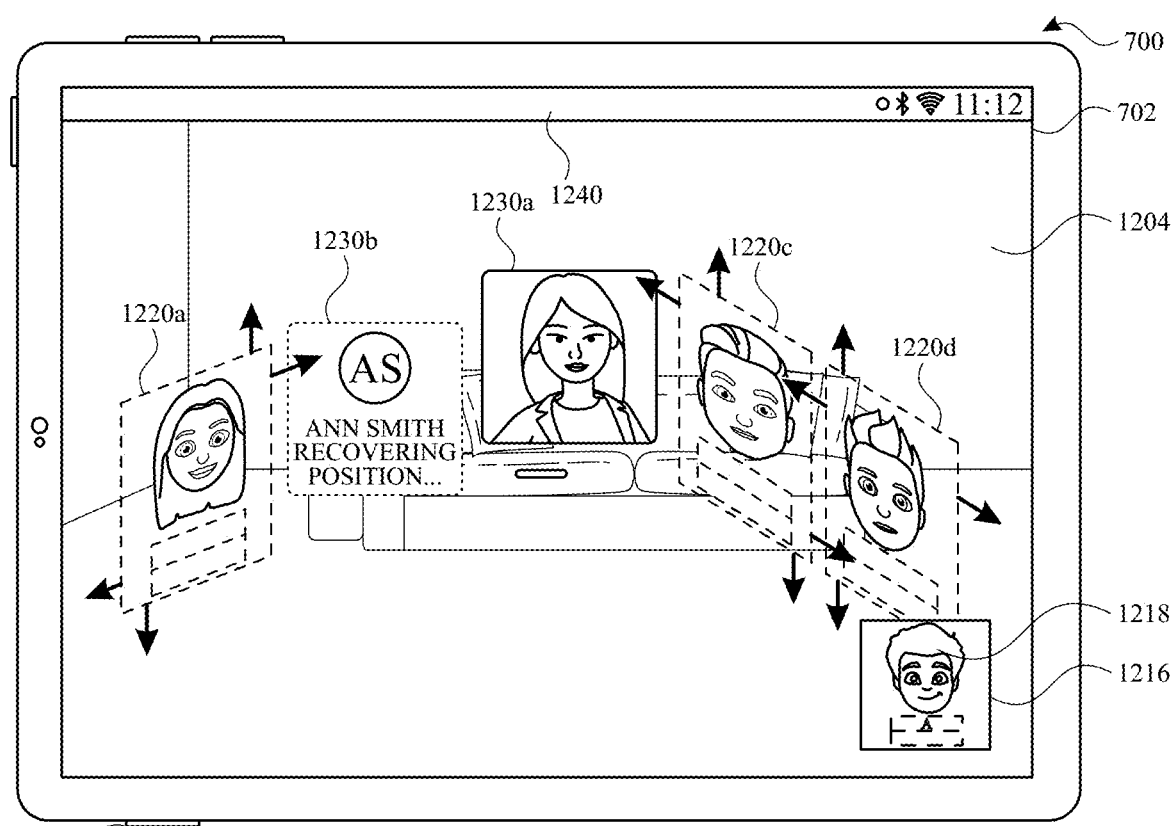

In some embodiments, if connectivity worsens such that a threshold connection quality (e.g., as determined by latency, bandwidth, loss and/or throughput) is not met, a 3D representation corresponding to the device experiencing connectivity issues is removed from XR environment 1204 and optionally, replaced by a 2D representation. In some embodiments, this indicates that devices participating in the XR communication session are attempting to establish an adequate connection with the device of the user (e.g., "recovering position"), and optionally, serving as a placeholder until a connection is reestablished. In FIG. 12F, for example, 3D representation 1220b is replaced by 2D representation 1230b indicating that connectivity for the user corresponding to the 3D representation 1220b has worsened such that the threshold connection quality is not met.

Additional descriptions regarding FIGS. 12A-12F are provided below in reference to method 1300 described with respect to FIGS. 12A-12F.

FIG. 13 is a flow diagram of an exemplary method 1300 for providing information in live communication sessions, in accordance with some embodiments. In some embodiments, method 1300 is performed at a computer system (e.g., computer system 101 in FIG. 1A, computer system 700, and/or HMD X700) (e.g., a smartphone, tablet, and/or head-mounted device) that is in communication with a display generation component (e.g., display generation component 120 in FIGS. 1A, 3, and 4, display 702, and/or display X702) (e.g., a visual output device, a 3D display, a display having at least a portion that is transparent or translucent on which images can be projected (e.g., a see-through display), a projector, a heads-up display, and/or a display controller) and one or more sensors (e.g., a touch-sensitive surface, a gyroscope, an accelerometer, a motion sensor, a movement sensor, a microphone, an infrared sensor, a camera sensor, a depth camera, a visible light camera, an eye-tracking sensor, a gaze-tracking sensor, a physiological sensor, and/or an image sensor). In some embodiments, the method 1300 is governed by instructions that are stored in a non-transitory (or transitory) computer-readable storage medium and that are executed by one or more processors 202 of a computer system, such as the one or more processors 202 of computer system 101 (e.g., control 110 in FIG. 1A). Some operations in method 1300 are, optionally, combined and/or the order of some operations is, optionally, changed.

While in a communication session (e.g., as in FIGS. 12A-12F) (e.g., a spatial communication session, a non-spatial communication session, a video communication session, and/or an audio communication session) with one or more participants (e.g., one user, two users, or 5 users) in the communication session, the computer system (e.g., 700 and/or X700) detects (1302), via the one or more sensors, gaze input (e.g., 1205a and/or X1205a) (e.g., a gaze input directed to a predetermined area, a gaze input directed to an area or a displayed object, and/or a gaze input away from an area or a displayed object) of a user of the computer system (e.g., 700 and/or X700).

In response to detecting the gaze input (e.g., 1205a and/or X1205a) and in accordance with a determination that the gaze input (e.g., 1205a and/or X1205a) meets a set of one or more gaze criteria, the computer system displays (1306), via the display generation component (e.g., 702 and/or X702), information (e.g., names of participants, as in FIGS. 12B1 and/or 12B2) about a first participant in the communication session.

In response to detecting the gaze input (e.g., 1205a and/or X1205a) and in accordance with a determination that the gaze input does not meet the set of one or more gaze criteria, the computer system forgoes display (1308) of the information about the first participant in the communication session. Displaying information about the first participant in response to detecting the gaze input provides the user with feedback about the first participant, thereby providing improved visual feedback.

In some embodiments, the set of one or more gaze criteria includes a first location criterion that is met when the gaze input (e.g., 1205a and/or X1205a) is directed to a location corresponding to the first participant. In some embodiments, the gaze is directed to a location corresponding to one of the participants in order for the set of one or more gaze criteria to be met. In some embodiments, information is displayed for a respective participant when the gaze is directed to a location corresponding to the respective participant. In some embodiments, the first location criterion is met for a first participant (and not a second participant) when the gaze is directed to the first participant. In some embodiments, a second set of one or more gaze criteria includes a third location criterion that is met when the gaze input is directed to the second participant. In some embodiments, in response to detecting the gaze input: in accordance with a determination that the gaze input meets the second set of one or more gaze criteria, displaying, via the display generation component, information about the second participant in the communication session (e.g., without displaying information about the first participant); and in accordance with a determination that the gaze input does not meet the second set of one or more gaze criteria, forgoing display of the information about the second participant in the communication session. Displaying information about the first participant in response to detecting the gaze input directed to the location of the first participant provides the user with feedback about the first participant, thereby providing improved visual feedback.

In some embodiments, in response to detecting the gaze input (e.g., 1205a and/or X1205a) and in accordance with a determination that the gaze input (e.g., 1205a and/or X1205a) meets the set of one or more gaze criteria, the computer system (e.g., 700 and/or X700) displays information (e.g., names of participants, as in FIGS. 12B1 and/or 12B2) about a second participant (e.g., 1220b and/or X1220b) in the communication session that is different from the first participant (e.g., 1220a and/or X1220a). In some embodiments, the computer system displays information about the participant being gazed at without displaying information about other participants. Displaying information about the first participant in response to detecting the gaze input directed to the location of the first participant, without providing information about other participants, provides the user with feedback about which participant the user is looking at, thereby providing improved visual feedback.

In some embodiments, the set of one or more gaze criteria includes a second location criterion that is met when the gaze input is directed to a location (e.g., 1240 and/or X1240) that does not correspond to the first participant (e.g., 1220*a* and/or X1220*a*) (e.g., a location that is away from representations of participants). Displaying information about the first participant in response to detecting the gaze input directed to a location that does not correspond to the first participant provides the user with feedback about the first participant without requiring the user to look at the first participant, thereby providing improved visual feedback.

In some embodiments, the location that does not correspond to the first participant is a location of a system user interface element (e.g., 1240 and/or X1240). In some embodiments, the second location criterion is met when the gaze input is directed to the system user interface element (e.g., and if the gaze input is not directed to the system user interface element, the second location criteria is not met). Displaying information about the first participant in response to detecting the gaze input directed to a system user interface element provides the user with feedback about the first participant without requiring the user to look at the first participant, thereby providing improved visual feedback.

In some embodiments, in response to detecting the gaze input (e.g., 1205*a* and/or X1205*a*) and in accordance with a determination that the gaze input (e.g., 1205*a* and/or X1205*a*) meets a second set of one or more gaze criteria, the computer system (e.g., 700 and/or X700) displays, via the display generation component (e.g., 702 and/or X702), controls (e.g., 1250*a*-12500 for the communication session. In some embodiments, the second set of one or more gaze criteria includes the set of one or more gaze criteria and includes a duration criterion that is met when the gaze input (e.g., 1205*a* and/or X1205*a*) continues to be directed to the location of the system user interface element (e.g., 1240 and/or X1240) for a predefined duration of time (e.g., after the set of one or more gaze criteria has been met). In some embodiments, the computer system detects the user gazing at the location of the system user interface element and displays information about the first participant, then as the user continues to gaze at the location of the system user interface element, the computer system displays controls for the communication session. Displaying controls for the communication session based on the user continuing to gaze at the system user interface element provides the user with easy access to the controls and provides the user with feedback that the gaze is being detected.

In some embodiments, in response to detecting the gaze input (e.g., 1205*a* and/or X1205*a*) and in accordance with a determination that the gaze input (e.g., 1205*a* and/or X1205*a*) meets a third set of one or more gaze criteria, the computer system (e.g., 700 and/or X700) displays, via the display generation component (e.g., 702 and/or X702), system controls (e.g., 1260) for the computer system (e.g., that do not correspond to controls for the communication session). In some embodiments, the third set of one or more gaze criteria includes the set of one or more gaze criteria and includes a second duration criterion that is met when the gaze input continues to be directed to the location of the system user interface element (e.g., 1240 and/or X1240) for a second predefined duration of time (e.g., after the set of one or more gaze criteria has been met). In some embodiments, the computer system detects the user gazing at the location of the system user interface element and displays information about the first participant, then as the user continues to gaze at the location of the system user interface element, the computer system displays the system controls (e.g., enable/disable Wi-Fi, enable/disable Bluetooth, change system volume, and/or turn on/off airplane mode). In some embodiments, in response to detecting the gaze input and in accordance with a determination that the gaze input does not meet the third set of one or more gaze criteria, forgoing display of system controls for the computer system. Displaying system controls based on the user continuing to gaze at the system user interface element provides the user with easy access to the controls and provides the user with feedback that the gaze is being detected.

In some embodiments, the system user interface element (e.g., 1240 and/or X1240) indicates (e.g., via 1208) a state (e.g., connecting, active, paused, audio muted, and/or microphone muted) of the communication session. Providing an indication of the state of the communication session provides the user with improved visual feedback about the state of the communication session.

In some embodiments, a color of the system user interface element (e.g., 1240 and/or X1240) indicates the state of the communication session (e.g., green for open invitation to communication session and/or orange for open audio channel). Using different colors for different states for the communication session provides the user with improved visual feedback about the state of the communication session.

In some embodiments, subsequent to displaying the information (e.g., names as in FIGS. 12B1 and/or 12B2) about the first participant in the communication session, the computer system automatically ceases to display the information about the first participant in the communication session (e.g., as in FIG. 12E). In some embodiments, the information about the participants is displayed temporarily (e.g., the information fades out after a predetermination period of time). Temporarily displaying the information about the first participant provides the user with feedback about the first participant without continuing to take up display space, thereby providing the user with improved visual feedback.

In some embodiments, in response to detecting the gaze input (e.g., 1205*a* and/or X1205*a*) and in accordance with a determination that the gaze input (e.g., 1205*a* and/or X1205*a*) meets the set of one or more gaze criteria, the computer system (e.g., 700 and/or X700) displays, via the display generation component (e.g., 702 and/or X702), information (e.g., name information) about a second participant (e.g., 1220*b* and/or X1220*b*) in the communication session that is different from the first participant in the communication session. In some embodiments, the computer system displays information about a plurality of participants of the communication session. In some embodiments, the computer system displays information about all participants of the communication session.

In some embodiments, in response to detecting the gaze input (e.g., 1205*a* and/or X1205*a*) and in accordance with a determination that the gaze input (e.g., 1205*a* and/or X1205*a*) does not meet the set of one or more gaze criteria, the computer system (e.g., 700 and/or X700) forgoes display of the information about the second participant in the communication session. Displaying information about multiple participants provides the user with additional information about the participants of the communication session, thereby providing improved visual feedback.

In some embodiments, the information about the first participant includes a name of the first participant (e.g., as in FIGS. 12B1 and/or 12B2). In some embodiments, the information includes respective names for a plurality of (e.g., all of) the participants of the communication session. Displaying names of participants provides the user with information about the participants of the communication session, thereby providing improved visual feedback.

In some embodiments, the information about the first participant is displayed near (e.g., adjacent to or overlapping) a representation (e.g., an avatar) of the first participant (e.g., as in FIGS. 12B1 and/or 12B2). In some embodiments, information about a respective participant is displayed near (e.g., adjacent to or overlapping) a respective representation of the respective participant. Displaying the information about the participants of the communication session near the representations of the participants provides the user with feedback about what information corresponds to what participant, thereby providing improved visual feedback.

In some embodiments, the information about the first participant includes a connection status (e.g., connected, connecting, or not connected) of the first participant (e.g., "reconnecting" as in FIG. 12C). In some embodiments, the information includes connection statuses for a plurality of (e.g., all of) the participants of the communication session. Displaying connection status of participants provides the user with information about the participants of the communication session, thereby providing improved visual feedback.

In some embodiments, the information about the first participant includes an availability status (e.g., as in "away" in FIG. 12C) (e.g., away, in a meeting, and/or available) of the first participant. In some embodiments, the information includes availability statuses for a plurality of (e.g., all of) the participants of the communication session. Displaying availability status and/or away status of participants provides the user with information about the participants of the communication session, thereby providing improved visual feedback.

In some embodiments, an availability status (e.g., as in "away" in FIG. 12C) of a respective participant (e.g., 1220a and/or X1220a) is based on whether the respective participant is wearing an electronic device. In some embodiments, the status of a user that ceases to wear the electronic device being used to join the communication session is automatically changed to away. Displaying availability status and/or away status of participants based on the respective participants wearing (r not wearing) an electronic device provides the user with information about the participants of the communication session, thereby providing improved visual feedback.

In some embodiments, the information about the first participant includes a microphone status (e.g., muted or not muted) of the first participant. In some embodiments, the information includes microphone statuses for a plurality of (e.g., all of) the participants of the communication session. Displaying audio information and/or microphone status of participants provides the user with information about the participants of the communication session, thereby providing improved visual feedback.

In some embodiments, the information about the first participant includes an indication of whether the first participant is a guest (e.g., as in "Guest" in FIG. 12D). In some embodiments, the information includes indications of whether a plurality of (e.g., all of) the participants of the communication session are guests. In some embodiments, an un-registered user is using an electronic device to participant in the communication session is identified as a guest. In some embodiments, a user that has not logged into an account of the device that is participating in the communication session is identified as a guest. Displaying whether a participant is a guest (or not) provides the user with information about the participants of the communication session, thereby providing improved visual feedback.

In some embodiments, the information about the first participant includes an identifier (e.g., a name of the device being used for the communication session or an owner of the device) associated with a device of the first participant (e.g., as in "Using John's device" in FIG. 12D) (e.g., when the first participant is a guest or regardless of whether the first participant is a guest). In some embodiments, the information includes identifiers associated with respective devices of a plurality of participants (e.g., that are guests). Displaying an identifier associate with the device (e.g., computer system and/or smart phone) of the respective participants provides the user with information about the participants of the communication session, thereby providing improved visual feedback.

In some embodiments, while in the communication session (e.g., a spatial communication session, a non-spatial communication session, a video communication session, and/or an audio communication session) with the one or more participants (e.g., one user, two users, or 5 users) in the communication session and in accordance with a determination that the first participant is the owner of a device (and/or is logged into the device) being used to connect to the communication session, the computer system (e.g., 700 and/or X700) displays a first representation of the first participant. In some embodiments, while in the communication session (e.g., a spatial communication session, a non-spatial communication session, a video communication session, and/or an audio communication session) with the one or more participants (e.g., one user, two users, or 5 users) in the communication session and in accordance with a determination that the first participant is not the owner of the device (and/or is not logged into the device) being used to connect to the communication session, the computer system (e.g., 700 and/or X700) displays a second representation of the first participant. In some embodiments, guest participants are represented with an avatar that is different from an avatar of the owner of the device that the guest participant is using to participate in the communication session. Displaying different avatars for participants based on whether they are a guest user or owner of the device used to connect to the communication session provides the user with information about the participants of the communication session, thereby providing improved visual feedback.

In some embodiments, the second representation is a default or placeholder avatar that has not been customized to include facial features of the first participant (that is a guest participant). In some embodiments, the first representation is an avatar that has been customized to include facial features of the first participant (that is the owner of the device). Displaying a default or placeholder avatar for guest participants provides the user with information about the participants of the communication session, thereby providing improved visual feedback.

In some embodiments, the computer system (e.g., 700 and/or X700) detects a change in state of a second participant in the communication session. In some embodiments, in response to detecting the change in the state (e.g., away, available, connecting, and/or in a meeting) of the second participant, the computer system (e.g., 700 and/or X700) displays, via the display generation component (e.g., 702 and/or X702), information about (e.g., an indication of the state of, a name of, and/or a connection status of) the second participant (e.g., as in "Ann Smith" in FIG. 12F). Automatically displaying information about the second participant provides the user with information about the participants of the communication session without requiring the user to provide input, thereby providing improved visual feedback and reducing the number of inputs required.

In some embodiments, in response to detecting the gaze input and in accordance with a determination that the gaze input meets a set of one or more gaze criteria, the computer system (e.g., 700 and/or X700) displays, via the display generation component (e.g., 702 and/or X702), respective information (e.g., names of participants as in FIG. 12C) about a plurality of respective participants of the one or more participants in the communication session. In some embodiments, in response to detecting the change in the state of the second participant, the computer system (e.g., 700 and/or X700) forgoes displaying, via the display generation component, information about a third participant that is different from the second participant. In some embodiments, when the computer system detects a gaze input that meets the set of one or more gaze criteria, the computer system displays information about each of the participants in the communication session. In some embodiments, when the computer system detects a change in the state of a particular participant, the computer system displays information about that particular participant without displaying information about participants that did not have a state change. Displaying information about multiple participants based on gaze input and displaying information about a particular participant based on a state change provides the user with information about the participants and indicates to the user that that gaze was detected and/or that the state of the particular participant changed.

In some embodiments, in response to detecting that tracking has been lost for a respective participant in the communication session (e.g., as in for 1220*b* in FIG. 12E), the computer displays an indication (e.g., as in "recovering position" in FIG. 12F) that tracking has been lost for the respective participant. In some embodiments, the indication that tracking has been lost for the respective participant includes displaying a representation of the respective participant as a low fidelity avatar (e.g., as compared to participants that have not lost tracking), a placeholder/default avatar (e.g., monogram avatar), and/or a colored shape (e.g., square or circle). In some embodiments, in response to detecting that tracking has been lost for a respective participant in the communication session: in accordance with a determination that the respective participant is a first participant, displaying an indication that tracking has been lost for the first participant (e.g., without displaying that tracking has been lost for a second participant), and in accordance with a determination that the respective participant is a second participant, displaying an indication that tracking has been lost for the second participant (e.g., without displaying that tracking has been lost for the first participant). Displaying an indication that tracking has been lost for a participant of the communication session provides the user with visual feedback about the state of the participants, thereby providing improved visual feedback.

In some embodiments, aspects/operations of methods 800, 900, 1100, and/or 1300 may be interchanged, substituted, and/or added between these methods. For example, the home screen of FIG. 7B is the same home screen of FIG. 10A. For another example, the real-time communication session of FIG. 10C is the same as the real-time communication session of FIG. 12A. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve management of live communication sessions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve management of live communication sessions. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Account-ability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of live communication sessions, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a live communication session can be provided based on non-personal information data or a bare minimum amount of personal information, such as the content being requested by the device associated with a user, other non-personal information available to the service, or publicly available information.

What is claimed is:

1. A computer system configured to communicate with a display generation component, the computer system comprising:
one or more processors; and
memory storing one or more programs configured to be executed by the one or more processors, the one or more programs including instructions for:
while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying:
the representations of the plurality of participants spaced apart from each other and a user of the computer system by at least a threshold amount in a first non-vertical direction in the 3D environment; and
the representations of the plurality of participants spaced apart from each other and the user by at least the threshold amount in a second non-vertical direction that is different from the first non-vertical direction;
while displaying the representations of the plurality of participants distributed in the 3D environment, detecting an event; and
in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement:
the representations of the plurality of participants are spaced apart from each other by less than the threshold amount in the first non-vertical direction in the 3D environment;
a representation of a first participant in the grouped arrangement has a different position than a representation of the first participant in the spatially distributed arrangement; and
a representation of a second participant in the grouped arrangement has a different position than a representation of the second participant in the spatially distributed arrangement.

2. The computer system of claim 1, wherein:
in the non-spatial communication session:
a representation of a first participant of the plurality of participants is in a first window region, and
a representation of a second participant of the plurality of participants is in a second window region that is different from the first window region; and
in the spatial communication session:
a representation of the first participant of the plurality of participants is not in a window region, and
a representation of the second participant of the plurality of participants is not in a window region.

3. The computer system of claim 2, wherein the representation of the first participant is a simulated three-dimensional representation and the representation of the second participant is a two-dimensional representation.

4. The computer system of claim 2, wherein the plurality of participants are two-dimensional representations.

5. The computer system of claim 2, wherein the plurality of participants are three-dimensional representations.

6. The computer system of claim 1, wherein the event is a request received during the communication session to transition a representation of the user of the computer system from a 3D representation to a 2D representation.

7. The computer system of claim 6, wherein the request is based on an input in a communication session control region.

8. The computer system of claim 7, wherein the communication session control region includes an option to transition the representation of the user of the computer system from the 3D representation to the 2D representation and one or more options corresponding to other communication session controls.

9. The computer system of claim 1, wherein the event is a request received during the communication session to transition the communication session from the spatial communication session to the non-spatial communication session.

10. The computer system of claim 1, wherein the event is an additional participant joining the communication session.

11. The computer system of claim 10, wherein the additional participant joining the communication session causes a number of participants represented by simulated three-dimensional representations to exceed a threshold number of participants.

12. The computer system of claim 1, the one or more programs further including instructions for:
    while the communication session is a non-spatial communication session, shifting a position of a respective window region corresponding to a respective participant based on the respective participant moving.

13. The computer system of claim 12, wherein the respective window region moves forward and/or backward in a virtual environment based on a head position of respective participant.

14. The computer system of claim 12, wherein the respective window region tilts based on a head position of respective participant.

15. The computer system of claim 12, wherein a first window shifts in a first direction based on movement of a participant displayed in the first window and a second window shifts in a second direction, different from the first direction, based on movement of a participant displayed in the second window.

16. The computer system of claim 1, the one or more programs further including instructions for:
    while participating in the communication session that is a non-spatial communication session, detecting a second event; and
    in response to detecting the second event, transitioning the communication session from the non-spatial communication session to the spatial communication session.

17. The computer system of claim 16, wherein the second event is a participant leaving the communication session.

18. The computer system of claim 16, wherein the second event is a request received during the communication session to transition a representation of the user of the computer system from a 2D representation to a 3D representation.

19. The computer system of claim 16, wherein the second event is a request received during the communication session to transition the communication session from a non-spatial communication session to a spatial communication session.

20. The computer system of claim 1, the one or more programs further including instructions for:
    while in a spatial communication session, displaying, via the display generation component, a self-view of a representation of the user of the computer system in a self-view window region.

21. The computer system of claim 20, wherein the self-view window region overlaps a window region that includes a representation of another participant of an ongoing communication session.

22. The computer system of claim 20, wherein the self-view window region is smaller than a window region that includes a representation of another participant.

23. The computer system of claim 1, wherein:
    during a spatial communication session, a first participant of the communication session is enabled to move a respective representation of the first participant and a second participant of the communication session is enabled to move a respective representation of the second participant; and
    during a non-spatial communication session, a user of the computer system is enabled to move respective window regions that include respective representations of the plurality of participants of the communication session.

24. The computer system of claim 23, wherein the computer system is configured to communicate with one or more sensors, the one or more programs further including instructions for:
    detecting, via the one or more sensors, user input to reposition a respective window region that includes a respective representation of a participant; and
    in response to detecting the user input to reposition the respective window region that includes the respective representation of the participant, repositioning a plurality of window regions of the plurality of participants.

25. The computer system of claim 23, wherein the respective representations of the plurality of participants are placed in an initial placement based on predetermined placement rules.

26. The computer system of claim 23, the one or more programs further including instructions for:
    displaying, via the display generation component, a representation of an invited user that is not currently a participant in the communication session;
    in accordance with a determination that the communication session is a non-spatial communication session, enabling a user of the computer system to reposition the representation of the invited user that is not currently a participant; and
    in accordance with a determination that the communication session is a spatial communication session, forgoing enabling the user of the computer system to reposition the representation of the invited user that is not currently a participant.

27. The computer system of claim 1, the one or more programs further including instructions for:
    in response to changing between a spatial communication and a non-spatial communication session, displaying, via the display generation component, an indication that a mode of the communication session has changed.

28. A non-transitory computer-readable storage medium storing one or more programs configured to be executed by one or more processors of a computer system that is in communication with a display generation component, the one or more programs including instructions for:
    while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying:
        the representations of the plurality of participants spaced apart from each other and a user of the computer system by at least a threshold amount in a first non-vertical direction in the 3D environment; and
        the representations of the plurality of participants spaced apart from each other and the user by at least the threshold amount in a second non-vertical direction that is different from the first non-vertical direction;
while displaying the representations of the plurality of participants distributed in the 3D environment, detecting an event; and
in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement:
the representations of the plurality of participants are spaced apart from each other by less than the threshold amount in the first non-vertical direction in the 3D environment;
a representation of a first participant in the grouped arrangement has a different position than a representation of the first participant in the spatially distributed arrangement; and
a representation of a second participant in the grouped arrangement has a different position than a representation of the second participant in the spatially distributed arrangement.

29. A method, comprising:
at a computer system that is in communication with a display generation component:
while participating in a communication session that is a spatial communication session that includes displaying, via the display generation component, representations of a plurality of participants in the communication session in a spatially distributed arrangement in a 3D environment, wherein displaying the plurality of participants in the spatially distributed arrangement includes displaying:
the representations of the plurality of participants spaced apart from each other and a user of the computer system by at least a threshold amount in a first non-vertical direction in the 3D environment; and
the representations of the plurality of participants spaced apart from each other and the user by at least the threshold amount in a second non-vertical direction that is different from the first non-vertical direction;
while displaying the representations of the plurality of participants distributed in the 3D environment, detecting an event; and
in response to detecting the event, transitioning the communication session from the spatial communication session to a non-spatial communication session that includes displaying, via the display generation component, representations of at least a subset of the plurality of participants of the communication session in a grouped arrangement, wherein in the grouped arrangement:
the representations of the plurality of participants are spaced apart from each other by less than the threshold amount in the first non-vertical direction in the 3D environment;
a representation of a first participant in the grouped arrangement has a different position than a representation of the first participant in the spatially distributed arrangement; and
a representation of a second participant in the grouped arrangement has a different position than a representation of the second participant in the spatially distributed arrangement.

30. The non-transitory computer-readable storage medium of claim 28, wherein:
in the non-spatial communication session:
a representation of a first participant of the plurality of participants is in a first window region, and
a representation of a second participant of the plurality of participants is in a second window region that is different from the first window region; and
in the spatial communication session:
a representation of the first participant of the plurality of participants is not in a window region, and
a representation of the second participant of the plurality of participants is not in a window region.

31. The non-transitory computer-readable storage medium of claim 28, wherein the event is a request received during the communication session to transition a representation of the user of the computer system from a 3D representation to a 2D representation.

32. The non-transitory computer-readable storage medium of claim 28, wherein the event is a request received during the communication session to transition the communication session from the spatial communication session to the non-spatial communication session.

33. The non-transitory computer-readable storage medium of claim 28, wherein the event is an additional participant joining the communication session.

34. The non-transitory computer-readable storage medium of claim 28, the one or more programs further including instructions for:
while the communication session is a non-spatial communication session, shifting a position of a respective window region corresponding to a respective participant based on the respective participant moving.

35. The non-transitory computer-readable storage medium of claim 28, the one or more programs further including instructions for:
while participating in the communication session that is a non-spatial communication session, detecting a second event; and
in response to detecting the second event, transitioning the communication session from the non-spatial communication session to the spatial communication session.

36. The non-transitory computer-readable storage medium of claim 28, the one or more programs further including instructions for:
while in a spatial communication session, displaying, via the display generation component, a self-view of a representation of the user of the computer system in a self-view window region.

37. The non-transitory computer-readable storage medium of claim 28, wherein:
during a spatial communication session, a first participant of the communication session is enabled to move a respective representation of the first participant and a second participant of the communication session is enabled to move a respective representation of the second participant; and
during a non-spatial communication session, a user of the computer system is enabled to move respective window regions that include respective representations of the plurality of participants of the communication session.

38. The non-transitory computer-readable storage medium of claim 28, the one or more programs further including instructions for:
  in response to changing between a spatial communication and a non-spatial communication session, displaying, via the display generation component, an indication that a mode of the communication session has changed.

39. The method of claim 29, wherein:
  in the non-spatial communication session:
    a representation of a first participant of the plurality of participants is in a first window region, and
    a representation of a second participant of the plurality of participants is in a second window region that is different from the first window region; and
  in the spatial communication session:
    a representation of the first participant of the plurality of participants is not in a window region, and
    a representation of the second participant of the plurality of participants is not in a window region.

40. The method of claim 29, wherein the event is a request received during the communication session to transition a representation of the user of the computer system from a 3D representation to a 2D representation.

41. The method of claim 29, wherein the event is a request received during the communication session to transition the communication session from the spatial communication session to the non-spatial communication session.

42. The method of claim 29, wherein the event is an additional participant joining the communication session.

43. The method of claim 29, further comprising:
  while the communication session is a non-spatial communication session, shifting a position of a respective window region corresponding to a respective participant based on the respective participant moving.

44. The method of claim 29, further comprising:
  while participating in the communication session that is a non-spatial communication session, detecting a second event; and
  in response to detecting the second event, transitioning the communication session from the non-spatial communication session to the spatial communication session.

45. The method of claim 29, further comprising:
  while in a spatial communication session, displaying, via the display generation component, a self-view of a representation of the user of the computer system in a self-view window region.

46. The method of claim 29, wherein:
  during a spatial communication session, a first participant of the communication session is enabled to move a respective representation of the first participant and a second participant of the communication session is enabled to move a respective representation of the second participant; and
  during a non-spatial communication session, a user of the computer system is enabled to move respective window regions that include respective representations of the plurality of participants of the communication session.

47. The method of claim 29, further comprising:
  in response to changing between a spatial communication and a non-spatial communication session, displaying, via the display generation component, an indication that a mode of the communication session has changed.

* * * * *